US008745881B2

(12) United States Patent
Thompson et al.

(10) Patent No.: US 8,745,881 B2
(45) Date of Patent: Jun. 10, 2014

(54) POWER OPERATED ROTARY KNIFE

(75) Inventors: Terry J. Thompson, Wakeman, OH (US); Nicholas A. Mascari, Wellington, OH (US); Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 13/556,008

(22) Filed: Jul. 23, 2012

(65) Prior Publication Data

US 2013/0185944 A1 Jul. 25, 2013

Related U.S. Application Data

(63) Continuation-in-part of application No. 13/189,938, filed on Jul. 25, 2011.

(51) Int. Cl.
*B26B 7/00* (2006.01)

(52) U.S. Cl.
USPC ............................................ 30/276; 30/347

(58) Field of Classification Search
USPC ................................ 30/123, 347, 272.1, 276
See application file for complete search history.

(56) References Cited

U.S. PATENT DOCUMENTS

| | | | | |
|---|---|---|---|---|
| 1,220,345 A * | 3/1917 | Koster | ........................ | 384/571 |
| 1,374,988 A * | 4/1921 | Cooper | ........................ | 384/505 |
| 1,476,345 A | 9/1922 | McGee | | |
| 2,266,888 A | 12/1941 | McCurdy et al. | | |
| 2,827,657 A * | 3/1958 | Bettcher | ...................... | 452/137 |

(Continued)

FOREIGN PATENT DOCUMENTS

| | | |
|---|---|---|
| DE | 29 06 128 | 8/1980 |
| DE | 199 68 802 C2 | 7/2001 |

(Continued)

OTHER PUBLICATIONS

International Search Report dated Oct. 16, 2012 and Written Opinion of the International Searching Authority dated Oct. 16, 2012 for PCT International Application No. PCT/US2012/040894, filed Jul. 13, 2012. PCT International Application No. PCT/US2012/046594 corresponds to and claims priority from the parent application (U.S. Appl. No. 13/189,938, filed Jul. 25, 2011) of the present application, (8 pages).

(Continued)

*Primary Examiner* — Sean Michalski
(74) *Attorney, Agent, or Firm* — Tarolli, Sundheim, Covell & Tummino LLP

(57) ABSTRACT

A two-part rotary knife blade (2300, 3300) for a power operated rotary knife. The knife blade (2300) includes a carrier portion (2302, 3302) and a blade portion (2350, 3350), the blade portion configured to be received in a nested relationship by the carrier portion and being releasably secured to the carrier portion by an attachment structure (2370, 3370). The attachment structure (2370, 3370) including a plurality of projections (2372, 3372) extending from one of an outer wall (2354, 3354) of the blade portion (2350, 3350) and the inner wall (2304, 3304) of the carrier portion and a plurality of sockets (2374, 3374) disposed in the other of the outer wall of the blade portion and the inner wall of the carrier portion, each of the plurality of projections being received in a respective different one of the plurality of sockets to releasably secure the blade portion to the carrier portion.

50 Claims, 71 Drawing Sheets

(56) References Cited

U.S. PATENT DOCUMENTS

| | | | | | |
|---|---|---|---|---|---|
| 3,150,409 | A | * | 9/1964 | Wilcox | 452/86 |
| RE25,947 | E | | 12/1965 | Bettcher | |
| 3,262,474 | A | * | 7/1966 | Enders | 408/209 |
| 3,269,010 | A | * | 8/1966 | Bettcher | 30/276 |
| 3,592,519 | A | * | 7/1971 | Martin | 384/503 |
| 3,816,875 | A | | 6/1974 | Duncan et al. | |
| 4,019,833 | A | * | 4/1977 | Gale | 416/220 R |
| 4,082,232 | A | | 4/1978 | Brewer | |
| 4,170,063 | A | | 10/1979 | Bettcher | |
| 4,178,683 | A | | 12/1979 | Bettcher | |
| 4,198,750 | A | | 4/1980 | Bettcher | |
| 4,236,531 | A | | 12/1980 | McCullough | |
| 4,267,759 | A | | 5/1981 | Sullivan et al. | |
| 4,326,361 | A | | 4/1982 | McGill | |
| 4,363,170 | A | | 12/1982 | McCullough | |
| 4,418,591 | A | * | 12/1983 | Astle | 82/113 |
| 4,439,924 | A | | 4/1984 | Bettcher | |
| 4,494,311 | A | * | 1/1985 | McCullough | 30/276 |
| 4,509,261 | A | * | 4/1985 | Bettcher | 30/276 |
| 4,516,323 | A | * | 5/1985 | Bettcher et al. | 30/276 |
| 4,575,938 | A | * | 3/1986 | McCullough | 30/276 |
| 4,590,676 | A | | 5/1986 | Bettcher | |
| 4,609,227 | A | | 9/1986 | Wild et al. | |
| 4,637,140 | A | * | 1/1987 | Bettcher | 30/276 |
| 4,829,860 | A | * | 5/1989 | VanderPol | 82/113 |
| 4,854,046 | A | * | 8/1989 | Decker et al. | 452/149 |
| 4,865,473 | A | | 9/1989 | De Vito | |
| 4,909,640 | A | | 3/1990 | Nakanishi | |
| 4,942,665 | A | | 7/1990 | McCullough | |
| 5,033,876 | A | | 7/1991 | Kraus | |
| 5,071,264 | A | | 12/1991 | Franke et al. | |
| 5,099,721 | A | | 3/1992 | Decker et al. | |
| 5,230,154 | A | | 7/1993 | Decker et al. | |
| 5,331,877 | A | | 7/1994 | Ishii | |
| 5,419,619 | A | | 5/1995 | Lew | |
| 5,522,142 | A | * | 6/1996 | Whited | 30/276 |
| 5,529,532 | A | * | 6/1996 | Desrosiers | 451/344 |
| 5,664,332 | A | * | 9/1997 | Whited et al. | 30/276 |
| 5,692,307 | A | * | 12/1997 | Whited et al. | 30/276 |
| 5,749,661 | A | | 5/1998 | Moller | |
| 5,761,817 | A | * | 6/1998 | Whited et al. | 30/276 |
| 5,971,413 | A | | 10/1999 | El-Kassouf | |
| 6,209,439 | B1 | * | 4/2001 | Repac et al. | 83/858 |
| 6,247,847 | B1 | | 6/2001 | Lob | |
| 6,364,086 | B1 | | 4/2002 | Blaurock | |
| 6,604,288 | B2 | | 8/2003 | Whited et al. | |
| 6,615,494 | B2 | | 9/2003 | Long et al. | |
| 6,662,452 | B2 | | 12/2003 | Whited | |
| 6,665,940 | B2 | | 12/2003 | Sanders et al. | |
| 6,694,649 | B2 | | 2/2004 | Whited et al. | |
| 6,751,872 | B1 | | 6/2004 | Whited et al. | |
| 6,769,184 | B1 | | 8/2004 | Whited | |
| 6,857,191 | B2 | | 2/2005 | Whited et al. | |
| 6,978,548 | B2 | | 12/2005 | Whited et al. | |
| 7,000,325 | B2 | | 2/2006 | Whited | |
| 7,107,887 | B2 | | 9/2006 | Whited | |
| 7,207,114 | B2 | | 4/2007 | Rosu et al. | |
| 7,959,419 | B2 | * | 6/2011 | Borowski et al. | 417/423.15 |
| 8,074,363 | B2 | * | 12/2011 | Whited | 30/276 |
| 8,448,340 | B2 | * | 5/2013 | Whited | 30/276 |
| 8,505,207 | B2 | * | 8/2013 | Thien | 30/276 |
| 2003/0131482 | A1 | * | 7/2003 | Long et al. | 30/276 |
| 2006/0137193 | A1 | * | 6/2006 | Whited | 30/276 |
| 2006/0211966 | A1 | * | 9/2006 | Hatton et al. | 602/16 |
| 2006/0275152 | A1 | * | 12/2006 | Borowski et al. | 417/360 |
| 2007/0283573 | A1 | * | 12/2007 | Levsen | 30/276 |
| 2007/0283574 | A1 | | 12/2007 | Levsen | |
| 2008/0098605 | A1 | | 5/2008 | Whited et al. | |
| 2008/0168667 | A1 | * | 7/2008 | Spinato | 30/391 |
| 2009/0227192 | A1 | | 9/2009 | Luthi et al. | |
| 2011/0185580 | A1 | | 8/2011 | Whited | |
| 2011/0247220 | A1 | | 10/2011 | Whited et al. | |
| 2012/0030952 | A1 | * | 2/2012 | Levsen | 30/276 |
| 2013/0025134 | A1 | * | 1/2013 | Mascari et al. | 30/165 |
| 2013/0025136 | A1 | * | 1/2013 | Whited et al. | 30/276 |
| 2013/0025137 | A1 | * | 1/2013 | Whited et al. | 30/276 |
| 2013/0025138 | A1 | * | 1/2013 | Whited et al. | 30/276 |
| 2013/0025139 | A1 | * | 1/2013 | Whited et al. | 30/276 |
| 2013/0185944 | A1 | | 7/2013 | Thompson et al. | |
| 2013/0243358 | A1 | * | 9/2013 | Stork et al. | 384/445 |

FOREIGN PATENT DOCUMENTS

| | | |
|---|---|---|
| FR | 1216947 | 4/1960 |
| WO | WO 01/41980 A1 | 6/2001 |
| WO | WO 2008/107490 A1 | 9/2008 |

OTHER PUBLICATIONS

International Search Report dated Nov. 30, 2012 and Written Opinion of the International Searching Authority dated Nov. 30, 2012 for PCT International Application No. PCT/US2012/0487989, filed Jul. 24, 2012, PCT International Application No. PCT/US2012/0467989 corresponds to the present application. PCT International Application No. PCT/US2012/047989 claims priority from the present application and from U.S. Appl. No. 13/189,938. (15 pages).

Oct. 3, 2011 Decision and Opinion of the United States Court of Appeals for the Federal Circuit (Appeal No. 2011-1038, -1046) regarding the case styled *Bettcher Industries, Inc*, v. *Brunzl USA, Inc. and Bunzl Processor Distribution, LLC*, Case No. 3:08 CV 2423, U.S. District Court for the Northern District of Ohio, Judge Zouhary. The Decision and Opinion relates to U.S. Pat. No. 7,000,325, owned by the assignee of the present application. (47 pages).

Catalog entitled "Ball Bearing Cages", Publication No. WLK 100 E, Publication Date—Sep. 2004, Published by International Customized Bearings. (34 pages).

International Search Report dated Nov. 30, 2012 and Written Opinion of the International Searching Authority dated Nov. 30, 2012 for PCT International Application No. PCT/US2012/047989, filed Jul. 24 2012. PCT International Application No. PCT/US2012/047989 corresponds to the present application. PCT International Application No. PCT/US2012/047989 claims priority from the present application and from U.S. Appl. No. 13/189,938, filed Jul. 25, 2011, (15 pages).

* cited by examiner

POWER OPERATED ROTARY KNIFE

CROSS-REFERENCE TO RELATED APPLICATION

The present application is a continuation-in-part application of co-pending U.S. application Ser. No. 13/189,938, filed Jul. 25, 2011 and entitled POWER OPERATED ROTARY KNIFE. The present application claims priority from above-identified application Ser. No. 13/189,938, which is incorporated herein in its entirety by reference, for all purposes.

TECHNICAL FIELD

The present disclosure relates to a power operated rotary knife.

BACKGROUND

Power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy and cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by a pneumatic or electric motor. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Conventional power operated rotary knives are disclosed in U.S. Pat. Nos. 6,354,949 to Baris et al., 6,751,872 to Whited et al., 6,769,184 to Whited, and 6,978,548 to Whited et al., all of which are assigned to the assignee of the present invention and all of which are incorporated herein in their respective entireties by reference.

SUMMARY

In one aspect, the present disclosure relates a power operated rotary knife comprising: an annular rotary knife blade including a wall defining a knife blade bearing surface; a blade housing including a wall defining a blade housing bearing surface; and a blade-blade housing bearing structure disposed between the knife blade bearing surface and the blade housing bearing surface, the blade-blade housing bearing structure supporting the knife blade for rotation with respect to the blade housing about a knife blade central axis, the blade-blade housing bearing structure including an elongated rolling bearing strip that extends circumferentially around the knife blade central axis between the knife blade bearing surface and the blade housing bearing surface. In one exemplary embodiment, the elongated rolling bearing strip comprises a plurality of rolling bearings disposed in spaced apart relation and a flexible separator cage for positioning the plurality of spaced apart rolling bearings.

In another aspect, the present disclosure relates to a support structure for use with a power operated rotary knife including an annular rotary knife blade rotating about a central axis and an annular blade housing, the support structure disposed between a knife blade bearing surface and a blade housing bearing surface to secure and rotatably support the knife blade with respect to the blade housing, the support structure comprising: an elongated rolling bearing strip having a plurality of rolling bearings disposed in spaced apart relation and a flexible separator cage for positioning the plurality of spaced apart rolling bearings, the rolling bearing strip extending circumferentially between the knife blade bearing surface and the blade housing bearing surface, the separator cage forming at least a portion of a circle and each of the plurality of rolling bearings extending radially from the separator cage and adapted to contact the knife blade bearing surface and the blade housing bearing surface.

In another aspect, the present disclosure relates to a method of supporting an annular knife blade for rotation about a central axis in a blade housing of a power operated rotary knife, the method comprising: aligning a knife blade and blade housing such that a bearing surface of the knife blade is in radial alignment with a bearing surface of the blade housing, the knife blade bearing surface and the blade housing bearing surface defining an annular passageway; and routing a rolling bearing strip along the annular passageway such that the strip extends circumferentially around the knife blade central axis between the knife blade bearing surface and the blade housing bearing surface forming at least a portion of a circle about the central axis.

In another aspect, the present disclosure relates to a power operated rotary knife comprising: a head assembly including a gearbox assembly, an annular rotary knife blade, a blade housing, and a blade-blade housing bearing structure; the blade housing coupled to the gearbox assembly and including an annular blade support section defining a bearing surface formed on an inner wall of the annular blade support section; the annular rotary knife blade including a body and a blade section extending axially from the body, the body including a first, upper end and a lower, second end spaced axially apart and an inner wall and an outer wall spaced radially apart, the blade section extending from the lower end of the body, the outer wall defining a knife blade bearing surface and a set of gear teeth, the set of gear teeth being axially spaced from the upper end of the body and from the knife blade bearing surface; the blade-blade housing bearing structure disposed between the knife blade bearing surface and the blade housing bearing surface; and a gear train of the gearbox assembly, the gear train including a drive gear having a plurality of gear teeth that mesh with the set of gear teeth of the knife blade to rotate the knife blade with respect to the blade housing.

In another aspect, the present disclosure relates to an annular rotary knife blade for rotation about a central axis in a power operated rotary knife, the rotary knife blade comprising: an annular rotary knife blade including a body and a blade section extending axially from the body, the body including a first upper end and a second lower end spaced axially apart and an inner wall and an outer wall spaced radially apart; the blade section extending from the lower end of the body; and the outer wall defining a knife blade bearing surface and a set of gear teeth, the set of gear teeth being axially spaced from the upper end of the body and axially spaced from the knife blade bearing surface.

In another aspect, the present disclosure relates to a power operated rotary knife comprising: a gearbox assembly including a gearbox housing and a gearbox; a blade housing coupled to the gearbox housing; and an annular rotary knife blade including an upper end and an axially spaced apart lower end, the lower end defining a cutting edge of the blade, the knife blade further including an outer wall defining a set of gear teeth, the set of gear teeth being axially spaced from the upper end of the knife blade, the knife blade rotating about a central axis with respect to the blade housing; the gearbox comprising a gear train including a pinion gear and a drive gear, the pinion gear engaging and rotating the drive gear and the drive gear engaging and rotating the knife blade about the central axis; and the drive gear comprising a double gear including a first gear engaging and being rotated by the pinion gear about a rotational axis of the drive gear and a second gear engaging the set of gear teeth of the knife blade to rotate the knife blade about the central axis, the first and second gears of the drive gear being concentric with the drive gear rotational axis.

In another aspect, the present disclosure relates to a gear train supported in a gearbox housing of a power operated rotary knife to rotate an annular rotary knife blade about a central axis, the gear train comprising: a pinion gear and drive gear wherein the pinion gear engages and rotates the drive gear and the drive gear is configured to engage and rotate an annular rotary knife blade; and wherein the drive gear comprises a double gear including a first gear engaging and being rotated by the pinion gear about a rotational axis of the drive gear and a second gear configured to engage an annular rotary knife blade, the first and second gears of the drive gear being concentric with the drive gear rotational axis.

In another aspect, the present disclosure relates to an annular blade housing for a power operated rotary knife, the blade housing comprising: an inner wall and an outer wall, the inner wall defining a blade housing bearing surface, the blade housing further including a cleaning port having an entry opening and exit opening, the exit opening being in the inner wall and in fluid communication with the blade housing bearing surface.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface on the inner wall; a blade-blade housing bearing structure disposed between the knife blade bearing surface and the blade housing bearing surface, the blade-blade housing bearing structure supporting the knife blade for rotation with respect to the blade housing about a knife blade central axis; and the blade housing further including a cleaning port extending radially between the inner wall and the outer wall, cleaning port including an entry opening and an exit opening, the exit opening being in the inner wall and in fluid communication with the blade housing bearing surface.

In another aspect, the present disclosure relates to an annular blade housing for a power operated rotary knife, the blade housing comprising: an inner wall and an outer wall, the inner wall defining a blade housing bearing surface, the blade housing further including a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug configured to be releasably secured within the blade housing plug opening.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface; a blade-blade housing bearing structure disposed between the knife blade bearing surface and the blade housing bearing surface, the blade-blade housing bearing structure supporting the knife blade for rotation with respect to the blade housing about a knife blade central axis; and wherein the blade housing further includes a blade housing plug opening extending between and through the inner wall and the outer wall, an end of the blade housing plug opening at the inner wall intersecting the blade housing bearing surface to provide access to the blade housing bearing surface through the blade housing plug opening, and a blade housing plug configured to be releasably secured within the blade housing plug opening.

In another aspect, the present disclosure relates to an annular blade housing comprising: an inner wall and an outer wall, a section of the inner wall defining a blade housing bearing surface, the blade housing bearing surface being axially spaced from opposite first and second ends of the inner wall, the blade housing further including a projection at one of the first and second ends of the inner wall, the projection extending radially inwardly with respect to the section of the inner wall defining the blade housing bearing surface.

In another aspect, the present disclosure relates to a power operated rotary knife comprising: an annular rotary knife blade including a wall defining a knife blade bearing surface; an annular blade housing comprising an inner wall and an outer wall, the inner wall defining a blade housing bearing surface; a blade-blade housing bearing structure disposed between the knife blade bearing surface and the blade housing bearing surface, the blade-blade housing bearing structure supporting the knife blade for rotation with respect to the blade housing about a knife blade central axis; and wherein the blade housing further includes a projection at one of the first and second ends of the inner wall, the projection extending radially inwardly with respect to the section of the inner wall defining the blade housing bearing surface.

In another aspect, the present disclosure relates to an annular rotary knife blade for rotation about an axis of rotation in a power operated rotary knife, the rotary knife blade comprising: an annular carrier portion including a first end and an axially spaced apart second end, an outer wall and a radially inward spaced apart inner wall extending respectively between the first end and the second end, the carrier portion including a set of gear teeth and a knife blade bearing surface; an annular blade portion including a first end and an axially spaced apart second end, an outer wall and a radially inward spaced apart inner wall extending respectively between the first end and the second end, and a cutting edge at the blade portion second end, the blade portion configured to be received in a nested relationship by the carrier portion; and an attachment structure for releasably securing the blade portion to the carrier portion, the attachment structure including a plurality of projections extending from one of the outer wall of the blade portion and the inner wall of the carrier portion and a plurality of sockets disposed in the other of the outer wall of the blade portion and the inner wall of the carrier portion, each of the plurality of projections being received in a respective different one of the plurality of sockets to releasably secure the blade portion to the carrier portion.

In another aspect, the present disclosure relates to a power operated rotary knife comprising: a two-part annular rotary knife blade rotating about an axis of rotation and defining a knife blade bearing race, the knife blade including an annular carrier portion, an annular blade portion and an attachment structure; a blade housing including an inner wall defining a blade housing bearing surface; and a blade-blade housing bearing structure disposed between the knife blade bearing surface and the blade housing bearing surface; the knife blade carrier portion including a first end and an axially spaced apart second end, an outer wall and a radially inward spaced apart inner wall extending respectively between the first end and the second end, and a set of gear teeth; the knife blade blade portion including a first end and an axially spaced apart second end, an outer wall and a radially inward spaced apart inner wall extending respectively between the first end and the second end, and a cutting edge at the blade portion second end, the blade portion configured to be received in a nested relationship by the carrier portion; and the knife blade attachment structure for releasably securing the blade portion to the carrier portion, the attachment structure including a plurality of projections extending from one of the outer wall of the blade portion and the inner wall of the carrier portion and a plurality of sockets disposed in the other of the outer wall of the blade portion and the inner wall of the carrier portion, each of the plurality of projections being received in a respective different one of the plurality of sockets to releasably secure the blade portion to the carrier portion.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
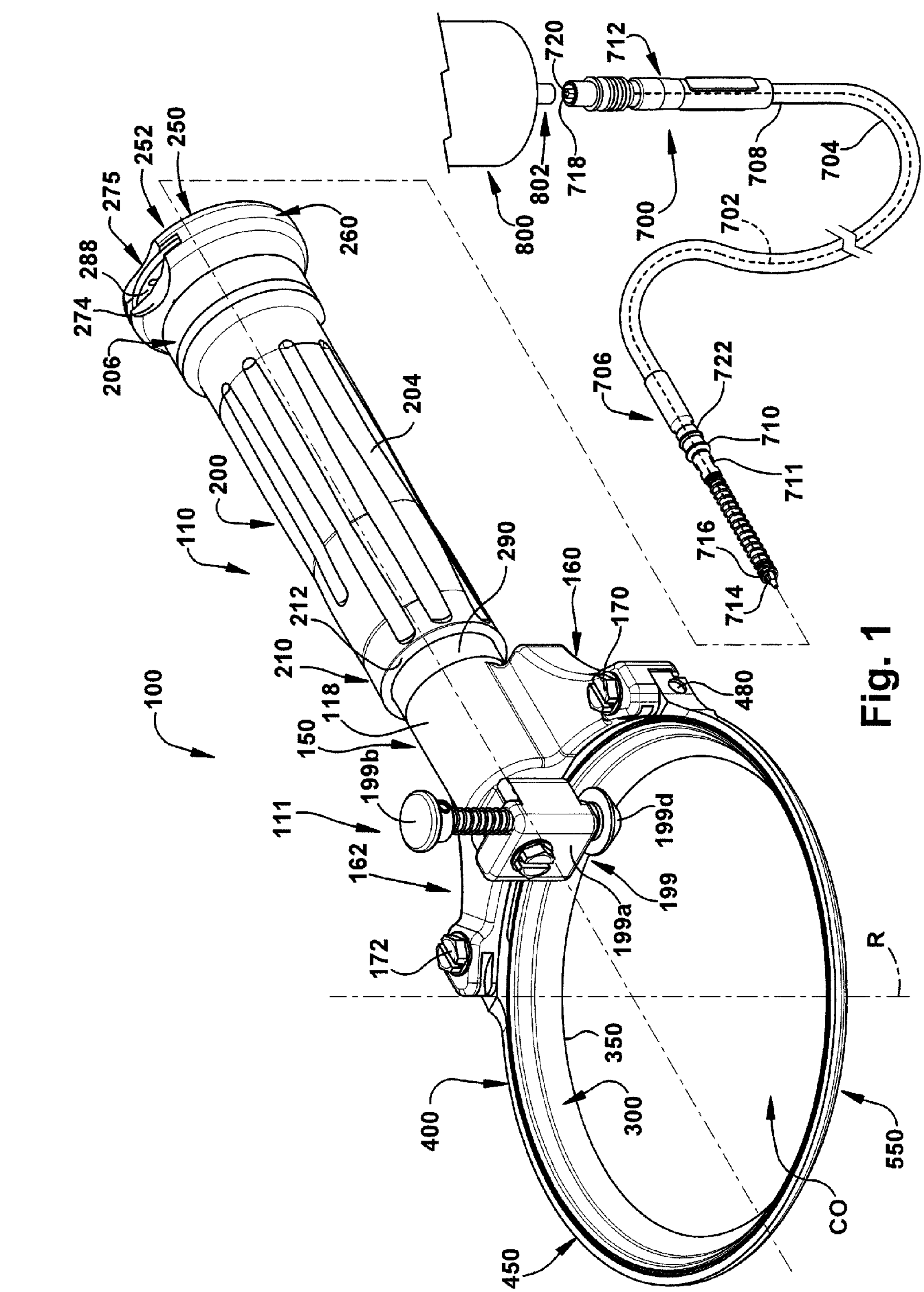
FIG. 1 is a schematic front perspective view of a first exemplary embodiment of a power operated rotary knife of the present disclosure including a head assembly, a handle assembly and a drive mechanism, the head assembly including a gearbox assembly, an annular rotary knife blade, a blade housing, and a blade-blade housing support or bearing structure and the handle assembly including a hand piece and a hand piece retaining assembly.

First Exemplary Embodiment—Power Operated Rotary Knife 100

Overview

Designers of power operated rotary knives are constantly challenged to improve the design of such knives with respect to multiple objectives. For example, there is a desire for increasing the rotational speed of the rotary knife blade of a power operated rotary knife. Generally, increasing blade rotational speed reduces operator effort required for cutting and trimming operations. There is also a desire for reducing the heat generated during operation of the power operated rotary knife. One source of generated heat is the blade-blade housing bearing interface, that is, heat generated at the bearing interface between the rotating knife blade and the stationary blade housing. Reducing generated heat during power operated rotary knife operation will tend to increase the useful life of various knife components. Additionally, reducing generated heat during knife operation will tend to reduce undesirable "cooking" of the product being cut or trimmed. If sufficient heat is generated in the bearing region of the rotary knife blade and blade housing, dislodged pieces or fragments of a product being cut or trimmed (e.g., small pieces or fragments of fat, gristle or meat dislodged during a trimming or cutting operations) in proximity to the bearing region may become so hot that the pieces "cook". The cooked materials tend to gum up the blade and blade housing bearing region resulting in even more undesirable heating.

There is further a desire for reducing the vibration of a power operated rotary knife during operation for purposes of improved operator ergonomics and, consequently, improved operator productivity. There is also a desire for increasing the useful life of components of a power operated rotary knife. Areas of potential improvement include the design of the rotary knife blade, the blade housing, the blade-blade housing bearing interface or bearing structure that supports the knife blade for rotation in the blade housing, and the gearing that rotatably drives the rotary knife blade in the blade housing.

Many conventional power operated rotary knives include a so-called split ring, annular blade housing. A split ring or split annular blade housing is one that includes a split through a diameter of the blade housing. The split allows for expansion of a circumference of the blade housing for purposes of removing a rotary knife blade that needs to be sharpened or is at the end of its useful life and inserting a new rotary knife blade. A split ring blade housing has several inherent disadvantages. Because of the split, a split ring blade housing is weaker than a blade housing without a split. Further, the split, which defines a discontinuity along the rotational path of the knife blade, is often a collection point for fragments of meat, fat, gristle and/or bones that are created during a cutting or trimming operation. Accumulation of such fragment or debris in the region of the split may generate heat and/or potentially result in increased vibration of the power operated rotary knife, both of which are undesirable results.

Additionally, a split ring blade housing requires operator adjustment of the blade housing circumference as the rotary knife blade wears. Given the large loading forces applied to the blade when cutting and trimming meat, wear will occur between the bearing structure of the blade and the corresponding bearing structure of the blade housing that support the blade for rotation within the blade housing. In some power operated rotary knives, the blade-blade housing bearing structure includes a portion of a radial outer surface of the rotary knife blade which serves as a bearing structure of the blade and a portion of a radial inner surface of the blade housing which serves as the corresponding or mating bearing structure of the blade housing. In such power operated rotary knifes, the outer radial surface of the blade and the corresponding radial inner surface of the blade housing will wear over time resulting in a gradual loosening of the rotary knife blade within the blade housing.

In certain power operated rotary knives, the blade-blade housing bearing structure comprises an inwardly extending bead of the blade housing that extends into a bearing race formed in a radial outer surface of the rotary knife blade to support the blade for rotation in the blade housing. Again, the bearing race of the blade and the bearing bead of the blade housing will wear over time resulting in looseness of the rotary knife blade within the blade housing. As the rotary knife blade becomes looser within the blade housing, the power operated rotary knife will typically experience increased vibration. An inexperienced operator may simply accept the increased vibration of the power operated rotary knife as a necessary part of using such a knife and will reduce his or her productivity by cutting or trimming at a slower pace, turning the knife off, taking additional time between cuts, etc.

An experienced operator may recognize that a potential solution to the problem of increased vibration is to adjust, that is, reduce the blade housing circumference, i.e., reduce the effective blade housing diameter, to account for the blade and blade housing bearing interface wear. Such an adjustment of the blade housing circumference is a trial and error technique that requires the operator to find a suitable operating clearance. Operating clearance can be viewed as striking a proper balance between providing sufficient blade-blade housing bearing clearance, that is, having the bearing diameter of the blade housing sufficiently larger than the corresponding mating bearing diameter of the knife blade such that the knife blade freely rotates in the blade housing while at the same time not having too much clearance that would cause the knife blade to have excessive play and/or vibrate in the blade housing.

However, even for an experience operator, adjustment of the blade housing circumference may be problematic. If the operator fails to appropriately adjust the blade housing circumference, i.e., find a suitable operating clearance, the power operated rotary knife may not function properly. If the operator's adjustment leads to insufficient operating clearance, the knife blade will not rotate freely in the blade housing, that is, the knife blade will tend to bind in the blade housing thereby generating heat and tending to increase the wear of the rotary knife blade, blade housing and drive gear components, all undesirable results. Depending on the degree of binding, the rotary knife blade may lock-up within the housing. On the other hand if the operator adjusts the blade housing circumference such that the operating clearance is too large, the knife blade will be loose in the blade housing. This may result in excessive movement of the knife blade within the blade housing and attendant problems of excessive vibration of the power operated rotary knife during operation.

Further, even if the operator is successful in adjusting the blade housing to an acceptable circumference, adjustment of the blade housing circumference necessarily requires the operator to cease cutting/trimming operations with the power operated rotary knife during the trial and error adjustment process. The adjustment process results in downtime and lost operator productivity. Finally, since wear of the rotary knife blade and blade housing bearing interface is ongoing as the power operated rotary knife continues to be used for cutting and trimming operations, the blade housing circumference adjustment undertaken by the operator is only a temporary fix as further wear occurs.

The present disclosure relates to a power operated rotary knife that addresses many of the problems associated with conventional power operated rotary knives and objectives of power operated rotary knife design. One exemplary embodiment of a power operated rotary knife of the present disclosure is schematically shown generally at 100 in FIGS. 1-9. The power operated rotary knife 100 comprises an elongated handle assembly 110 and a head assembly or head portion 111 removably coupled to a forward end of the handle assembly 110. The handle assembly 110 includes a hand piece 200 that is secured to the head assembly 111 by a hand piece retaining assembly 250.

In one exemplary embodiment, the head assembly 111 includes a continuous, generally ring-shaped or annular rotary knife blade 300, a continuous, generally ring-shaped or annular blade housing 400, and a blade-blade housing support or bearing structure 500. Annular, as used herein, means generally ring-like or generally ring-shaped in configuration. Continuous annular, as used herein, means a ring-like or ring-shape configuration that is continuous about the ring or annulus, that is, the ring or annulus does not include a split extending through a diameter of the ring or annulus. The head assembly 111 further includes a gearbox assembly 112 and a frame or frame body 150 for securing the rotary knife blade 300 and the blade housing 400 to the gearbox assembly 112.

The rotary knife blade 300 rotates in the blade housing 400 about a central axis of rotation R. In one exemplary embodiment, the rotary knife blade 300 includes a bearing surface 319 and a driven gear 328. Both the bearing race 319 and the driven gear 328 are axially spaced from an upper end 306 of a body 302 of the blade 300 and from each other. The rotary knife blade 300 is supported for rotation in the blade housing 400 by the blade-blade housing support or bearing structure 500 of the present disclosure (best seen in FIGS. 2A and 14). The blade-blade housing bearing structure 500 advantageously both supports the rotary knife blade 300 for rotation with respect to the blade housing 400 and releasably secures the rotary knife blade 300 to the blade housing 400.

In one exemplary embodiment, the blade-blade housing bearing structure 500 includes an elongated rolling bearing strip 502 (FIG. 14) having a plurality of spaced apart rolling bearings 506 supported in a flexible separator cage 508. The elongated rolling bearing strip 502 is disposed in an annular passageway 504 (FIG. 13) formed between opposing bearing surfaces 319, 459 of the rotary knife blade 300 and the blade housing 400, respectfully. The blade-blade housing bearing structure 500 defines a plane of rotation RP (FIGS. 7 and 8) of the rotary knife blade 300 with respect to the blade housing 400, the rotational plane RP being substantially orthogonal to the rotary knife blade central axis of rotation R.

In one exemplary embodiment, the plurality of rolling bearings 506 comprises a plurality of generally spherical ball bearings. The plurality of ball or rolling bearings 506 are in rolling contact with and bear against the opposing bearing surfaces 319, 459 of the rotary knife blade 300 and the blade housing 400 to support the knife blade 300 for rotation with respect to the blade housing 400 and secure the knife blade 300 with respect to the blade housing 400. The flexible separator cage 508 rotatably supports and locates the plurality of rolling bearings 506 in spaced apart relation within the annular passageway 504. The flexible separator cage 508 does not function as a bearing structure or provide a bearing surface with respect to the rotary knife blade 300 and the blade housing 400. The function of rotatably supporting the rotary knife blade 300 with respect to the blade housing 400 is solely provided by the rolling bearing support of the plurality of spaced apart ball bearings 506. This rolling bearing support can be contrasted with power operated rotary knives utilizing a sliding bearing structure. For example, U.S. Pat. No. 6,769,184 to Whited, discloses a sliding bearing structure comprising a blade housing having a plurality of circumferentially spaced, radially inwardly extending bead sections that extend into and bear against a bearing race or groove of a rotary knife blade and U.S. Published Application Pub. No. US 2007/0283573 to Levsen, which discloses a sliding bearing structure comprising an annular bushing having an elongated bushing body disposed along a groove in a blade housing and in contact with opposing bearing surfaces of a rotary knife blade and the blade housing.

Figure 13:
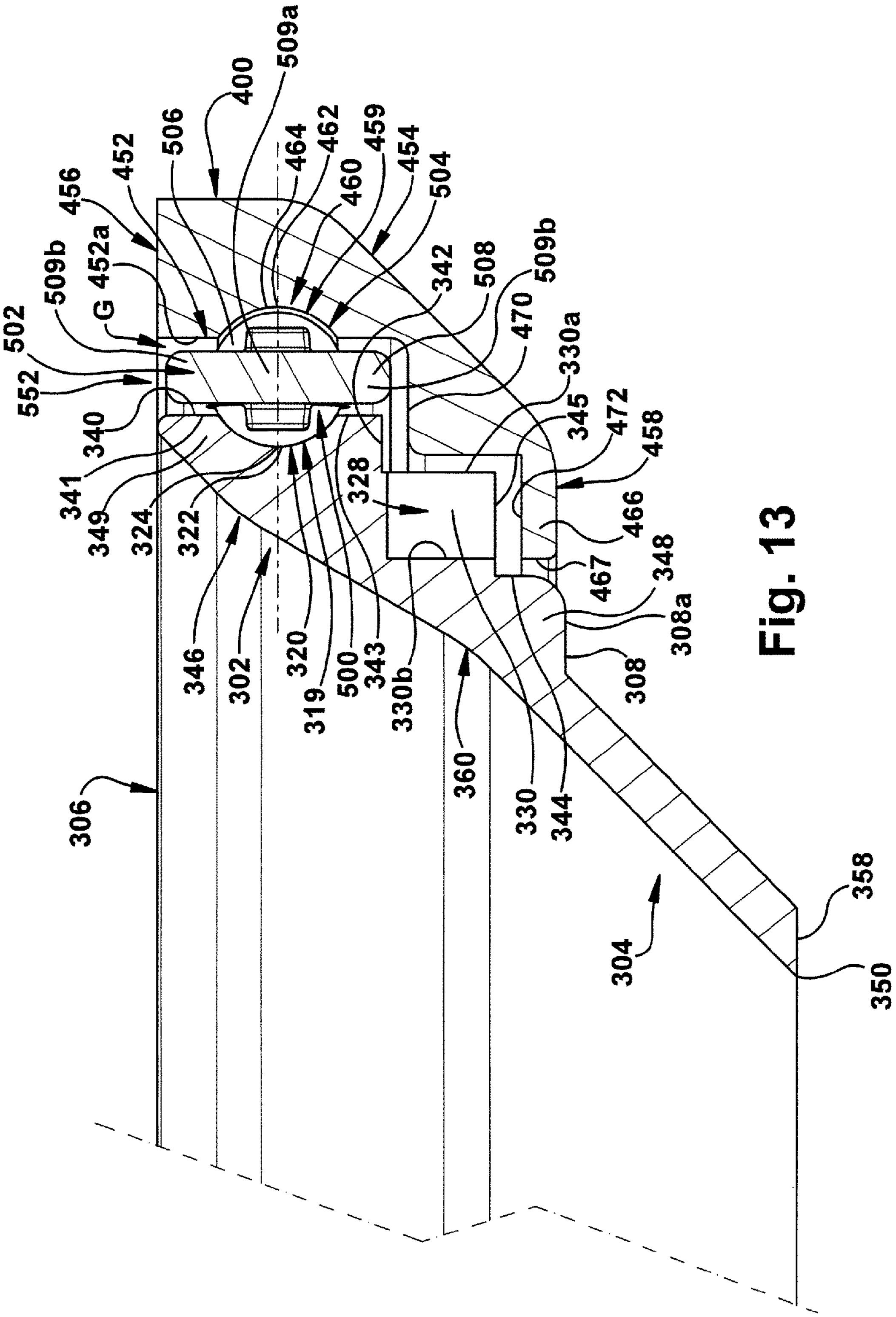
FIG. 13 is a schematic enlarged section view of the assembled combination of the rotary knife blade, the blade housing and the blade-blade housing bearing structure of the power operated rotary knife of FIG. 1 as seen from a plane indicated by the line 13-13 in FIG. 10.

As can best be seen in the sectional view of FIG. 13, the flexible separator cage 508 is configured to ride in the annular passageway 504 without substantial contact with either the knife blade 300 or the blade housing 400 or the opposing bearing surfaces 319, 459 of the knife blade 300 and blade housing. Indeed, it would not be desired for the flexible separator cage 508 to be in contact with or in bearing engagement with either the rotary knife blade 300 or the blade housing 400 as this would resulting in undesirable sliding friction. The blade-blade housing bearing structure 500 rotatably supports the knife blade 300 with respect to the blade housing 400 via rolling bearing support provided by the plurality of ball bearings 506 of the rolling bearing strip 502 bearing against the opposing bearing surfaces 319, 459 of the rotary knife blade 300 and the blade housing 400.

The rotational speed of a specific rotary knife blade 300 in the power operated rotary knife 100 will depend upon the specific characteristics of a drive mechanism 600 (shown schematically in FIG. 53) of the power operated rotary knife 100, including an external drive motor 800, a flexible shaft drive assembly 700, a gear train 604, and a diameter and gearing of the rotary knife blade 300. Further, depending on the cutting or trimming task to be performed, different sizes and styles of rotary knife blades may be utilized in the power operated rotary knife 100 of the present disclosure. For example, rotary knife blades in various diameters are typically offered ranging in size from around 1.4 inches in diameter to over 7 inches in diameter. Selection of a blade diameter will depend on the task or tasks being performed.

Increasing the rotational speed of the rotary knife blade of a power operated rotary knife is an important objective of designers of power operated rotary knives. The rolling bearing structure of the blade-blade housing bearing structure 500 of the present disclosure results in reduced friction, less generated heat and less surface wear than would be the case with a sliding or journal bearing structure. Because of the reduced friction and heat resulting from a rolling bearing structure, the rolling blade-blade housing bearing structure 500 permits increased rotational speed of the rotary knife blade 300 compared to the sliding bearing structures disclosed or used in prior power operated rotary knives.

By way of example only and without limitation, the following table compares blade rotational speed of two exemplary power operated rotary knives of the present disclosure versus the assignee's previous versions of those same models of power operated rotary knives. Of course, it should be appreciated the blade rotational speed increase will vary by model and will be dependent upon the specific characteristics of each particular model and blade size.

| Model | Approx. Blade Diameter | Approximate Blade Rotational Speed % Increase |
|---|---|---|
| 1000/1500 | 5.0 inches | 51% (930 RPM vs. 1,400 RPM) |
| 620 | 2.0 inches | 57% (1,400 RPM vs. 2,200 RPM) |

There are also significant advantages to using the flexible separator cage 508 to support and locate the plurality of rolling bearings 506, as opposed to, for example, using only a plurality of rolling bearings, such as ball bearings, inserted into a gap or passageway between the rotary knife blade and the blade housing. The flexible separator cage 508 facilitates insertion of and removal of, as a group, the plurality of rolling bearings 506 into and from the annular passageway 504. That is, it is much easier to insert the rolling bearing strip 502 into the annular passageway 504, as opposed to attempting to insert individual rolling bearings into the annular passageway 504 in a one-at-a-time, sequential order, which would be both time consuming and fraught with difficulty. This is especially true in a meat processing environment where a dropped or misplaced rolling bearing could fall into a cut or trimmed meat product. Similarly, removal of the plurality of rolling bearings 506, as a group, via removal of the rolling bearing strip 502 is much easier and less prone to dropping or losing rolling bearings than individually removing rolling bearings from the annular passageway 504.

Additionally, from the viewpoints of friction, bearing support and cost, utilizing the plurality of rolling bearings 506 supported in a predetermined, spaced apart relationship by the flexible separator cage 508, is more efficient and effective than utilizing a plurality of rolling bearings disposed loosely in a gap or passageway between the rotary knife blade and the blade housing. For example, the separator cage 508 allows for the plurality of rolling bearings 506 to be appropriately spaced to provide sufficient rolling bearing support to the rotary knife blade 300 given the application and characteristics of the product or material to be cut or trimmed with the power operated rotary knife 100, while at the same time, avoids the necessity of having more rolling bearings than required for proper bearing support of the rotary knife blade 500 and the application being performed with the power operated rotary knife 100.

For example, if the individual rolling bearings are tightly packed in a one-adjacent-the-next relationship in the annular passageway 504, more rolling bearings than needed for most applications would be provided, thereby unnecessarily increasing cost. Further, having more rolling bearings than needed would also increase total friction because of the friction between each pair of adjacent, in-contact, rolling bearings. If, on the other hand, the individual rolling bearings are loosely packed in the annular passageway 504, there is no control over the spacing between adjacent rolling bearings. Thus, there may be instances where a large gap or space may occur between two adjacent rolling bearings resulting in insufficient bearing support in a particular region of the annular passageway 504, given the cutting forces being applied to the rotary knife blade 300 during a specific cutting or trimming application or operation.

Figure 2:
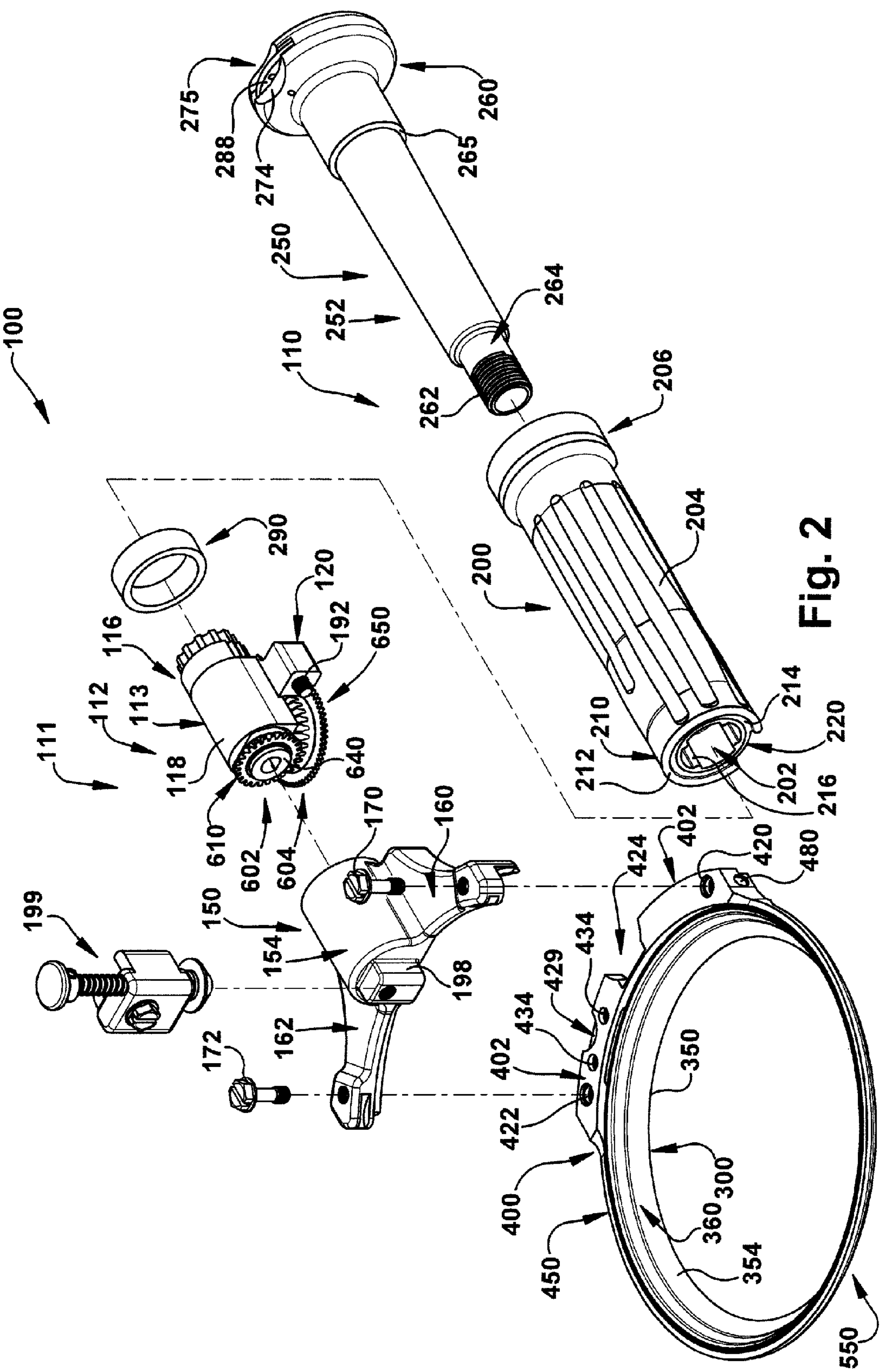
FIG. 2 is a schematic exploded perspective view of the power operated rotary knife of FIG. 1.

As can best be seen in FIG. 2, an assembled combination 550 of the rotary knife blade 300, the blade housing 400 and blade-blade housing bearing structure 500 is releasably secured as a unitary structure to the gearbox assembly 112 by the frame body 150 thereby completing the head assembly 111. For brevity, the assembled combination 550 of the rotary knife blade 300, the blade housing 400 and blade-blade housing bearing structure 500 will hereinafter be referred to as the blade-blade housing combination 550. The handle assembly 110 is releasably secured to the head assembly 111 thereby completing the power operated rotary knife 100. As used herein, a front or distal end of the power operated rotary knife 100 is an end of the knife 100 that includes the blade-blade housing combination 550 (as seen in FIG. 1), while a rear or proximal end of the power operated rotary knife 100 is an end of the knife 100 that includes the handle assembly 110, and specifically, an enlarged end 260 of an elongated central core 252 of the hand piece retaining assembly 250 (as seen in FIG. 1).

Figure 2A:
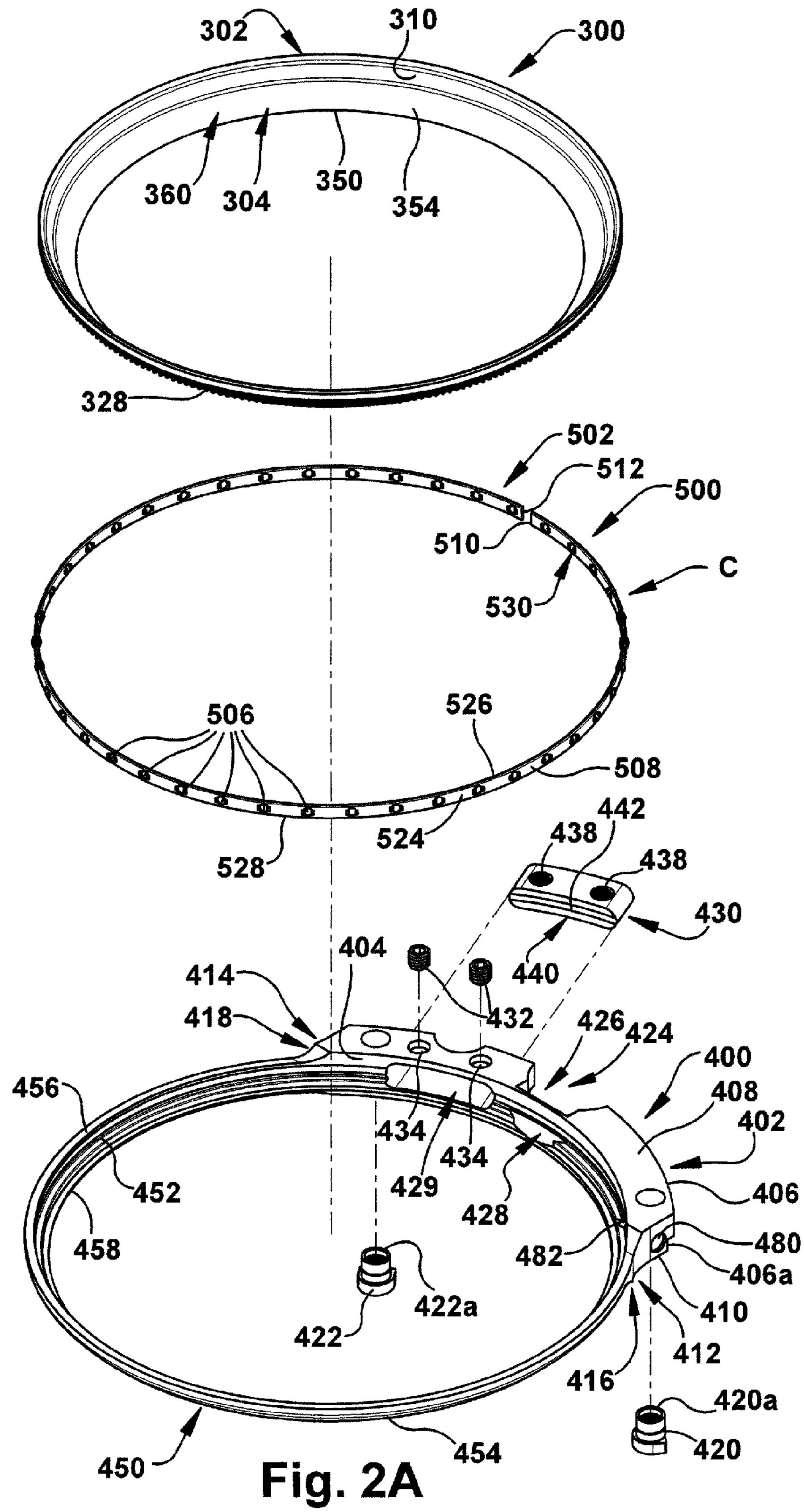
FIG. 2A is a schematic exploded perspective view of a portion of the head assembly of the power operated rotary knife of FIG. 1 including the rotary knife blade, the blade housing and the blade-blade housing bearing structure that, in one exemplary embodiment, includes an elongated rolling bearing strip that secures and rotatably supports the rotary knife blade with respect to the blade housing.
Figure 2B:
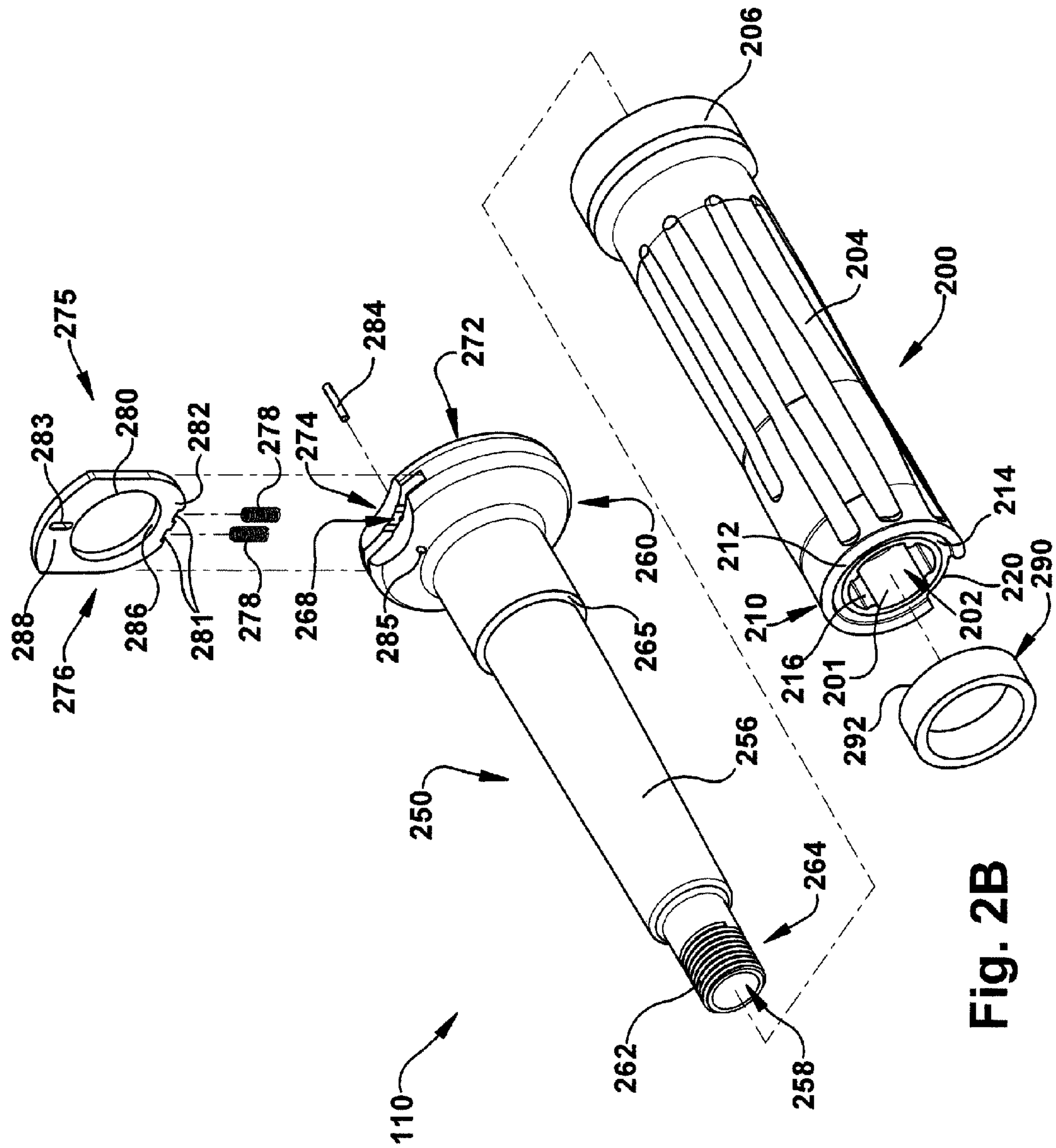
FIG. 2B is a schematic exploded perspective view of the handle assembly of the power operated rotary knife of FIG. 1 including the hand piece, the hand piece retaining assembly and a drive shaft latching assembly supported by the hand piece retaining assembly.
Figure 2C:
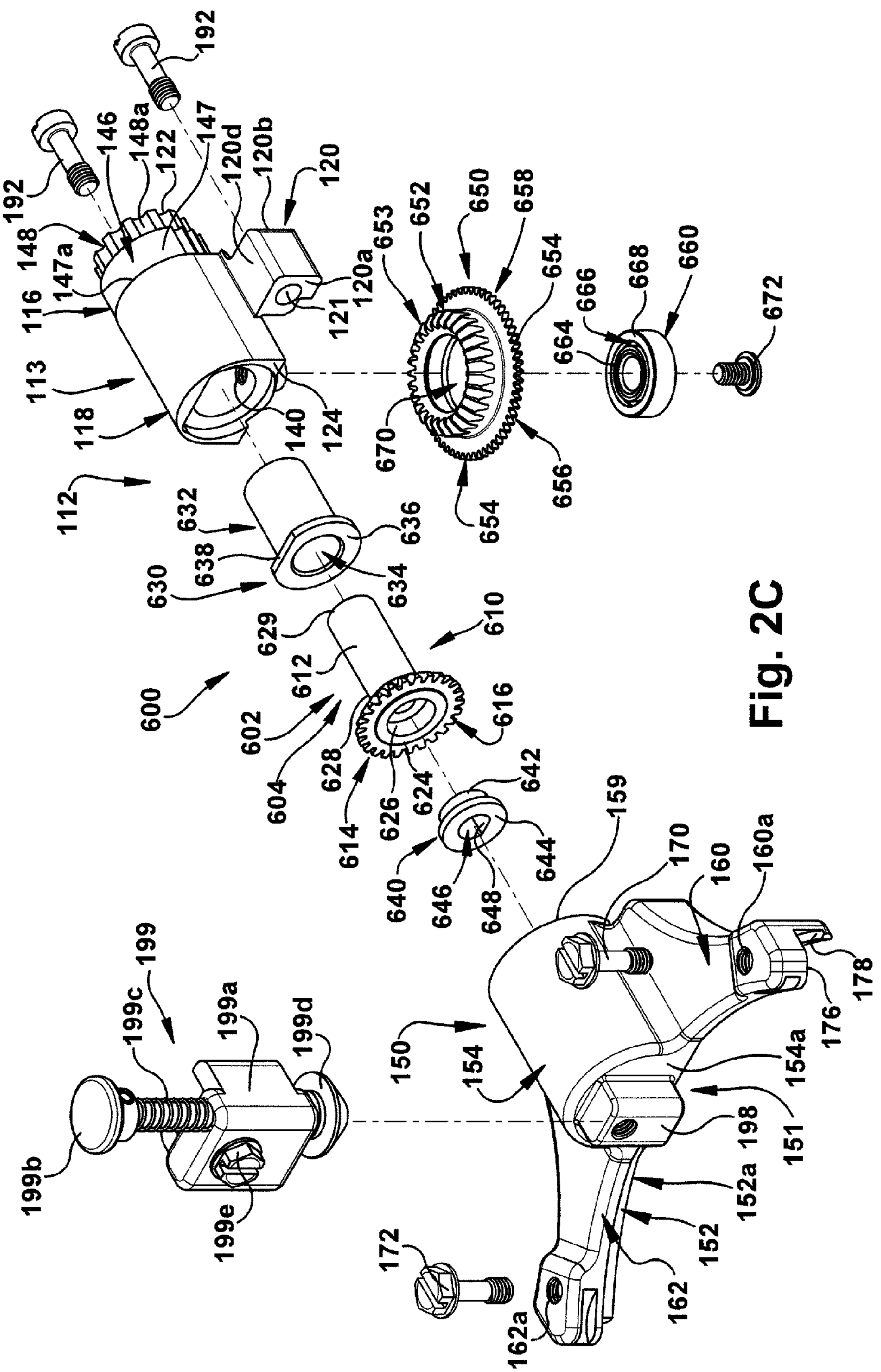
FIG. 2C is a schematic exploded perspective view of a portion of the head assembly of the power operated rotary knife of FIG. 1 including the gearbox assembly, a steeling assembly and a frame body, the gearbox assembly including a gearbox and a gearbox housing.
Figure 3:
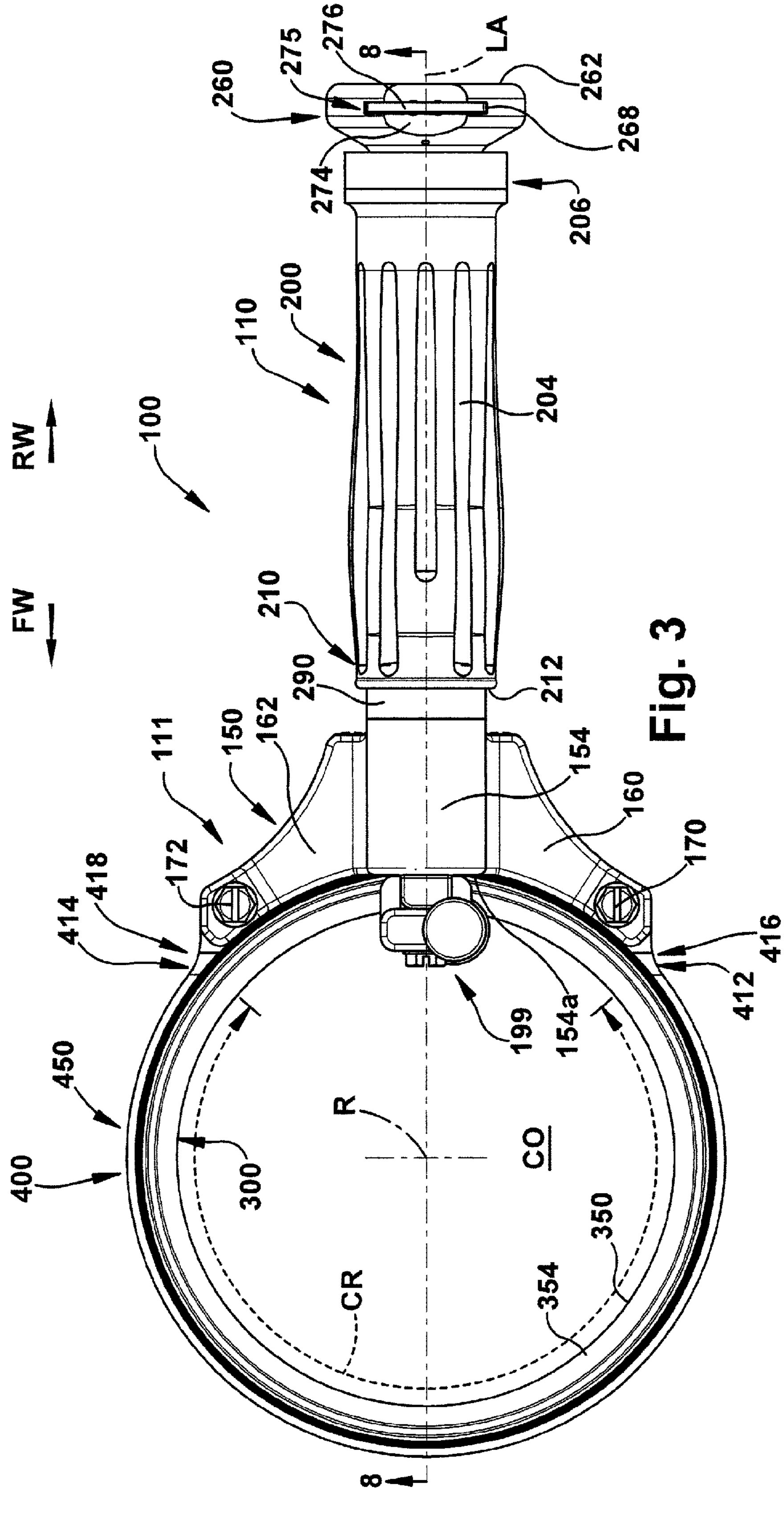
FIG. 3 is a schematic top plan view of the power operated rotary knife of FIG. 1.
Figure 4:
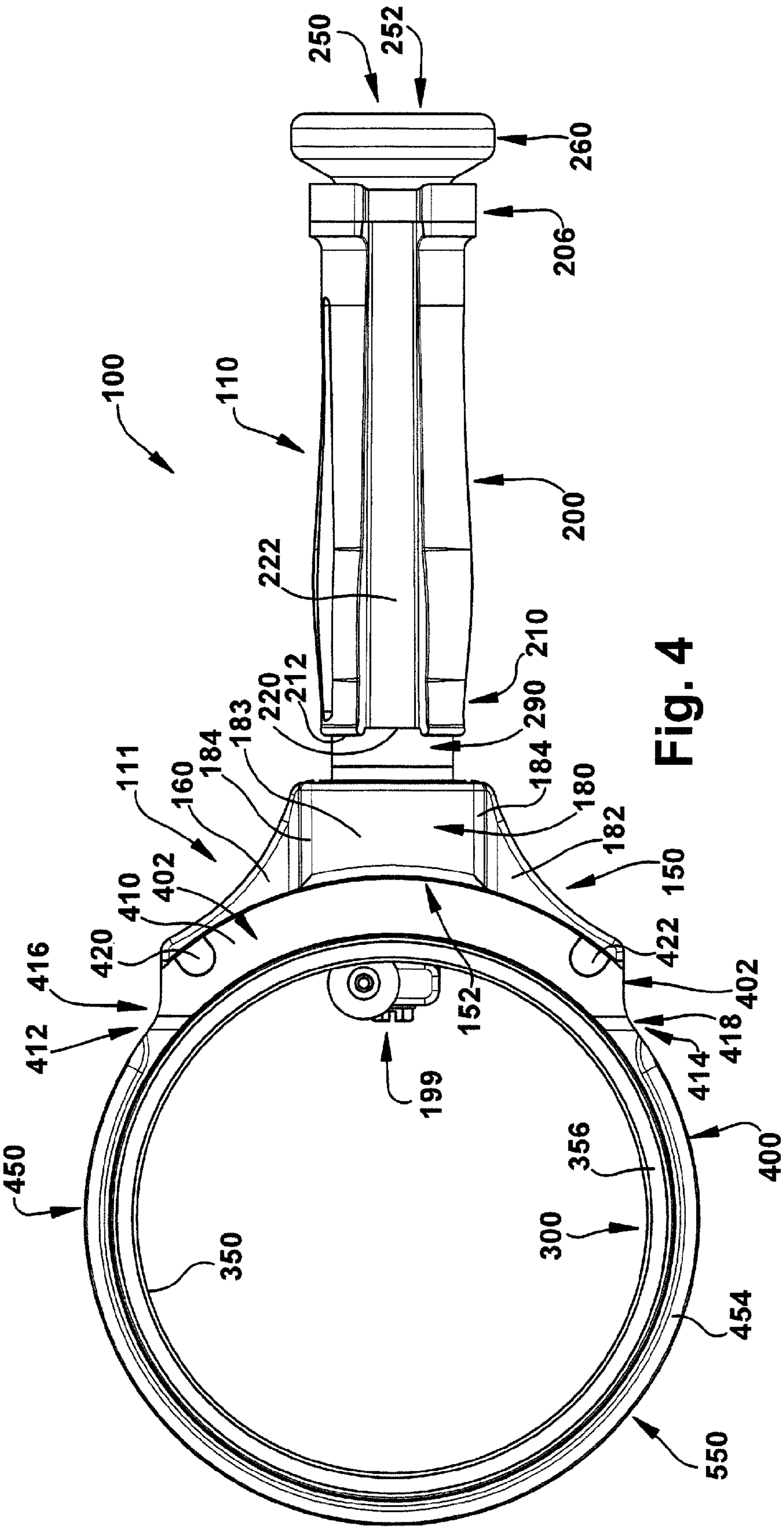
FIG. 4 is a schematic bottom plan view of the power operated rotary knife of FIG. 1.
Figure 5:
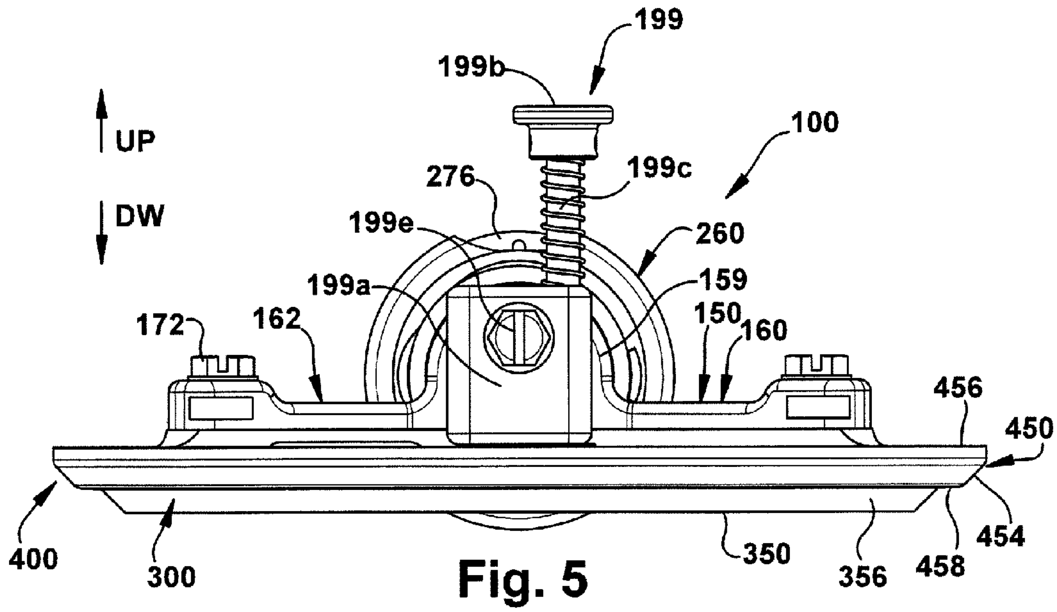
FIG. 5 is a schematic front elevation view of the power operated rotary knife of FIG. 1.
Figure 33:
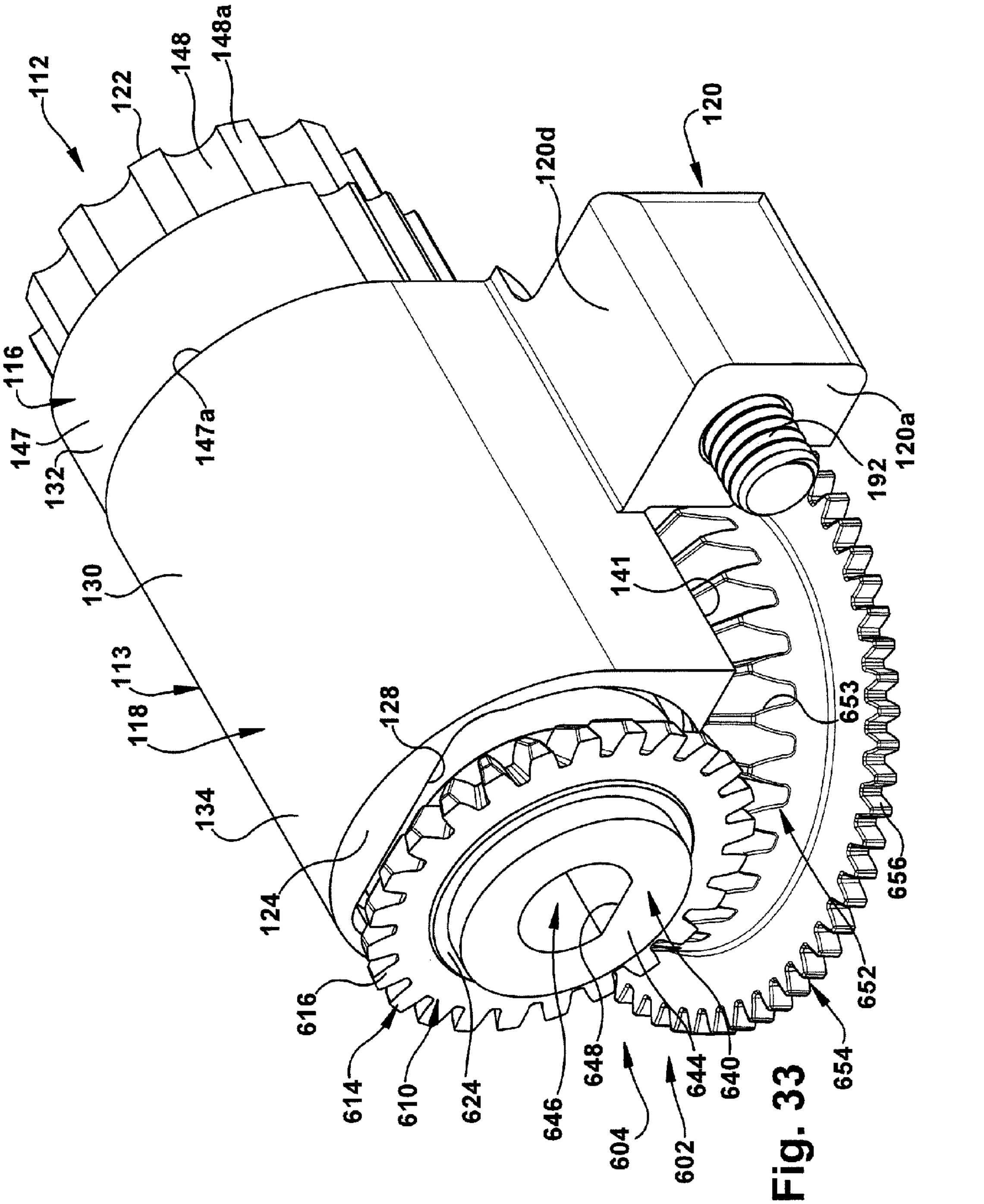
FIG. 33 is a schematic front prospective view of the gearbox assembly of the power operated rotary knife of FIG. 1.
Figure 34:
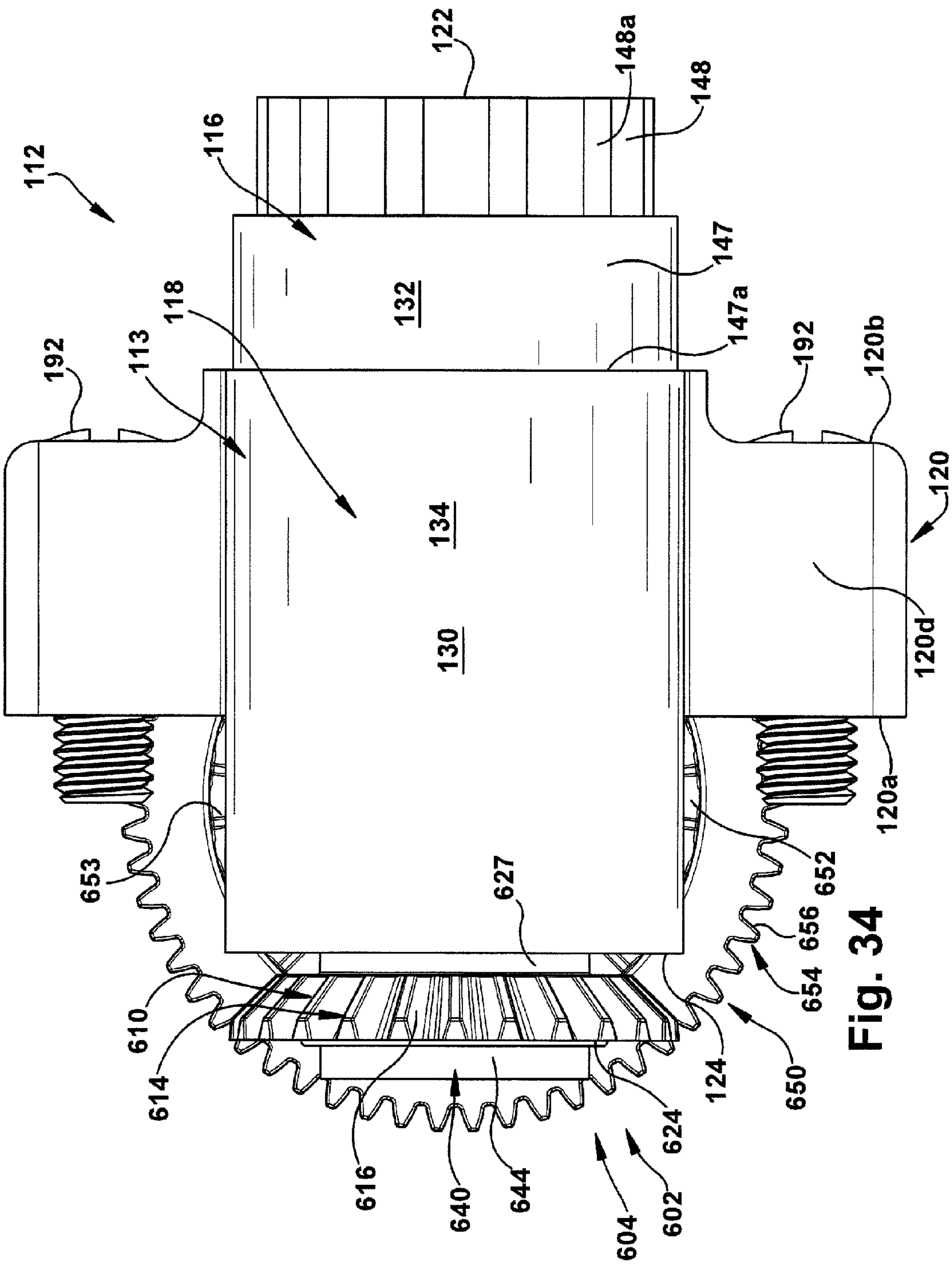
FIG. 34 is a schematic top plan view of the gearbox assembly of FIG. 33.
Figure 35:
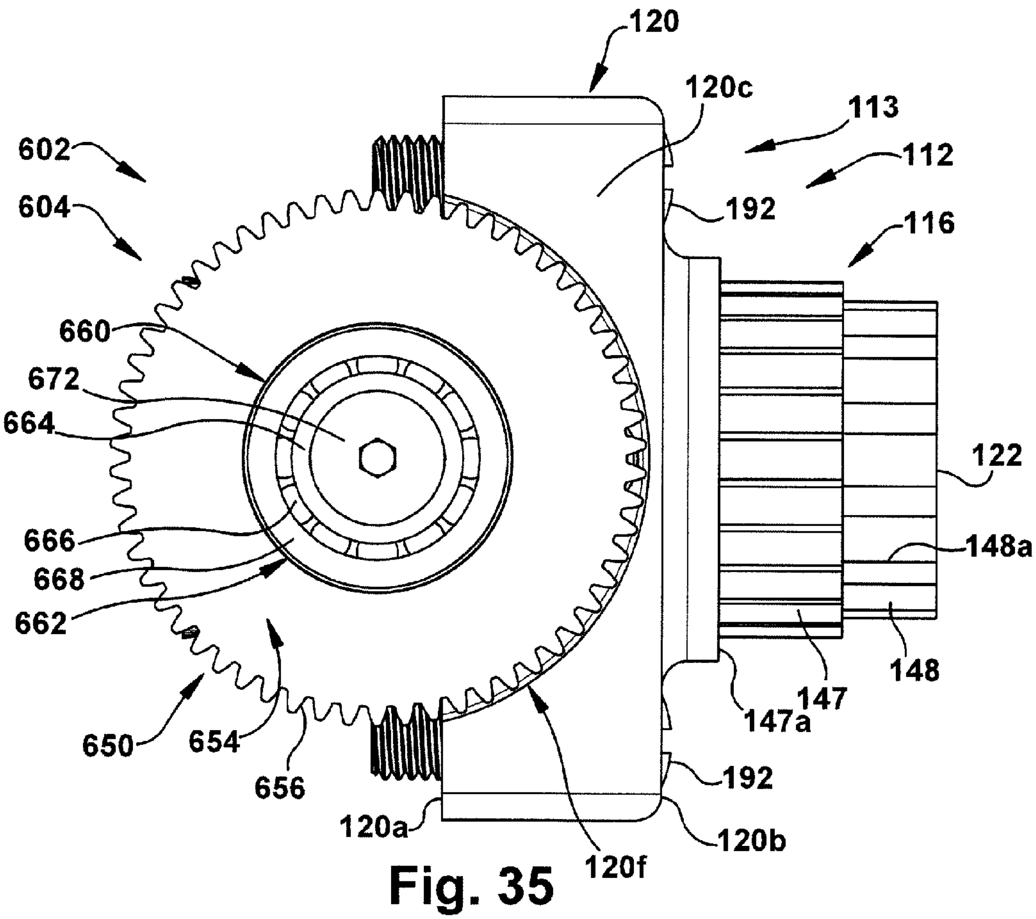
FIG. 35 is a schematic bottom plan view of the gearbox assembly of FIG. 33.
Figure 36:
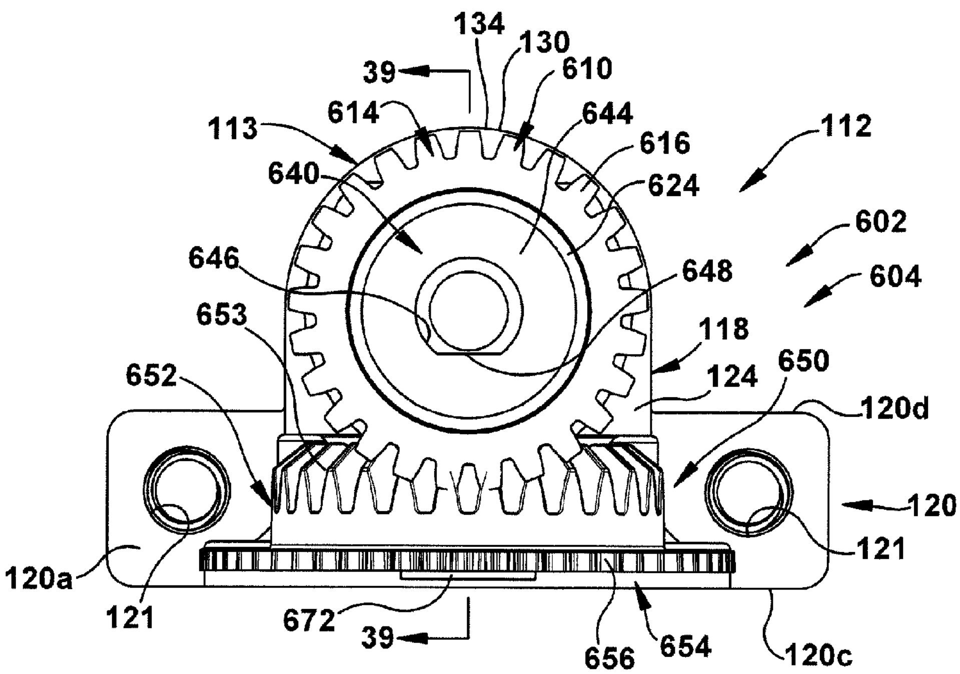
FIG. 36 is a schematic front elevation view of the gearbox assembly of FIG. 33.
Figure 41:
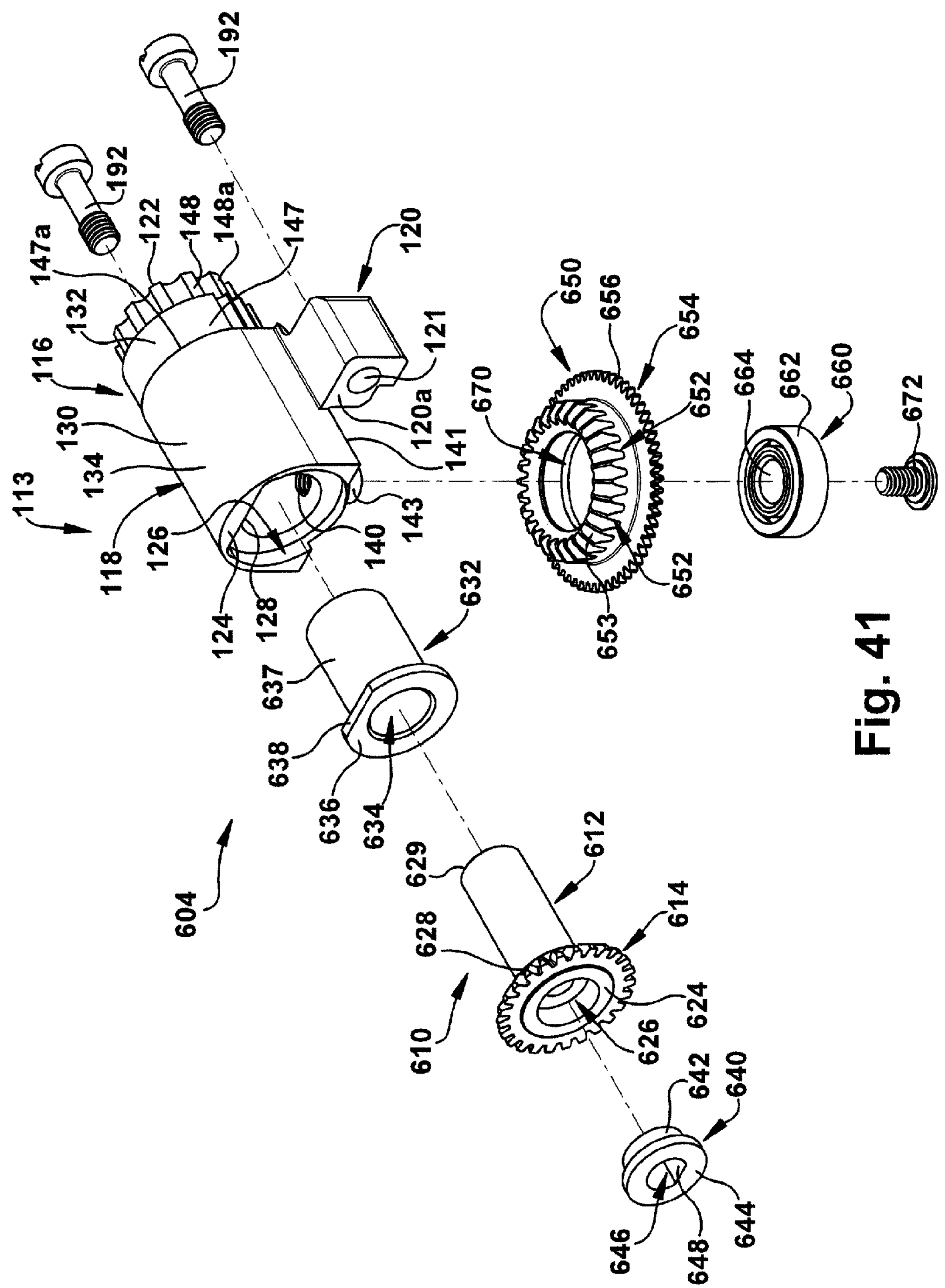
FIG. 41 is a schematic exploded perspective view of the gearbox assembly of FIG. 33.

The head assembly 111 includes the frame 150 and the gearbox assembly 112. As is best seen in FIGS. 2C and 33, the gearbox assembly 112 includes a gearbox housing 113 and a gearbox 602. The gearbox 602 is supported by the gearbox housing 113. The gearbox 602 includes the gear train 604 (FIG. 41). The gear train 604 includes, in one exemplary embodiment, a pinion gear 610 and a drive gear 650. The gearbox 602 includes the gear train 604, along with a bearing support assembly 630 that rotatably supports the pinion gear 610 and a bearing support assembly 660 that rotatably supports the drive gear 650.

The drive gear 650 is a double gear that includes a first bevel gear 652 and a second spur gear 654, disposed in a stacked relationship, about an axis of rotation DGR (FIG. 8A) of the drive gear 650. The drive gear axis of rotation DRG is substantially parallel to the rotary knife blade axis of rotation R. The drive gear first bevel gear 652 meshes with the pinion gear 610 to rotatably drive the drive gear 650 about the drive gear axis of rotation DGR. The second spur gear 654 of the drive gear engages the driven gear 328 of the rotary knife blade 300, forming an involute gear drive, to rotate the knife blade 300 about the blade axis of rotation R.

The gear train 604 is part of the drive mechanism 600 (shown schematically in FIG. 53), some of which is external to the power operated rotary knife 100, that provides motive power to rotate the rotary knife blade 300 with respect to the blade housing 400. The drive mechanism 600 includes the external drive motor 800 and the flexible shaft drive assembly 700, which is releasably secured to the handle assembly 110 by a drive shaft latching assembly 275 (FIG. 2B). The gear train 604 of the power operated rotary knife 100 transmits rotational power from a rotating drive shaft 702 of the flexible shaft drive assembly 700, through the pinion and drive gears 610, 650, to rotate the rotary knife blade 300 with respect to the blade housing 400.

Figure 45:
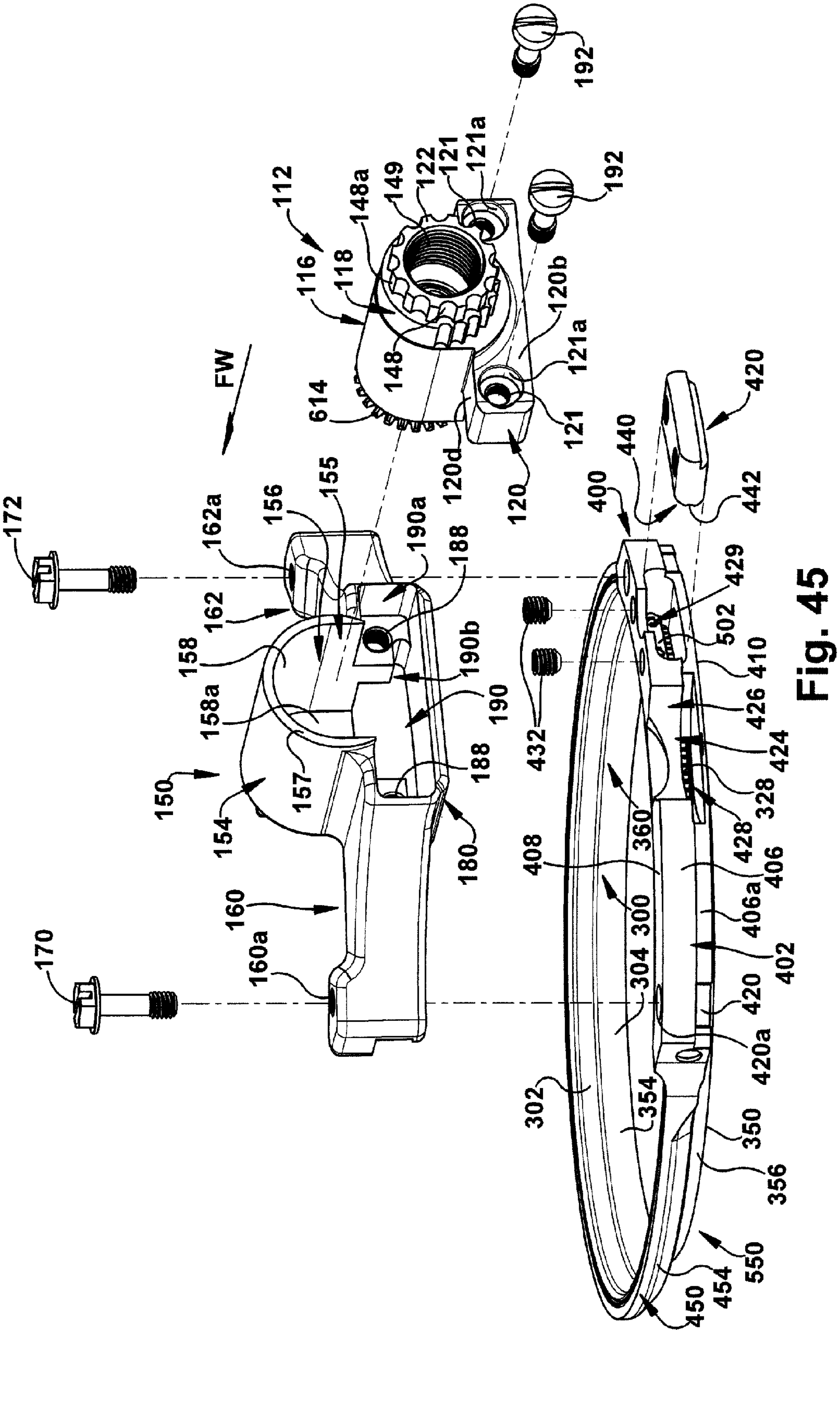
FIG. 45 is a schematic exploded rear perspective view of the head assembly of the power operated rotary knife of FIG. 1 showing the gearbox assembly, the frame body, and the assembled combination of the blade, blade housing and blade-blade housing bearing structure.

The frame body 150 (FIGS. 2C and 49) of the head assembly 111 includes an arcuate mounting pedestal 152 at a front or forward end of the frame body 150. The arcuate mounting pedestal 152 defines a seating region **152*a* for a mounting section 402 of the blade housing 400 such that the blade-blade housing combination 550 may be releasably affixed to the frame body 150. The frame body 150 also defines a cavity or opening 155 (FIG. 49) that slidably receives the gearbox housing 113, as the gearbox housing is moved in a forward direction FW (FIGS. 3, 7 and 45) along the longitudinal axis LA in the direction of the frame body 150. When the gearbox housing 113 is fully inserted into the frame cavity 155 and secured to the frame body 150 by a pair of threaded fasteners 192, as is shown schematically in FIG. 53, the drive gear 650 of the gear train 604 engages and meshes with the driven gear 328 of the rotary knife blade 300 to rotate the blade 300** about its axis of rotation R.

The frame body 150 releasably couples the blade-blade housing combination 550 to the gearbox housing 113 to form the head assembly 111 of the power operated rotary knife 100. The hand piece 200 of the handle assembly 110 is secured or mounted to the head assembly 111 by the hand piece retaining assembly 250 (FIG. 2B) to complete the power operated rotary knife 100. The elongated central core 252 of the hand piece retaining assembly 250 extends through a central throughbore 202 of the hand piece 200 and threads into the gearbox housing 113 to secure the hand piece 200 to the gearbox housing 113.

The handle assembly 110 (FIG. 2B) extends along a longitudinal axis LA (FIGS. 3, 7 and 8) that is substantially orthogonal to the central axis of rotation R of the rotary knife blade 300. The hand piece 200 includes an inner surface 201 that defines the central throughbore 202, which extends along the handle assembly longitudinal axis LA. The hand piece 200 includes a contoured outer handle or outer gripping surface 204 that is grasped by an operator to appropriately manipulate the power operated rotary knife 100 for trimming and cutting operations.

In one exemplary embodiment, the hand piece 200 and the elongated central core 252 of the handle assembly 110 may be fabricated of plastic or other material or materials known to have comparable properties and may be formed by molding and/or machining. The hand piece 200, for example, may be fabricated of two over molded plastic layers, an inner layer comprising a hard plastic material and an outer layer or gripping surface comprised of a softer, resilient plastic material that is more pliable and easier to grip for the operator. The gearbox housing 113 and the frame body 150 of the head assembly 111 may be fabricated of aluminum or stainless steel or other material or materials known to have comparable properties and may be formed/shaped by casting and/or machining. The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes.

Rotary Knife Blade 300

Figure 24:
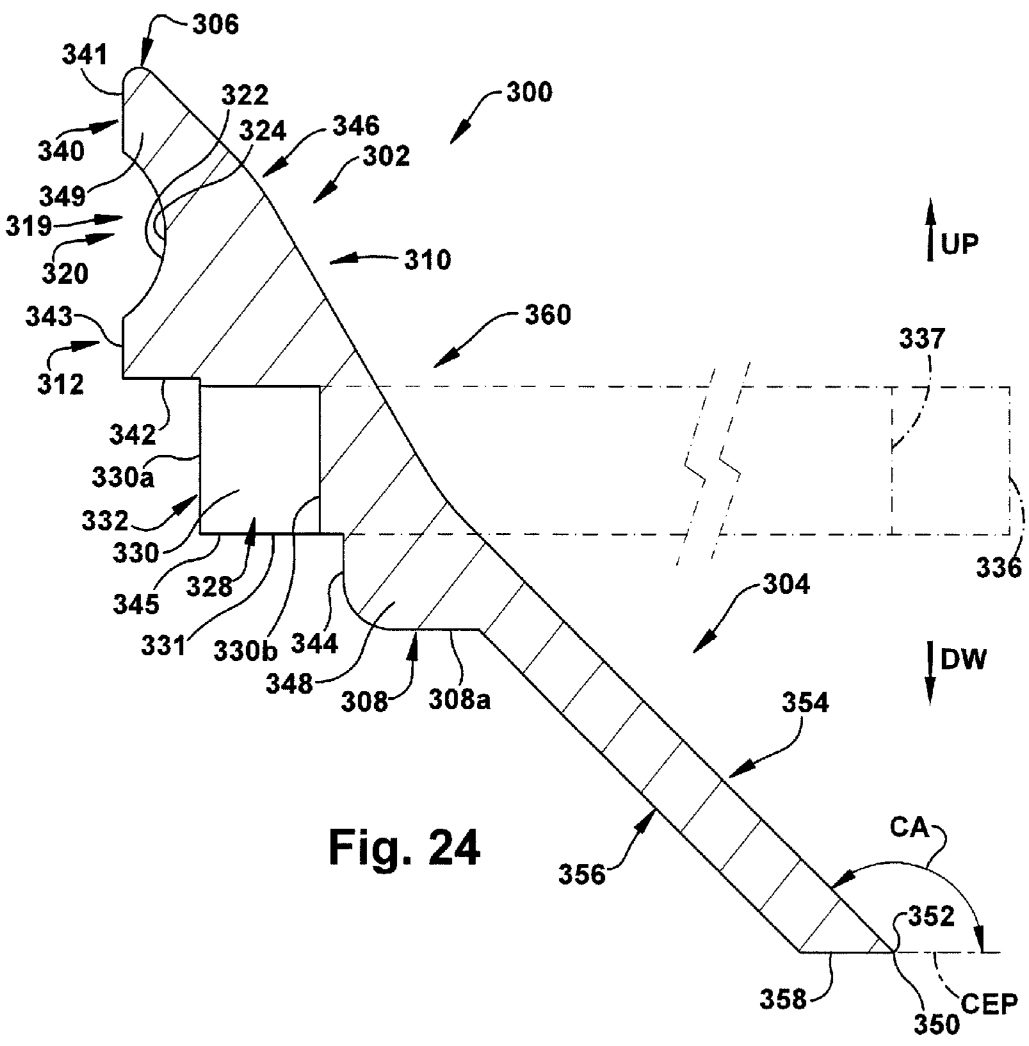
FIG. 24 is a schematic section view of the annular rotary knife blade of FIG. 22, as seen from a plane indicated by the line 24-24 in FIG. 22.
Figure 26:
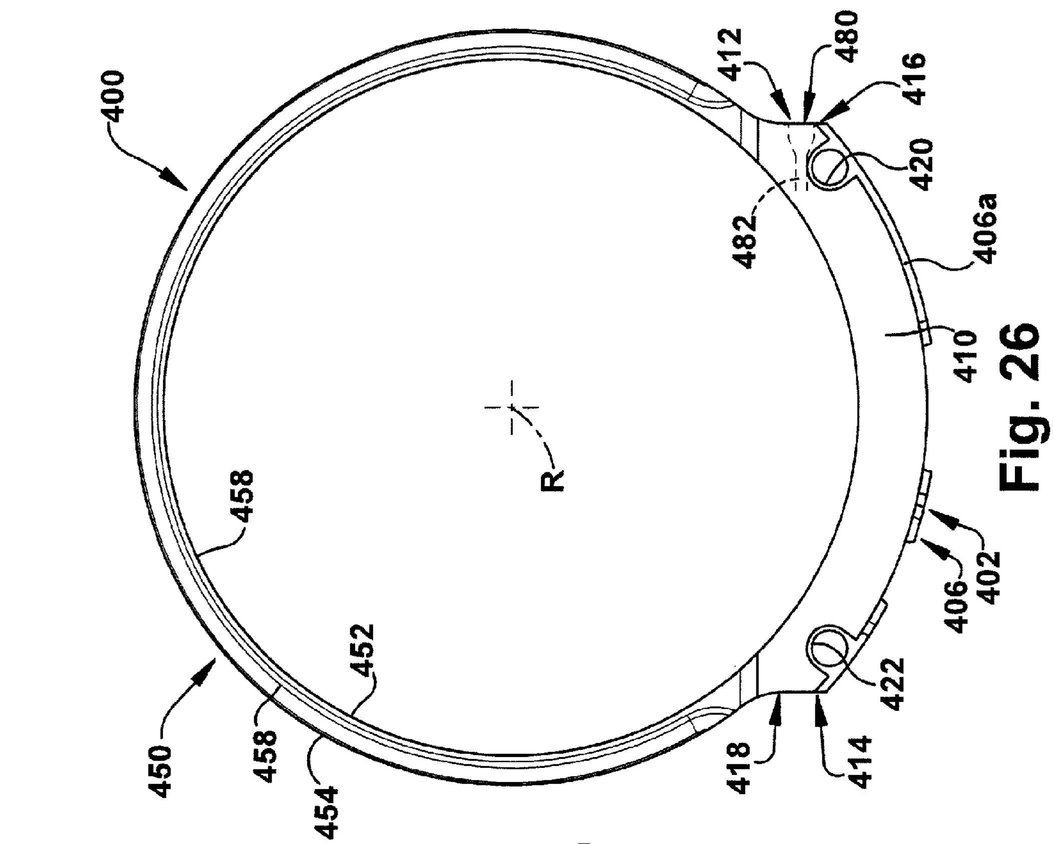
FIG. 26 is a schematic bottom plan view of the blade housing of FIG. 25.

In one exemplary embodiment and as best seen in FIGS. 2A and 22-24, the rotary knife blade 300 of the power operated rotary knife 100 is a one-piece, continuous annular structure. As can best be seen in FIG. 24, the rotary knife blade 300 includes the body 302 and a blade section 304 extending axially from the body 302. The knife blade body 302 includes an upper end 306 and a lower end 308 spaced axially from the upper end 306. The body 302 of the rotary knife blade 300 further includes an inner wall 310 and an outer wall 312 spaced radially apart from the inner wall 310. An upper, substantially vertical portion 340 of the body outer wall 312 defines the knife blade bearing surface 319. In one exemplary embodiment of the power operated rotary knife 100 and as best seen in FIGS. 13 and 24, the knife blade bearing surface 319 comprises the bearing race 320 that extends radially inwardly into the outer wall 312. In one exemplary embodiment, the knife blade bearing race 320 defines a generally concave bearing surface, and, more specifically, a generally arcuate bearing face 322 in a central portion 324 of the bearing race 320. As can be seen in FIG. 24, the knife blade bearing race 320 is axially spaced from an upper end 306 of the knife blade body 302. Specifically, a section 341 of the vertical portion 340 of the body outer wall 312 extends between the knife blade bearing race 320 and the upper end 306 of the knife blade body 302. Stated another way, the knife blade body outer wall 312 includes the vertical section 341 which separates the knife blade bearing race 320 from the upper end 306 of the knife blade body 302. When viewed in three dimensions, the vertical section 341 defines a uniform diameter, cylindrical portion of the knife blade body outer wall 312 which separates the knife blade bearing race 320 from the upper end 306 of the knife blade body 302.

The outer wall 312 of the body 302 of the rotary knife blade 300 also defines the driven gear 328. The driven gear 328 comprises a set of spur gear teeth 330 extending radially outwardly in a stepped portion 331 of the outer wall 312. The blade gear 330 is a spur gear which means that it is a cylindrical gear with a set of gear teeth 328 that are parallel to the axis of the gear, i.e., parallel to the axis of rotation R of the rotary knife blade 300 and a profile of each gear tooth of the set of gear teeth 328 includes a tip or radially outer surface 330*a* (FIG. 13) and a root or radially inner surface 330*b*. The root 330*b* of the gear tooth is sometimes referred to as a bottom land, while the tip 330*a* of the gear tooth is sometimes referred to as a top land. The root 330*b* is radially closer to the axis of rotation R of the blade 300, the root 330*b* and the tip 330*a* are radially spaced apart by a working depth plus clearance of a gear tooth of the set of gear teeth 330. The driven gear 328 of the rotary knife blade 300 is axially spaced from and disposed below the bearing race 320, that is, closer to the second lower end 308 of the knife blade body 302. The knife blade body outer wall 312 includes the vertical portion 340 which separates the set of gear teeth 330 from the upper end 306 of the knife blade body 302. When viewed in three dimensions, the vertical portion 340 defines a uniform diameter, cylindrical portion of the knife blade body outer wall 312 which separates the knife blade bearing race 320 from the upper end 306 of the knife blade body 302. The driven gear 328, in one exemplary embodiment, defines a plurality of involute spur gear teeth 332.

The set of spur gear teeth 330 of the knife blade driven gear 328 are axially spaced from both the upper end 306 of the body 302 and the lower end 308 of the body 302 and are axially spaced from the arcuate bearing race 320 of the body 302. Additionally, the driven gear 328 is also offset radially inwardly with respect to the upper vertical portion 340 of the body outer wall 312 that defines the blade bearing race 320. Specifically, the set of spur gear teeth 330 are disposed radially inwardly of an outermost extent 343 of the outer wall 312 of the knife blade body 302. As can be seen in FIGS. 13 and 24, the upper vertical portion 340 of the body outer wall 312 defines the outermost extent 343 of the outer wall 312. Accordingly, the upper vertical portion 340 of the outer wall 312 extends radially outwardly over the set of gear teeth 330 and form a gear tooth cap 349. The gear tooth cap 349 is axially spaced from and overlies the set of gear teeth 330 and functions to further protect the set of gear teeth 330.

This configuration of the rotary knife blade 300, wherein the set of gear teeth 330 are both axially spaced from the upper end 306 of the knife blade body 302 and inwardly offset from the outermost extent 343 of the blade body outer wall 312 is sometimes referred to as a "blind gear tooth" configuration. Advantageously, the driven gear 328 of the rotary knife blade 300 of the present disclosure is in a relatively protected position with respect to the knife blade body 302. That is, the driven gear 328 is in a position on the knife blade body 302 where there is less likely to be damage to the set of gear teeth 330 during handling of the rotary knife blade 300 and, during operation of the power operated rotary knife 100, there is less ingress of debris, such as small pieces fat, meat, bone and gristle generated during cutting and trimming operations, into the gear teeth region.

Conceptually, the respective gear tips or radially outer surfaces 330*a* of the set of gear teeth 330, when the knife blade 300 is rotated, can be viewed as forming a first imaginary cylinder 336 (shown schematically in FIG. 24). Similarly, the respective roots or radially inner surfaces 330*b* of the set of gear teeth 330, when the knife blade 300 is rotated, can be viewed as forming a second imaginary cylinder 337. A short radially or horizontally extending portion 342 of the outer wall 312 of the blade body 302 extends between the radially outer surfaces 330*a* of the driven gear 328 and the vertical upper portion 340 of the outer wall 312 of the blade body. A second substantially vertical lower portion 344 of the outer wall 312 of the blade body 302 extends between a bottom surface 345 of the driven gear 328 and the lower end 308 of the blade body. As can be seen in FIG. 24, the vertical lower portion 344 of the knife blade body 302 results in a radially extending projection 348 adjacent the lower end 308 of the blade body 302.

Axial spacing of the drive gear 328 from the upper end 306 of the knife blade body 302 advantageously protects the set of gear teeth 330 from damage that they would otherwise be exposed to if, as is the case with conventional rotary knife blades, the set of gear teeth 330 were positioned at the upper end 306 of the blade body 302 of the rotary knife blade 300. Additionally, debris is generated by the power operated rotary knife 100 during the cutting/trimming operations. Generated debris include pieces or fragments of bone, gristle, meat and/or fat that are dislodged or broken off from the product being cut or trimmed by the power operated rotary knife 100. Debris may also include foreign material, such as dirt, dust and the like, on or near a cutting region of the product being cut or trimmed. Advantageously, spacing the set of gear teeth 330 from both axial ends 306, 308 of the knife blade body 302, impedes or mitigates the migration of such debris into the region of the knife blade driven gear 328. Debris in the region of knife blade driven gear 328 may cause or contribute to a number of problems including blade vibration, premature wear of the driven gear 328 or the mating drive gear 650, and "cooking" of the debris.

Similar advantages exist with respect to axially spacing the blade bearing race 320 from the upper and lower ends 306, 308 of the blade body 302. As will be explained below, the rotary knife blade body 302 and the blade housing 400 are configured to provide radially extending projections or caps which provide a type of labyrinth seal to inhibit entry of debris into the regions of the knife blade driven gear 328 and the blade-blade housing bearing structure 500. These labyrinth seal structures are facilitated by the axial spacing of the knife blade drive gear 328 and the blade bearing race 320 from the upper and lower ends 306, 308 of the blade body 302 of the rotary knife blade 300.

As can best be seen in FIG. 24, in the rotary knife blade 300, the second end 308 of the knife blade body 302 transitions radially inwardly between the body 302 and the blade section 304. The second end 308 of the body 302 is defined by a radially inwardly extending step or shoulder 308*a*. The blade section 304 extends from the second end 308 of the body 302 and includes a blade cutting edge 350 at an inner, lower end 352 of the blade section 304. As can be seen, the blade section 304 includes an inner wall 354 and a radially spaced apart outer wall 356. The inner and outer walls 354, 356 are substantially parallel. A bridging portion 358 at the forward end of the rotary knife blade 300 extends between the inner and outer walls 354, 356 and forms the cutting edge 350 at the intersection of the bridging portion 358 and the inner wall 354. Depending on the specific configuration of the blade section 304, the bridging portion 358 may extend generally radially or horizontally between the inner and outer walls 354, 356 or may taper at an angle between the inner and outer walls 354, 356.

The rotary knife blade body inner wall 310 and the blade section inner wall 354 together form a substantially continuous knife blade inner wall 360 that extends from the upper end 306 to the cutting edge 350. As can be seen in FIG. 24, there is a slightly inwardly protruding "humpback" region 346 of the inner wall 310 of the blade body 302 in the region of the bearing race 320. The protruding region 346 provides for an increased width or thickness of the blade body 302 in the region where the bearing race 320 extends radially inwardly into the blade body outer wall 312. The knife blade inner wall 360 is generally frustoconical in shape, converging in a downward direction (labeled DW in FIG. 24), that is, in a direction proceeding away from the driven gear 328 and toward the cutting edge 350. The knife blade inner wall 360 defines a cutting opening CO (FIGS. 1 and 54) of the power operated rotary knife 100, that is, the opening defined by the rotary knife blade 300 that cut material, such as a cut layer CL1 (FIG. 54) passes through, as the power operated rotary knife 100 trims or cut a product P.

Blade Housing 400

In one exemplary embodiment and as best seen in FIGS. 25-29, the blade housing 400 of the power operated rotary knife 100 is a one-piece, continuous annular structure. The blade housing 400 includes the mounting section 402 and a blade support section 450. The blade housing 400 is continuous about its perimeter, that is, unlike prior split-ring annular blade housings, the blade housing 400 of the present disclosure has no split along a diameter of the housing to allow for expansion of the blade housing circumference. The blade-blade housing bearing or support structure 500 of the present disclosure secures the rotary knife blade 300 to the blade housing 400. Accordingly, removal of the knife blade 300 from the blade housing 400 is accomplished by removing a portion of the blade-blade housing structure 500 from the power operated rotary knife 100. The blade-blade housing bearing structure 500 permits use of the continuous annular blade housing 400 because there is no need to expand the blade housing circumference to remove the rotary knife blade 300 from the blade housing 400.

The continuous annular blade housing 400 of the present disclosure provides a number of advantages over prior split-ring annular blade housings. The one-piece, continuous annular structure provides for greater strength and durability of the blade housing 400, as compared to prior split-ring annular blade housings. In addition to greater strength and durability of the blade housing 400, the fact that a circumference of the blade housing 400 is not adjustable eliminates need for and precludes the operator from adjusting the circumference of the blade housing 400 during operation of the power operated rotary knife 100 in an attempt to maintain proper operating clearance. This is a significant improvement over the prior split ring annular blade housings. Advantageously, the combination of the rotary knife blade 300, the blade housing 400 and the blade-blade housing bearing structure 500 of the power operated rotary knife 100 provide for proper operating clearance of the rotary knife blade 300 with respect to the blade housing 400 over the useful life of a given rotary knife blade.

Figure 25:
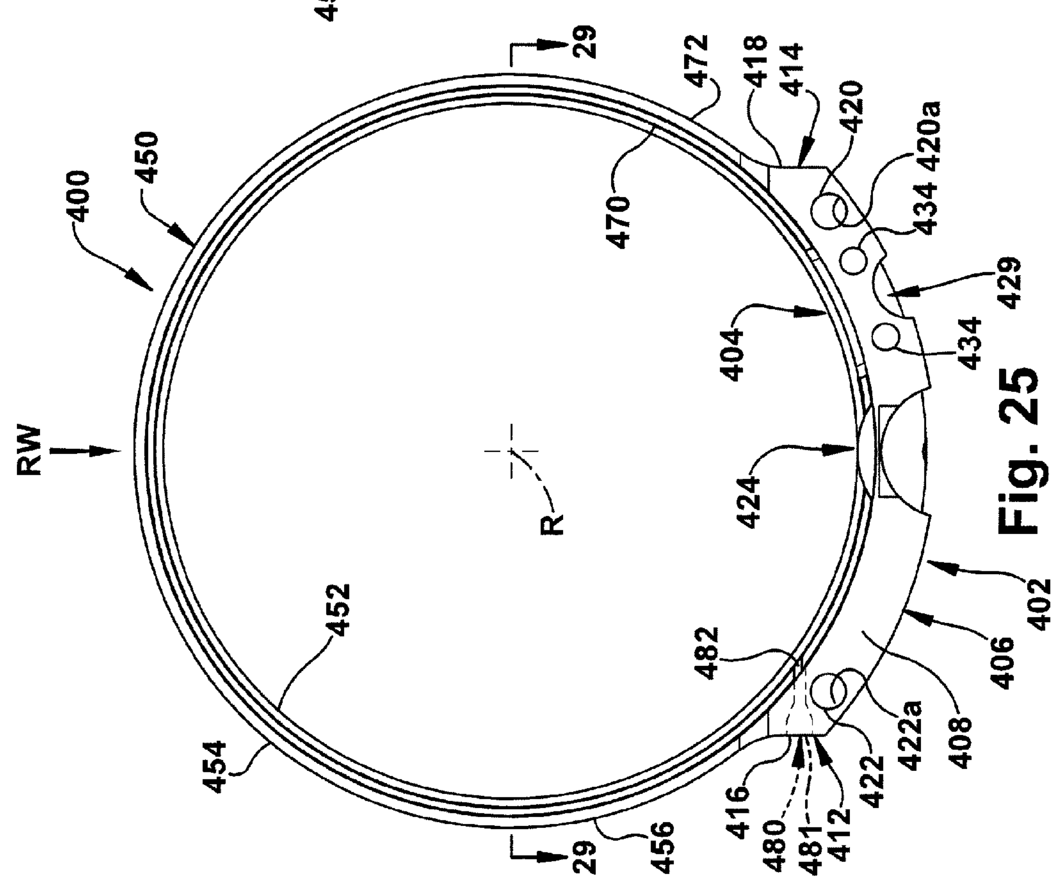
FIG. 25 is a schematic top plan view of the blade housing of the power operated rotary knife of FIG. 1.

As can best be seen in FIG. 25, in the blade housing 400, the blade support section extends around the entire 360 degrees (360°) circumference of the blade housing 400. The mounting section 402 extends radially outwardly from the blade support section 450 and subtends an angle of approximately 120°. Stated another way, the blade housing mounting section 402 extends approximately ⅓ of the way around the circumference of the blade housing 400. In the region of the mounting section 402, the mounting section 402 and the blade support section 450 overlap.

The mounting section 402 is both axially thicker and radially wider than the blade support section 450. The blade housing mounting section 402 includes an inner wall 404 and a radially spaced apart outer wall 406 and a first upper end 408 and an axially spaced apart second lower end 410. At forward ends 412, 414 of the mounting section 402, there are tapered regions 416, 418 that transition between the upper end 408, lower end 410 and outer wall 406 of the mounting section and the corresponding upper end, lower end and outer wall of the blade support section 450.

The blade housing mounting section 402 includes two mounting inserts 420, 422 (FIG. 2A) that extends between the upper and lower ends 408, 410 of the mounting section 402. The mounting inserts 420, 422 define threaded openings 420*a*, 422*a*. The blade housing mounting section 402 is received in the seating region 152*a* defined by the arcuate mounting pedestal 152 of the frame body 150 and is secured to the frame body 150 by a pair of threaded fasteners 170, 172 (FIG. 2C). Specifically, the pair of threaded fasteners 170, 172 extend through threaded openings 160*a*, 162*a* defined in a pair of arcuate arms 160, 162 of the frame body 150 and thread into the threaded openings 420*a*, 422*a* of the blade housing mounting inserts 420, 422 to releasably secure the blade housing 400 to the frame body 150 and, thereby, couple the blade housing 400 to the gearbox assembly 112 of the head assembly 111.

The mounting section 402 further includes a gearing recess 424 (FIGS. 25 and 28) that extends radially between the inner and outer walls 404, 406. The gearing recess 424 includes an upper clearance recess 426 that does not extend all the way to the inner wall and a wider lower opening 428 that extends between and through the inner and outer walls 404, 406. The upper clearance recess 426 provides clearance for the pinion gear 610 and the axially oriented first bevel gear 652 of the gearbox drive gear 650. The lower opening 428 is sized to receive the radially extending second spur gear 654 of the gearbox drive gear 650 and thereby provide for the interface or meshing of the second spur gear 654 and the driven gear 328 of the rotary knife blade 300 to rotate the knife blade 300 with respect to the blade housing 400.

Figure 30:
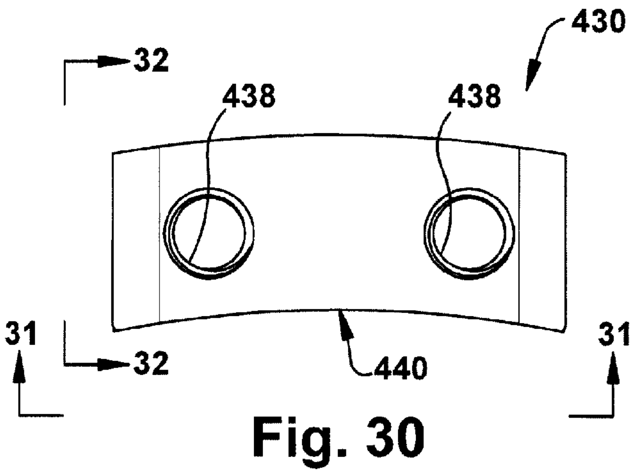
FIG. 30 is a schematic top plan view of the blade housing plug that is removably secured to the blade housing of FIG. 25.
Figure 32:
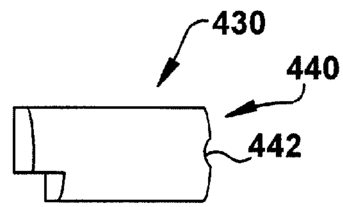
FIG. 32 is a schematic left side elevation view of the blade housing plug of FIG. 30 as seen from a plane indicated by the line 32-32 in FIG. 30.
Figure 31:
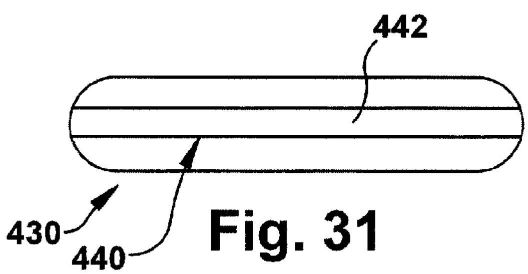
FIG. 31 is a schematic front elevation view of the blade housing plug of FIG. 30 as seen from a plane indicated by the line 31-31 in FIG. 30.

The mounting section 402 of the blade housing 400 also includes a blade housing plug opening 429 that extends between the inner and outer walls 404, 406. The blade housing plug opening 429 is generally oval-shaped in cross section and is sized to receive a blade housing plug 430 (FIGS. 30-32). The blade housing plug 430 is removably secured to the blade housing 400 by two screws 432 (FIG. 2A). The screws 432 pass through a pair of countersunk openings 434 that extend from the upper end 408 of the mounting section 402 to the lower portion 428 of the gearing recess 424 and threaded engage a pair of aligned threaded openings 438 of the blade housing plug 430.

Figure 29A:
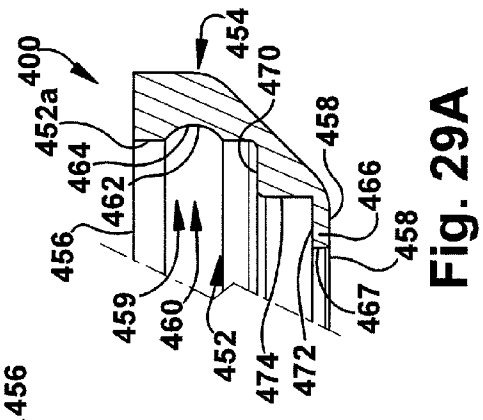
FIG. 29A is a schematic enlarged section view of a portion of the blade housing of FIG. 25 that is within a dashed circle labeled FIG. 29A in FIG. 29.
Figure 29:
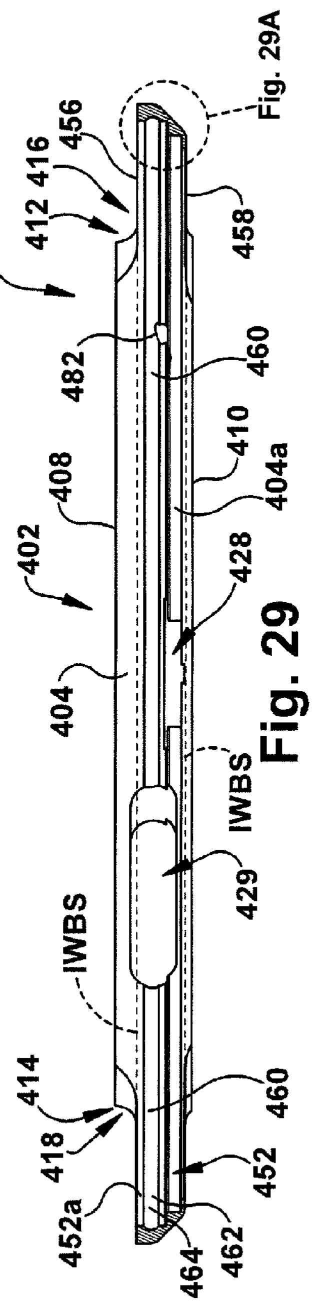
FIG. 29 is a schematic section view of the blade housing of FIG. 25 as seen from a plane indicated by the line 29-29 in FIG. 25.

As can best be seen in FIG. 29A, the blade support section 450 includes an inner wall 452 and radially spaced apart outer wall 454 and a first upper end 456 and an axially spaced second lower end 458. The blade support section 450 extends about the entire 360° circumference of the blade housing 400. The blade support section 450 in a region of the mounting section 402 is continuous with and forms a portion of the inner wall 404 of the mounting section 402. As can be seen in FIG. 29, a portion 404*a* of the inner wall 404 of the mounting section 402 of the blade housing 400 within the horizontally extending dashed lines IWBS constitutes both a part of the inner wall 404 of the mounting section 402 and a part of the of the inner wall 452 of the blade support section 450. The dashed lines IWBS substantially correspond to an axial extent of the inner wall 452 of the blade support section 450, that is, the lines IWBS correspond to the upper end 456 and the lower end 458 of the blade support section 450. A substantially vertical portion 452*a* of the blade support section inner wall 452 adjacent the first upper end 456 defines the blade housing bearing surface 459. In one exemplary embodiment of the power operated rotary knife 100 and as best seen in FIGS. 13 and 29A, the blade housing bearing surface 459 comprises a bearing race 460 that extends radially inwardly into the inner wall 452. The bearing race 460 is axially spaced from the upper end 456 of the blade support section 450. In one exemplary embodiment, a central portion 462 of the blade housing bearing race 460 defines a generally concave bearing surface, and, more specifically, a generally arcuate bearing face 464.

In one exemplary embodiment of the power operated rotary knife 100, the knife blade bearing surface 319 is concave with respect to the outer wall 312, that is, the knife blade bearing surface 319 extends into the outer wall 312 forming the bearing race 320. It should be appreciated that the knife blade bearing surface 319 and/or the blade housing bearing surface 459 may have a different configuration, e.g., in an alternate embodiment, the knife blade bearing surface 319 and the blade housing bearing surface 459 could, for example, be convex with respect to their respective outer and inner walls 312, 452. The plurality of rolling bearings 506 of the blade-blade housing bearing structure 500 would, of course, have to be configured appropriately.

Though other geometric shapes could be used, the use of arcuate bearing faces 322, 464 for the bearing races 320, 460 of both the rotary knife blade 300 and the blade housing 400 is well suited for use with the power operated knife 100 of the present disclosure. Due to the unpredictable and varying load direction the plurality of ball bearing 506 and the arcuate bearing faces 322, 464 allow the rotary knife blade 300 and blade housing 400 to be assembled in such a way to allow for running or operating clearance. This helps to maintain to the extent possible, the theoretical ideal of a single point of rolling bearing contact between a given ball bearing of the plurality of ball bearings 506 and the rotary knife blade arcuate bearing face 322 and the theoretical ideal of a single point of rolling bearing contact between a given ball bearing of the plurality of ball bearings 506 and the blade housing bearing face 464. (It being understood, of course, that a single point of rolling bearing contact is a theoretical because deformation between a ball bearing and a bearing race necessarily causes deformation of the ball bearing and the bearing race resulting in a small region of contact as opposed to a point of contact.) Nevertheless, the arcuate bearing face configurations 322, 464 provide for reduced frictional torque produced in the bearing region. Due to the thin cross sections of the rotary knife blade 300 and the blade housing 400 of the power operated rotary knife 100, there is a tendency for both the inner or blade bearing race 320 and the outer or blade housing outer race 460 to flex and bend while in use. An arcuate bearing race design of slightly larger radius than the ball of the plurality of ball bearings 506 will allow the balls to move along an arc defined by the annular passageway 504 and still contact the respective bearing races 320, 460 at respective single points thereby maintaining low friction even during bending and flexing of the rotary knife blade 300 and the blade housing 400. The arcuate shape of the blade and blade housing bearing races 320, 460 also helps compensate for manufacturing irregularities within the rotary knife blade 300 and the blade housing 400 and thereby helps maintain theoretical ideal of the single point of bearing contact between a ball bearing of the plurality of ball bearings 506 and the respective bearing races 320, 460, as discussed above, thereby reducing friction.

A radially inner wall 440 (FIGS. 2A, 30 and 31) of the blade housing plug 430 defines a bearing race 442 that is a portion of and is continuous with the bearing race 460 of the blade housing 400. Like the portion 404*a* of the inner wall 404 of the mounting section 402 of the blade housing 400 within the horizontally extending dashed lines IWBS, a portion of the inner wall 440 of the blade housing plug 430 that would be within the horizontally extending dashed lines IWBS of FIG. 29 is both a part of the inner wall 440 of the blade housing plug 430 and a part of the inner wall 452 of the blade support section 450. Thus, when the blade housing plug 430 is inserted in the blade housing plug opening 429 of the blade housing 400, the blade housing bearing race 460 is substantially continuous about the entire 360° circumference of the blade support section 450.

As can best be seen in FIG. 13, when the blade is secured and supported within the blade housing 400 by the blade-blade housing support structure 500, in order to impede the ingress of pieces of meat, bone and other debris into the driven gear 328 of the rotary knife blade 300, a radially outwardly extending driven gear projection or cap 466 at the lower end 458 of the blade support section 450 is axially aligned with and overlies at least a portion of the bottom surface 345 of the set of gear teeth of the knife blade driven gear 328. The driven gear projection or cap 466 defines the lower end 458 of the blade support section 450. The driven gear cap 466 overlies or bridges a gap between the first and second imaginary cylinders 336, 337 (FIG. 24) formed by the driven gear 328 of the rotary knife blade 300. As can be seen in FIG. 13, because of the radial projection 348 of the knife blade body 302 and the driven gear cap 466, only a small radial clearance gap exists between the radially extending end 467 of the driven gear cap 466 of the blade housing 400 and the projection vertical lower portion 344 of outer wall 312 of the knife blade body 302. Advantageously, the combination of the knife blade radial projection 348 and the blade housing cap 466 form a type of labyrinth seal that inhibits ingress of debris into the regions of the driven gear 328 and the bearing race 320 of the rotary knife blade 300.

As can best be seen in FIG. 13, the blade support section inner wall 452 of the blade housing 400 includes a first radially outwardly extending ledge 470 that is located axially below the blade housing bearing race 460. The blade support section inner wall 452 also includes a second radially outwardly extending ledge 472 that forms an upper surface of the driven gear cap portion 466 and is axially spaced below the first radially outwardly extending ledge 470. The first and second ledges 470, 472 provide a seating regions for the horizontally extending portion 342 of the knife blade outer wall 312 and the bottom surface 345 of the set of gear teeth 330, respectively, to support the knife blade 300 when the knife blade 300 is positioned in the blade housing 400 from axially above and the rolling bearing strip 502 of the blade-blade housing bearing structure 500 has not been inserted into a passageway 504 (FIG. 13) between the rotary knife blade 300 and the blade housing 400 defined by opposing arcuate bearing faces 322, 464 of the knife blade bearing race 320 and the blade housing bearing race 460. Of course, it should be understood that without insertion of the rolling bearing strip 502 into the passageway 504, if the power operated rotary knife 100 were turned upside down, that is, upside down from the orientation of the power operated rotary knife 100 shown, for example, in FIG. 7, the rotary knife blade 300 would fall out of the blade housing 400.

Figure 27:
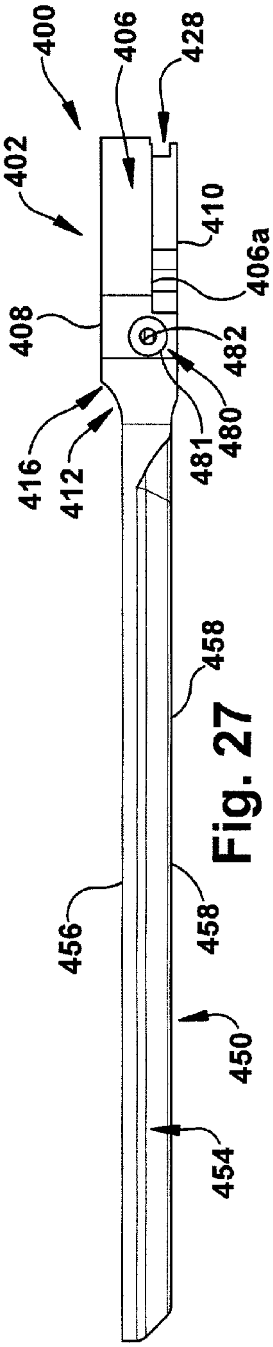
FIG. 27 is a schematic right side elevation view of the blade housing of FIG. 25.
Figure 28:
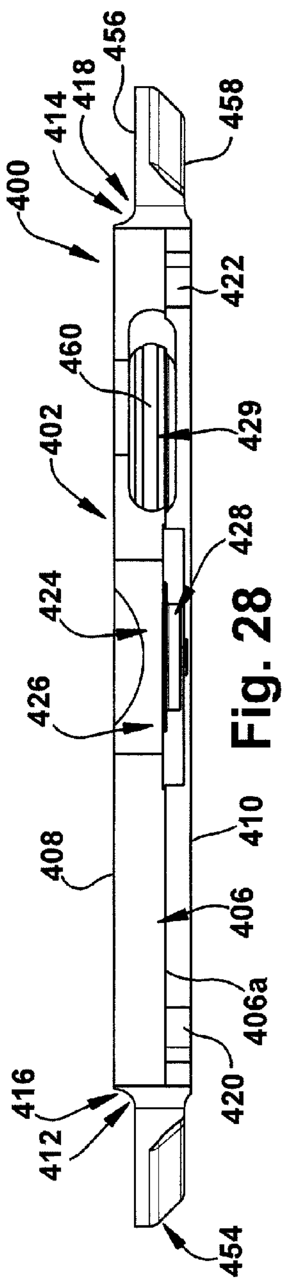
FIG. 28 is a schematic rear elevation view of the blade housing of FIG. 25 showing a blade housing plug opening of a mounting section of the blade housing.

As is best seen in FIGS. 25, 27 and 29, the right tapered region 416 (as viewed from a front of the power operated rotary knife 100, that is, looking at the blade housing 400 from the perspective of an arrow labeled RW (designating a rearward direction) in FIG. 25) of the blade housing mounting section 402 includes a cleaning port 480 for injecting cleaning fluid for cleaning the blade housing 400 and the knife blade 300 during a cleaning process. The cleaning port 480 includes an entry opening 481 in the outer wall 406 of the mounting section 402 and extends through to exit opening 482 in the inner wall 404 of the mounting section 402. As can best be seen in FIG. 29, a portion of the exit opening 482 in the mounting section inner wall is congruent with and opens into a region of the bearing race 460 of the blade housing 400. The exit opening 482 in the mounting section inner wall 404 and radial gap G (FIG. 13) between the blade 300 and the blade housing 400 provides fluid communication and injection of cleaning fluid into bearing race regions 320, 460 of the knife blade 300 and blade housing 400, respectively, and the driven gear 328 of the knife blade 300.

Blade-Blade Housing Bearing Structure 500

The power operated rotary knife 100 includes the blade-blade housing support or bearing structure 500 (best seen in FIGS. 2A, 13 and 14) that: a) secures the knife blade 300 to the blade housing 400; b) supports the knife blade for rotation with respect to the blade housing about the rotational axis R; and c) defines the rotational plane RP of the knife blade. As noted previously, advantageously, the blade-blade housing support structure 500 of the present disclosure permits the use of a one-piece, continuous annular blade housing 400. Additionally, the blade-blade housing bearing structure 500 provides for lower friction between the knife blade 300 and blade housing 400 compared to prior power operated rotary knife designs.

The lower friction afforded by the blade-blade housing bearing structure 500 advantageously permits the power operated rotary knife 100 of the present disclosure to be operated without the use of an additional, operator applied source of lubrication. Prior power operated rotary knives typically included a lubrication reservoir and bellows-type manual pump mechanism, which allowed the operator to inject an edible, food-grade grease from the reservoir into the blade-blade housing bearing region for the purpose of providing additional lubrication to the bearing region. When cutting or trimming a meat product, lubrication in the nature of fat/grease typically occurs as a natural by-product or result of cutting/trimming operations, that is, as the meat product is cut or trimmed the rotary knife blade cuts through fat/grease. As cutting/trimming operations continue and the rotary knife blade rotates within the blade housing, fat/grease from the meat product may migrate, among other places, into the blade-blade housing bearing region.

In the power operated rotary knife 100, the fat/grease may migrate into the annular passageway 504 (FIG. 13) defined by the opposing arcuate bearing faces 322, 464 of the rotary knife blade bearing race 320 and the blade housing bearing race 460 as the knife 100 is used for meat cutting/trimming operations. However, in prior power operated rotary knives, this naturally occurring lubrication would typically be supplemented by the operator by using the pump mechanism to apply additional lubrication into the blade-blade housing region in an attempt to reduce blade-blade housing bearing friction, make the blade rotate easier, and reduce heating.

In one exemplary embodiment of the power operated rotary knife 100, there is no reservoir of grease or manual pump mechanism to apply the grease. Elimination of the need for additional lubrication, of course, advantageously eliminates those components associated with providing lubrication (grease reservoir, pump, etc.) in prior power operated rotary knives. Elimination of components will reduce weight and/or reduce maintenance requirements associated with the lubrication components of the power operated rotary knife 100. Lower friction between the knife blade 300 and the blade housing 400 decreases heat generated by virtue of friction between the rotary knife blade 300, the blade-blade housing bearing structure 500 and the blade housing 400. Reducing heat generated at the blade-blade housing bearing region has numerous benefits including mitigation of the aforementioned problem of "cooking" of displaced fragments of trimmed meat, gristle, fat, and bone that migrated into the blade-blade housing bearing region 504. In prior power operated rotary knives, frictional contact between the blade and blade housing, under certain conditions, would generate sufficient heat to "cook" material in the blade-blade housing bearing region. The "cooked" material tended to accumulate in the blade-blade housing bearing region as a sticky build up of material, an undesirable result.

Additionally, the lower friction afforded by the blade-blade housing bearing structure 500 of the power operated rotary knife 100 has the additional advantage of potentially increasing the useful life of one or more of the knife blade 300, the blade housing 400 and/or components of the gearbox 602. Of course, the useful life of any component of the power operated rotary knife 100 is dependent on proper operation and proper maintenance of the power operated knife.

As can best be seen in FIGS. 14-17, the blade-blade housing bearing structure 500 comprises an elongated rolling bearing strip 502 that is routed circumferentially through the annular passageway 504 about the axis of rotation R of the knife blade 300. A rotary knife bearing assembly 552 (FIG. 13) of the power operated rotary knife 100 includes the combination of the blade-blade housing bearing structure 500, the blade housing bearing race 460, the knife blade bearing race 320 and the annular passageway 504 defined therebetween. In an alternate exemplary embodiment, a plurality of elongated rolling bearing strips may be utilized, each similar to, but shorter in length than, the elongated bearing strip 502. Utilizing a plurality of shorter elongated bearing strips in place of the single, longer elongated bearing strip 502 may be advantageous in that shorter elongated bearing strips are less difficult and less expensive to fabricate. If a plurality of elongated bearing strips are used, such strips would be sequentially inserted within the annular passageway 504 in head-to-tail fashion or in spaced apart relationship. The plurality of elongated bearing strips may include slightly enlarged end portions so that two adjacent bearing strips do not run together or to limit an extent of overlapping of two adjacent bearing strips.

Figure 14:
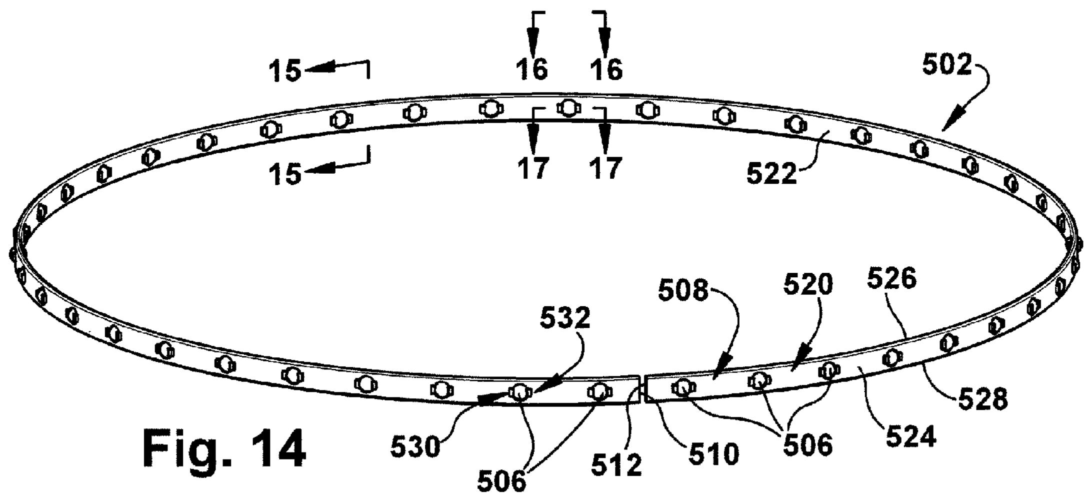
FIG. 14 is a schematic perspective view of the elongated rolling bearing strip of the blade-blade housing bearing structure of the power operated rotary knife of FIG. 1.
Figure 15:
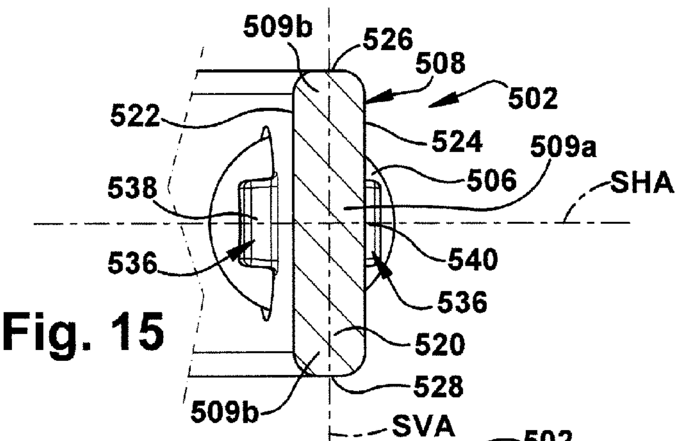
FIG. 15 is a schematic section view of the rolling bearing strip of FIG. 14 taken transverse to a longitudinal axis of the strip, as seen from a plane indicated by the line 15-15 in FIG. 14, to show a schematic section view of an elongated separator cage of the rolling bearing strip at a position where no rolling bearing is located.
Figure 16:
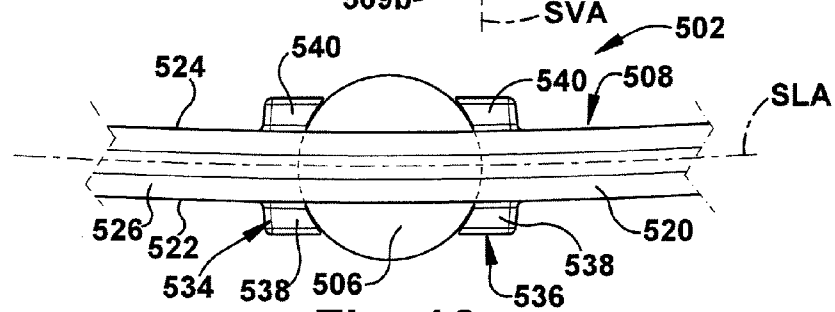
FIG. 16 is a schematic top plan view of a short portion of the rolling bearing strip of FIG. 14 taken along the longitudinal axis of the strip, as seen from a plane indicated by the line 16-16 in FIG. 14, to show a schematic top plan view of the elongated separator cage of the rolling bearing strip at a position where a rolling bearing is located.
Figure 17:
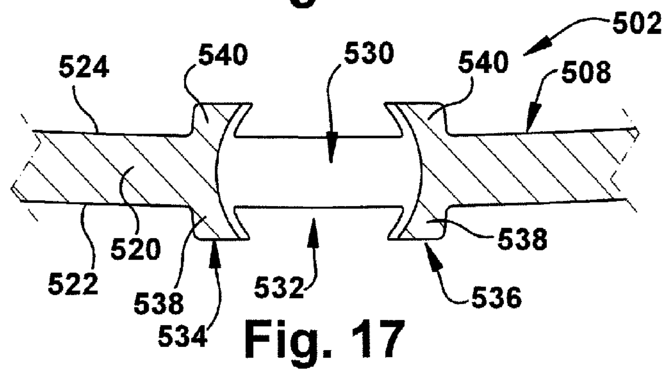
FIG. 17 is a schematic section view of the short portion of the rolling bearing strip of FIG. 14, as seen from a plane indicated by the line 17-17 in FIG. 14, with the rolling bearing removed to show a schematic section view of a pocket of the elongated separator cage.

In one exemplary embodiment, the central portion 462 of the blade housing bearing race 460 defines, in cross section, the substantially arcuate bearing face 464. Similarly, the central portion 324 of the knife blade bearing race 320 defines, in cross section, the substantially arcuate bearing face 322. As can best be seen in FIGS. 14-17, the elongated rolling bearing strip 502, in one exemplary embodiment, comprises the plurality of spaced apart rolling bearings 506 supported for rotation in the flexible separator cage 508. In one exemplary embodiment, the flexible separator cage 508 comprises an elongated polymer strip 520. The elongated polymer strip 520 defines a strip longitudinal axis SLA (FIG. 16) and is generally rectangular when viewed in cross section. The strip 520 includes a first vertical axis SVA (FIG. 15) that is orthogonal to the strip longitudinal axis SVA and a second horizontal axis SHA (FIG. 15) orthogonal to the strip longitudinal axis SLA and the first vertical axis SVA. The strip first vertical axis SVA is substantially parallel to a first inner surface 522 and a second outer surface 524 of the strip 520. As can be seen in FIG. 15, the first inner surface 522 and the second outer surface 524 are generally planar and parallel. The strip second horizontal axis SHA is substantially parallel to a third top or upper surface 526 and a fourth bottom or lower surface 528 of the strip 520.

Each of the plurality of ball bearings 506 is supported for rotation in a respective different bearing pocket 530 of the strip 520. The bearing pockets 530 are spaced apart along the strip longitudinal axis SLA. Each of the strip bearing pockets 530 defines an opening 532 extending between the first inner surface 522 and the second outer surface 524. Each of the plurality of bearing pockets 530 includes a pair of spaced apart support arms 534, 536 extending into the opening 532 to contact and rotationally support a respective ball bearing of the plurality of ball bearings 506. For each pair of support arms 534, 536, the support arms 534, 536 are mirror images of each other. Each of the pairs of support arms 534, 536 defines a pair of facing, generally arcuate bearing surfaces that rotationally support a ball bearing of the plurality of ball bearings 506. Each of the pairs of support arms 534, 536 includes an extending portion 538 that extends outwardly from the strip 520 beyond the first planar inner surface 522 and an extending portion 540 that extends outwardly from the strip 520 beyond the second planar outer surface 524.

The plurality of ball bearings 506 of the elongated rolling bearing strip 502 are in rolling contact with and provide bearing support between the knife blade bearing race 320 and the blade housing bearing race 460. At the same time, while supporting the knife blade 300 for low friction rotation with respect to the blade housing 400, the elongated rolling bearing strip 502 also functions to secure the knife blade 300 with respect to the blade housing 400, that is, the bearing strip 502 prevents the knife blade 300 from falling out of the blade housing 400 regardless of the orientation of the power operated rotary knife 100.

When the rolling bearing strip 502 and, specifically, the plurality of ball bearings 506 are inserted into the passageway 504, the plurality of ball bearings 506 support the knife blade 300 with respect to the blade housing 400. In one exemplary embodiment, the plurality of ball bearings 506 are sized that their radii are smaller than the respective radii of the arcuate bearing surfaces 464, 322. In one exemplary embodiment, the radius of each of the plurality of ball bearings 506 is 1 mm. or approximately 0.039 inch, while radii of the arcuate bearing surfaces 464, 322 are slightly larger, on the order of approximately 0.043 inch. However, it should be recognized that in other alternate embodiments, the radii of the plurality of ball bearings 506 may be equal to or larger than the radii of the arcuate bearing faces 464, 322. That is, the radii of the plurality of ball bearings 506 may be in a general range of between 0.02 inch and 0.07 inch, while the radii of the arcuate bearing surfaces 464, 322 may be in a general range of between 0.03 inch and 0.06 inch. As can best be seen in FIG. 13, when the rolling bearing strip 502 is inserted into the radial, annular gap G, the plurality of ball bearings 506 and a central portion **509*a* of the separator cage 508 are received in the annular passageway 504 defined between the opposing bearing surfaces 319, 459 of the rotary knife blade 300 and the blade housing 400. The annular passageway 504 comprises part of the annular gap G between the opposing outer wall 312 of the rotary knife blade body 302 and the inner wall 452 of the blade housing blade support section 450. In one exemplary embodiment, the annular gap G is in a range of approximately 0.04-0.05 inch and is disposed between the vertical inner wall portion 452*a* of the blade support section 450 of the blade housing 400 and the facing vertical outer wall portion 340 of the outer wall 312 of the body 302 of the knife blade 300, adjacent or in the region of the opposing bearing surfaces 319, 459**.

As can be seen in FIG. 13, the annular passageway 504 is generally circular in cross section and receives the plurality of ball bearings 506 and a central portion **509*a* of the separator cage 508 of the elongated rolling bearing strip 502. When positioned in the annular passageway 504, the elongated rolling bearing strip 502 and, specifically, the separator cage 508 of the rolling bearing strip 502, forms substantially a circle or a portion of a circle within the annular passageway 504 centered about an axis that is substantially congruent with the rotary knife blade axis of rotation R. As the separator cage 508 of the rolling bearing strip 502 is vertically oriented in the gap G, the cage 508 includes top and bottom portions 509*b* extending from the central portion 509*a*. As can be seen in FIG. 13, the top and bottom portions 509*b* of the separator cage 508 extend axially slightly above and slightly below the plurality of ball bearings 506. When positioned in the annular passageway 504, the elongated rolling bearing strip 502 forms substantially a circle or a portion of a circle within the annular passageway 504 centered about an axis that is substantially congruent with the rotary knife blade axis of rotation R, while the separator cage 508** forms substantially a cylinder or a portion of a cylinder with the gap G centered about the rotary knife blade axis of rotation R.

As can be seen in FIG. 13, the separator cage 508, in cross section, is rectangular and is oriented in an upright position within the gap G, the separator cage 508 may be viewed as forming substantially a cylinder or a partial cylinder within the gap G centered about the rotary knife blade axis of rotation R. The plurality of ball bearings 506 ride within the annular passageway 504, which is substantially circular in cross section and is centered about the blade axis of rotation R.

To minimize friction, it is not desirable for the flexible separator cage 508 to be in contact with or in bearing engagement with either the rotary knife blade 300 or the blade housing 400 as this would unnecessarily generate sliding friction. What is desired is for the rotary knife blade 300 to be solely supported with respect to the blade housing 400 via rolling bearing support provided by the plurality of ball bearings 506 of the rolling bearing strip 502 bearing against the opposing arcuate bearing faces 322, 464 of the rotary knife blade 300 and the blade housing 400. Accordingly, as can best be seen in the sectional view of FIG. 13, the flexible separator cage 508 is configured to ride in the annular passageway 504 and in the annular gap G without substantial contact with either the knife blade 300 or the blade housing 400 or the opposing bearing surfaces 319, 459 of the knife blade 300 and blade housing 400. In one exemplary embodiment, a width of the upper and lower portions 509*b* of the separator cage 508 is on the order of 0.03 inch and, as mentioned previously, the annular gap G is on the order of 0.04-0.05 inch. Thus, when the rolling bearing strip 502 is inserted into the annular passageway 504, a clearance of approximately 0.005-0.010 inch exists between the separator cage 508 and the facing vertical outer wall portion 340 of the outer wall 312 of the body 302 of the knife blade 300, adjacent the opposing bearing surfaces 319, 459. Depending on the specific length of the separator cage 508 and the circumference of the gap G, the ends 510, 512 of the separator cage 508 may be spaced apart slightly (as is shown in FIG. 14), may be in contact, or may be slightly overlapping.

Figure 10:
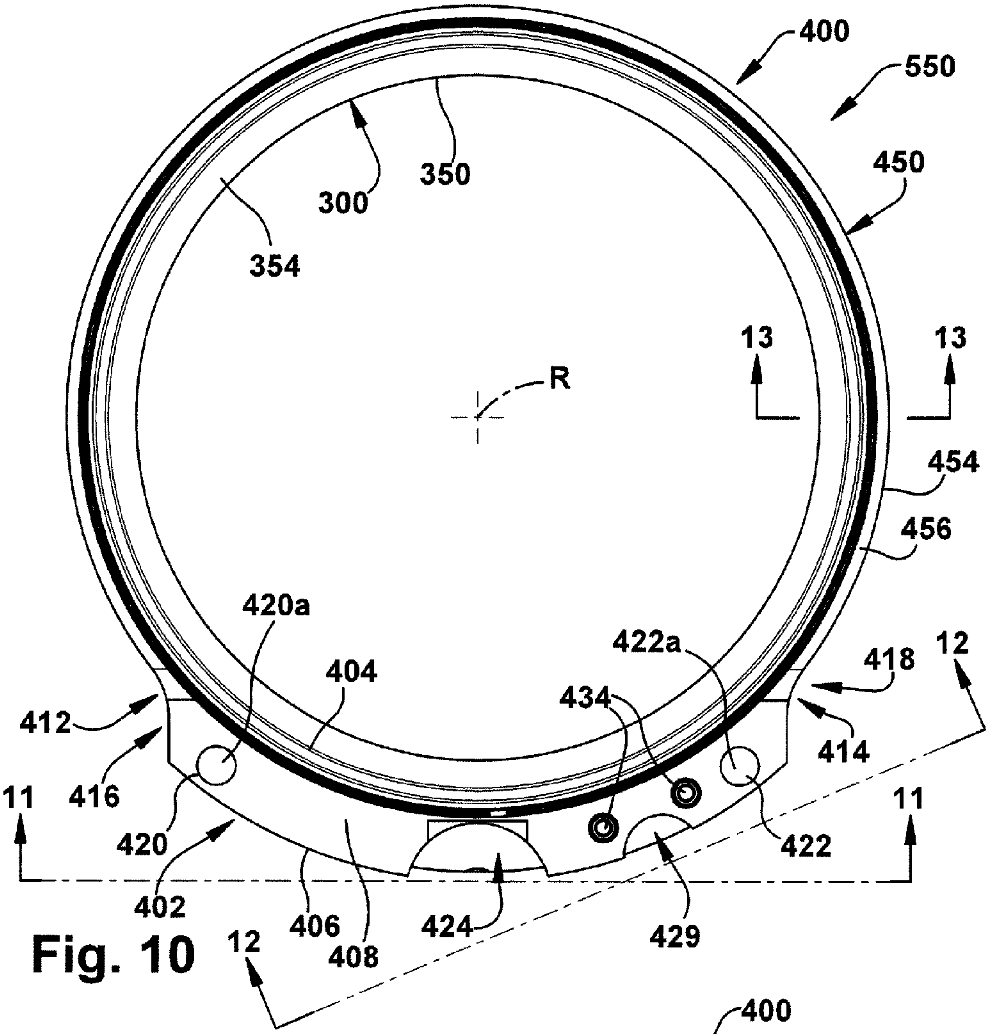
FIG. 10 is a schematic top plan view of an assembled combination of the rotary knife blade, the blade housing, and the blade-blade housing bearing structure of the power operated rotary knife of FIG. 1.
Figure 11:
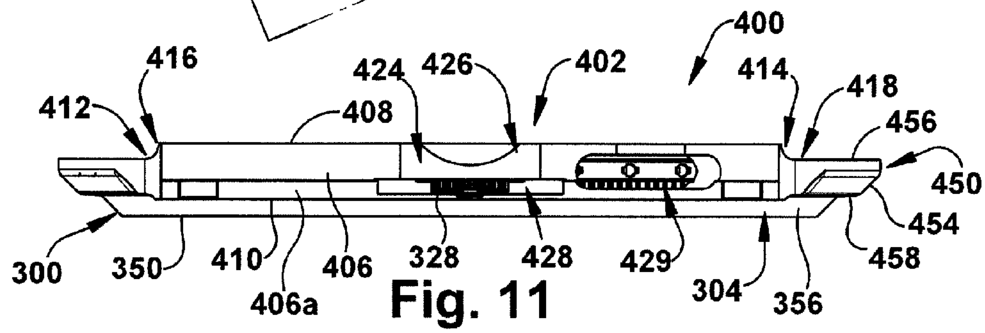
FIG. 11 is a schematic rear elevation view of the assembled combination of the rotary knife blade, blade housing, and blade-blade housing bearing structure of FIG. 10, as seen from a plane indicated by the line 11-11 in FIG. 10, with a blade housing plug removed from the blade housing.
Figure 12:
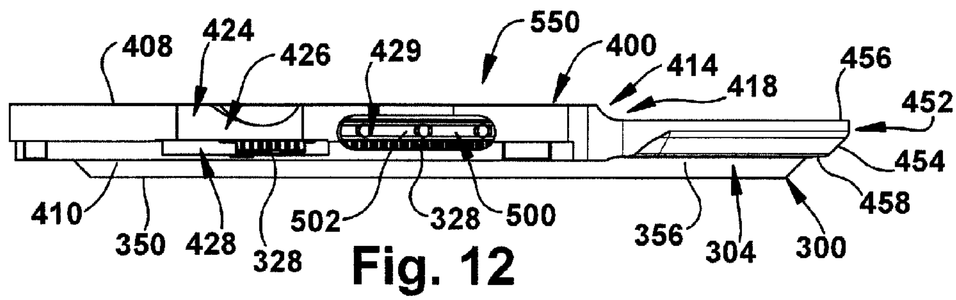
FIG. 12 is a schematic side elevation view of the assembled combination of the rotary knife blade, blade housing, and blade-blade housing bearing structure of FIG. 10, as seen from a plane indicated by the line 12-12 in FIG. 10, with a blade housing plug removed from the blade housing.

It should be appreciated that when the rotary knife blade 300 is rotated by the drive train 604 at a specific, desired RPM, the separator cage 508 also moves or translates in a circle along the annular gap G, although the rotational speed of the separator cage 508 within the gap G is less than the RPM of the rotary knife blade 300. Thus, when the power operated rotary knife 100 is in operation, the elongated rolling bearing strip 502 traverses through the annular passageway 504 forming a circle about the knife blade axis of rotation R. Similarly, when the power operated rotary knife 100 is in operation, the separator cage 508, due to its movement or translation along the annular gap G about the knife blade axis of rotation R, can be considered as forming a complete cylinder within the gap G. Additionally, when the rotary knife blade 300 is rotated, the plurality of ball bearings 506 both rotate with respect to the separator cage 506 and also move or translate along the annular passageway 504 about the knife blade axis of rotation R as the separator cage 508 moves or translates along the annular gap G. Upon complete insertion of the rolling bearing strip 502 into the gap G, the assembled blade-blade housing combination 550 (FIGS. 9 and 10) is then ready to be secured, as a unit, to the frame body 150 of the head assembly 111.

Rolling bearing strips of suitable configuration are manufactured by KMF of Germany and are available in the United States through International Customized Bearings, 200 Forsyth Dr., Step. E, Charlotte, N.C. 28237-5815.

Securing the Knife Blade 300 to the Blade Housing 400

The blade-blade housing bearing structure 500 is utilized to both secure the rotary knife blade 300 to the blade housing 400 and to rotatably support the blade 300 within the blade housing 400. To insert the elongated rolling bearing strip 502 of the blade-blade housing bearing structure 500 the passageway 504 formed between the radially aligned, opposing arcuate bearing faces 322, 464 of the blade bearing race 320 and the blade housing bearing race 460, the blade housing plug 430 is removed from the blade housing plug opening 429 of the blade housing 400. Then, the rolling bearing strip 502 is routed between the knife blade 300 and the blade housing 400 into the annular gap G and through the passageway 504. Next, the blade housing plug 430 is inserted in the blade housing plug opening 429 and the plug 430 is secured to the blade housing 400. The blade-blade housing combination 550 then ready to be secured to the arcuate mounting pedestal 152 of the frame body 150.

Figure 58:
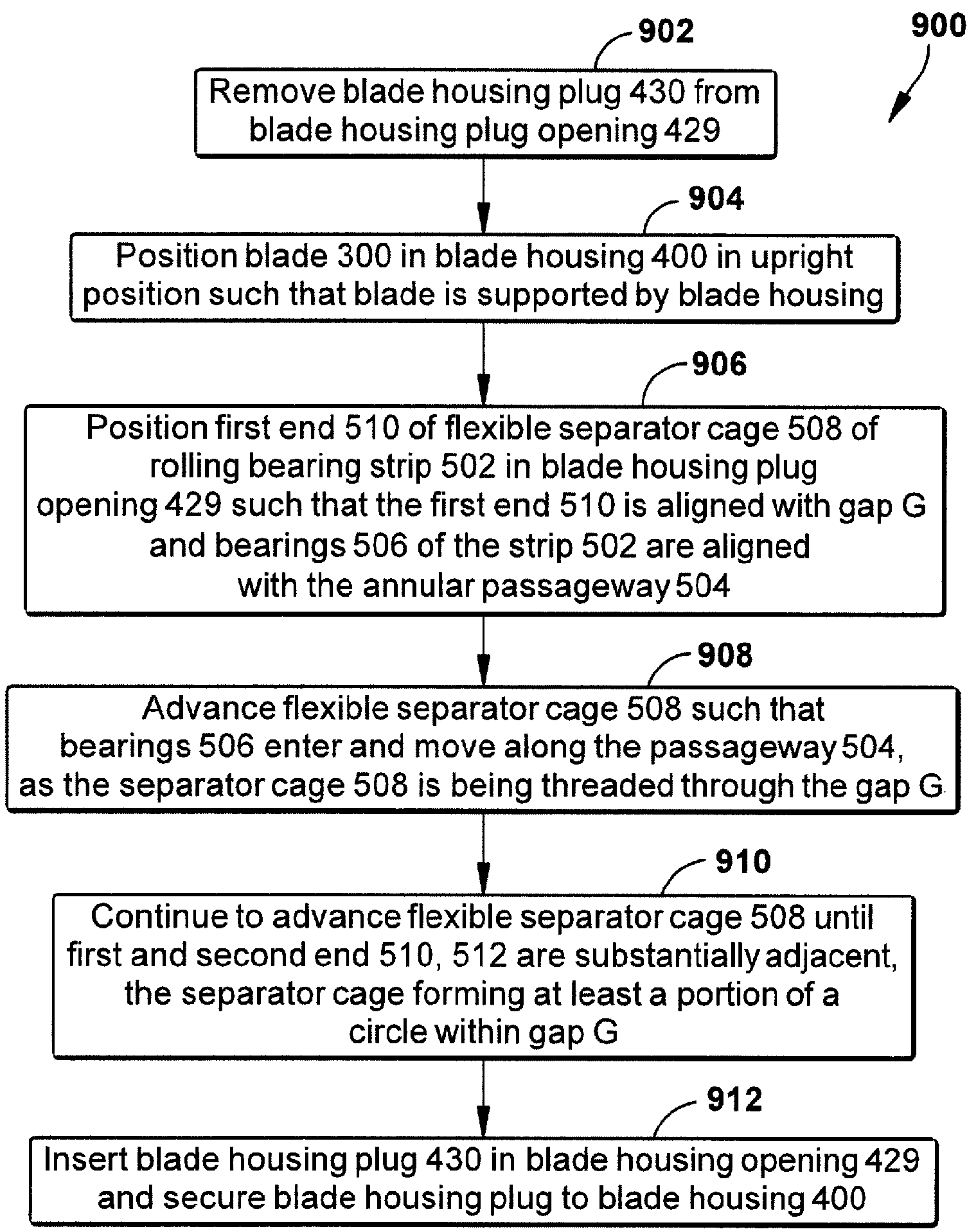
FIG. 58 is a is a schematic flow diagram for a method of securing and rotationally supporting the rotary knife blade with respect to the blade housing utilizing the blade-blade housing bearing structure of the power operated rotary knife of FIG. 1.
Figure 59:
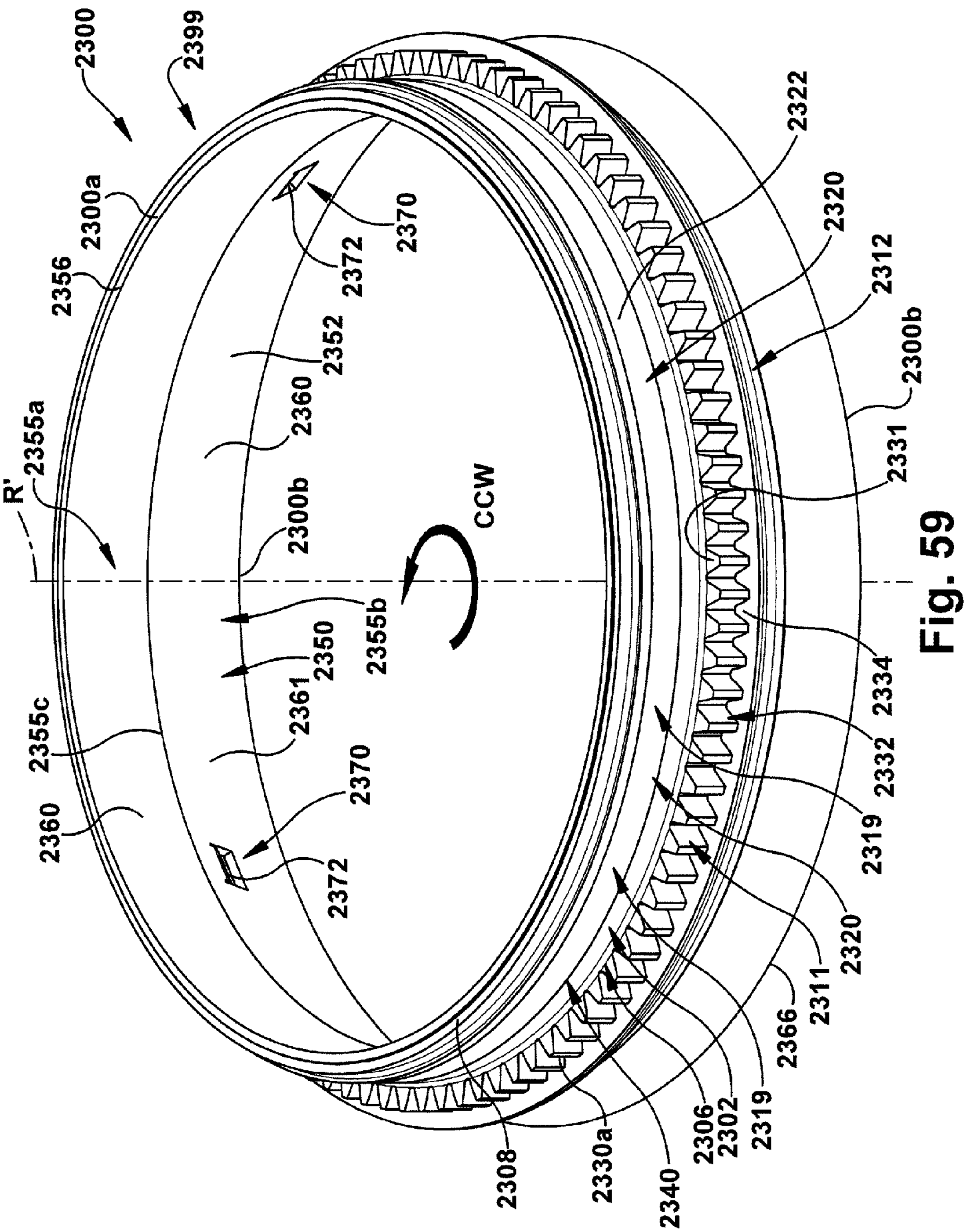
FIG. 59 is a schematic perspective view taken from above of an alternate exemplary embodiment of a two-piece or two-part annular rotary knife blade of the present disclosure suitable for use in the power operated rotary knife of FIG. 1, the rotary knife blade including a carrier portion and a blade portion of the two-piece knife blade in a locked position or an assembled condition.
Figure 60:
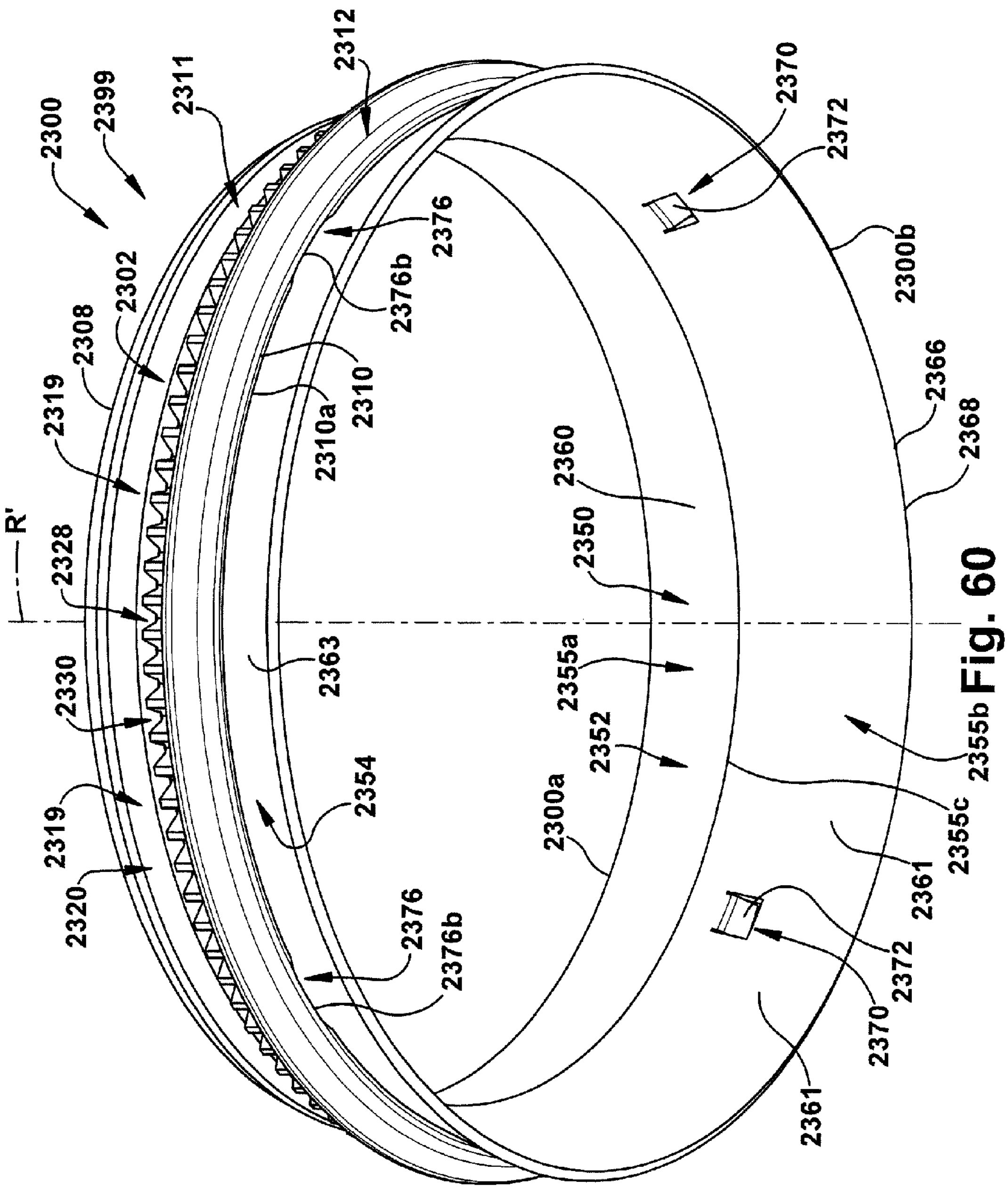
FIG. 60 is a schematic perspective view taken from below of the rotary knife blade of FIG. 59.

As can be seen in FIGS. 18-21 and in the flow diagram set forth in FIG. 58, a method of securing the rotary knife blade 300 to the blade housing 400 for rotation with respect to the blade housing 400 about the blade axis of rotation R is shown generally at 900 in FIG. 58. The method 900 includes the following steps. At step 902, remove the blade housing plug 430 from the blade housing plug opening 429. At step 904, position the rotary knife blade 300 in blade housing 400 in an upright position such that blade 300 is supported by blade housing 400. Specifically, the knife blade 300 is positioned in the blade housing 400 in an upright orientation such that the horizontal extending portion 342 of the outer wall 312 of the knife blade 300 and the bottom surface 345 of the knife blade set of gear teeth 330 are disposed on the respective first and second ledges 470, 472 of the blade housing 400. In this upright orientation, the blade housing bearing race 460 and the knife blade bearing race 320 are substantially radially aligned such that the annular passageway 504 is defined between the blade housing bearing race 460 and the knife blade bearing race 320.

Figure 18:
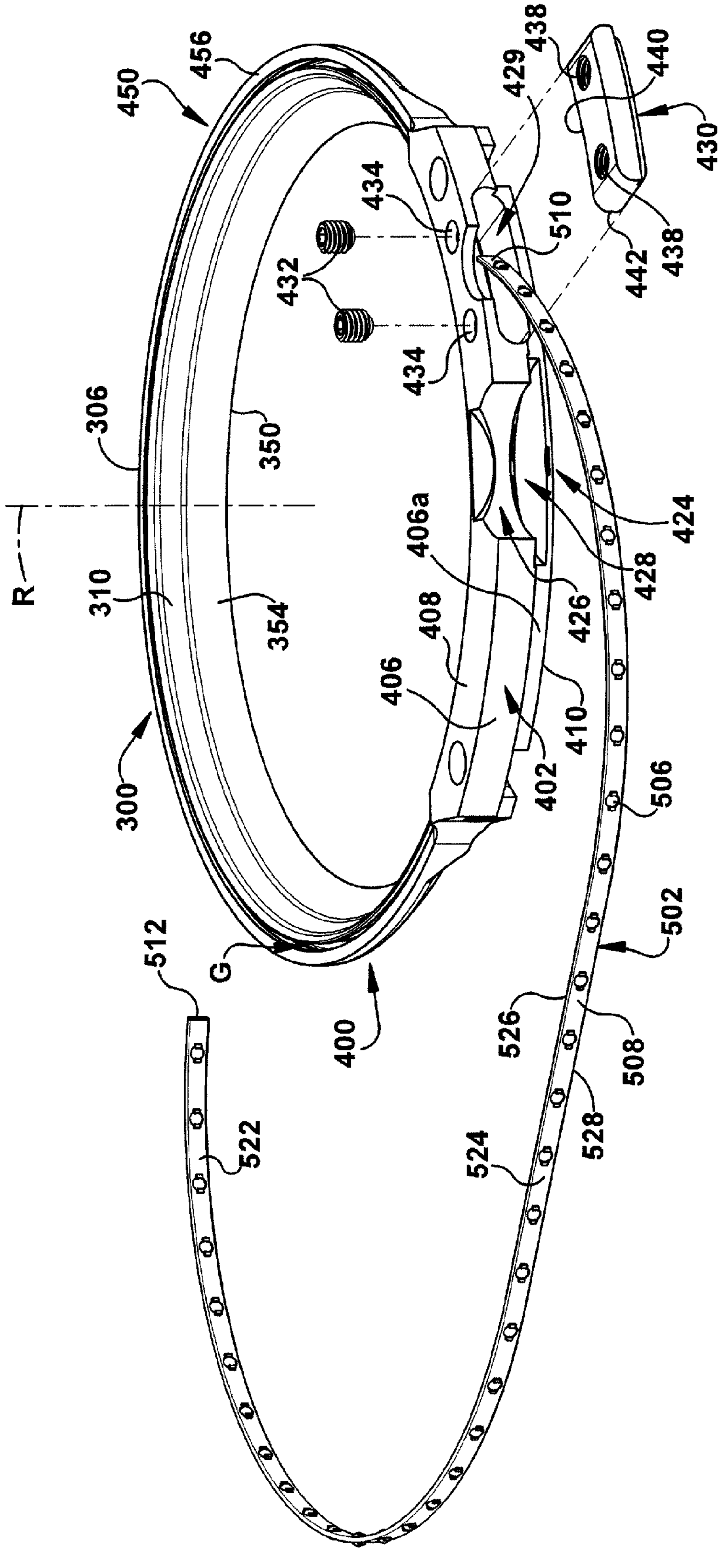
FIG. 18 is a schematic perspective view representation of a method of releasably securing the rotary knife blade to the blade housing utilizing the blade-blade housing bearing structure in the power operated rotary knife of FIG. 1, showing alignment of the elongated rolling bearing strip with an annular passageway defined between the rotary knife blade and the blade housing.
Figure 19:
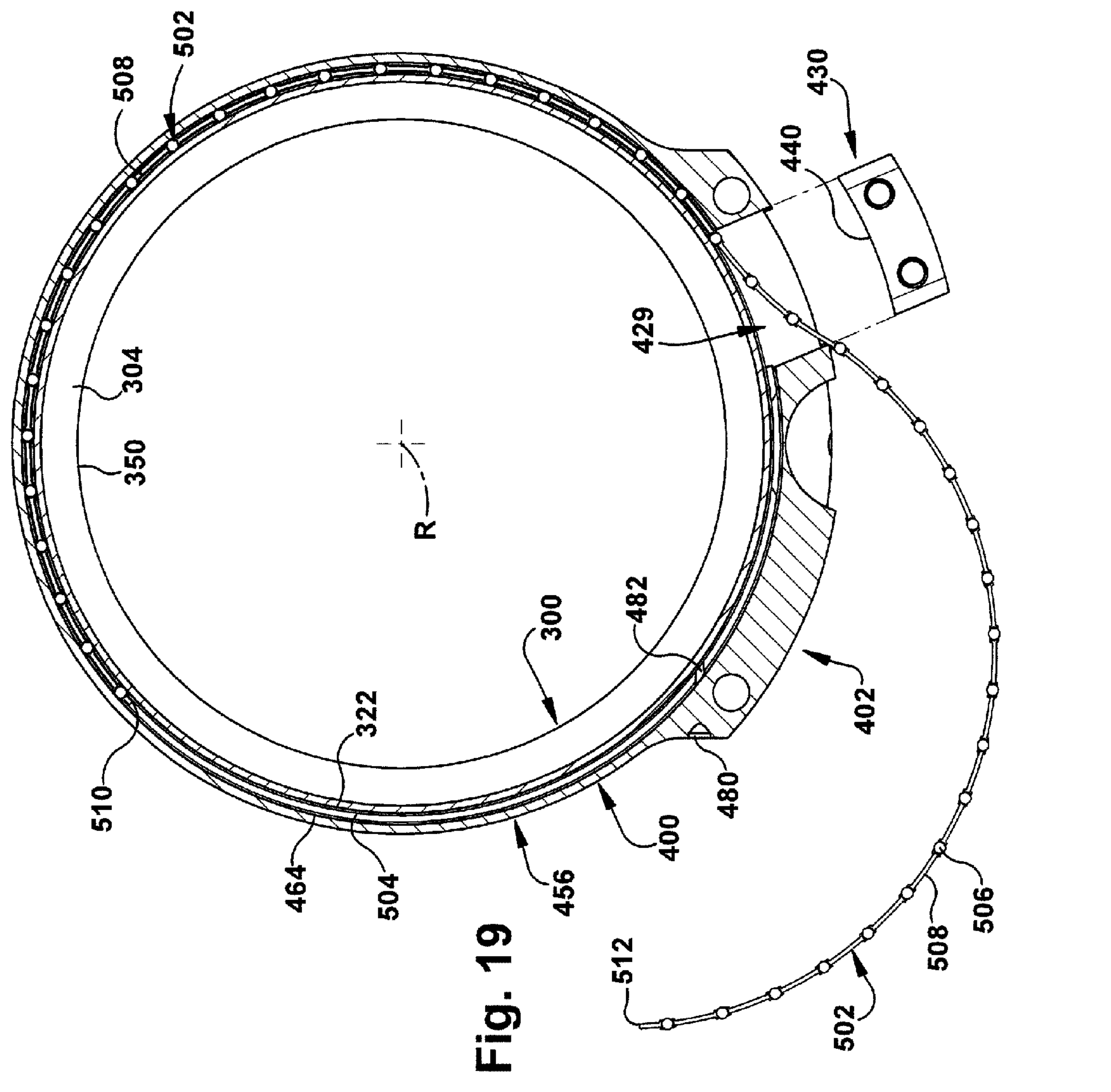
FIG. 19 is a schematic section view representation of a method of releasably securing the rotary knife blade to the blade housing utilizing the blade-blade housing bearing structure in the power operated rotary knife of FIG. 1, showing partial insertion of the elongated rolling bearing strip into the annular passageway between the rotary knife blade and the blade housing.
Figure 21:
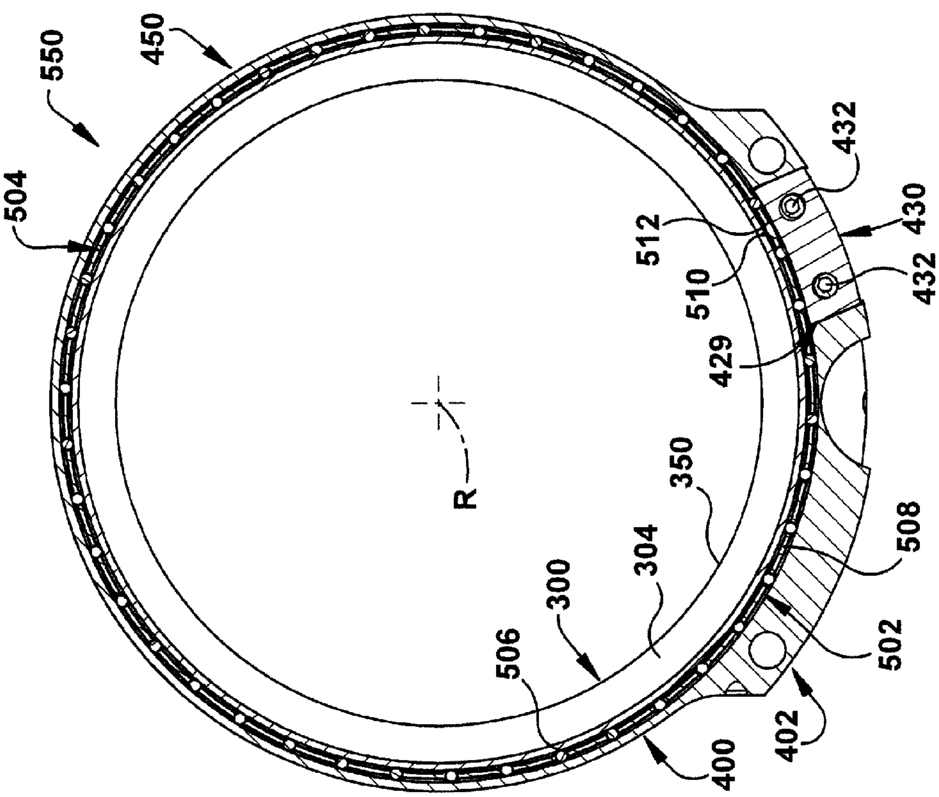
FIG. 21 is a schematic section view representation of a method of releasably securing the rotary knife blade to the blade housing utilizing the blade-blade housing bearing structure in the power operated rotary knife of FIG. 1, showing attachment of the blade housing plug to the blade housing after insertion of the elongated rolling bearing strip into the annular passageway between the knife blade and the blade housing.
Figure 20:
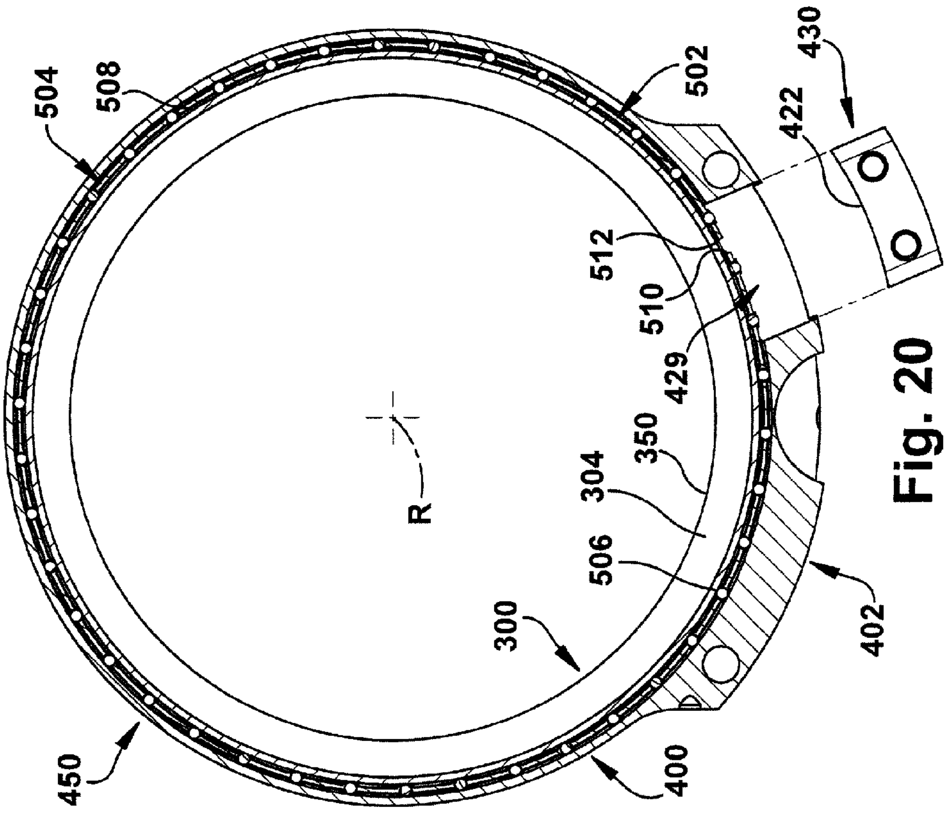
FIG. 20 is a schematic section view representation of a method of releasably securing the rotary knife blade to the blade housing utilizing the blade-blade housing bearing structure in the power operated rotary knife of FIG. 1, showing completion of insertion of the elongated rolling bearing strip into the annular passageway between the knife blade and the blade housing.
Figure 23:
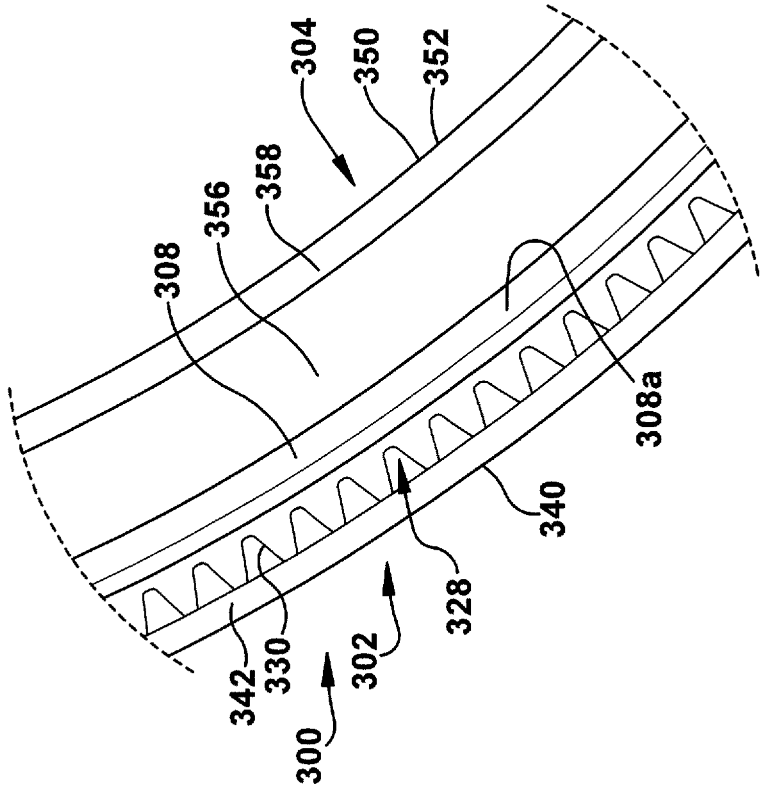
FIG. 23 is schematic enlarged bottom plan view of the portion of the annular rotary knife blade of FIG. 22.
Figure 22:
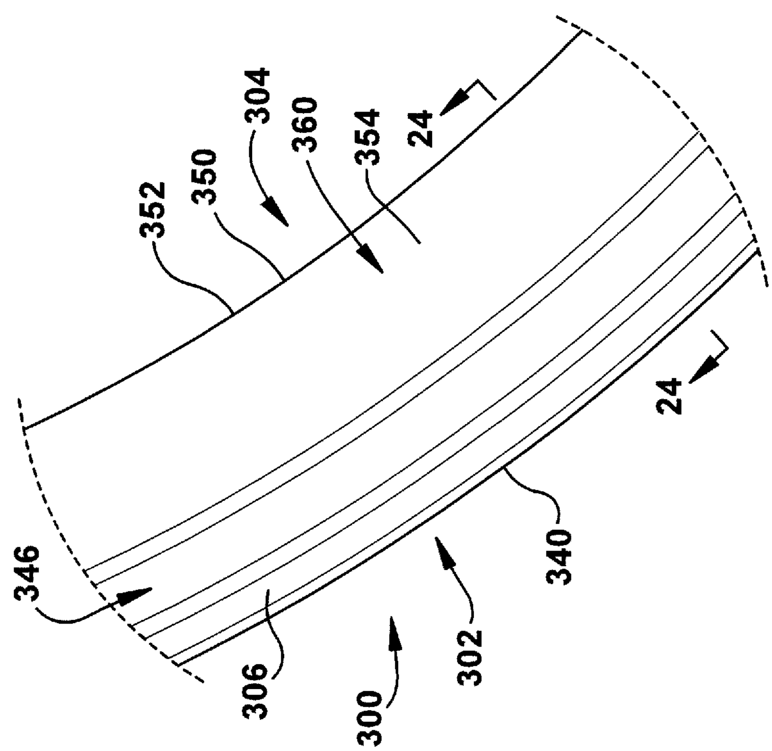
FIG. 22 is a schematic enlarged top plan view of a portion of the annular rotary knife blade of the power operated rotary knife of FIG. 1.

At step 906, as is shown schematically in FIG. 18, position the first end 510 of flexible separator cage 508 of rolling bearing strip 502 in blade housing plug opening 429 such that first end 510 is tangentially aligned with the gap G between the blade 300 and the blade housing 400 and the bearings 506 of the rolling bearing strip 502 are aligned with the annular passageway 504 between the opposing arcuate bearing faces 322, 464 of the blade 300 and blade housing 400. At step 908, advance the flexible separator cage 508 tangentially with respect to the gap G such that bearings 506 of the rolling bearing strip 502 enter and move along the passageway 504. That is, as is shown schematically in FIG. 19, the separator cage 508 is advanced such that the separator cage 508 is effectively threaded through the passageway 504 and the gap G. The separator cage 508 is oriented in an upright position such that the cage fits into the gap G between the knife blade 300 and the blade housing 400.

At step 910, continue to advance the flexible separator cage 508 until first and second ends 510, 512 of the separator cage 508 are substantially adjacent (FIG. 20), that is, the separator cage 508 forms at least a portion of a circle within the passageway 504 and the gap G (like the circle C formed by the separator cage 508 schematically shown in FIG. 2A). A longitudinal extent of the separator cage 508 of the elongated strip 502 along the strip longitudinal axis SLA is sufficient such that when the strip 502 is installed in the passageway 504, the first and second ends 510, 512 of the strip separator cage 508, if not in contact, are slightly spaced apart as shown, for example in FIGS. 2A and 14. That is, the upright strip cage 508 when installed in the passageway 504 forms at least a portion of a cylinder within the passageway 504 and the gap G. At step 912 and as is shown schematically in FIG. 21, insert the blade housing plug 430 in blade housing opening 429 and secure blade housing plug to blade housing 400 with the fasteners 432.

As the rotary knife blade 400 is rotated by the gear train 604, the elongated rolling bearing strip 502 will travel in a circular route or path of travel within the gap G, that is, the plurality of spaced apart ball bearings 506 will move in a circle though the annular passageway 504. However, because the individual bearings are also rotating within the separator cage 508 as the separator cage 508 moves in a circular route in the gap G, the rotational speed or angular velocity of the separator cage 508 is significantly less than the rotation speed or angular velocity of the rotary knife blade 300 with respect to the blade housing 400.

It should be appreciated that not all of the mating or coacting bearing surfaces of the rotary knife bearing assembly 552 including of the plurality of ball bearings 506 of the elongated rolling bearing strip 502, the rotary knife blade bearing race 320, the blade housing bearing race 460, and the blade housing plug bearing race portion 442, as described above, are in contact at any given time because there are necessarily running or operating clearances between the bearing strip rotary knife blade 300, the blade housing 400, and the blade housing plug 430 which allow the blade 300 to rotate relatively freely within the blade housing 400.

These running or operating clearances cause the rotary knife blade 300 to act somewhat akin to a teeter-totter within the blade housing 400, that is, as one region of the blade 300 is pivoted or moved upwardly within the blade housing 400 during a cutting or trimming operation, the diametrically opposite portion of the blade (180° away) is generally pivoted or moved downwardly within the blade housing. Accordingly, the specific mating bearing surfaces of the rotary blade bearing assembly 552 in contact at any specific location of the rotary knife blade 300, the blade housing 400, or the elongated bearing strip 502 will change and, at any given time, will be determined, at least in part, by the forces applied to the rotary knife blade 300 during use of the power operated rotary knife 100. Thus, for any specific portion or region of a bearing surface of the rotary blade bearing assembly 552, there may be periods of non-contact or intermittent contact with a mating bearing surface.

Removal of the rotary knife blade 300 from the blade housing 400 involves the reverse of the procedure discussed above. Namely, the blade housing plug 430 is removed from the blade housing 400. The rotary knife blade 300 is rotated with respect to the blade housing 400 until the adjacent ends 510, 512 of the separator cage 508 are visible within the blade housing plug opening 429. A small instrument, such as a small screwdriver, is used to contact and direct or pry one end of the separator cage 508, say, the first end 510 of the separator cage 508, tangentially away from the gap G. Rotation of the rotary knife blade 300 is continued until a sufficient length of the separator cage 508 is extending tangentially away from the gap G and through the blade housing plug opening 429 such that the end 510 of the separator cage 508 may be grasped by the fingers of the operator. The separator cage 508 is then pulled from the gap G. Once the cage 508 has been completely removed from the gap G between the rotary knife blade 300 and the blade housing 400, the blade housing 400 is turned upside down and the rotary knife blade 300 will fall out of the blade housing 400.

Cutting Profile of Blade-Blade Housing Combination 550

Figure 54:
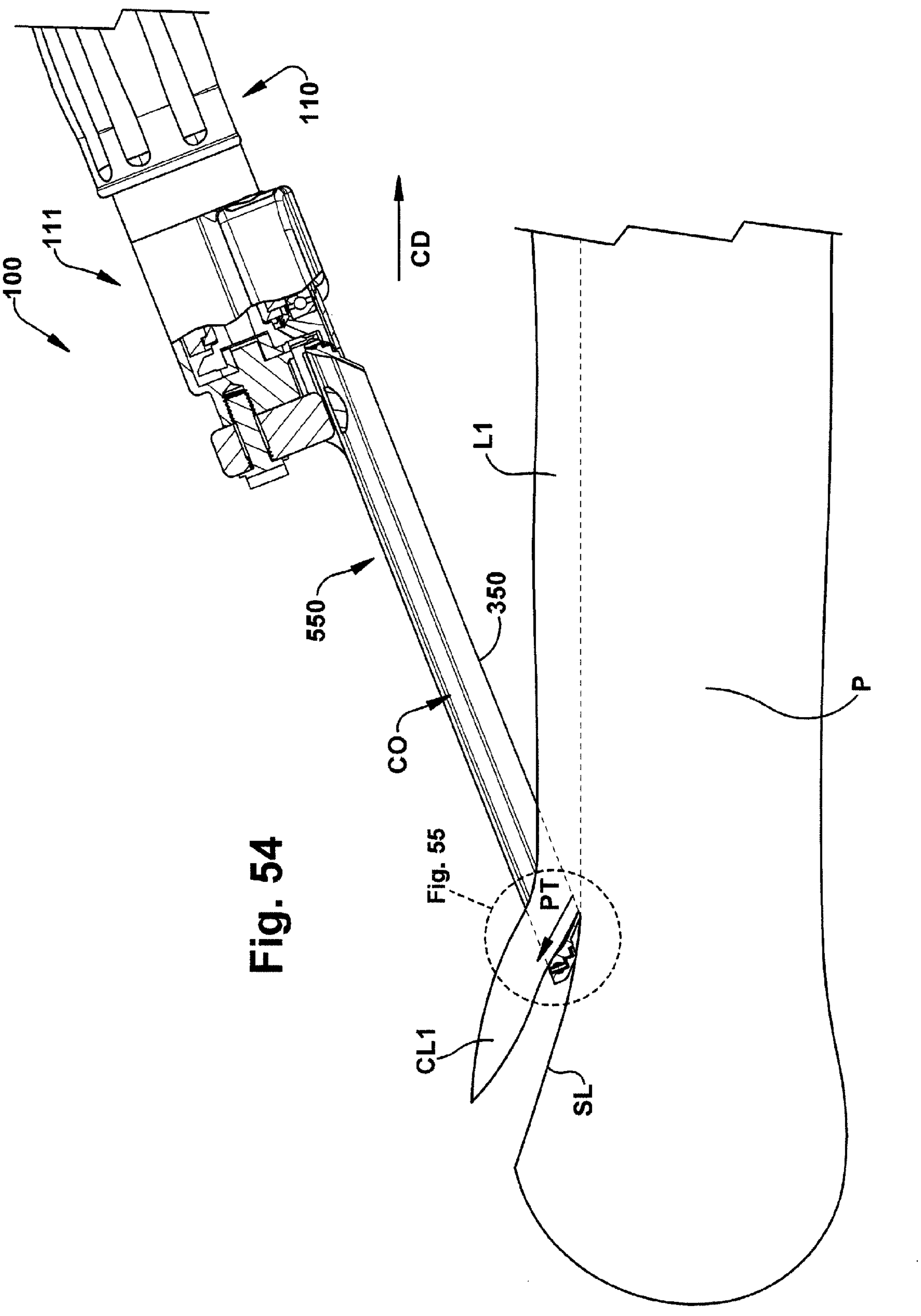
FIG. 54 is a schematic view, partly in side elevation and partly in section, depicting use of the power operated rotary knife of FIG. 1 for trimming a layer of material from a product utilizing the "flat blade" style rotary knife blade, shown, for example, in FIG. 24.
Figure 55:
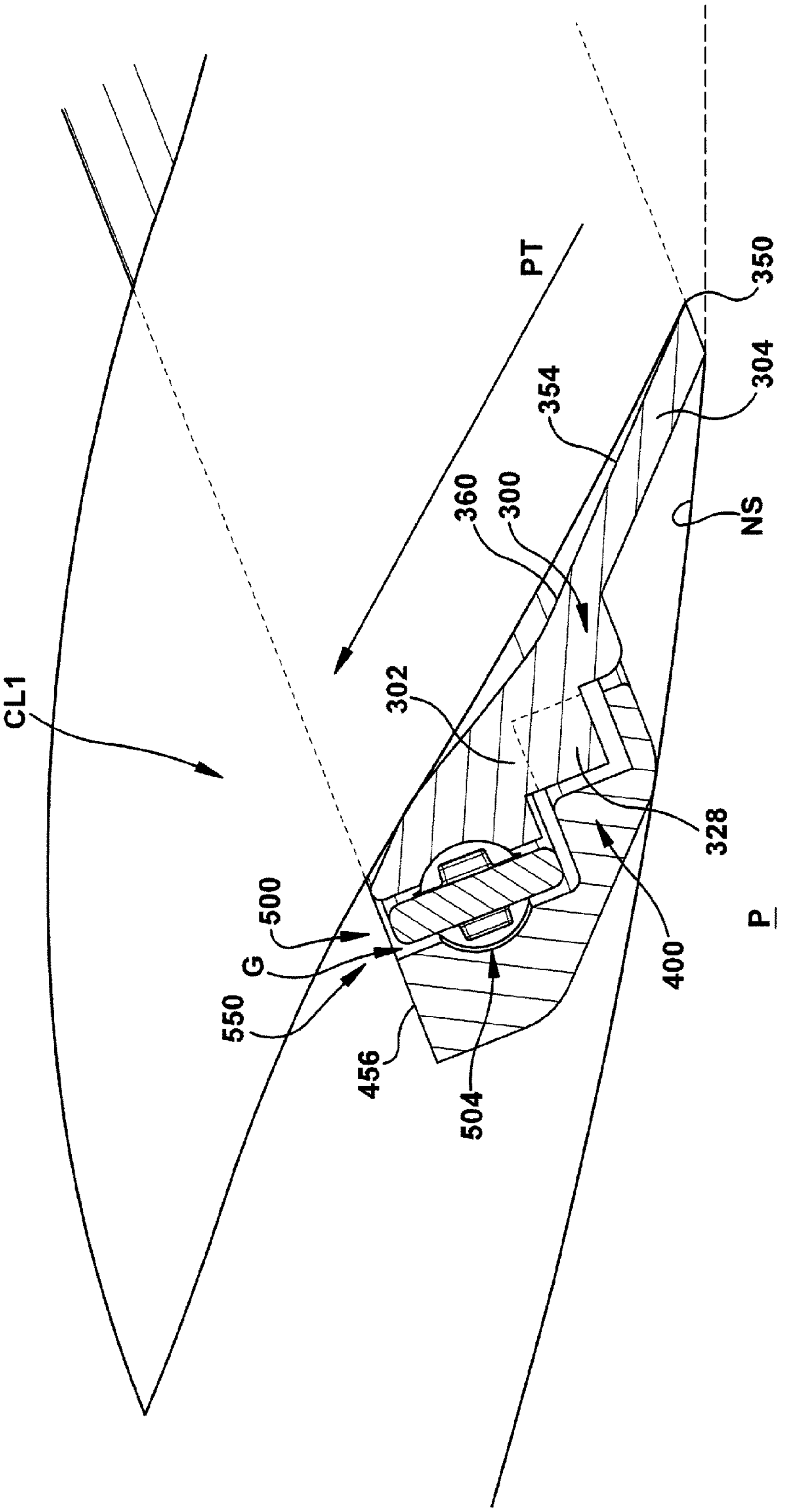
FIG. 55 is a schematic enlarged view, partly in side elevation and partly in section, depicting use of the power operated rotary knife of FIG. 1 for trimming a layer of material from a product utilizing the "flat blade" style rotary knife blade.

The friction or drag experienced by the operator as the power operated rotary knife 100 is manipulated by the operator to move through a product P, as schematically illustrated in FIGS. 54 and 55, is dependent, among other things, on the cross sectional shape or configuration of the blade-blade housing combination 550 in a cutting region CR of the assembled combination 550. As can best be seen in FIG. 3, the cutting region CR of the blade-blade housing combination 550 is approximately 240° of the entire 360° periphery of the combination. The cutting region CR excludes the approximately 120° of the periphery of the blade-blade housing combination 550 occupied by the mounting section 402 of the blade housing 400.

As can best be seen in FIGS. 54 and 55, the blade-blade housing combination 550 is configured and contoured to be as smooth and continuous as practical. As can best be seen in FIG. 54, a layer L1 of material is cut or trimmed from a product P being processed (for example, a layer of tissue, for example, a layer of meat or fat trimmed from an animal carcass) by moving the power operated rotary knife 100 in a cutting direction CD such that the rotating knife blade 300 and blade housing 400 move along and through the product P to cut or trim the layer of material L1. As the power operated rotary knife 100 is moved by the operator, the blade edge 350 cuts the layer L1 forming a cut portion CL1 of the layer L1. The cut portion CL1 moves along a cut or trimmed material path of travel PT through the cutting opening CO of the blade-blade housing combination 550 as the power operated rotary knife 100 advances through the product P.

A new outer surface layer NS (FIG. 55) formed as the layer L1 is cut away from the product P. The cut portion CL1 of the layer L1 slides along the inner wall 360 of the rotary knife blade 300, while new outer surface layer NS slides along the respective outer walls 356, 454 of the blade section 350 of the knife blade 300 and the blade support section 450 of the blade housing 400.

A smooth transition between the blade section outer wall 356 of the knife blade 300 and the blade support section outer wall 454 of the blade housing 400 is provided by the short, radially extending driven gear cap portion 466 of the blade housing 400 and the radially extending shoulder 308*a* of the lower end 308 of the rotary knife blade body 302. The close proximity of the radially extending end 467 of the driven gear cap portion 466 provides a labyrinth seal to impede ingress of foreign materials into the region of the knife blade driven gear 328 and the region of the blade-blade housing bearing structure 500. Finally, the blade-blade housing combination 550 in the cutting region CR is shaped to extent possible to reduce drag and friction experienced by the operator when manipulating the power operated rotary knife in performing cutting or trimming operations.

Gear Train 604

The drive mechanism 600 of the power operated rotary knife 100 includes certain components and assemblies internal to the power operated rotary knife 100 including the gear train 604 and the driven gear 328 of the rotary knife blade 300 and certain components and assemblies external to the power operated rotary knife 100 including the drive motor 800 and the flexible shaft drive assembly 700, which is releasably coupled to the knife 100, via the drive shaft latching assembly 275.

Within the power operated rotary knife 100, the drive mechanism 600 includes the gearbox 602 comprising the gear train 604. In one exemplary embodiment, the gear train 604 includes the pinion gear 610 and the drive gear 650. The drive gear 650, in turn, engages the driven gear 328 of the rotary knife blade 300 to rotate the knife blade 300. As noted previously, the gearbox drive gear 650, in one exemplary embodiment, is a double gear that includes an upper, vertically or axially oriented bevel gear 652 and a lower, horizontally or radially oriented spur gear 654. The drive gear upper bevel gear 652 engages and is rotatably driven by the pinion gear 610. The drive gear lower spur gear 654 defines a plurality of drive gear teeth 656 that are mating involute gear teeth that mesh with the involute gear teeth 332 of the rotary knife blade driven gear 328 to rotate the rotary knife blade 300. This gearing combination between the drive gear 650 and the rotary knife blade 300 defines a spur gear involute gear drive 658 (FIG. 8A) to rotate the rotary knife blade 300.

In the involute gear drive, the profiles of the rotary knife gear teeth 332 of the rotary knife blade 300 and the gear teeth 656 of the spur gear 654 of the drive gear 650 are involutes of a circle and contact between any pair of gear teeth occurs at a substantially single instantaneous point. Rotation of the drive gear 650 and the knife blade driven gear 328 causes the location of the contact point to move across the respective tooth surfaces. The motion across the respective gear tooth faces is a rolling type of contact, with substantially no sliding involved. The involute tooth form of rotary knife blade gear teeth 332 and the spur gear gear teeth 656 results in very little wear of the respective meshing gear teeth 332, 656 versus a gearing structure wherein the meshing gear teeth contact with a sliding motion. The path traced by the contact point is known as the line of action. A property of the involute tooth form is that if the gears are meshed properly, the line of action is straight and passes through the pitch point of the gears. Additionally, the involute gear drive 658 is also a spur gear drive which means that an axis of rotation DGR (shown in FIGS. 8 and 8A) of the drive gear 650 is substantially parallel to the axis of rotation R of the knife blade 300. Such a spur drive with parallel axes of rotation DGR, R is very efficient in transmitting driving forces. The spur drive gearing arrangement of the rotary knife blade gear teeth 332 and the spur gear drive teeth 656 also advantageously contributes to reducing the wear of the meshing gears 332, 656 compared with other more complex gearing arrangements.

Figure 37:
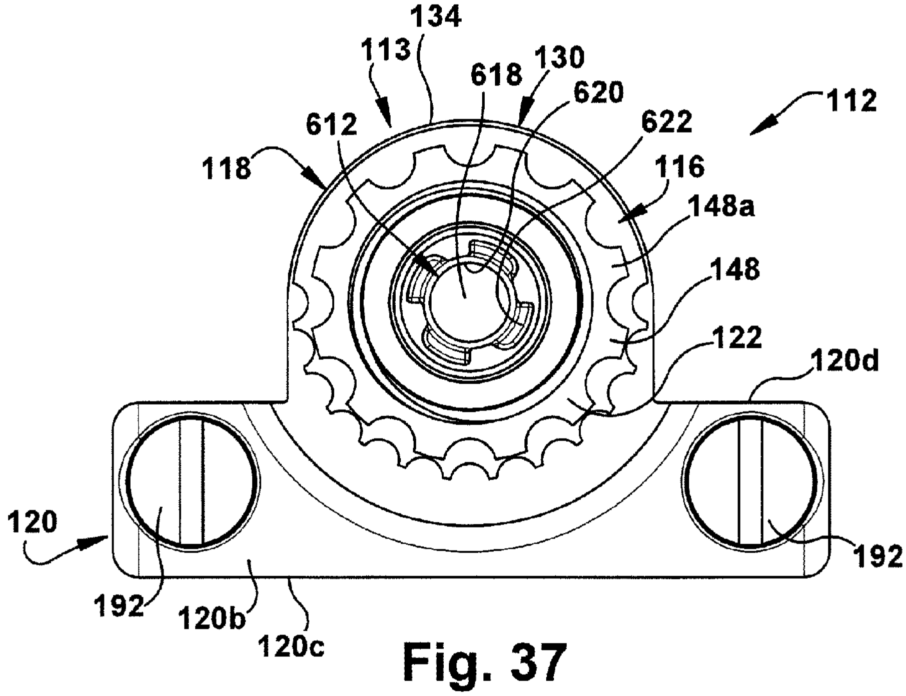
FIG. 37 is a schematic rear elevation view of the gearbox assembly of FIG. 33.
Figure 38:
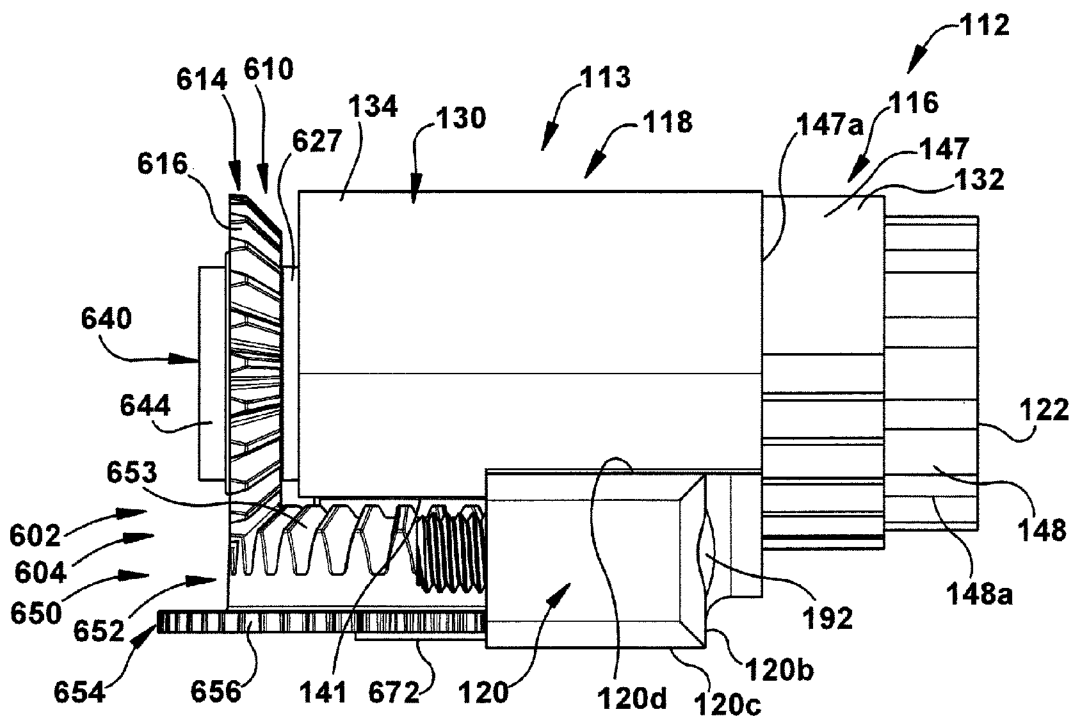
FIG. 38 is a schematic right side elevation view of the gearbox assembly of FIG. 33.

The pinion gear 610 comprises an input shaft 612 and a gear head 614 that extends radially outwardly from the input shaft 612 and defines a set of bevel gear teeth 616. The input shaft 612 extends in a rearward direction RW along the handle assembly longitudinal axis LA and includes a central opening 618 extending in a forward direction FW from a rearward end 629 (FIG. 41) to a forward end 628 of the input shaft 612, the central opening 618 terminating at the gear head 614. An inner surface 620 of the input shaft 612 defines a cross-shaped female socket or fitting 622 (FIGS. 37 and 40) which receives a mating male drive fitting 714 (FIG. 53) of the shaft drive assembly 700 to rotate the pinion gear 610 about an axis of rotation PGR which is substantially congruent with the handle assembly longitudinal axis LA and intersects the knife blade axis of rotation R.

Figure 42:
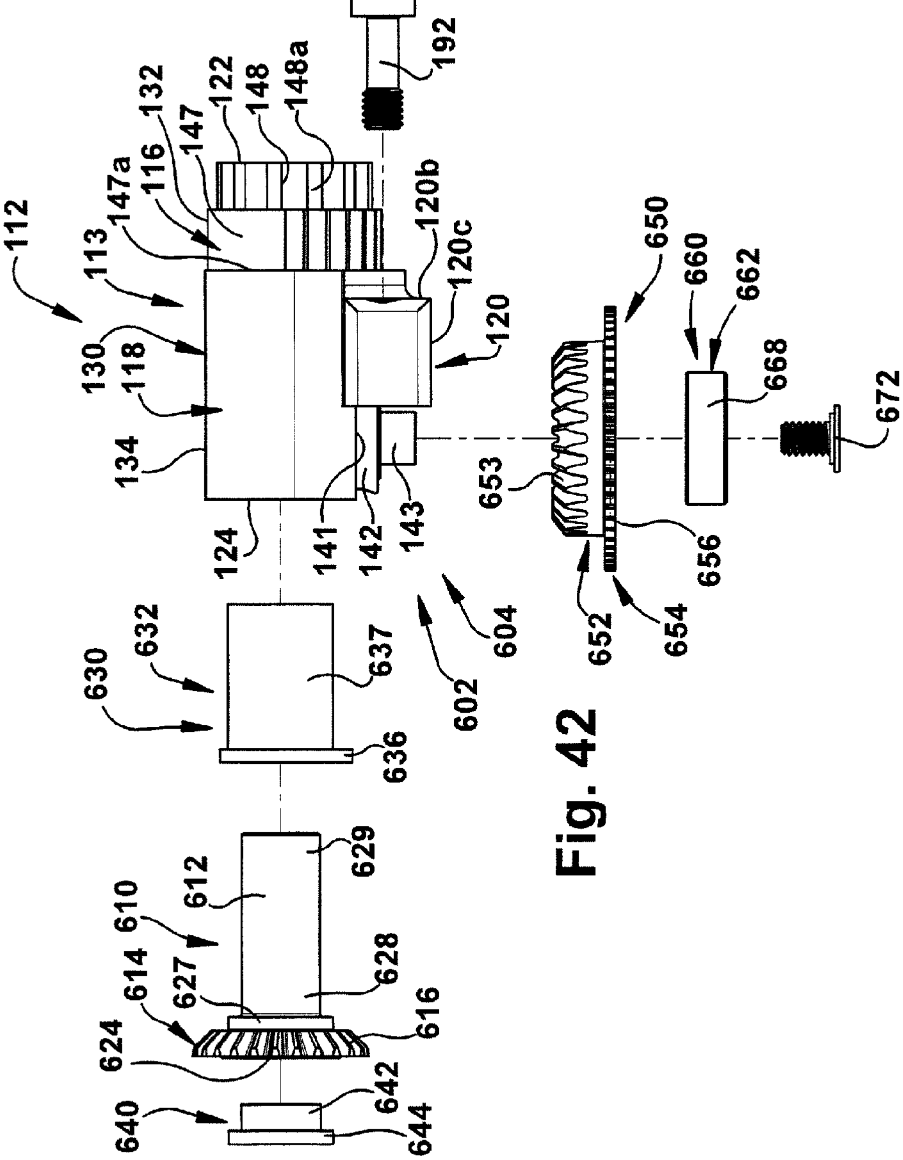
FIG. 42 is a schematic exploded side elevation view of the gearbox assembly of FIG. 33.
Figure 44:
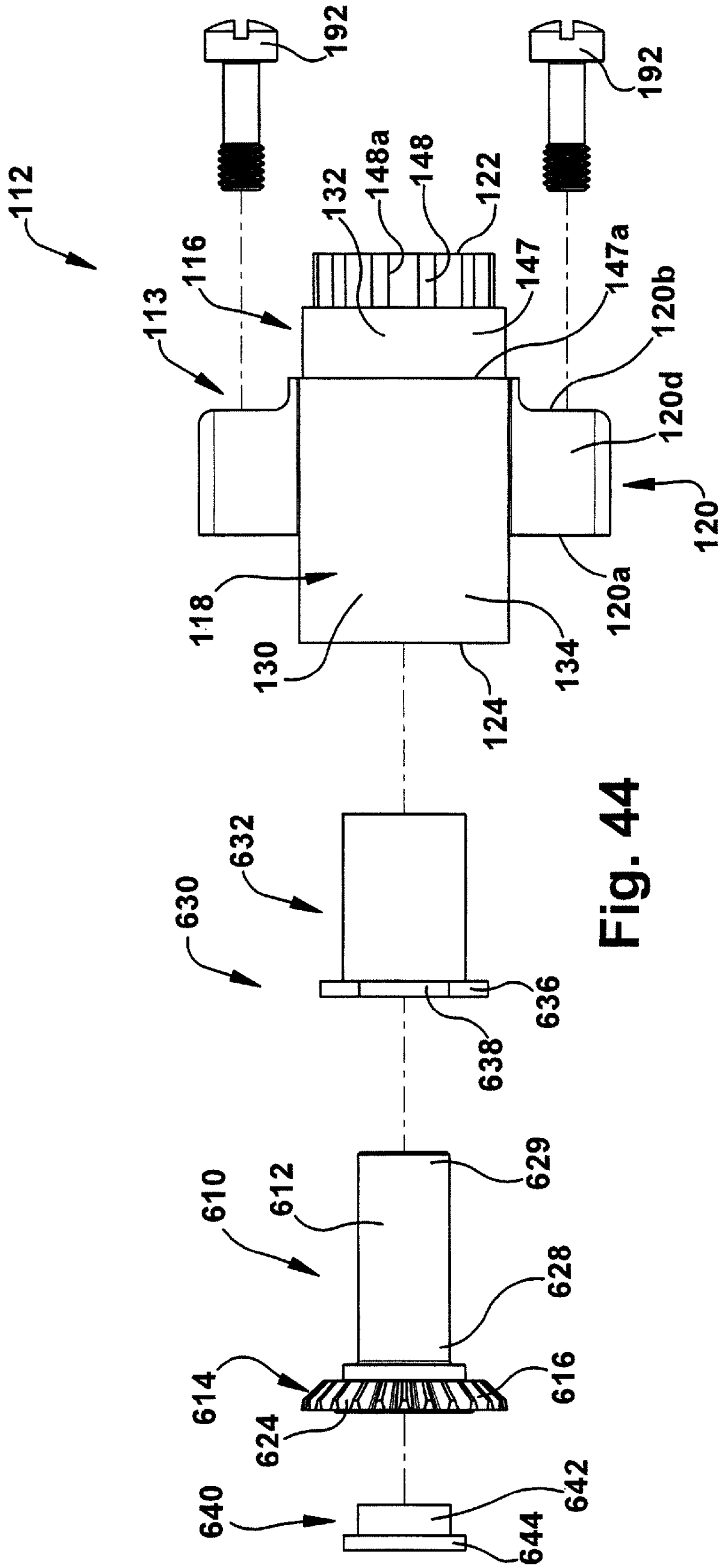
FIG. 44 is a schematic exploded top plan view of the gearbox assembly of FIG. 33.

The pinion gear 610 is supported for rotation about the pinion gear axis of rotation PGR (FIGS. 8 and 8A) by the bearing support assembly 630, which, in one exemplary embodiment, includes a larger sleeve bushing 632 and a smaller sleeve bushing 640 (FIG. 42). As can best be seen in FIG. 41, a forward facing surface 624 of the gear head 614 of the pinion gear 610 includes a central recess 626 which is substantially circular in cross section and is centered about the pinion gear axis of rotation PGR. The pinion gear central recess 626 receives a cylindrical reward portion 642 of the smaller sleeve bushing 640. The smaller sleeve bushing 640 functions as a thrust bearing and includes an enlarged annular head 644 provides a bearing surface for the pinion gear gear head 614 and limits axial travel of the pinion gear 610 in the forward direction FW, that is, travel of the pinion gear 610 along the pinion gear axis of rotation PGR, in the forward direction FW.

The sleeve bushing 640 is supported on a boss 158*b* (FIGS. 49 and 50) of the frame body 150. Specifically, the boss 158*b* extends rearwardly from an inner surface 158*a* of a forward wall 154*a* of a central cylindrical region 154 of the frame body 150. The boss 158*b* of the frame body central cylindrical region 154 includes a flat 158*c* that interfits with a flat 648 (FIG. 2C) formed in a central opening 646 of the sleeve bushing 640 to prevent rotation of the sleeve bushing 640 as the pinion gear 610 rotates about its axis of rotation PGR.

In one exemplary embodiment, the gear head 614 of the pinion gear 610 includes 25 bevel gear teeth and, at the forward facing surface 624, has an outside diameter of approximately 0.84 inch (measured across the gear from the tops of the gear teeth) and a root diameter of approximately 0.72 inch (measured across a base of the teeth). The bevel gear teeth 616 taper from a larger diameter at the forward facing surface 624 to a smaller diameter in away from the forward facing surface 624.

The larger sleeve bushing 632 of the pinion gear bearing support assembly 630 includes a central opening 634 that receives and rotatably supports the pinion gear input shaft 612. The larger sleeve bushing 632 includes an enlarged forward head 636 and a cylindrical rearward body 637. The cylindrical rearward body 637 of the larger sleeve bushing 632 is supported within a conforming cavity 129 (FIGS. 39 and 48) of the inverted U-shaped forward section 118 of the gearbox housing 113, while the enlarged forward head 636 of the sleeve bushing 632 fits within a conforming forward cavity 126 of the U-shaped forward section 118 of the gearbox housing 113.

A flat 638 (FIG. 41) of the enlarged forward head 636 of the larger sleeve bushing 632 interfits with a flat 128 of the U-shaped forward section 118 of the gearbox housing 113 to prevent rotation of the sleeve bushing 632 within the gearbox housing 113. The cylindrical body 639 of the larger sleeve bushing 632 defining the central opening 634 provides radial bearing support for the pinion gear 610. The enlarged head 636 of the sleeve bushing 632 also provides a thrust bearing surface for the rearward collar 627 of the gear head 614 to prevent axial movement of the pinion gear 610 in the rearward direction RW, that is, travel of the pinion gear 610 along the pinion gear axis of rotation PGR, in the rearward direction RW. Alternatively, instead of a pair of sleeve bushings 632, 640, the bearing support assembly 630 for the pinion gear 610 may comprise one or more roller or ball bearing assemblies or a combination of roller/ball bearing assemblies and sleeve bearings.

Figure 8:
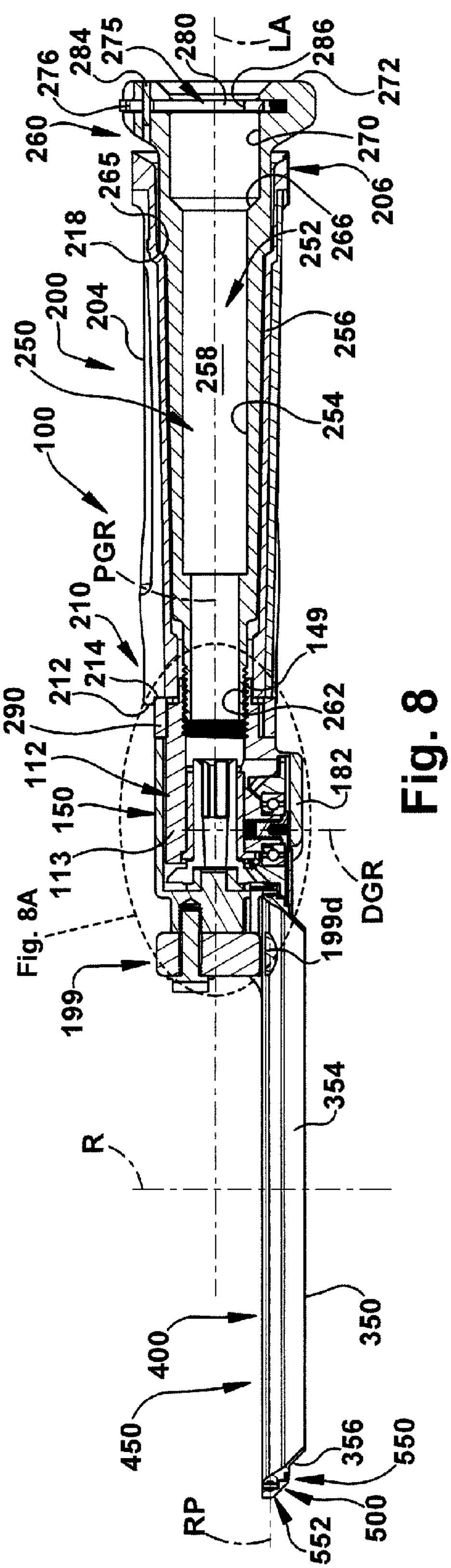
FIG. 8 is a schematic section view taken along a longitudinal axis of the handle assembly of the power operated rotary knife of FIG. 1, as seen from a plane indicated by the line 8-8 in FIG. 3.
Figure 8A:
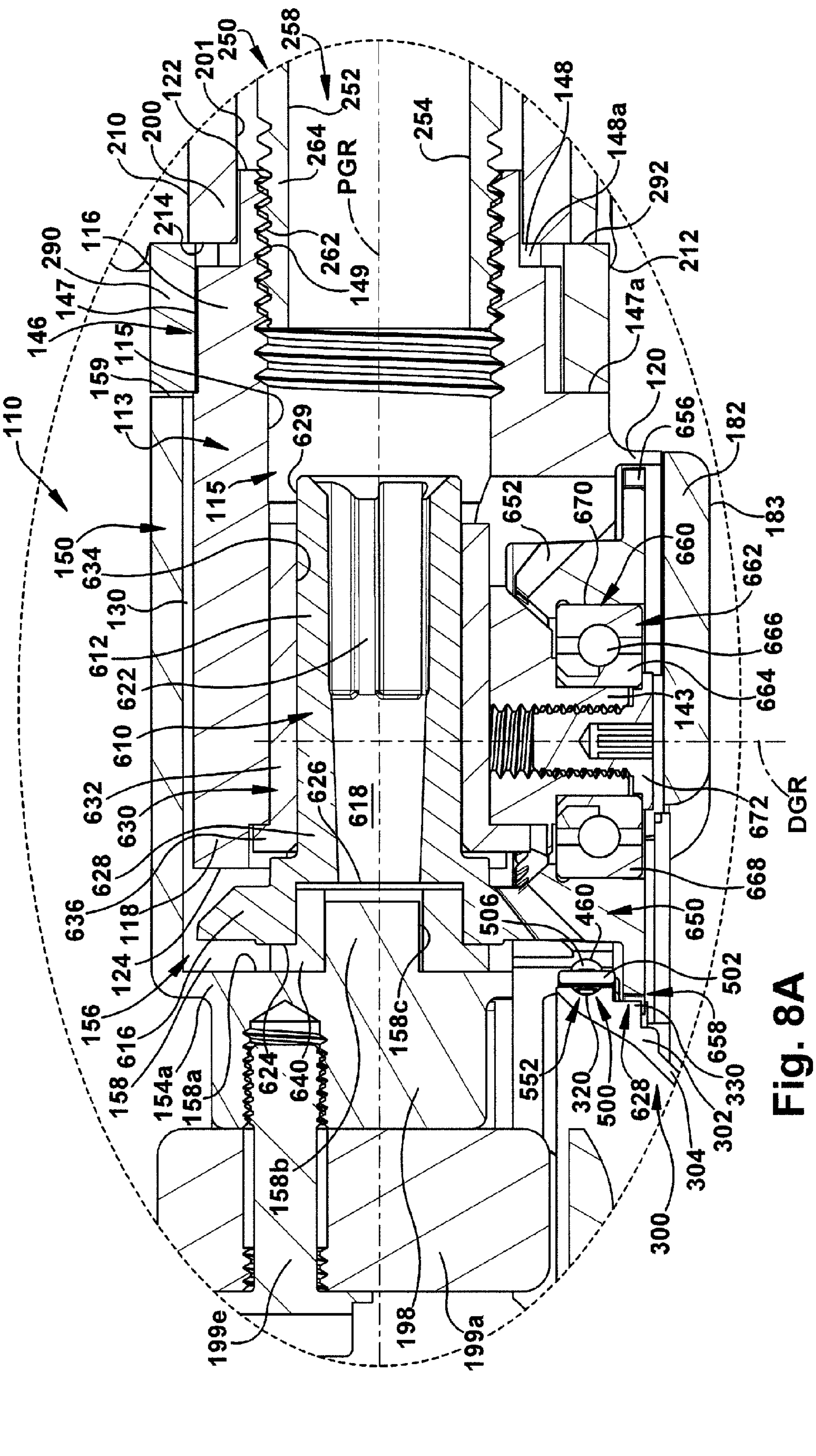
FIG. 8A is a schematic enlarged section view of a portion of the handle assembly shown in FIG. 8 that is within a dashed circle labeled FIG. 8A in FIG. 8.
Figure 9:
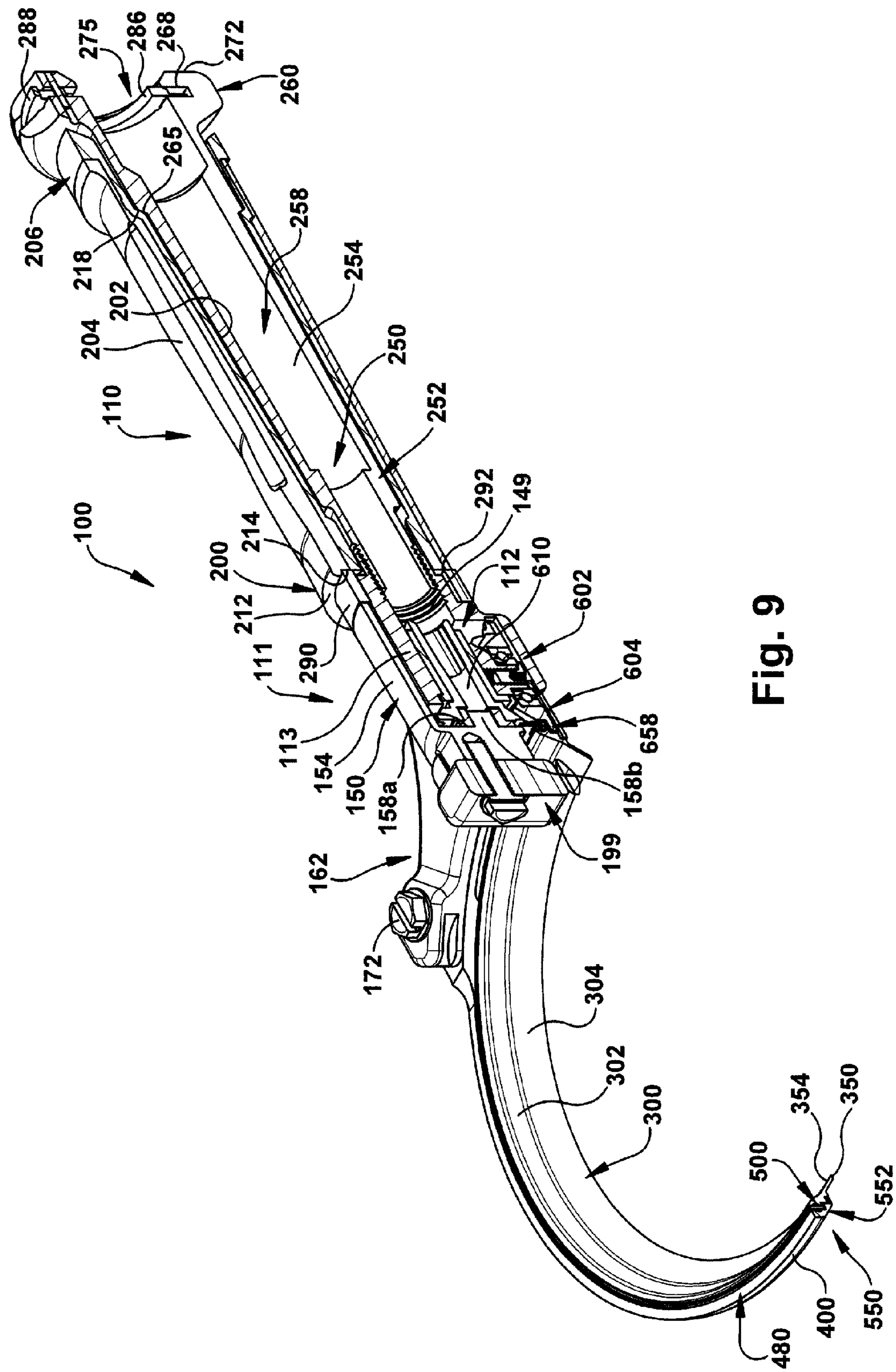
FIG. 9 is a schematic perspective section view along the longitudinal axis of the handle assembly of the power operated rotary knife of FIG. 1, as seen from a plane indicated by the line 8-8 in FIG. 3.

The drive gear 650, in one exemplary embodiment, is a double gear with axially aligned gears including the first bevel gear 652 and the second spur gear 654, both rotating about a drive gear axis of rotation DGR (FIGS. 8 and 8A). The drive gear axis of rotation DGR is substantially orthogonal to and intersects a pinion gear axis of rotation PGR. Further, the drive gear axis of rotation DGR is substantially parallel to the knife blade axis of rotation R. The first gear 652 is a bevel gear and includes a set of bevel gear teeth 653 that mesh with the set of bevel gear teeth 616 of the gear head 614 of the pinion gear 610. As the pinion gear 610 is rotated by the shaft drive assembly 700, the bevel gear teeth 616 of the pinion gear 610, in turn, engage the bevel gear teeth 653 of the first gear 652 to rotate the drive gear 650.

The second gear 654 comprises a spur gear including a set of involute gear teeth 656. The spur gear 654 engages and drives the driven gear 328 of the knife blade 300 to rotate the knife blade about its axis of rotation R. Because the spur gear 654 of the gearbox 602 and the driven gear 328 of the knife blade 300 have axes of rotation DGR, R that are parallel (that is, a spur gear drive) and because the gears 654, 328 comprise an involute gear drive 658, there is less wear of the respective gear teeth 656, 332 than in other gear drives wherein the axes of rotation are not parallel and wherein a non-involute gear drive is used. In one exemplary embodiment, the first gear 652 includes 28 bevel gear teeth and has an outside diameter of approximately 0.92 inch and an inside diameter of approximately 0.66 inch and the second gear 654 includes 58 spur gear teeth and has an outside diameter of approximately 1.25 inches and a root diameter of approximately 1.16 inches.

Figure 39:
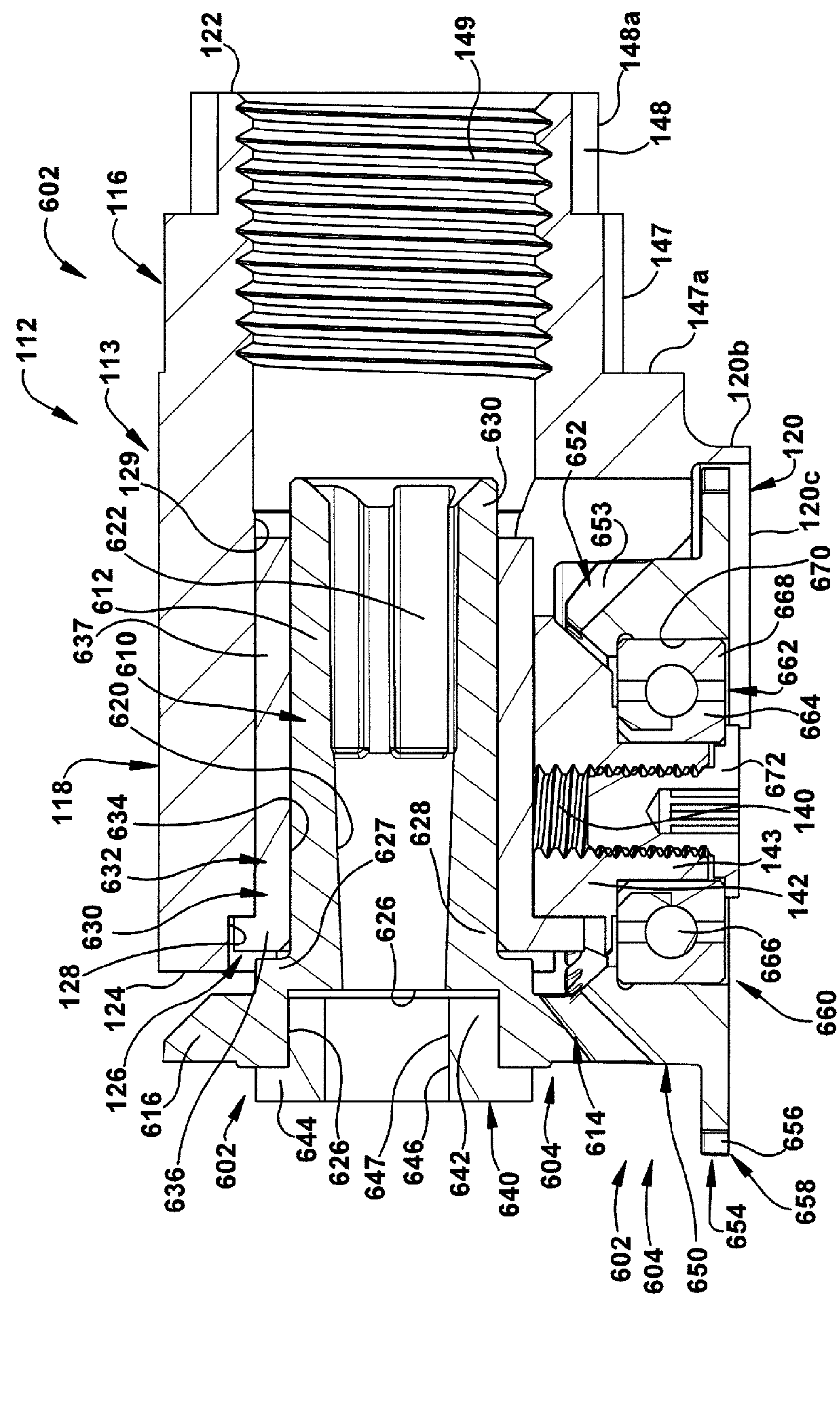
FIG. 39 is a schematic longitudinal section view of the gearbox assembly of FIG. 33, as seen from a plane indicated by the line 39-39 in FIG. 36.

The drive gear 650 is supported for rotation by the bearing support assembly 660 (FIGS. 39-43). The bearing support assembly 660, in one exemplary embodiment, comprises a ball bearing assembly 662 that supports the drive gear 650 for rotation about the drive gear rotational axis DGR. The drive gear bearing support assembly 660 is secured to a downwardly extending projection 142 (FIGS. 47 and 48) of the inverted U-shaped forward section 118 of the gearbox housing 113. As can be seen in FIG. 39, the ball bearing assembly 662 includes a plurality of ball bearings 666 trapped between an inner race 664 and an outer race 668. The outer race 668 is affixed to the drive gear 650 and is received in a central opening 670 of the drive gear 650. The inner race 664 is supported by the fastener 672. A threaded end portion of the fastener 672 and screws into a threaded opening 140 (FIGS. 41 and 47) defined in a stem 143 of the downwardly extending projection 142 of the inverted U-shaped forward section 118 of the gearbox housing 113. The fastener 672 secures the ball bearing assembly 662 to the gearbox housing 113. Alternatively, instead of a ball bearing assembly, the bearing support assembly 660 may comprise one or more sleeve bearings or bushings.

Gearbox Housing 113

As is best seen in FIGS. 2C, and 33-44, the gearbox assembly 112 includes the gearbox housing 113 and the gearbox 602. As can best be seen in FIGS. 41-48, the gearbox housing 113 includes a generally cylindrical rearward section 116 (in the rearward direction RW away from the blade housing 400), an inverted U-shaped forward section 118 (in the forward direction FW toward the blade housing 400) and a generally rectangular base section 120 disposed axially below the forward section 118. The gearbox housing 113 includes the gearbox cavity or opening 114 which defines a throughbore 115 extending through the gearbox housing 113 from a rearward end 122 to a forward end 124. The throughbore 115 extends generally along the handle assembly longitudinal axis LA. The inverted U-shaped forward section 118 and the cylindrical rearward section 116 combine to define an upper surface 130 of the gearbox housing 113.

Figure 43:
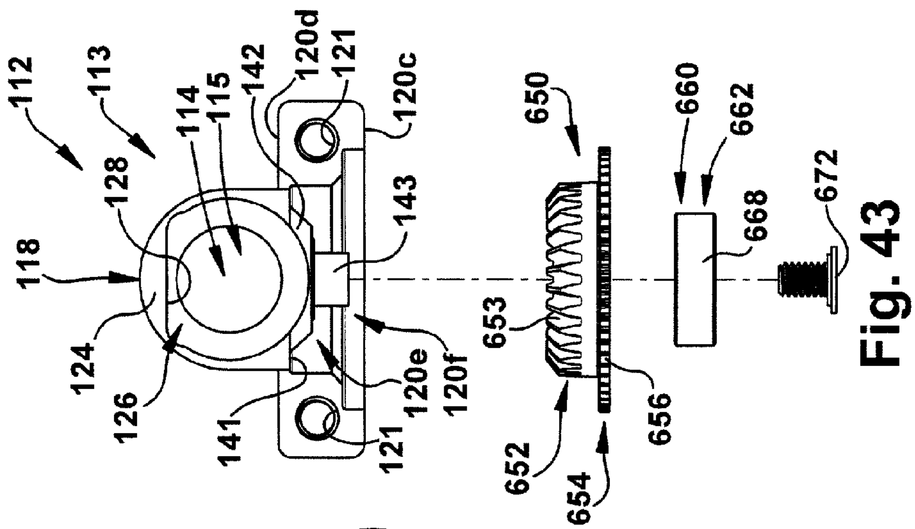
FIG. 43 is a schematic exploded front elevation view of the gearbox assembly of FIG. 33.
Figure 47:
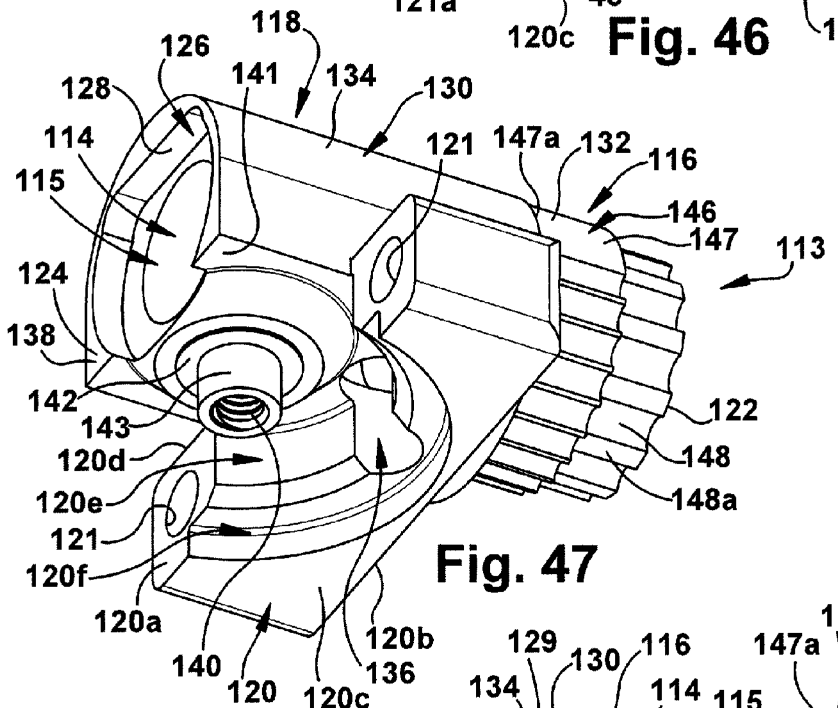
FIG. 47 is a schematic front, bottom perspective view of the gearbox housing of FIG. 46.
Figure 48:
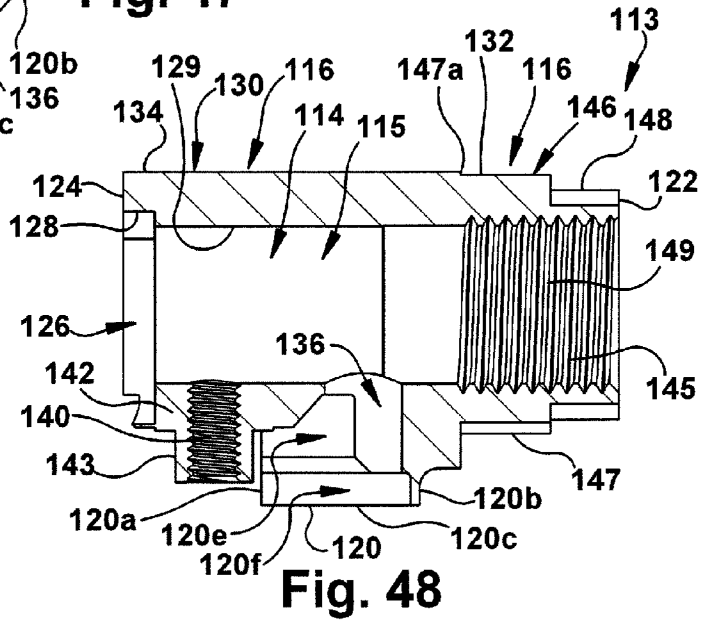
FIG. 48 is a schematic longitudinal section view of the gearbox housing of FIG. 46, as seen from a plane indicated by the line 48-48 in FIG. 46.

The gearbox housing 113 also includes a generally rectangular shaped base 120 which extends downwardly from the inverted U-shaped forward section 118, i.e., away from the upper surface 130. The rectangular base 120 includes a front wall 120*a* and a rear wall 120*b*, as well as a bottom wall 120*c* and an upper wall 120*d*, all of which are generally planar. As is best seen in FIGS. 47 and 48, extending radially inwardly into the front wall 120*a* of the rectangular base 120 are first and second arcuate recesses 120*e*, 120*f*. The first arcuate recess 120*e* is an upper recess, that is, the upper recess 120*e* is adjacent a bottom portion 141 of the inverted U-shaped forward section 118 and, as best seen in FIG. 43, is offset slightly below the upper wall 120*d* of the rectangular base 120. The second arcuate recess 120*f* is a lower recess and extends through the bottom wall 120*c* of the rectangular base 120.

The bottom portion 141 of the inverted U-shaped forward section 118 includes a downwardly extending projection 142 (FIG. 47). The downwardly extending projection 142 includes a cylindrical stem portion 143 and defines a threaded opening 140 extending through the projection 142. A central axis through the threaded opening 140 defines and is coincident with the axis of rotation DGR of the drive gear 650. The upper and lower arcuate recesses 120*e*, 120*f* are centered about the drive gear axis of rotation DGR and the central axis of the threaded opening 140.

The throughbore 115 of the gearbox housing 113 provides a receptacle for the pinion gear 610 and its associated bearing support assembly 630 while the upper and lower arcuate recesses 120*e*, 120*f* provide clearance for the drive gear 650 and its associate bearing support assembly 660. Specifically, with regard to the bearing support assembly 630, the cylindrical body 637 of the larger sleeve bushing 632 fits within the cylindrical cavity 129 of the inverted U-shaped forward section 118. The enlarged forward head 636 of the sleeve bushing 632 fits within the forward cavity 126 of the forward section 118. The cylindrical cavity 129 and the forward cavity 126 of the inverted U-shaped forward section 118 are both part of the throughbore 115.

With regard to the upper and lower arcuate recesses 120*e*, 120*f*, the upper recess 120*e* provides clearance for the first bevel gear 652 of the drive gear 650 as the drive gear 650 rotates about its axis of rotation DGR upon the first bevel gear 652 being driven by the pinion gear 610. The wider lower recess 120*f* provides clearance for the second spur gear 654 of the drive gear 650 as the spur gear 654 coacts with the driven gear 328 to rotate the rotary knife blade 300 about its axis of rotation R. As can best be seen in FIGS. 39 and 40, the downwardly extending projection 142 and stem 143 provide seating surfaces for the ball bearing assembly 662, which supports the drive gear 650 for rotation within the rectangular base 120 of the gearbox housing 113. A cleaning port 136 (FIGS. 47 and 48) extends through the bottom portion 141 of inverted U-shaped forward section 118 and a portion of the base 120 of the gearbox housing 113 to allow cleaning fluid flow injected into the throughbore 115 of the gearbox housing 113 from the proximal end 122 of the gearbox housing 113 to flow into the upper and lower arcuate recesses 120*e*, 120*f* for purpose of cleaning the drive gear 650.

Figure 40:
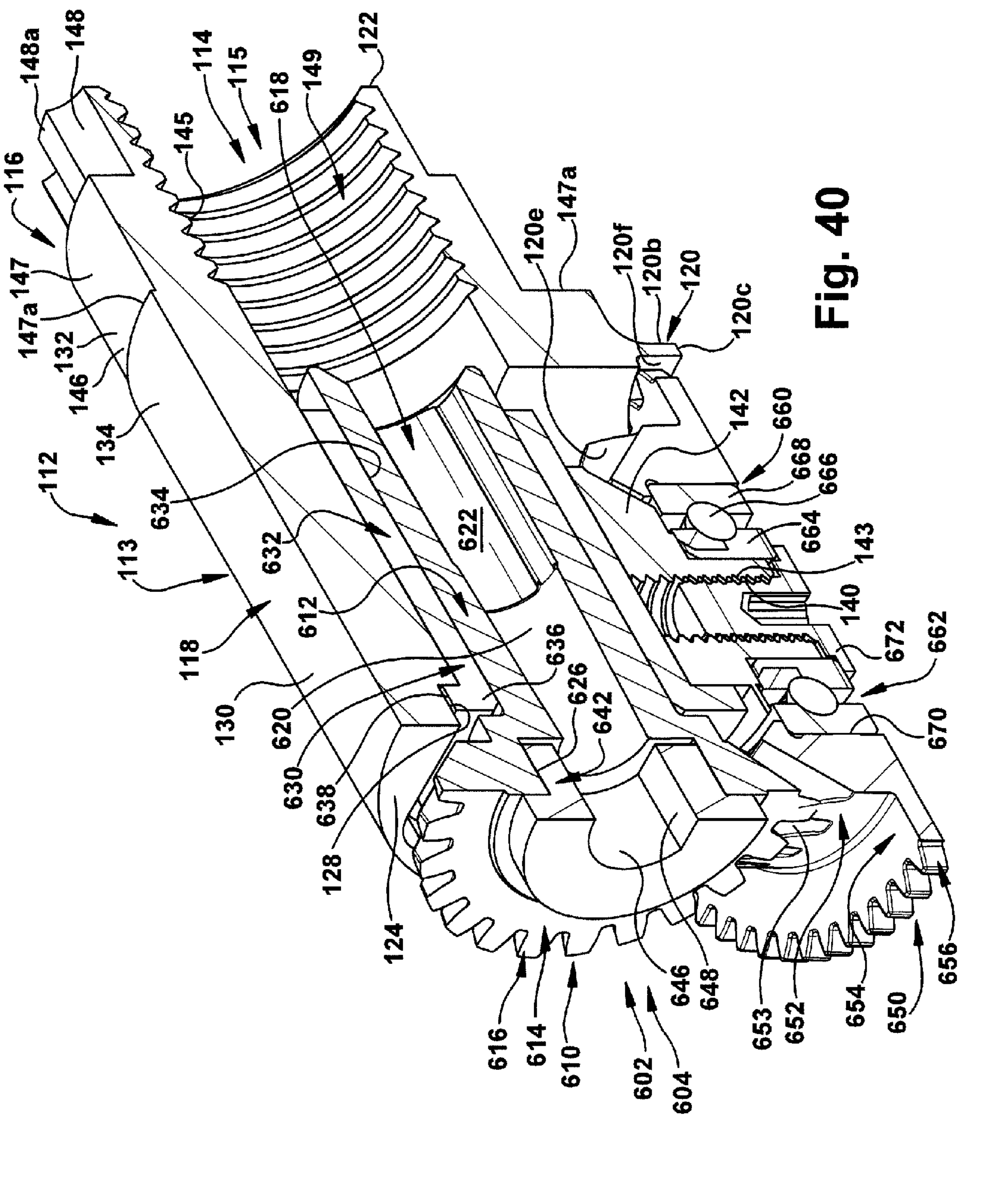
FIG. 40 is a schematic longitudinal perspective section view of the gearbox assembly of FIG. 33, as seen from a plane indicated by the line 39-39 in FIG. 36.

As can be seen in FIGS. 39 and 40, an inner surface 145 of the cylindrical rearward section 116 of the gearbox housing 113 defines a threaded region 149, adjacent the proximal end 122 of the gearbox housing 113. The threaded region 149 of the gearbox housing 113 receives a mating threaded portion 262 (FIG. 2B) of the elongated central core 252 of the hand piece retaining assembly 250 to secure the hand piece 200 to the gearbox housing 113. As seen in FIGS. 38-44, an outer surface 146 of the cylindrical rearward section 116 of the gearbox housing 113 defines a first portion 148 adjacent the proximal end 122 and a second larger diameter portion 147 disposed forward or in a forward direction FW of the first portion 148. The first portion 148 of the outer surface 146 of the cylindrical rearward portion 116 of the gearbox housing 113 includes a plurality of axially extending splines 148*a*. The plurality of splines 148*a* accept and interfit with four ribs 216 (FIG. 2B) formed on an inner surface 201 of a distal end portion 210 of the hand piece 200. The coacting plurality of splines 148*a* of the gearbox housing 113 and the four ribs 216 of the hand piece 200 allow the hand piece 200 to be oriented at any desired rotational position with respect to the gearbox housing 113.

The second larger diameter portion 147 of the outer surface 146 of the cylindrical rearward section 116 of the gearbox housing 113 is configured to receive a spacer ring 290 (FIG. 2B) of the hand piece retaining assembly 250. As can be seen in FIG. 8A, the spacer ring 290 abuts and bears against a stepped shoulder 147*a* defined between the cylindrical rearward section 116 and the inverted U-shaped forward section 118 of the gearbox housing 113. That is, an upper portion 134 of the inverted U-shaped forward section 118 is slightly radially above a corresponding upper portion 132 of the cylindrical rearward section 116 of the gearbox housing 113. A rear or proximal surface 292 (FIG. 2B) of the spacer ring 290 acts as a stop for an axially stepped collar 214 of the distal end portion 210 of the hand piece 200 when the hand piece 200 is secured to the gearbox housing 113 by the elongated central core 252 of the hand piece retaining assembly 250.

Figure 46:
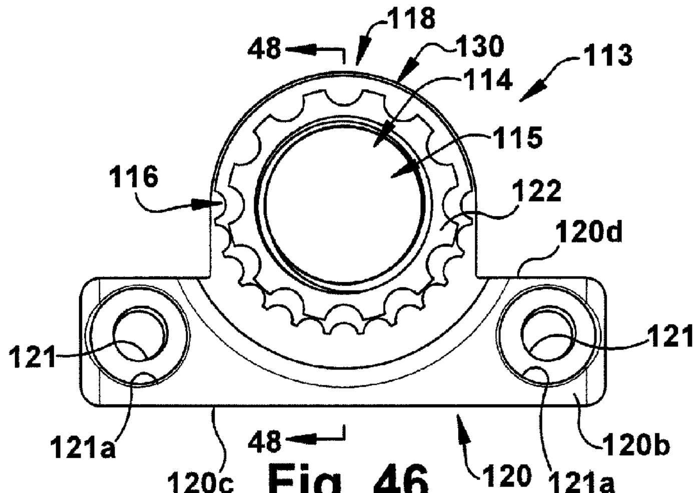
FIG. 46 is a schematic rear elevation view of the gearbox housing of the gearbox assembly of the power operated rotary knife of FIG. 1.

The second larger diameter portion 147 of the outer surface 146 also includes a plurality of splines (seen in FIGS. 41 and 46). The plurality of splines of the second portion 147 are used in connection with an optional thumb support (not shown) that may be used in place of the spacer ring 290. The thumb support provides an angled, outwardly extending support surface for the operator's thumb. The plurality of splines of the second portion 147 are utilized in connection with the optional thumb support to allow the operator to select a desired rotational orientation of the thumb support with respect to the gearbox housing 113 just as the plurality of splines 148*a* of the first portion 148 allow the operator to select a desired rotational orientation of the hand piece 200 with respect to the gearbox housing 113.

Frame Body 150

Also part of the head assembly 111 is the frame or frame body 150, best seen in FIGS. 45 and 49-52. The frame body 150 receives and removably supports both the gearbox assembly 112 and the blade-blade housing combination 550. In this way, the frame body 150 releasably and operatively couples the gearbox assembly 112 to the blade-blade housing combination 550 such that the gear train 604 of the gearbox assembly 112 operatively engages the driven gear 328 of the rotary knife blade 300 to rotate the knife blade 300 with respect to the blade housing 400 about the axis of rotation R.

The frame body 150 includes the arcuate mounting pedestal 152 disposed at a forward portion 151 (FIG. 2C) of the frame 150, the central cylindrical region 154, and a rectangular base 180 (FIG. 51) disposed below the central cylindrical region 154. The arcuate mounting pedestal 152 of the frame body defines the seating region 152*a* (FIGS. 2C and 51) to receive the mounting section 402 of the blade housing 400 and secure the blade-blade housing combination 550 to the frame body 150. The central cylindrical region 154 and the rectangular base 180 of the frame body 150 define a cavity 155 (FIGS. 45 and 49) which slidably receives the gearbox housing 113. The frame body cavity 155 is comprised of an upper socket 156 defined by the central cylindrical region 154 and a lower horizontally extending opening 190 defined by and extending through the central rectangular base 180.

Figure 49:
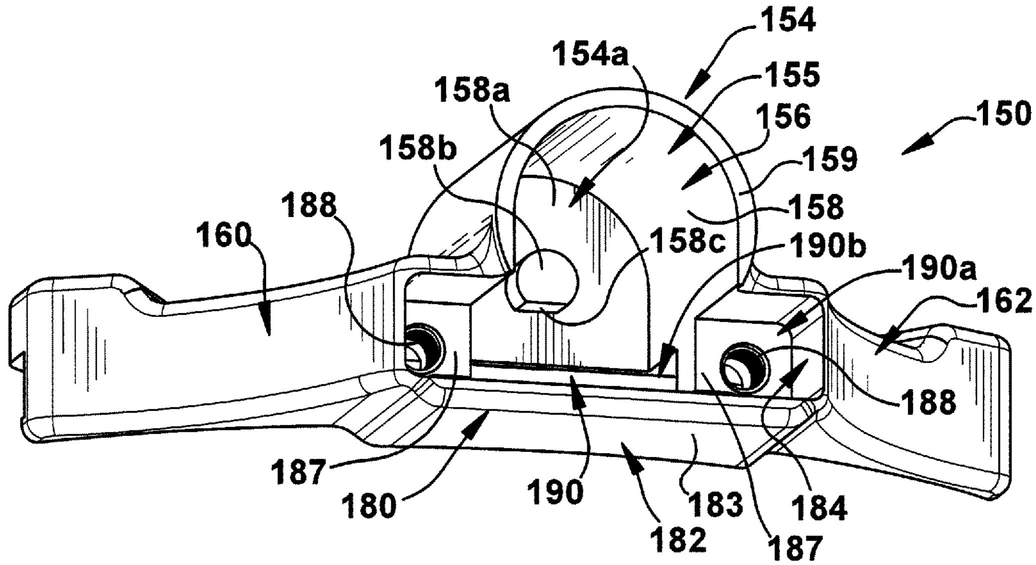
FIG. 49 is a schematic rear perspective view of the frame body of the head assembly of the power operated rotary knife of FIG. 1.
Figure 50:
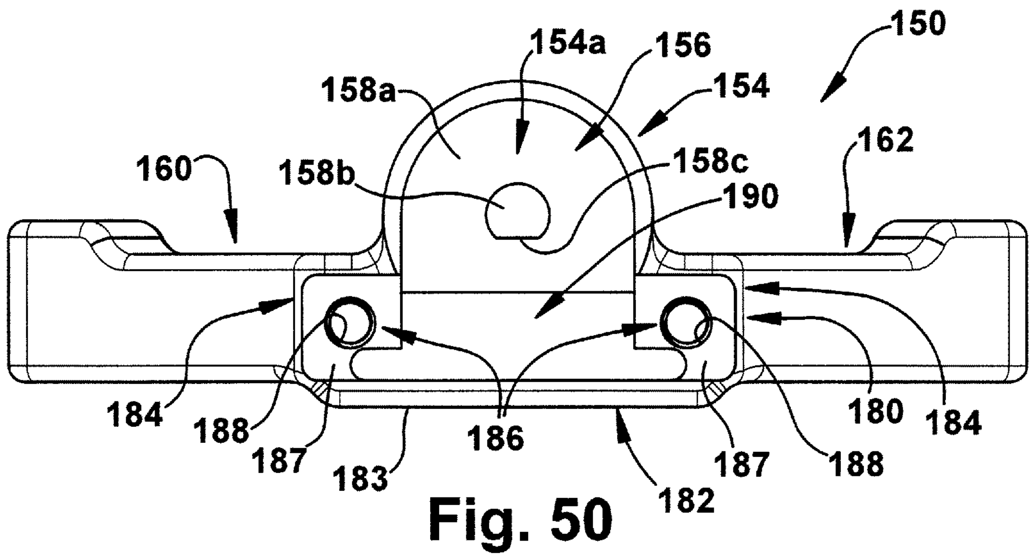
FIG. 50 is a schematic rear elevation view of the frame body of FIG. 49.
Figure 51:
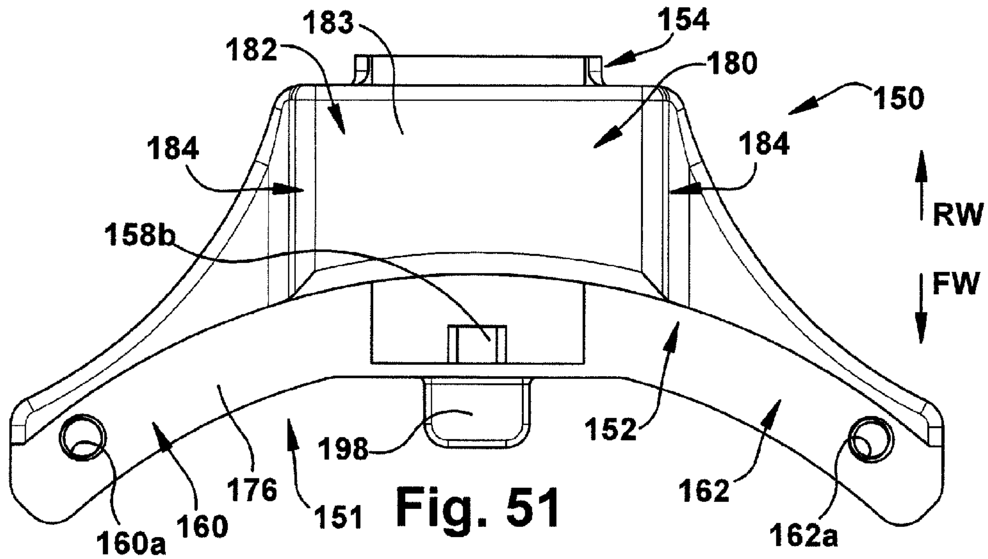
FIG. 51 is a schematic bottom plan view of the frame body of FIG. 49.
Figure 52:
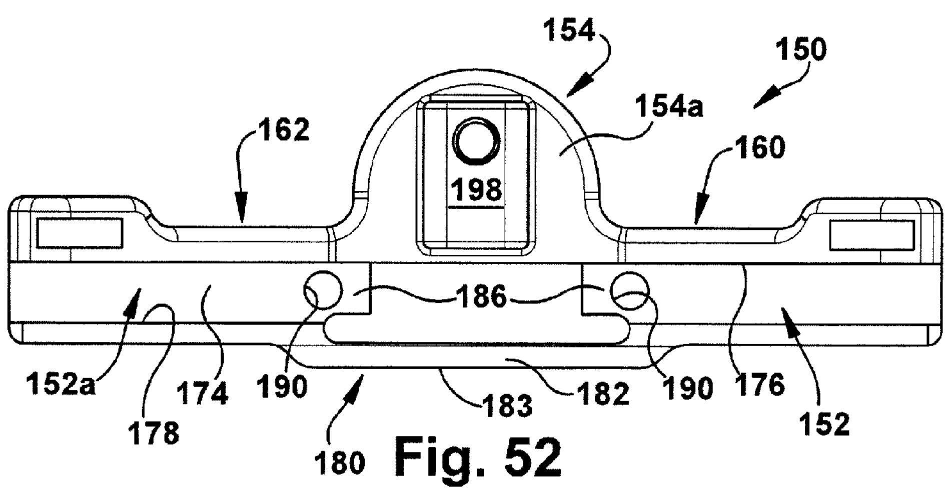
FIG. 52 is a schematic front elevation view of the frame body of FIG. 49.

The central rectangular base 180 of the frame body 150 includes a bottom wall 182 and a pair of side walls 184 that extend upwardly from the bottom wall 182. As is best seen in FIGS. 49 and 50, a pair of bosses 186 extend inwardly from the pair of side walls 184. Rearward facing surfaces 187 of the pair of bosses 186 each include a threaded opening 188. The lower horizontally extending opening 190 defined by the rectangular base 180 includes two parts: a generally rectangular portion 190*a* extending rearwardly from the pair of boss surfaces 187; and a forward portion 190*b* that extends through the rectangular base 180 to the seating region 152*a* of the frame body 150.

To secure the gearbox assembly 112 to the frame body 150, the gearbox assembly 112 is aligned with and moved toward a proximal end 157 of the frame body 150. As can best be seen in FIG. 45, the socket 156 defined by the central cylindrical region 154 of the frame body 150 is configured to slidably receive the inverted U-shaped forward section of the gearbox housing 113 and the rectangular portion 190*a* of the horizontally extending opening 190 of the rectangular base 180 is configured to slidably receive the rectangular base 120 of the gearbox housing 113. The upper surface 130 of the gearbox housing 113 is slidably received within the inner surface 158 of the central cylindrical region 154 of the frame body 150.

When the gearbox assembly 112 is fully inserted into the frame body 150, the front wall 120*a* of the base 120 of the gearbox housing 113 abuts the rearward facing surfaces 187 of the pair of bosses 186 of the rectangular base 180 of the frame body 150. Further, the horizontally extending openings 121 of the gearbox housing base 120 are aligned with the horizontally extending threaded openings 188 of the pair of bosses 186 of the frame body rectangular base 180. A pair of threaded fasteners 192 (FIG. 45) pass through the openings 121 of the gearbox housing base 120 and thread into the threaded openings 188 of the pair of bosses 186 of the frame body rectangular base 180 to releasably secure the gearbox assembly 112 to the frame body 150. The openings 121 of the gearbox housing base 120 are partially threaded to prevent the fasteners 192 from fall out of the openings 121 when the gearbox housing 113 is not coupled to the frame body 150.

The openings 121 of the gearbox housing base 120 include countersunk end portions 121*a* (FIG. 45) to receive the enlarged heads of the pair of threaded fasteners 192 such that the enlarged heads of the fasteners 192, when tightened into the frame body 150, are flush with the rear wall 120*b* of the base 120. The threaded fasteners 192 include narrow body portions relative to the enlarged heads and larger diameter threaded portions such that the fasteners 192 remain captured within their respective gearbox housing openings 121 when the gearbox housing 113 is not coupled to the frame body 150. Relative movement between the gearbox assembly 112 and the frame body 150 is constrained by the threaded interconnection of the gearbox housing 113 to the frame body 150 via the threaded fasteners 192 and the abutting surfaces of the rectangular base 120 of the gearbox housing 113 and the rectangular base 180 of the frame body 150.

Additionally, the frame body 150 releasably receives the blade-blade housing combination 550 and thereby operatively couples the blade-blade housing combination 550 to the gearbox assembly 112. As can best be seen in FIGS. 51 and 52, the pair of arcuate arms 160, 162 of the frame body 150 define the arcuate mounting pedestal 152. The mounting pedestal 152, in turn, defines the seating region 152*a* that releasably receives the mounting section 402 of the blade housing 400. Specifically, the arcuate mounting pedestal 152 includes an inner wall 174, an upper wall 176 extending radially in the forward direction FW from an upper end of the inner wall 174, and a lower wall or ledge 178 extending radially in a forward direction FW from a lower end of the inner wall 174.

When the blade housing mounting section 402 is properly aligned and moved into engagement with the frame body arcuate mounting pedestal 152: 1) the outer wall 406 of the blade housing mounting section 402 bears against the mounting pedestal inner wall 174 of the frame body 150; 2) the first upper end 408 of the blade housing mounting section 402 bears against the mounting pedestal upper wall 176 of the frame body 150; and 3) a radially inwardly stepped portion 406*a* of the outer wall 406 of the blade housing mounting section 402 bears against an upper face and a forward face of the radially outwardly projecting mounting pedestal lower wall or ledge 178 of the frame body 150.

The respective threaded fasteners 170, 172 of the frame body 150 are threaded into the threaded openings 420*a*, 422*a* of the mounting inserts 420, 422 of the blade housing mounting section 402 to secure the combination blade-blade housing 550 to the frame body 150. Assuming that the gearbox assembly 112 is coupled to the frame body 150, when the blade-blade housing combination 550 is secured to the frame body 150, the second spur gear 654 of the drive gear 650 of the gearbox assembly 112 engages and meshes with the driven gear 328 of the rotary knife blade 300 of the blade-blade housing combination 550. Thus, when the gearbox assembly 112 and the blade-blade housing combination 550 are secured to the frame body 150, the gear train 604 of the gearbox assembly 112 is operatively engaged with the driven gear 328 of the rotary knife blade 300 to rotatably drive the blade 300 within the blade housing 400 about the blade axis of rotation R. Like the threaded fasteners 192 of the gearbox housing 113 that secure the gearbox housing 113 to the frame body 150, the threaded fasteners 170, 172 of the frame body 150 include narrow bodies and larger diameter threaded portions such that the fasteners remain captured in the partially threaded openings 160*a*, 162*a* of the arcuate arms 160, 162.

To remove the combination blade-blade housing 550 from the frame body 150, the pair of threaded fasteners 170, 172 of the frame body 150 are unthreaded from the threaded openings 420*a*, 422*a* of the blade housing mounting inserts 420, 422. Then, the blade-blade housing combination 550 is moved is the forward direction FW with respect to the frame body 150 to disengage the blade-blade housing combination 550 from the head assembly 111.

A forward wall 154*a* of the central cylindrical region 154 of the frame body 150 includes a projection 198 that supports a steeling assembly 199 (FIG. 2C). The steeling assembly 199 includes a support body 199*a*, spring biased actuator 199*b*, and a push rod 199*c* with a steeling member 199*d* affixed to a bottom of the push rod 199*c*. The steeling assembly support body 199*a* is affixed to the projection 198. When the actuator 199*b* is depressed by the operator, the push rod 199*c* moves downwardly and the steeling member 199*d* engages the blade edge 350 of the knife blade 300 to straighten the blade edge 350.

Hand Piece 200 and Hand Piece Retaining Assembly 250

The handle assembly 110 includes the hand piece 200 and the hand piece retaining assembly 250. As can be seen in FIG. 2B, the hand piece 200 includes the inner surface 201 and the outer gripping surface 204. The inner surface 201 of the hand piece 200 defines the axially extending central opening or throughbore 202. The outer gripping surface 204 of the hand piece 200 extends between an enlarged proximal end portion 206 and the distal end portion 210. A front face or wall 212 of the hand piece 200 includes an axially stepped collar 214 that is spaced rearwardly and serves an abutment surface for a spacer ring 290 of the hand piece retaining assembly 250. The inner surface 201 of the hand piece 200 defines the four ribs 216, as previously described, which permit the hand piece 200 to be oriented in any desired rotational position with respect to the gearbox housing 113. A slotted radial opening 220 in the front face 212 of the hand piece 200 receives an optional actuation lever (not shown). The optional actuation lever, if used, allows the operator to actuate the power operated rotary knife 100 by pivoting the lever toward the gripping surface 204 thereby engaging the drive mechanism 600 to rotatably drive the rotary knife blade 300.

The hand piece retaining assembly 250, best seen in FIGS. 2 and 2B, releasably secures the hand piece 200 to the gearbox housing 113. The hand piece retaining assembly 250 includes the elongated central core 252 which extends through the central opening 202 of the hand piece 200. The elongated core 252 threads into the threaded opening 149 (FIG. 48) at the proximal or rearward end 122 of the gearbox housing 113 to secure the hand piece 200 to the gearbox housing 113.

The hand piece retaining assembly 250 also includes the spacer ring 290 (FIG. 2B). When the hand piece 200 is being secured to the gearbox housing 113, the spacer ring 290 is positioned on the second cylindrical portion 147 (FIG. 48) of the outer surface 146 of the cylindrical rearward section 116 of the gearbox housing 113. The spacer ring 290 is positioned to abut the stepped shoulder 147*a* defined between the larger second portion 147 of the outer surface 146 of the cylindrical rearward portion 116 and the inverted U-shaped forward section 118 of the gearbox housing 113. When the hand piece 200 is secured to the gearbox housing 113 by the elongated central core 252, the spacer ring 290 is sandwiched between the hand piece 200 and the stepped shoulder 147*a* of the gearbox housing 113.

As can best be seen in FIGS. 2B and 8, the elongated central core 252 of the hand piece retaining assembly 250 includes an inner surface 254 and an outer surface 256 extending between a distal or forward reduced diameter end portion 264 and the enlarged proximal or rearward end portion 260. The inner surface 254 of the elongated central core 252 defines a throughbore 258 extending along the longitudinal axis LA of the handle assembly 110. The elongated central core 252 also includes a threaded portion 262 on the outer surface 256 at the forward reduced diameter end portion 264. The outer surface 256 of the elongated core 252 includes a radially outwardly stepped shoulder 265.

When the elongated central core 252 is inserted through the central throughbore 202 and the threaded portion 262 of the core 252 is threaded into the threaded opening 149 of the gearbox housing 113, the hand piece 200 is secured to the gearbox housing 113. Specifically, the hand piece 200 is prevented from moving in the forward axial direction FW along the handle assembly longitudinal axis LA by the spacer ring 290. The rear surface 292 of the spacer ring 290 acts as a stop for the axially stepped collar 214 of the distal end portion 210 of the hand piece 200 to prevent movement of the hand piece 200 in the forward direction FW. The hand piece 200 is prevented by moving in the rearward axial direction RW along the handle assembly longitudinal axis LA by the radially outwardly stepped shoulder 265 of the elongated central core 252.

As can be seen in FIG. 8, the stepped shoulder 265 of the elongated central core 252 bears against a corresponding inwardly stepped shoulder 218 of the hand piece 200 to prevent movement of the hand piece 200 in the rearward direction RW. As mentioned previously, the spacer ring 290 may be replaced by an optional operator thumb support. Additionally, a strap attachment bracket (not shown) may be disposed between the spacer ring 290 and the gearbox housing 113. The strap attachment bracket, if used, provides an attachment point for an optional operator wrist strap (not shown).

Drive Shaft Latching Assembly 275

The elongated central core 252 of the hand piece retaining assembly 250 includes the enlarged rearward or proximal end portion 260. The enlarged end portion 260 supports a drive shaft latching assembly 275 which engages a first coupling 710 (FIGS. 1 and 53) of an outer sheath 704 of the shaft drive assembly 700 to secure the outer sheath 704 of the shaft drive assembly 700 to the handle assembly 110 and thereby ensures operative engagement of a first male fitting 714 of the inner drive shaft 702 within the female socket 622 of the pinion gear input shaft 612. The inner surface 254 of the elongated central core 252 also includes an inwardly stepped shoulder 266 (FIG. 8) that provides a stop for a distal portion 711 of the first coupling 710 of the shaft drive assembly 700.

Figure 6:
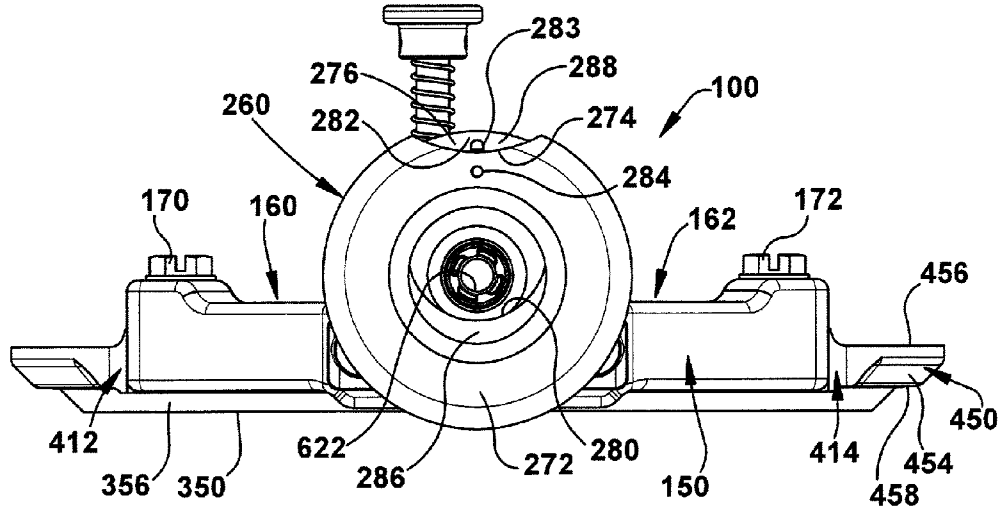
FIG. 6 is a schematic rear elevation view of the power operated rotary knife of FIG. 1.
Figure 7:
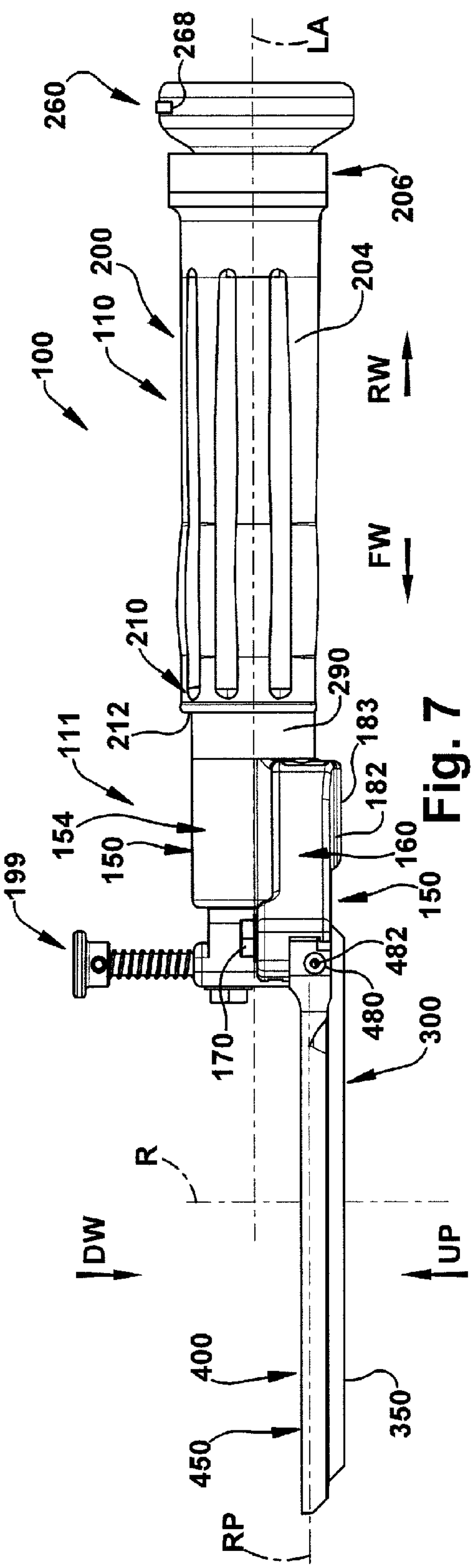
FIG. 7 is a schematic right side elevation view of the power operated rotary knife of FIG. 1, as viewed from a front or rotary knife blade end of the power operated knife.

As is best seen in FIG. 2B, the enlarged rearward end portion 260 of the elongated central core 252 of the hand piece retaining assembly 250 defines a generally U-shaped slot 268 that extends partially through the end portion 260 in a direction orthogonal to the longitudinal axis LA of the handle assembly 110. The rearward end portion 260 also defines a central opening 270 (FIG. 8) that is aligned with and part of the throughbore 258 of the elongated central core 252. The central opening 270 ends at the inwardly stepped shoulder 266. An end wall 272 of the rearward end portion 260 of the elongated central core 252 includes a peripheral cut-out 274. The peripheral cut-out 274 is best seen in FIGS. 2, 2B and 6.

Disposed in the U-shaped slot 268 of the elongated central core 252 is the drive shaft latching assembly 275 (best seen in schematic exploded view in FIG. 2B) that releasably latches or couples the shaft drive assembly 700 to the handle assembly 110. The drive shaft latching assembly 275 includes a flat latch 276 and a pair of biasing springs 278 inserted in the slot 268. The flat latch 276 of the drive shaft latching assembly 275 includes a central opening 280 that is substantially equal to the size of the opening 270 of the enlarged end portion 260 of the elongated central core 252.

The latch 276 is movable between two positions in a direction orthogonal to the longitudinal axis LA of the handle assembly 110: 1) a first, locking position wherein the opening 280 of the latch 276 is offset from the opening 270 defined by the enlarged end portion 260 of the elongated central core 252; and 2) a second release position wherein the opening 280 of the latch 276 is aligned with the opening 270 defined by the enlarged end portion 260 of the elongated central core 252. The biasing springs 278, which are trapped between peripheral recesses 281 in a bottom portion 282 of the latch 276 and the enlarged end portion 260 of the elongated central core 252, bias the latch 276 to the first, locking position.

When the latch 276 is in the first, locking position a lower portion 286 of the latch 276 adjacent the latch opening 280 extends into the opening 270 of the enlarged end portion 260 of the core 252. This can be seen schematically, for example in FIG. 6. Movement of the latch 276 with respect to the enlarged end portion 260 is limited by the engagement of a holding pin 284 extending through a radially extending channel 283 formed in the latch 276. The holding pin 284 bridges the U-shaped slot 268 of the enlarged end portion 260 and extends through the channel 283. The channel 283 constrains and limits an extent of the radial movement of the latch 276 with respect to the enlarged end portion 260 of the elongated central core 252.

Drive Mechanism 600

Figure 53:
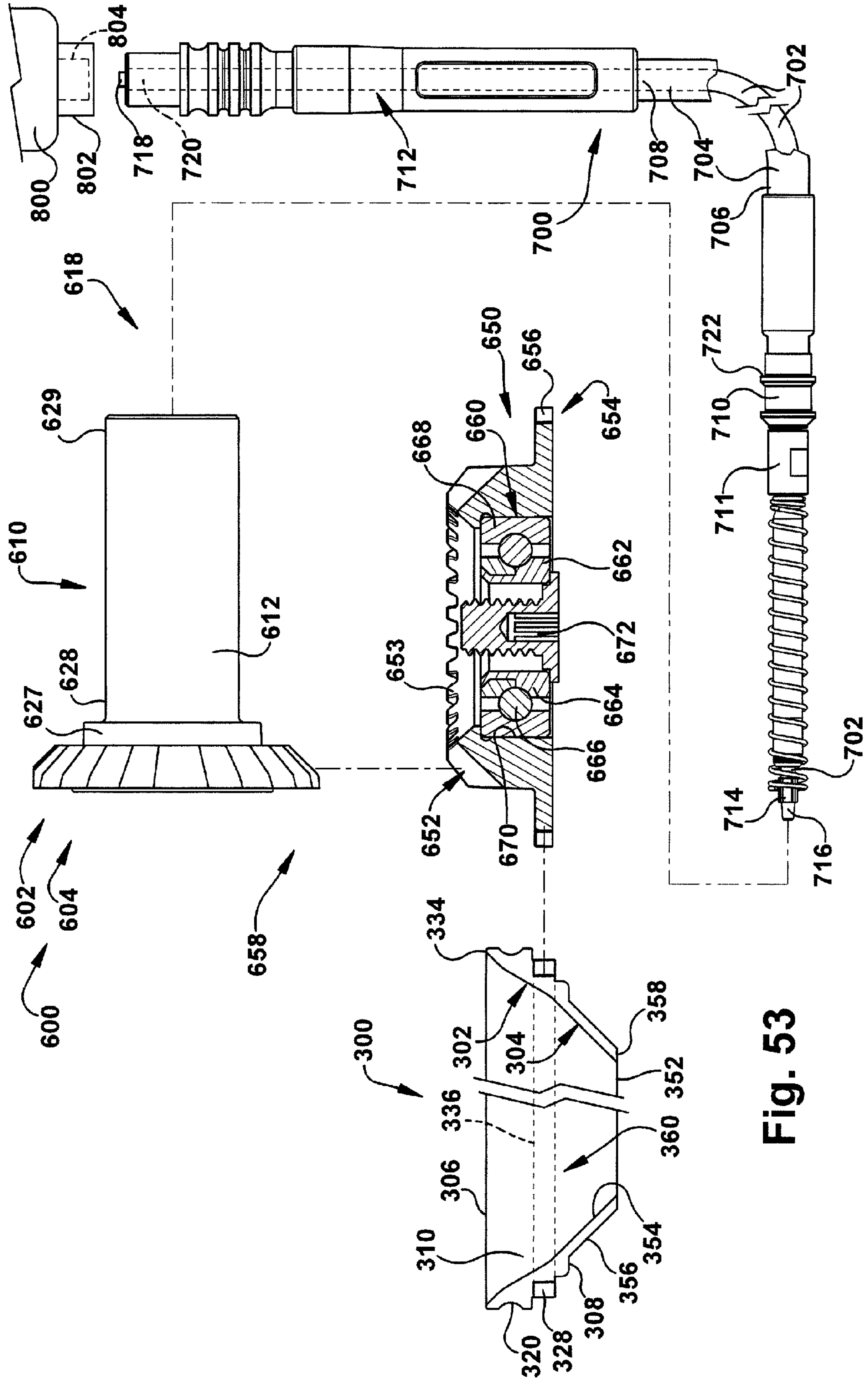
FIG. 53 is a schematic exploded side elevation view of the drive mechanism of the power operated rotary knife of FIG. 1 extending from a drive motor external to the power operated rotary knife to the rotary knife blade of the power operated rotary knife.

As can best be seen in the schematic depiction of FIG. 53, the knife blade 300 is rotatably driven in the blade housing 400 by the drive mechanism 600. Within the power operated rotary knife 100, the drive mechanism 600 includes the gearbox 602 supported by the gearbox housing 113. The gearbox 602, in turn, is driven by the flexible shaft drive assembly 700 and the drive motor 800 that are operatively coupled to the gearbox 602. The flexible shaft drive assembly 700 is coupled to the handle assembly 110 by the drive shaft latching assembly 275. A portion of the flexible shaft drive assembly 700 extends through the elongated central core 252 of the hand piece retaining assembly 250 and engages the pinion gear 610 to rotate the pinion gear about its axis of rotation PGR and thereby rotate the rotary knife blade 300 about its axis of rotation R.

As can best be seen in FIGS. 1 and 53, the drive mechanism 600 includes the flexible shaft drive assembly 700 and the drive motor 800. The shaft drive assembly 700 includes an inner drive shaft 702 and an outer sheath 704, the inner drive shaft 702 being rotatable with respect to the outer sheath 704.

Affixed to one end 706 of the outer sheath 704 is the first coupling 710 that is adapted to be releasably secured to the enlarged rearward end portion 260 of the elongated central core 252 of the hand piece retaining assembly 250. Affixed to an opposite end 708 of the outer sheath 704 is a second coupling 712 that is adapted to be releasably secured to a mating coupling 802 of the drive motor 800.

When the first coupling 710 of the shaft drive assembly 700 is affixed to the hand piece 200, the first male drive fitting 714 disposed at one end 716 of the inner drive shaft 702 engages the female socket or fitting 622 of the pinion gear input shaft 612 to rotate the pinion gear 610 about the pinion gear axis of rotation PGR. The rotation of the pinion gear 610 rotates the drive gear 650 which, in turn, rotates the rotary knife blade 300 about it axis of rotation R. When the second coupling 712 of the shaft drive assembly 700 is received by and affixed to the drive motor coupling 802, a second drive fitting 718 disposed at an opposite end 720 of the inner drive shaft 702 engages a mating socket or fitting 804 (shown in dashed line in FIG. 53) of the drive motor 800. Engagement of the second drive fitting 718 of the inner drive shaft 702 and the drive motor fitting 804 provides for rotation of the inner drive shaft 702 by the drive motor 800.

In the first, locking position of the latch 276 of the drive shaft latching assembly 275, the lower portion 286 of the latch 276 extending into the opening 270 of the enlarged end portion 260 of the elongated central core 252 engages the first coupling 710 of the shaft drive assembly 700 to secure the shaft drive assembly 700 to the handle assembly 110 and insure the mating engagement of the first male drive coupling 714 of the drive shaft 702 to the female socket or fitting 622 of the pinion gear input shaft 612. In the second, release position, the latch 276 is moved radially such that the opening 280 of the latch 276 is aligned with and coextensive with the opening 270 of the enlarged end portion 260 of the elongated central core 252 thus allowing for removal of the first coupling 710 of the shaft drive assembly 700 from the hand piece 200.

The drive motor 800 provides the motive power for rotating the knife blade 300 with respect the blade housing 400 about the axis of rotation R via a drive transmission that includes the inner drive shaft 702 of the drive shaft assembly 700 and the gear train 604 of the gear box 602. The drive motor 800 may be an electric motor or a pneumatic motor.

Alternately, the shaft drive assembly 700 may be eliminated and the gear train 604 of the gearbox 602 may be directly driven by an air/pneumatic motor or an electric motor disposed in the throughbore 258 of the elongated central core 252 of the hand piece retaining assembly 250 or in the throughbore 202 of the hand piece 200, if a different hand piece retaining structure is used. A suitable air/pneumatic motor sized to fit within a hand piece of a power operated rotary knife is disclosed in U.S. non-provisional patent application Ser. No. 13/073,207, filed Mar. 28, 2011, entitled "Power Operated Rotary Knife With Disposable Blade Support Assembly", inventors Jeffrey Alan Whited, David Curtis Ross, Dennis R. Seguin, Jr., and Geoffrey D. Rapp. Non-provisional patent application Ser. No. 13/073,207 is incorporated herein in its entirety by reference.

Securing Shaft Drive Assembly 700 to Handle Assembly 110

To secure the shaft drive assembly 700 to the hand piece 200, the operator axially aligns the first coupling 710 of the drive shaft assembly 700 along the longitudinal axis LA of the handle assembly 110 adjacent the opening 270 defined by the enlarged end portion 260 of the elongated central core 252 of the hand piece retaining assembly 250. The operator positions his or her thumb on the portion 288 of the latch 276 accessible through the peripheral cut-out 274 of the enlarged end portion 260 and slides the latch 276 radially inwardly to the second, release position. When the latch 276 is in the release position, the operator moves a forward portion 711 (FIG. 53) of the first coupling 710 into the throughbore 258 of the elongated central core 252.

After the forward portion 711 of the first coupling 710 is a received in the elongated central core 252 of the hand piece retaining assembly 250, the operator then releases the latch 276 and continues to move the first coupling 710 further into the throughbore 258 of the central core 252 until the latch 276 (which is biased radially outwardly by the biasing springs 278) snap fits into a radial securement groove 722 formed in an outer surface of the first coupling 710 of the shaft drive assembly 700. When the latch 276 extends into the securement groove 722 of the first coupling 710, the first coupling 710 is secured to the handle assembly elongated central core 252 and the first male drive fitting 714 of the inner drive shaft 702 is in operative engagement with the female socket or fitting 622 of the pinion gear input shaft 612.

To release the shaft drive assembly 700 from the handle assembly elongated central core 252, the operator positions his or her thumb on the portion 288 of the latch 276 accessible through the peripheral cut-out 274 of the enlarged end portion 260 of the elongated central core 252 and slides the latch 276 radially inwardly to the second, release position. This action disengages the latch 276 from the securement groove 722 of the first coupling 710 of the drive shaft assembly 700. At the same time, the operator moves the first coupling 710 in the axial rearward direction RW out of the throughbore 258 of the elongated central core 252 and away from the handle assembly 110. This will result in the first male drive fitting 714 of the drive shaft 702 being disengaged from the female fitting 622 of the pinion gear input shaft 612.

Rotary Knife Blade Styles

As previously mentioned, depending on the cutting or trimming task to be performed, different sizes and styles of rotary knife blades may be utilized in the power operated rotary knife 100 of the present disclosure. Also, as previously mentioned, rotary knife blades in various diameters are typically offered ranging in size from around 1.2 inches in diameter to over 7 inches in diameter. Selection of a blade diameter will depend on the task or tasks being performed. Additionally, different styles or configurations of rotary knife blades are also offered. For example, the style of the rotary knife blade 300 schematically depicted in FIGS. 1-53 and discussed above is sometimes referred to as a "flat blade" style rotary knife blade. The term "flat" refers to the profile of the blade section 304 and, in particular, to a cutting angle CA (FIG. 24) of the blade section 304 with respect to a plane CEP that is congruent with a cutting edge 350 of the blade 300. The angle CA of the blade section 304 with respect to the cutting edge plane CEP is relatively large. As can be seen in FIG. 24, the cutting angle CA, that is, the angle between the blade section 304 and the plane CEP, as measured with respect to the blade section inner wall 354 is an obtuse angle, greater than 90°. This large, obtuse cutting angle CA is referred to as a "shallow" blade cutting profile. As can be seen in FIG. 55, the inner wall 360 is generally smooth, frustoconical shape. As the product P is being trimmed or cut by the flat blade 300, the cut material layer CL1 moves easily along the inner wall 360 of the flat blade 300. The flat blade 300 is particularly useful for trimming thicker layers of material from a product, e.g., trimming a thicker layer of fat or meat tissue from a piece of meat, as the power operated rotary knife 100 is moved over the product in a sweeping motion. This is true because even thicker layers of cut or trimmed material will flow with minimal drag or friction over the inner wall 360 of the flat blade 300.

Figure 56:
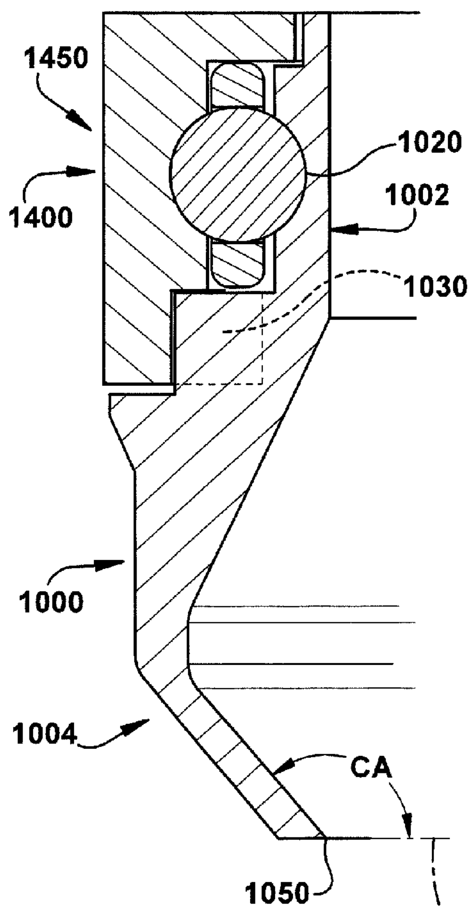
FIG. 56 is a schematic section view of a "hook blade" style rotary knife blade and associated blade housing adapted to be used in the power operated rotary knife of FIG. 1.

Another blade profile is shown in the "hook blade" style rotary knife blade which is schematically depicted at 1000 in FIG. 56. Here the cutting angle CA with respect to the plane CEP defined by the cutting edge 1050, may be about the same or slightly larger or smaller than the cutting angle CA of the rotary knife blade 300 (see FIG. 24). However, the inner profile of the hook blade 1000 is less planar and more V-shaped that the inner profile of the flat blade 300. That is, as the inner surface of the blade curves radially inwardly as one moves from the blade section 1004 to the body section 1002. This inward curvature of the inner surface of the hook blade 1000 results in a less smooth and more curved path of travel for cut or trimmed material, as compared with the flat blade 300. Thus, the hook blade 1000 is particularly useful for trimming relatively thin layers of material from a product, for example, trimming a thin layer of fat or meat tissue from a relatively planar, large piece of meat, as the power operated rotary knife 100 is moved over the product in a sweeping motion. For trimming thicker layers of material from a product, the hook blade 1000 would not be as efficient because the curved path of travel of the cut or trimmed material layer would result in the power operated rotary knife 100 experiencing more drag and resistance during cutting or trimming. Thus, more effort would be required by the operator to move and manipulate the power operated rotary knife 100 to make the desired cuts or trims.

As can also be seen, the shape of the rotary knife blade body 1002 is also different than the body 302 of the flat rotary knife blade 300. Accordingly, the shape of a blade support section 1450 of a blade housing 1400 is also modified accordingly from the shape of the blade support section 450 of the blade housing 400 when used in the power operated rotary knife 100. That is, the shape of a particular rotary knife blade selected to be used in the power operated rotary knife 100 will sometimes require modification of the associated blade housing for the power operated rotary knife 100. However, the blade-blade housing bearing structure 500 and gear train 604, as discussed above, are utilized to support and drive the blade 1000. Additionally, as discussed above, the driven gear 1030 of the knife blade 1000 is spaced axially below the bearing race 1020.

Figure 57:
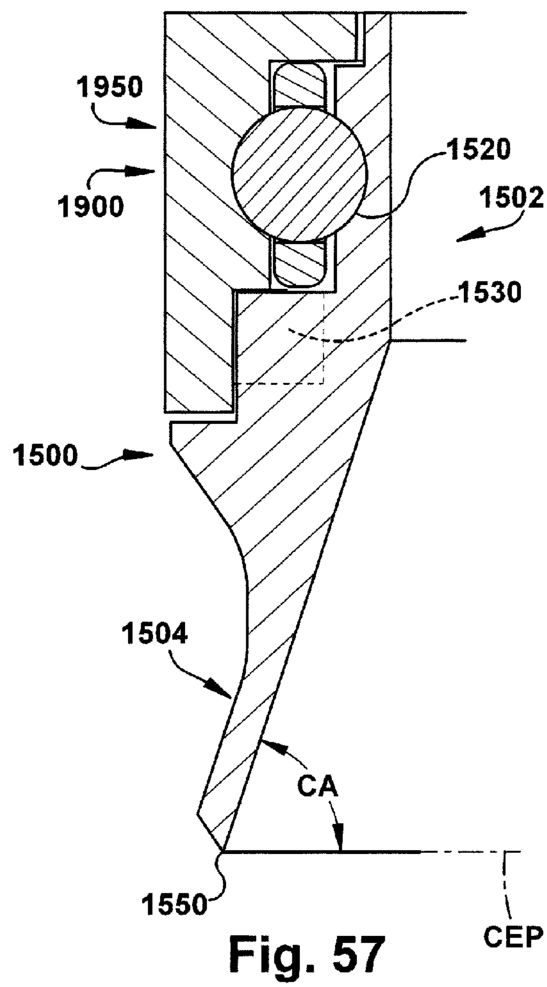
FIG. 57 is a schematic section view of a "straight blade" style rotary knife blade and associated blade housing adapted to be used in the power operated rotary knife of FIG. 1.

A more aggressive blade profile is shown in the "straight blade" style rotary knife blade which is schematically depicted at 1500 in FIG. 57. The cutting angle CA is smaller than the cutting angles of the rotary knife blades 300 and 1000. Indeed, the cutting angle CA of the knife blade 1500 is an acute angle of less than 90° with respect to the plane CEP defined by the cutting edge 1550. The cutting angle CA of the straight blade 1500 is very "steep" and more aggressive than the flat blade 300 or the hook blade 1000. A straight blade is particularly useful when make deep or plunge cuts into a product, i.e., making a deep cut into a meat product for the purpose of removing connective tissue/gristle adjacent a bone.

As can also be seen, the shape of the knife blade body 1502 is also different than the body 302 of the flat rotary knife blade 300. Accordingly, the shape of a blade support section 1950 of a blade housing 1900 is also modified accordingly from the shape of the blade support section 450 of the blade housing 400 when used in the power operated rotary knife 100. However, the blade-blade housing bearing structure 500 and gear train 604, as discussed above, are utilized to support and drive the blade 1500. Additionally, as discussed above, the driven gear 1530 of the knife blade 1500 is spaced axially below the bearing race 1520.

Other rotary knife blades styles, configurations, and sizes exist and may also be used with the power operated rotary knife 100. The blade-blade housing structure 500 of the present disclosure and the other features, characteristics and attributes, as described above, of the power operated rotary knife 100 may be used with a variety of rotary knife blades styles, configurations, and sizes and corresponding blade housings. The examples recited above are typical blade styles (flat, hook, and straight), but numerous other blade styles and combination of blade styles may be utilized, with an appropriate blade housing, in the power operated rotary knife 100 of the present disclosure, as would be understood by one of skill in the art. It is the intent of the present application to cover all such rotary knife blade styles and sizes, together with the corresponding blade housings, that may be used in the power operated rotary knife 100.

Second Exemplary Embodiment—Two-Piece Rotary Knife Blade 2300

In first exemplary embodiment of the power operated rotary knife 100, the annular knife blade 300 was integral, that is, the body 302 and the blade section 304 of the knife blade 300 comprised a single unitary structure. When in use, the rotary knife blade 300 typically has to be sharpened after 5-10 hours of use. The length of time between sharpenings will depend on a number of variables including the application, that is, the nature of the product being cut or trimmed, the skill of the operator in using the rotary knife, for example, a skilled operator will avoid gouging the blade into bones of the carcass when trimming or cutting meat or fat from a carcass, and the care and maintenance provided to the power operated rotary knife, including the rotary knife blade. Each sharpening of the knife blade 300 removes material from the blade section 304 thereby decreasing an extent of the blade.

While the number of times that the knife blade 300 may be sharpened will vary depending upon the cutting/trimming application, the skill of the operator, the maintenance/cleaning regimen of the power operated rotary knife, the skill of the person performing the sharpening operation, etc., in most cases the blade section 304 will reach the end of its useful life while the body is still suitable for use. Generally, repeated sharpenings of the blade section 304 will decrease an extent of the blade section to a point where the knife blade 300 is no longer suitable to be used in the power operated rotary knife 100. For example, if an axial extent of the blade section 304 is reduced by repeated sharpenings to a point the blade edge 350 is axially even with or axially above the bottom surface 458 of the blade support section 450 of the blade housing 400, the rotary knife blade 300 will no longer be suitable for use. When repeated sharpening of the knife blade 300 have reduced the blade section 304 to a point of being worn out, the blade body 302, including the driven gear 328 defined by the body 302, will typically still be suitable for use and, in fact, the blade body 302 have many hours of useful life remaining. Nevertheless, because the knife blade 300 is a unitary structure, the entire blade 300 must be discarded upon wearing out of the blade section 304 even though the body 302 may have many hours of useful life remaining.

In an alternate exemplary embodiment of the present disclosure and as shown generally in FIGS. 59-73, an annular, rotary knife blade 2300 comprises a two-part or two-piece structure including a carrier portion 2302 and a blade portion 2350. In one exemplary embodiment, both the carrier portion 2302 and the blade portion 2350 are one-piece, continuous annular pieces. The two-piece knife blade 2300 is schematically shown as a straight style blade, but the concepts discussed herein regarding a two-piece blade are equally applicable to flat and hook style rotary knife blades.

The knife blade 2300 extends axially between an upper end 2300*a*, defined by an upper wall 2365 of the blade portion 2350, and a lower end 2300*b*, defined by a lower or distal end 2366 of the blade portion 2350. The lower end 2366 of the blade portion 2350 defines a cutting edge 2368 of the knife 2300. The knife blade 2300 is adapted for use in a power operated rotary knife, such as the power operated rotary knife 100, although it should be appreciated that structural changes to other, mating components of the power operated rotary knife 100 (e.g., the blade housing 400) will be required to accommodate the specific configuration of the two-part knife blade 2300. As used in a power operated rotary knife 100, the two-part rotary knife blade 2300 will rotate about a central axis or an axis of rotation R' (FIG. 59) of the knife blade 2300 (similar to the axis of rotation R of the rotary knife blade 300). The two-part knife blade 2300 includes a bearing race 2320 that defines a rotational plane RP' (FIG. 63) of the knife blade 2300 (similar to the rotational plane RP of the rotary knife blade 300).

The blade portion 2350 is releasably secured or affixed to the carrier portion 2302. The carrier portion 2302, which includes a driven gear which may be formed, for example, in a gear hobbing machining operation, is more expensive to fabricate than the blade portion 2350. In one exemplary embodiment, the carrier portion 2302 is fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes. In one exemplary embodiment, the blade portion 2350 is fabricated of an alloy steel or stainless steel, or other material or materials known to have comparable properties and may be advantageously formed in a steel stamping operation or other suitable process or combination of processes.

The carrier portion 2302 will have a longer useful life than the less expensive blade portion 2350. Thus, when the blade portion 2350 is worn out and the carrier portion 2302 still has useful life remaining, the worn out blade portion 2350 is unlocked and removed from the carrier portion 2302 and a new blade portion is installed or affixed to the carrier portion 2302. In this way, multiple, relatively inexpensive, blade sections 2350 may be utilized for a given carrier portion 2302 thereby providing a lower overall total cost for rotary knife blades over the expected life of the carrier portion 2302, as compared to using and discarding single piece rotary knife blades.

Figure 63:
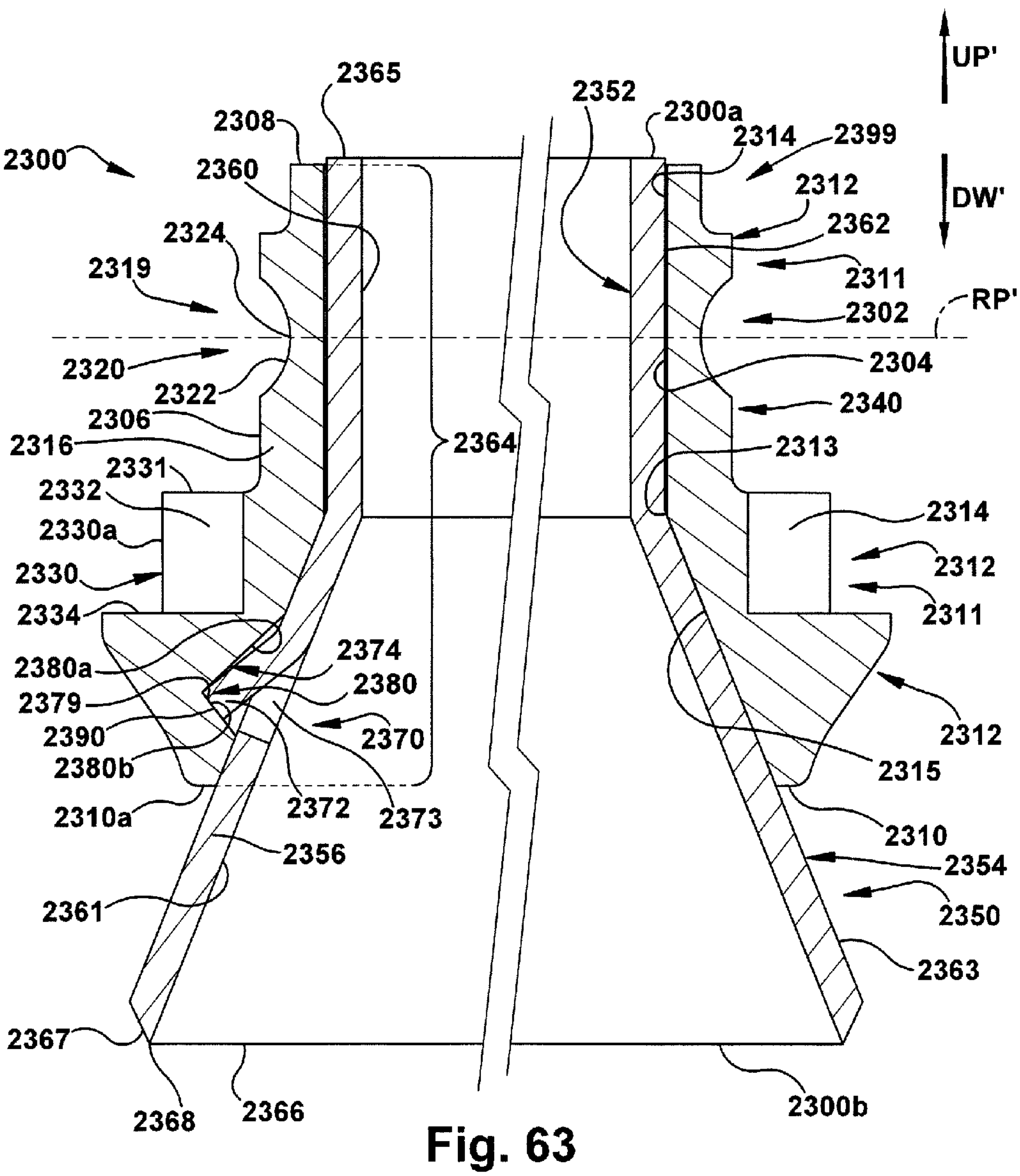
FIG. 63 is a schematic section view of the rotary knife blade of FIG. 59 showing a locking engagement of a projection of the blade portion and a socket of the carrier portion.

As can best be seen in FIGS. 59-63, which show the axial alignment of the blade portion 2350 and the carrier portion 2302, the carrier portion 2302 carries or supports the blade portion 2350 in a nested relationship. As can be seen in FIG. 63, a central portion 2364 of the blade portion 2350 is disposed within the axially shorter carrier portion 2302. The blade portion 2350 is releasably secured to the carrier portion 2302 via a twist-and-lock attachment structure 2370 (FIGS. 62-65) that provides a secure attachment between the blade portion 2350 and the carrier portion 2302. In addition to the lower overall total blade cost discussed above, the nesting relationship of the central portion 2364 of the blade portion 2350 within the carrier portion 2302 and the attachment structure 2370 provides additional advantages. The attachment structure 2370 configuration is such that rotation of the rotary blade 2300 in the blade housing 400 tends to increase a tightness of the attachment between the blade portion 2350 and the carrier portion 2302. Viewed from the central axis of rotation R from above the knife, the drive mechanism 700 of the power operated rotary knife 100 is configured to rotate the knife blade 2300 in a counterclockwise rotational direction (shown as CCW in FIGS. 59 and 62). The attachment structure 2370 is configured such that rotation of the rotary knife blade 2300 in the counterclockwise rotational direction CCW direction tends to tighten the attachment structure 2370 thereby tightening and further securing the attachment between blade portion 2350 and the carrier portion 2302.

Figure 66:
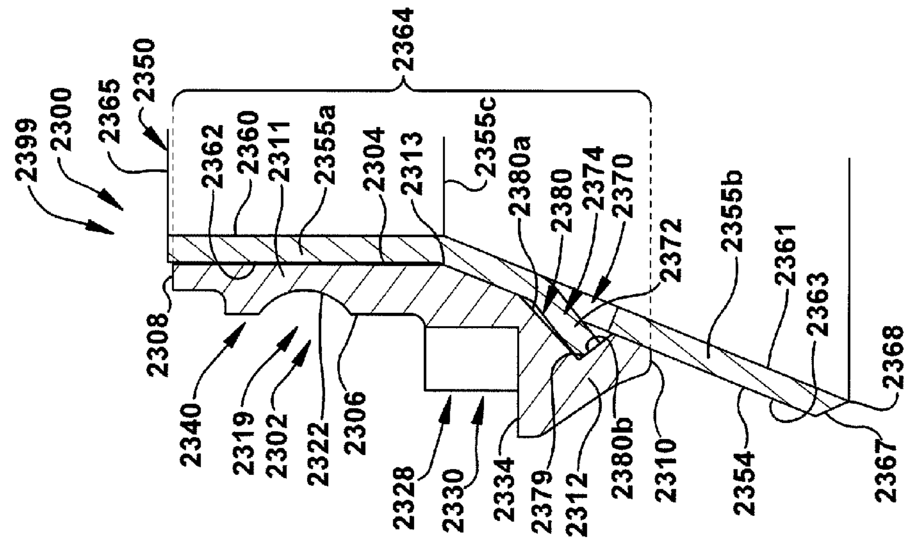
FIG. 66 is a schematic section view of the rotary knife blade of FIG. 59 wherein the projection of the blade portion into the socket of the carrier portion has moved from the second, tapering region of the socket of the carrier portion (as shown in the sectional view of FIG. 65) to a third, narrow locking region of the socket, the third, narrower locking region defining a locking region to lock a projection of the blade portion so that the blade portion and the carrier portion are in the assembled condition or locked position.
Figure 67:
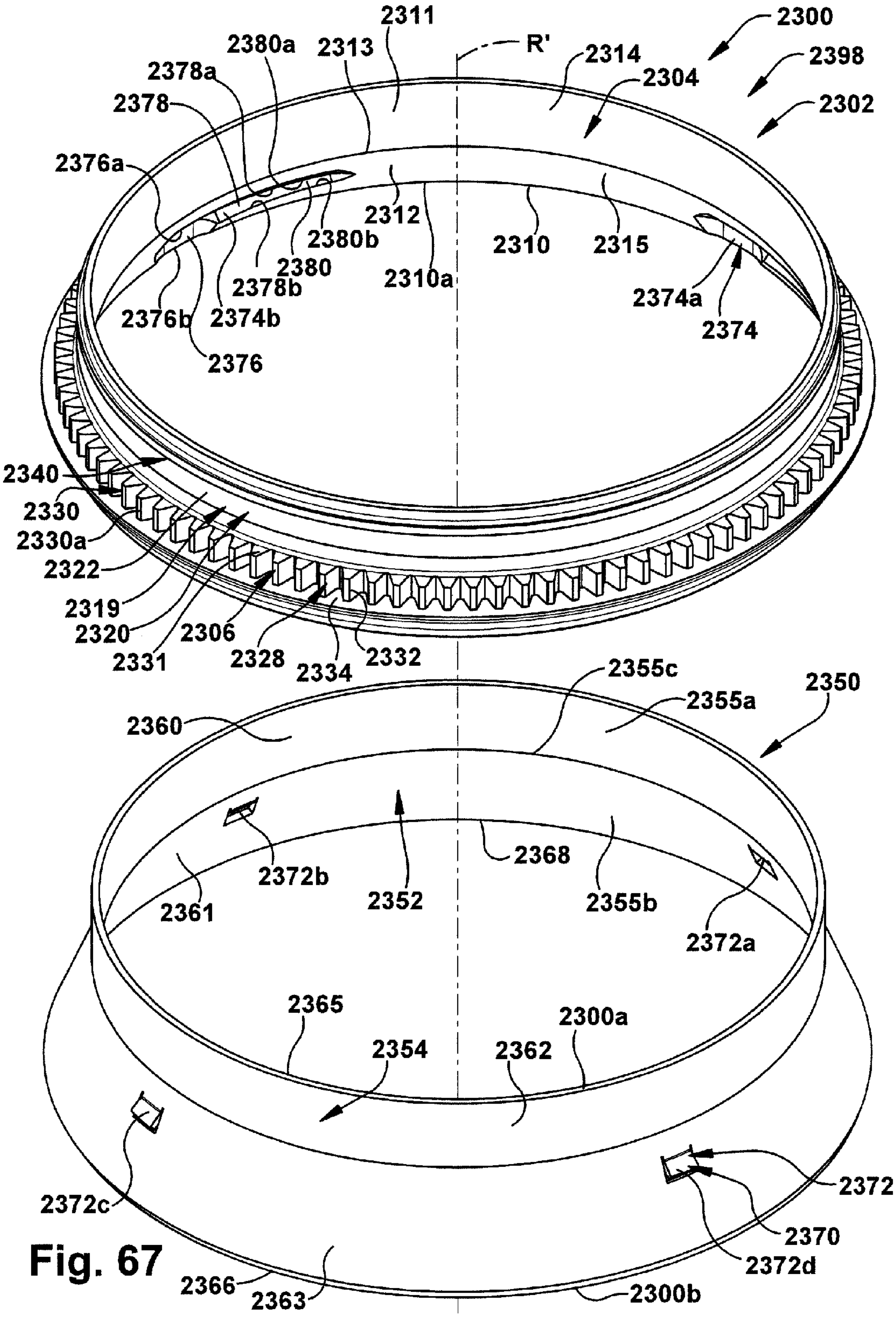
FIG. 67 is a schematic top perspective view of the rotary knife blade of FIG. 59 in an unassembled condition with the blade portion aligned below the carrier portion to schematically illustrate how the blade portion would be received into or would nest with respect to the carrier portion when assembled.
Figure 68:
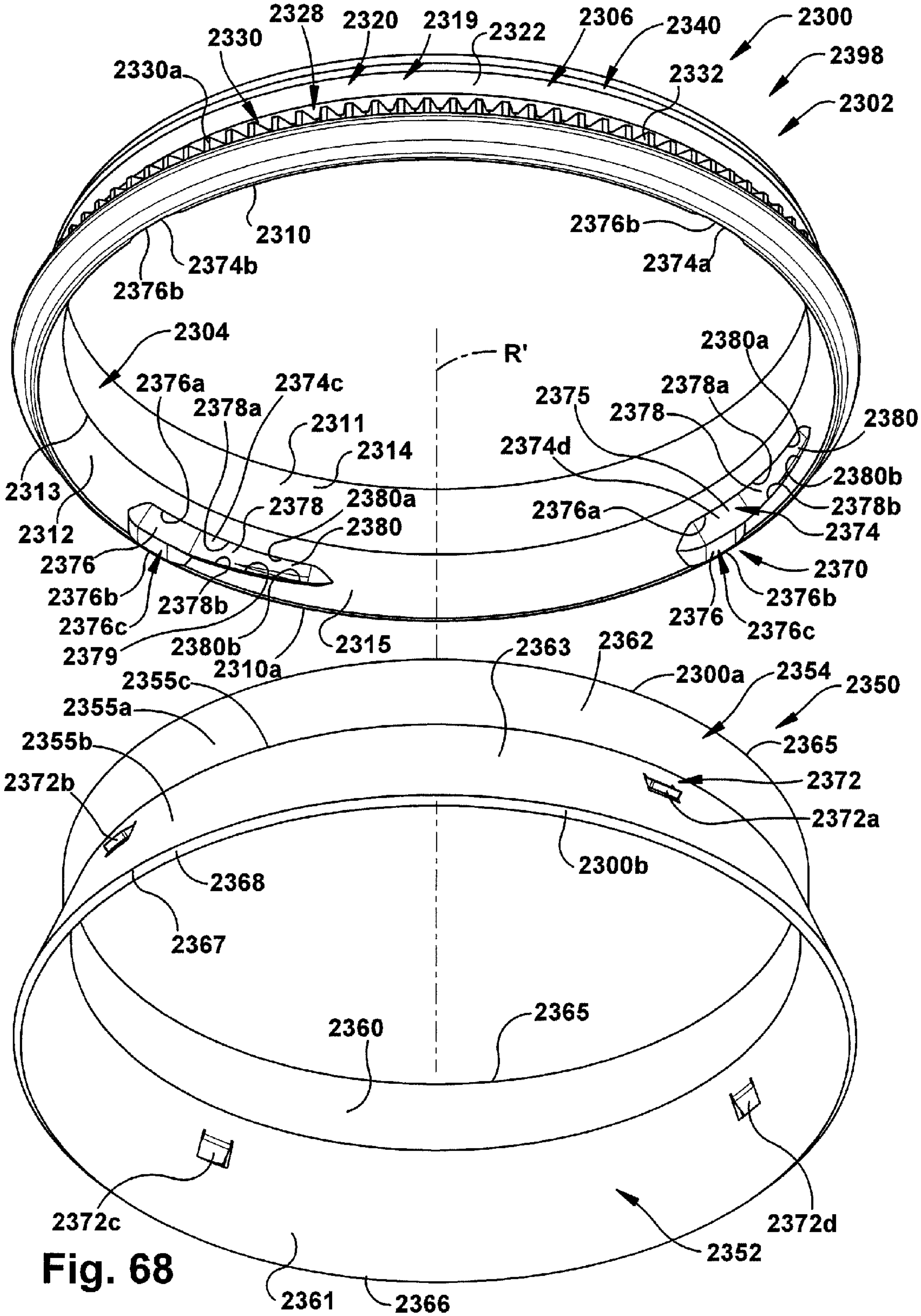
FIG. 68 is a schematic bottom perspective view of the rotary knife blade of FIG. 59 in an unassembled condition with the blade portion aligned below the carrier portion to schematically illustrate how the blade portion would be received into or would nest with respect to the carrier portion when assembled.
Figure 69:
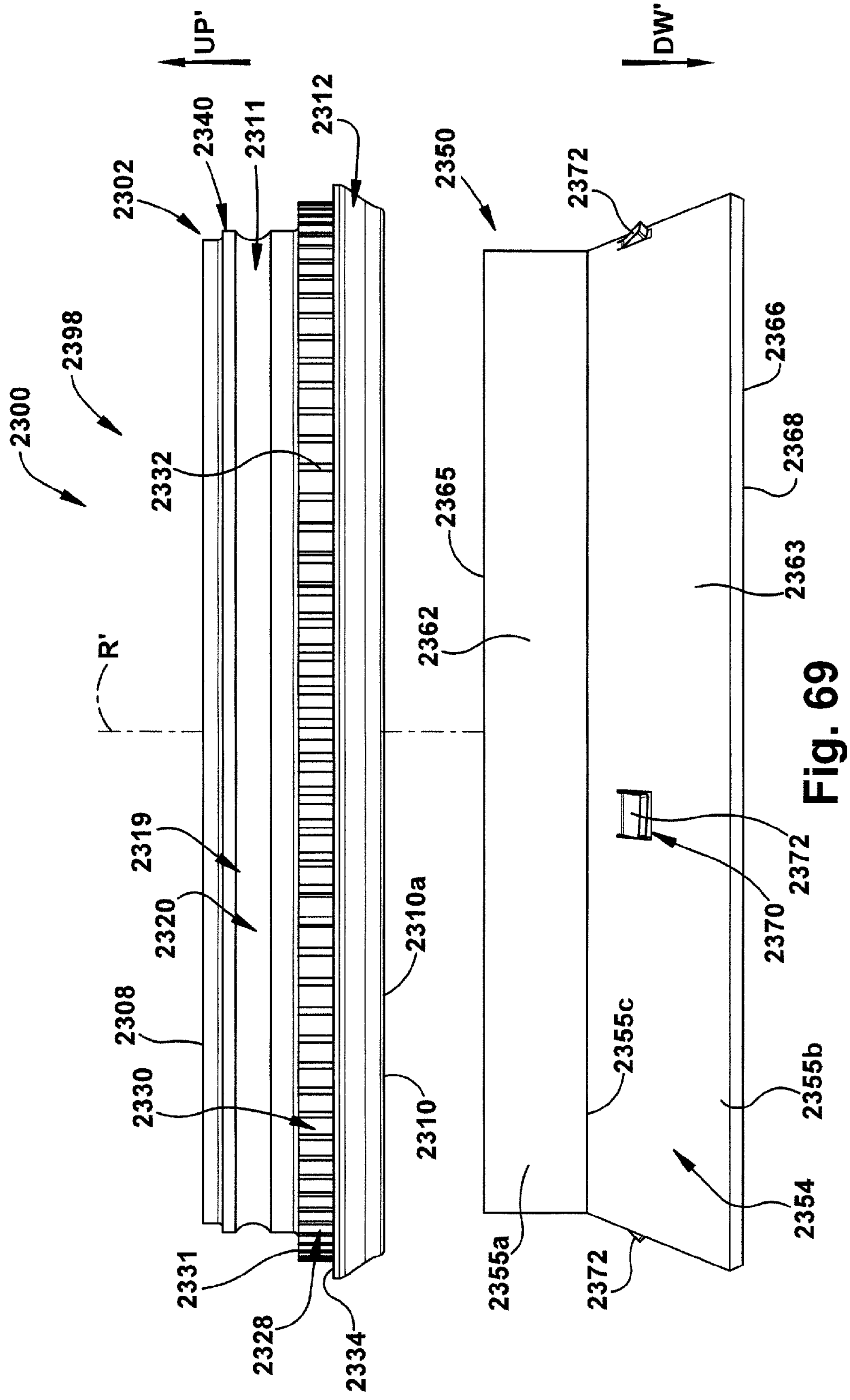
FIG. 69 is a schematic front elevation view of the rotary knife blade of FIG. 59 in an unassembled condition with the blade portion aligned below the carrier portion to schematically illustrate how the blade portion would be received into or would nest with respect to the carrier portion when assembled.

Moreover, because of the nested relationship between the blade portion 2350 and the carrier portion 2302, as is best seen in FIG. 63, when the knife blade 2300 is in an assembled state 2399, an area of contact between the facing surfaces of the blade portion 2350 and the carrier portion 2302 is large. The assembled state 2399 of the knife blade 2300 being schematically depicted FIGS. 59-63 and 66, while an unassembled state 2398 of the knife blade 2300 is schematically depicted in FIGS. 67-69. When in the assembled state 2399, the nested configuration and large surface area of contact between the blade portion 2350 and the carrier portion 2302 provides strength, stability and durability to the assembled knife blade 2300. In the overlap region 2364 of the blade portion 2350 and the carrier portion 2302, the respective walls of the blade and carrier portions 2350, 2302 are radially aligned thereby providing a double wall for strength and rigidity of the knife blade 2300.

Carrier Portion 2302

Figure 61:
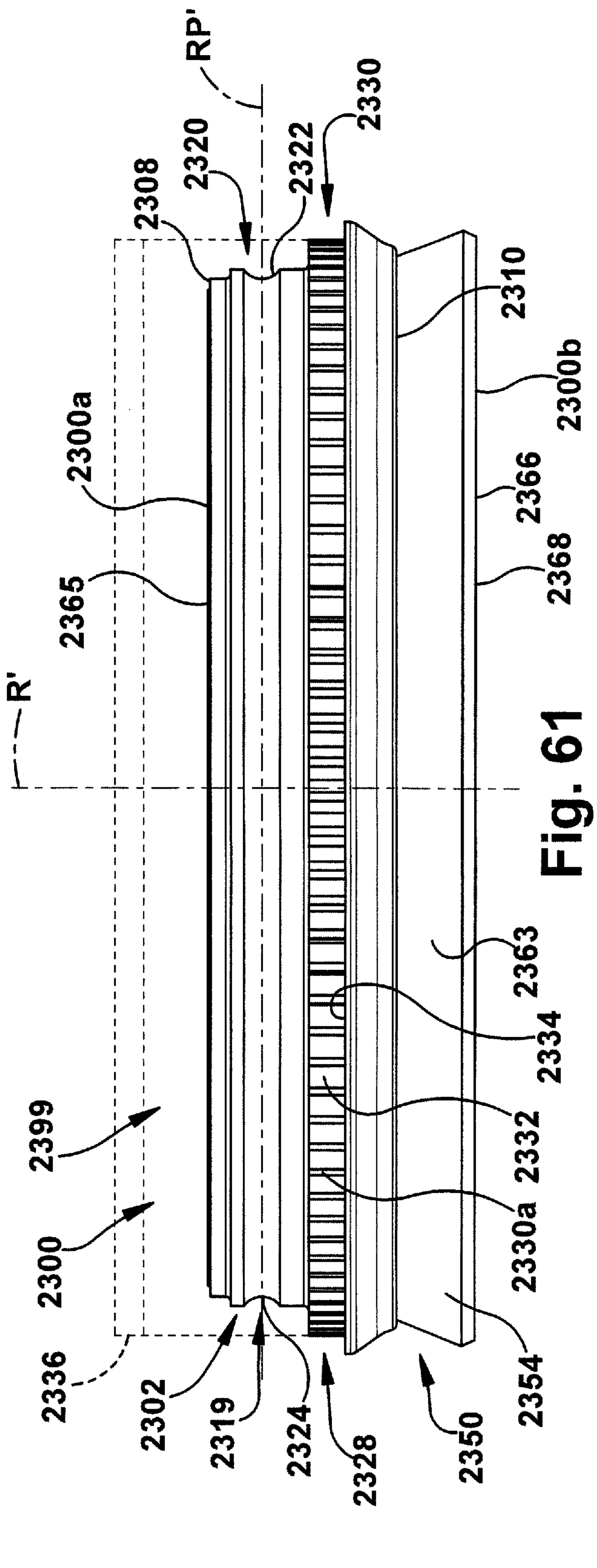
FIG. 61 is a schematic front elevation view of the rotary knife blade of FIG. 59.
Figure 62:
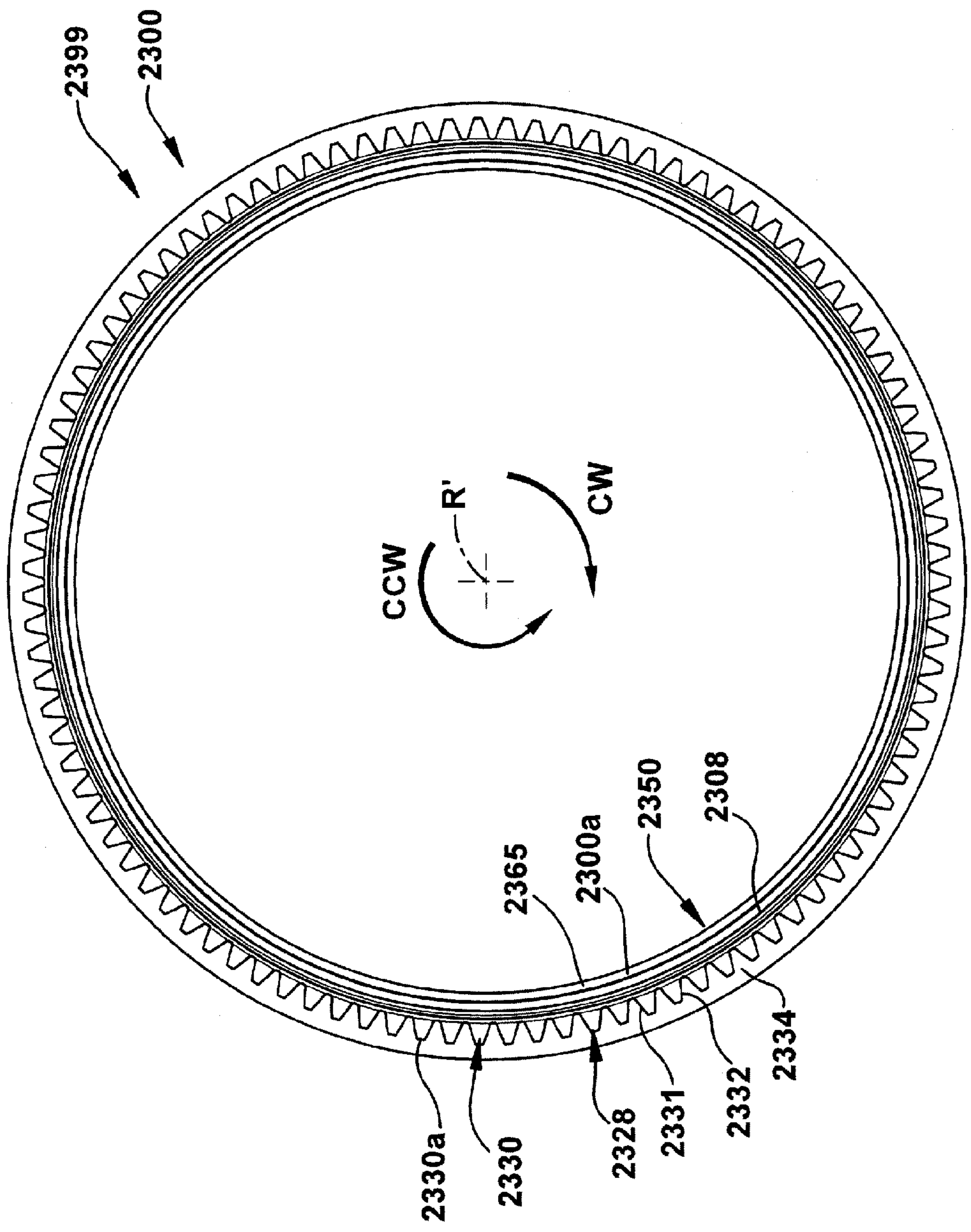
FIG. 62 is a schematic top plan view of the rotary knife blade of FIG. 59.

As is best seen in FIGS. 61, 63 and 69, the carrier portion 2302 includes an inner wall 2304 and a radially spaced apart outer wall 2306, a first end or top surface or upper wall 2308 and an axially spaced apart bottom surface or second end or lower wall 2310. The inner and outer walls 2304, 2306 are radially spaced apart by a central wall 2316 (FIG. 63). The carrier portion 2302, when viewed axially or vertically, includes an upper region 2311 and a lower region 2312 separated by a knee or transition region 2313 between the upper region 2311 and the lower region 2312. In the upper region 2311 of the carrier portion 2302, a generally cylindrical surface 2314 is defined by the inner wall 2304, while in the lower region 2312 of the carrier portion 2302, a generally frustoconical surface 2315 is defined by the inner wall 2304. The cylindrical surface 2314 is substantially centered about and coaxial with the axis of rotation R' of the knife blade 2300. The frustoconical surface 2315 converges in an upward direction UP' (FIG. 69), that is, the frustoconical surface 2315 converges proceeding in a direction toward the upper surface 2308 of the carrier portion 2302 and is generally coaxial with the axis of rotation R' of the knife blade 2300.

A portion of the outer wall 2306 that is axially spaced from the top surface 2308 of the carrier portion 2302 and also axially spaced from the upper end 2300*a* of the rotary knife blade 2300 defines a bearing surface 2319 for the blade 2300. In one exemplary embodiment, the bearing surface 2319 defines the bearing race 2320 that projects radially inwardly into a generally cylindrical portion 2340 of the outer wall 2306 of the upper region 2311 of the carrier portion 2302. The bearing race 2320, in one exemplary embodiment, includes an arcuate bearing surface 2322 in a central portion 2324 of the bearing race 2320. The bearing race 2320 of the carrier portion 2302 is configured and functions similarly to the bearing race 320 of the rotary knife blade 300, as previously described. That is, the bearing race 2320 of the knife blade 2300 is part of the rotary knife bearing assembly 552 of the power operated rotary knife 100.

Axially spaced in a downward direction DW' (FIG. 69) from the bearing surface 2319 is an outwardly stepped portion 2331 of the outer wall 2306 of the carrier portion 2302. The stepped portion 2331 of the outer wall 2306 defines a driven gear 2328 of the knife blade 2300. In one exemplary embodiment, the driven gear 2328 defines a spur gear comprising a set or a plurality of radially extending, involute gear teeth 2330, like the plurality of gear teeth 330 of the knife blade 300. A radial outer surface 2330*a* of the plurality of gear teeth 2330 define a cylindrical outer periphery 2336 this is shown schematically in dashed line in FIG. 61. In FIG. 61, for clarity, the cylindrical outer periphery 2336 is shown positioned above its true location which would be along the radial outer surface 2330*a* of the plurality of gear teeth 2330. A generally horizontally or radially extending step or shoulder 2334 extends from the lower terminus of the driven gear 2328. The shoulder 2334 inhibits the ingress of pieces of bone, fat, gristle and other debris into the driven gear 2328 and the bearing race 2320 during cutting and trimming operations with the power operated rotary knife 100 using the rotary knife blade 2300. As can be seen, the driven gear 2328 is axially spaced from the bottom surface 2310 of the carrier portion 2302.

Figure 70:
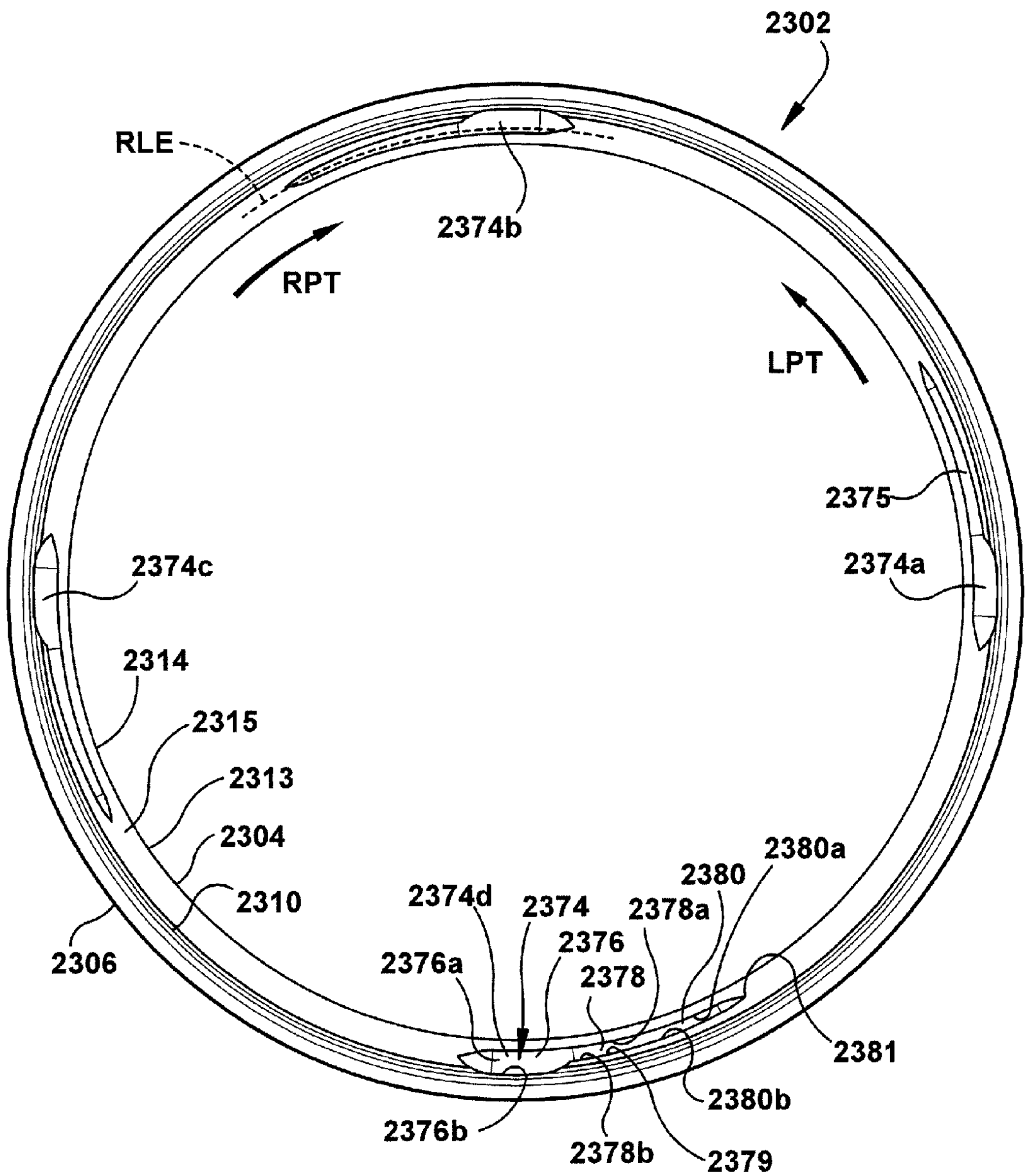
FIG. 70 is a schematic bottom plan view of the carrier portion of the knife blade of FIG. 59 showing a plurality of sockets of the attachment structure of the knife blade, in one exemplary embodiment, the plurality of sockets being four.

As can best be seen in FIG. 68, which shows the carrier portion 2302 and the blade portion 2350 in the unassembled state 2398, and FIG. 70 which shows a schematic bottom plan view of the carrier portion 2302, inner wall 2304 in the lower region 2312 of the carrier portion 2302 includes four cavities or sockets 2374. The sockets 2374 define recesses in the inner wall 2304 of the carrier portion and extend from a bottom wall 2310*a* defining the bottom surface 2310 of the carrier portion 2302 radially into the inner wall 2304 of the carrier portion 2302. The sockets 2374 are part of the twist-and-lock attachment structure 2370 of the knife blade 2300. The twist-and-lock attachment structure 2370 releasably secures the blade portion 2350 to the carrier portion 2302 in a nested configuration (FIG. 63). The recesses defined by the sockets 2374 have a longitudinal extent, as measured along the knee 2313 of the carrier portion 2302, that is, generally parallel to the extent of the knee 2313 and generally parallel to the top surface 2308 of the carrier portion 2302. In one exemplary embodiment, the inner wall 2304 in the lower region 2312 of the carrier portion 2302 includes four sockets 2374*a*, 2374*b*, 2374*c*, 2374*d*, spaced peripherally apart at 90° increments. The four sockets 2374 each include a first, wider opening region 2376, a second, tapering region 2378 and a third, narrow locking region 2380.

The first, wider opening region 2376 is defined by a lower surface 2376*b* and an axially spaced upper surface 2376*a*. The lower surface 2376*b* defines a projection receiving opening 2376*c* of the socket 2374. The projection receiving opening 2376*c* forms a portion of the bottom wall 2310*a* of the carrier portion 2302. The upper surface 2376*a* extends substantially parallel to the knee 2313 of the inner wall 2304 of the carrier portion 2302. A spacing between the lower surface 2376*b* and the upper surface 2376*a*, as measured along the inner wall 2304, is a maximum in the first, wider opening region 2376. The second, tapering region 2378 is defined by a lower surface 2378*b* and an axially spaced upper surface 2378*a* that extends substantially parallel to the knee 2313 of the inner wall 2304 of the carrier portion 2302. In the second, tapering region 2378, the spacing between the lower surface 2378*b* and the upper surface 2378*a*, as measured along the inner wall 2304, tapers and narrows proceeding from the first, wider opening region 2376 toward the third, locking region 2380. Finally, the third, locking region 2380 is defined by a lower surface 2380*b* and an axially spaced upper surface 2380*a* that extends substantially parallel to the knee 2313 of the inner wall 2304 of the carrier portion 2302. In the third, locking region 2380, the spacing between the lower surface 2380*b* and the upper surface 2380*a*, as measured along the inner wall 2304, is a minimum for the socket 2374.

The respective lower surfaces 2378*b*, 2380*b* of the tapering and locking regions 2378, 2380 of the socket 2374, define a camming surface 2379. The spacing between the upper and lower surfaces 2376*a*, 2376*b*, as measured along the inner wall 2304 of the carrier portion 2302 is a maximum in the first wider opening region 2376 of the socket 2374. In the second, tapering region 2378 and the third, locking region 2380, the spacing between the upper and lower surfaces, 2378*a*, 2378*b* and 2380*a*, 2380*b* generally tapers or narrows, as measured along the inner wall 2304 of the carrier portion 2302, because the camming surface 2379 proceeds in a direction toward the respective upper surfaces 2378*a*, 2380*a* of the second, tapering region 2378 and the third, locking region 2380. Thus, the camming surface 2379 extends from the projection receiving opening 2376*c* of the first, wider opening region 2376 to a terminal end 2381 of the socket 2374 in the third, locking region 2380.

It should be understood that the plurality of sockets 2374, in the exemplary embodiment of the two-piece rotary knife blade 2300 schematically shown in FIGS. 59-73, are configured as indentations or cavities extending into the inner wall 2304 of the carrier portion 2302, but not extending all the way through to the outer wall 2306 of the carrier portion 2302. However, it should be appreciated that the present disclosure contemplates that the configuration of the carrier portion 2302 and the blade portion 2350 may be reversed, that is, the carrier portion 2302 may include the plurality of projections and the blade portion 2350 may include the mating plurality of sockets. In the knife blade 2300, the sockets 2374 of the carrier portion 2302 are configured as indentations or cavities that extend from the inner wall 2304 into the central wall 2316 of the carrier portion 2302. However, in other exemplary embodiments contemplated by the present disclosure, the plurality of sockets may comprise openings that pass completely through from the inner to the outer wall of either the carrier portion or the blade portion, depending on which piece is configured to include the plurality of sockets. For example, in the two-piece rotary knife blade 4300, shown schematically in FIGS. 82-90, a blade portion 4350 includes a plurality of sockets 4374. Each of the plurality of sockets 4374 of the blade portion 4350 extends from an inner wall 4352 through an outer wall 4354 of the blade portion 4350, that is, the sockets 4374 extend completely through a central wall 4356 and the inner and outer walls 4352, 4354 of the blade portion 4350.

When the blade portion 2350 is moved and relative to the carrier portion 2302 such that a mating projection 2372 of the blade portion 2350 enters the projection receiving opening 2376*c* of the socket 2474 and the blade portion is twisted or rotated relative to the carrier portion 2302 such that the projection 2372 moves from the first, wider opening region 2376 (shown schematically in FIG. 64) through the second, tapering region 2378 (FIG. 65) into the third, locking region 2380 (FIG. 66), the camming surface 2379 of the sockets 2374 contacts and guides the projections 2372 along a locking path of travel LPT (FIG. 70) such that: a) the blade portion 2350 is axially urged or moved in an upward direction UP' (FIGS. 63 and 69) against the carrier portion 2302; b) the blade portion 2350 is secured or attached to the carrier portion 2302; and c) the knife blade 2300 is transformed from the unassembled condition 2398 to the assembled condition 2399.

Blade Portion 2350

As is best seen in FIGS. 69 and 71-73, the blade portion 2350 includes an inner wall 2352 and a radially spaced apart outer wall 2354. The blade portion further includes a first end or upper wall 2365 and an axially spaced apart second or lower end 2366. As can best be seen in FIG. 63, the upper wall 2365 of the blade portion 2350 defines the upper end 2300*a* of the knife blade, while the lower end 2366 of the blade portion 2350 defines the lower end 2300*b* of the knife blade 2300. The blade portion 2350 includes an upper, generally cylindrical region 2355*a* and a lower, generally frustoconical region 2355*b* having a knee or transition region 2355*c* between the upper region 2355*a* and the lower region 2355*b*. As can be seen in FIG. 63, the inner and outer walls 2352, 2354 are substantially parallel and the knee 2355*c* extends horizontally or radially across between the inner and outer walls 2352, 2354. The inner and outer walls 2352, 2354 are separated radially by a central wall 2356 which defines a thickness of the blade portion 2350.

The inner wall 2352 defines a generally cylindrical surface 2360 in the upper region 2355*a* and a generally frustoconical surface 2361 in the lower region 2355*b*. The cylindrical surface 2360 is substantially centered about and coaxial with the axis of rotation R' of the knife blade 2300 (similar to the axis of rotation R of the rotary knife blade 300). The frustoconical surface 2361 converges in the upward direction UP' (FIGS. 63 and 69) and is generally coaxial with the axis of rotation R' of the knife blade 2300. The outer wall 2354 defines a generally cylindrical surface 2362 in the upper region 2355*a* and a generally frustoconical surface 2363 in the lower region 2355*b*. The cylindrical surface 2362 is substantially centered about and coaxial with the axis of rotation R' of the knife blade 2300. The frustoconical surface 2363 converges in the upward direction UP' (FIG. 69) and is generally coaxial with the axis of rotation R' of the knife blade 2300. When the knife blade 2300 is in the assembled state 2399, the blade portion 2350 and the carrier portion 2302 are in a nested relationship or configuration, that is, a portion of the cylindrical surface 2362 of the outer wall 2354 within the overlap region 2364 (FIG. 63) of the blade portion 2350 confronts and snugly fits within the cylindrical surface 2314 of the inner wall 2304 of the carrier portion 2302, a portion of the frustoconical surface 2363 of the outer wall 2354 within the overlap region 2364 of the blade portion 2350 confronts and snugly fits within the frustoconical surface 2315 of the inner wall 2304 of the carrier portion, and the knee 2355*c* in the region of the outer wall 2354 of the blade portion 2350 is confronts and is adjacent to the knee 2313 of the carrier portion 2302. Thus, as a result of the nesting configuration, there is a large area or region of contact between facing surfaces of the inner wall 2304 of the carrier portion 2302 and the outer wall 2354 of the blade portion 2350.

The lower or distal end 2366 of the blade portion 2350 defines the cutting edge 2368 of the blade portion 2350. The lower end 2366 includes a bridging portion 2367 that bridges the inner and outer walls 2352, 2354. The blade cutting edge 2368 is defined at an intersection of the bridging portion 2367 and the inner wall 2352.

Figure 71:
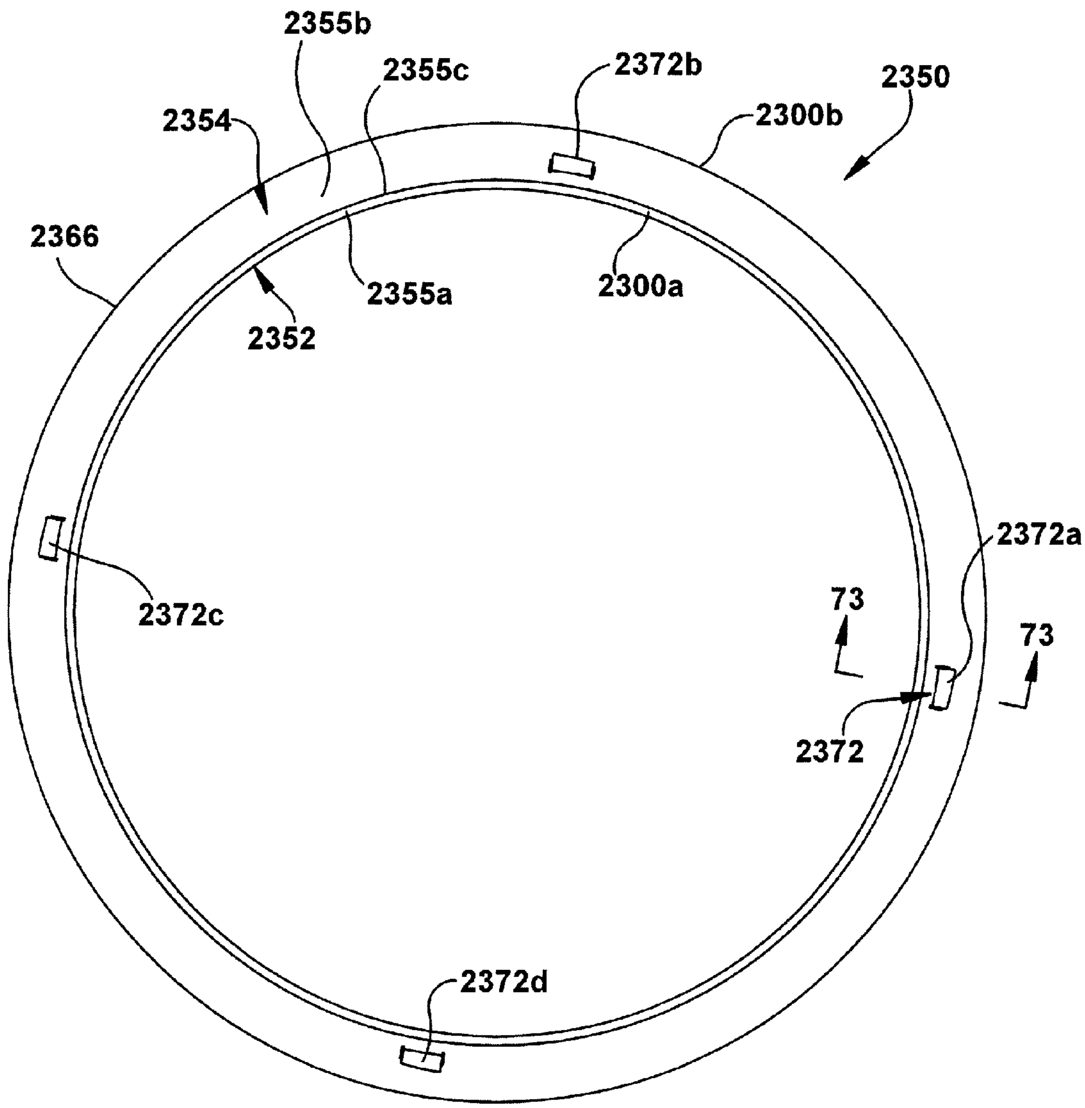
FIG. 71 is a schematic top plan view of the blade portion of the rotary knife blade of FIG. 59 showing a plurality of projections of the attachment structure of the knife blade, in one exemplary embodiment, the plurality of projections being four projections.
Figure 72:
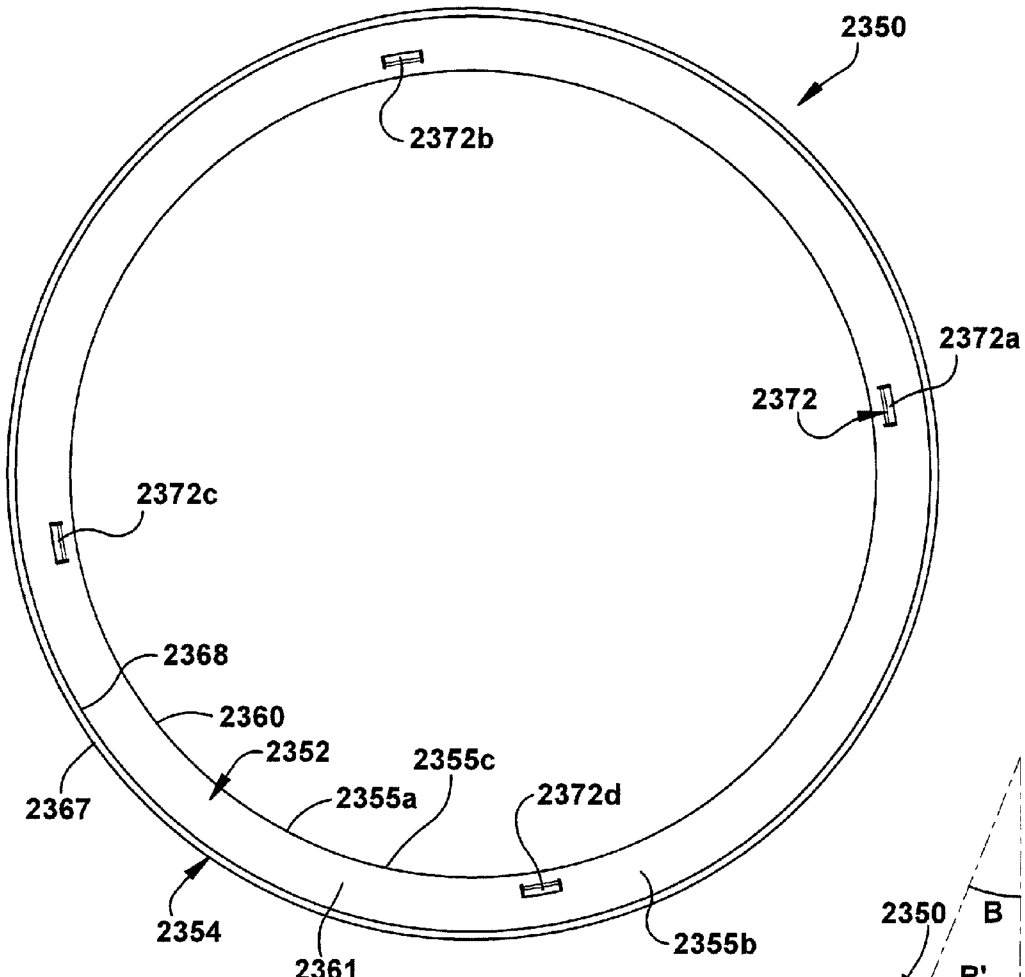
FIG. 72 is a schematic bottom plan view of the blade portion of FIG. 68.
Figure 73:
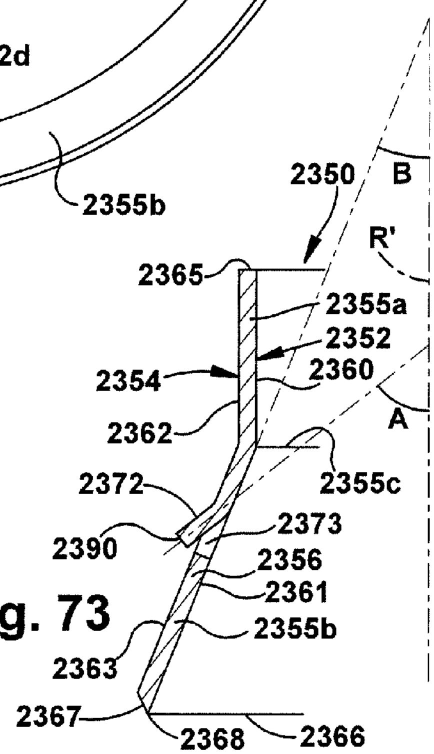
FIG. 73 is a schematic section view of the blade portion of FIG. 71 taken through one of the plurality of projections as seen from a plane indicated by the line 73-73 in FIG. 71.

As best seen in FIGS. 67 and 71-72, the blade portion 2350 includes a plurality of projections 2372 which extend outwardly from frustoconical surface 2363 of the outer wall 2352. Like the sockets 2374 of the carrier portion 2302, the projections 2372 are part of the twist-and-lock attachment structure 2370 of the knife blade 2300. In one exemplary embodiment, the number of projections is four, namely, projections 2372*a*, 2372*b*, 2372*c*, 2372*d*. The four projections 2372 are peripherally spaced about the outer wall 2354 at 90° increments. In one exemplary embodiment, the projections 2372 are formed by stamping or punching completely through the blade wall 2356 (FIGS. 63 and 73) of the blade portion 2350. This approach leaves a cavity or opening 2373 (FIG. 73) in the blade central wall 2356 where each of the projections 2372 is formed. As would be understood by those of skill in the art, other techniques may be utilized to suitably form the projections 2372. As can best be seen in FIGS. 64 and 73, each of the plurality of projections 2372 includes a generally planar end wall 2390.

The projections 2372 extend radially outwardly from the frustoconical surface 2363 of the outer wall 2354 of the blade portion 2350 and, thus, an acute angle A (FIG. 73) of the projections 2372 with respect to the axis of rotation R' of the knife blade 2300 has to be greater in magnitude than an acute angle B of the frustoconical surface 2363 of the outer wall 2354. The angle B of the frustoconical surface 2363 will vary depending on the intended use and configuration of the knife blade. In one exemplary embodiment, wherein the two-piece rotary knife blade 2300 is a straight blade style rotary knife blade and is a small diameter rotary knife blade, the acute angle A of the four projections 2372 is approximately 60°+/−10° and the acute angle B of the frustoconical surface 2363 is approximately 21°+/−10°. Typically, a small diameter rotary knife blade would be a rotary knife blade having an inner diameter of approximately 3 inches or less. Each of the projections 2372 are sized to be received into the opening region 2376*c* of any one of the four sockets 2374 and when the blade portion 2350 is appropriately positioned and then rotated or twisted with respect to the carrier portion 2302, the projections 2372 and, specifically, the end wall 2390 of the plurality of projections 2372, each move along and bear against the camming surface 2379 of the sockets 2374 as the projections 2372 traverse along the path LPT from the first, wider opening region 2376 through the second, tapering region 2378 to the third, locking region 2380 to secure the blade portion 2350 to the carrier portion 2302.

Twist-and-Lock Attachment Structure 2370

As mentioned previously, the carrier portion 2302, which may be machined from stainless steel or similar steel alloy, is more expensive to fabricate than the blade portion 2350, which may be stamped from stainless steel or similar steel alloy. The carrier portion 2302 and the blade portion 2350 are releasably affixed via the twist-and-lock attachment structure 2370 which allows the blade portion 2350 to be securely affixed to the carrier portion 2302 such that the knife blade 2300 may be used in the power operated rotary knife 100. The twist-and-lock attachment structure 2370 also allows the blade portion 2350 to be removed from the carrier portion 2302 when the blade portion 2350 reaches the end of its useful life such that it can be replaced by a new blade portion and the knife blade 2300 may continue to be used in the power operated rotary knife 100 though multiple replaced blade portions.

Advantageously, the attachment structure 2370 is configured such that, as the knife blade 2300 is driven for rotation in the blade housing 400, the forces resulting from the rotation of the knife blade 2300 tend to tighten the attachment between the blade portion 2350 and the carrier portion 2302. As mentioned previously, a direction of rotation of the knife blade 2300 in the rotary knife 100 is in a counterclockwise rotational direction CCW when viewed from the blade central axis R' axially above the upper end 2300*a* of the knife blade 2300. To affix the blade portion 2350 to the carrier portion 2302, a direction of rotation of the blade portion 2350 with respect to the carrier portion 2302 is in a clockwise rotational direction CW (FIG. 62) when viewed from the blade central axis R' axially above the upper end 2300*a* of the blade 2300.

The attachment structure 2370 includes the plurality of projections 2372 extending radially outwardly from the outer wall 2354 of the blade portion 2350 and the mating plurality of sockets 2374 formed in the inner wall 2304 of the carrier portion 2302. The attachment structure 2370 provides for movement of the plurality of projections 2372 with respect to the plurality of sockets 2374 between a release position, where the blade portion 2350 is capable of being moved axially away from the carrier portion 2302 and the locking position, where the blade portion 2350 is secured to the carrier portion 2302. In one exemplary embodiment, there are four projections 2372*a*, 2372*b*, 2372*c*, 2372*d* and four mating sockets 2374*a*, 2374*b*, 2374*c*, 2374*d*. Of course, it should be recognized that the number of projections and mating sockets may be greater or less than four.

As previously discussed, each socket 2374*a*, 2374*b*, 2374*c*, 2374*d* in the plurality of sockets 2374 includes three adjacent regions 2376, 2378, 2380 allowing for the twist-and-lock functionality of the attachment structure 2370. Each socket, referred to generally as socket 2374, includes the first, wider opening region 2376, the second, tapering region 2378, and the third, narrower locking region 2380. The respective upper surfaces 2376*a*, 2378*a*, 2380*a* of the three regions 2376, 2378, 2380 are aligned and substantially parallel to the knee 2355*c* of the blade portion.

By contrast, the respective lower surfaces 2378*b*, 2380*b* of the tapering and locking regions 2378, 2380, define the camming surface 2379 which generally tapers toward the upper surfaces 2378*a*, 2380*a* thereby reducing the spacing between the respective upper and lower surfaces, as measured along the inner wall 2304 of the carrier portion 2302, in moving from the first, opening region 2376 through the second, tapering region 2378 to the third, locking region 2380. The camming surface 2379 extends from the projection receiving opening 2376*c* of the first, wider opening region 2376 to the terminal end 2381 of the socket 2374 in the third, locking region 2380. Each of the sockets 2374 comprises a recess 2375 extending radially into the inner wall 2304 of the carrier portion 2302, the recess 2374*e* having a longitudinal extent RLE (FIG. 70) that is substantially parallel to the first and second ends 2308, 2310 of the carrier portion 2302.

To secure the blade portion 2350 to the carrier portion 2302, the blade portion 2350 and the carrier portion 2302 are axially and rotationally aligned such that each projection 2372*a*, 2372*b*, 2372*c*, 2372*d* of the plurality of projections 2372 is received in a respective socket 2374*a*, 2374*b*, 2374*c*, 2374*d* of the plurality of sockets 2374. Specifically, the carrier portion 2302 is positioned above the blade portion 2350. The carrier portion 2302 is moved in the downward direction DW' (FIGS. 63 and 69) with respect to the blade portion 2350. The carrier portion 2302 is aligned and rotated with respect to the blade portion such that each projection 2372*a*, 2372*b*, 2372*c*, 2372*d* is received into the projection receiving opening region 2376*c* defined by the lower surface 2376*b* of the first, wider opening region 2376 of its respective mating socket 2374*a*, 2374*b*, 2374*c*, 2374*d*.

Figure 65:
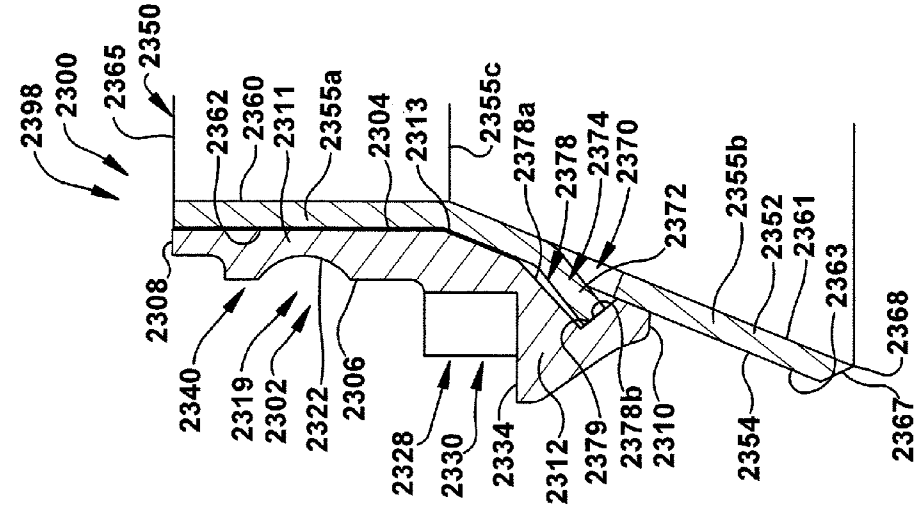
FIG. 65 is a schematic section view of the rotary knife blade of FIG. 59 wherein the projection of the blade portion into the socket of the carrier portion has moved from the first, wider opening region of the socket of the carrier portion (as shown in the sectional view of FIG. 64) to a second, transition or tapering region of the socket, the second, tapering region of the socket transitions between the first, wider opening region and a third, narrower locking region (shown in the section view of FIG. 66)
Figure 64:
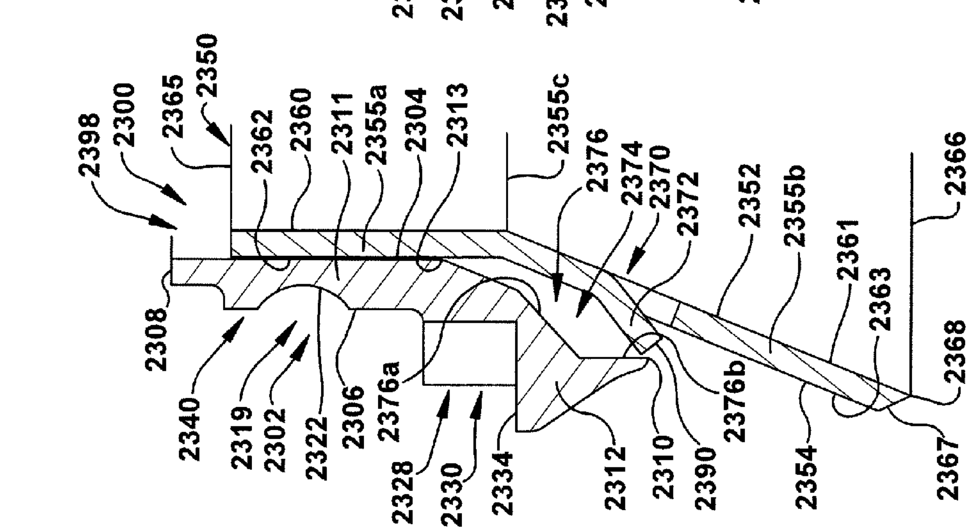
FIG. 64 is a schematic section view of the rotary knife blade of FIG. 59 in a region of the blade where there is engagement of a projection of the blade portion and into a first, wider opening region of a socket of the carrier portion, the blade portion projection and the carrier portion socket being part of an attachment structure of the knife blade for releasably securing blade portion to the carrier portion, the first, wider opening region defining a projection receiving opening to accept a projection of the blade portion.

Next, after proper alignment, to secure the blade portion 2350 to the carrier portion 2302, the blade portion 2350 is rotated with respect to the carrier portion 2302 in a clockwise direction of rotation CW (when viewed from above) to the locked position wherein the knife blade 2300 is in the assembled condition 2399. As the blade portion 2350 is rotated with respect to the carrier portion 2302, each of the projections 2372*a*, 2372*b*, 2372*c*, 2372*d* of the plurality of projections 2372 moves along the camming surface 2379 and along a locking path of travel LPT (FIG. 70) within a respective socket 2374*a*, 2374*b*, 2374*c*, 2374*d* of the plurality of sockets 2374. As a given projection 2372 moves along the locking path of travel LPT in a socket 2374 from the first, wider opening region 2376 to the third, narrow locking region 2380, the projection 2372 is axially displaced by the camming surface 2379 (defined by the lower surfaces 2378*b*, 2380*b* of the tapering and locking regions 2378, 2380) such that the outer wall 2354 of the blade portion 2350 and the inner wall 2304 of the carrier portion 2302 are urged axially toward each other and the blade portion 2350 is secured to the carrier portion 2302. FIGS. 64-66 schematically illustrate, in section view, movement of a representative projection 2372 within a socket 2374 along the locking path of travel LPT from the first, wider opening region 2376 (shown in FIG. 64—unlocked position), to the second, tapering region 2378 (shown in FIG. 65—partially locked position), to the third, locking region 2380 (shown in FIG. 66—locked position—assembled condition). As can be seen in the progression of FIGS. 64-66, as the twist and lock securement of the blade portion 2350 to the carrier portion 2304 occurs, the blade portion 2350 is urged axially to full engagement with the carrier portion 2304 in the nesting configuration depicted in FIG. 63.

As can best be seen in FIGS. 65 and 66, as the blade portion 2350 is rotated or twisted in the clockwise direction CW with respect to the carrier portion 2302, when viewed from above, the generally planar end wall 2390 of each of the plurality of projections 2372 bears against and rides along the camming surface 2379 in the second, tapering region 2378 and third, locking region 2380 of the respective sockets 2374. As the end wall 2390 of the projections 2374 rides along the camming surface 2379, the blade portion 2350 is urged in the upward axial direction UP' (FIGS. 63 and 69) into a nested configuration with the carrier portion 2302, that is, the locked position or the assembled condition 2399.

To release the blade portion 2350 from the carrier portion 2302, that is, to move the knife blade 2300 from an assembled condition 2399 to a disassembled condition 2398, the process is reversed. That is, the blade portion 2350 is rotated with respect to the carrier portion 2302 in the counterclockwise direction of rotation CCW (when viewed from above) to the release position. In moving from the locking position to the release position, each of the projections 2372*a*, 2372*b*, 2372*c*, 2372*d* of the plurality of projections 2372 moves along a release path of travel RPT (FIG. 70) within a respective socket 2374*a*, 2374*b*, 2374*c*, 2374*d* of the plurality of sockets 2374 that is opposite to the locking path of travel LPT. As a given projection 2372 moves along the release path of travel RPT from the third, narrow locking region 2380 to the first, wider opening region 2376, the projection 2372 tends to move along the camming surface 2379 of the socket 2374 such that the outer wall 2354 of the blade portion 2350 and the inner wall 2304 of the carrier portion 2302 tend to move away from each other. When each of the projections 2372*a*, 2372*b*, 2372*c*, 2372*d* of the plurality of projections 2372 are in the first, wider opening region 2376 of their respective sockets 2374*a*, 2374*b*, 2374*c*, 2374*d* of the plurality of sockets 2374, the blade portion 2350 may be moved axially away from the carrier portion 2302 to thereby complete the release of the blade portion 2350 from the carrier portion 2302 and thereby achieve the disassembled condition.

Alternate Exemplary Embodiments—Two-Piece Rotary Knife Blades

In FIGS. 74-99, three alternate exemplary embodiments of annular, rotary knife blades 3300 (FIGS. 74-81), 4300 (FIGS. 82-90), 5300 (FIGS. 91-99) are schematically shown, each knife blade comprising a two-part or two-piece structure including a carrier portion and a blade portion. Each of the rotary knife blades 3300, 4300, 5300 includes a twist-and-lock attachment structure 3370, 4370, 5370 that releasably couples the carrier portion to the blade portion. The rotary knife blades 3300, 4300, 5300 are generally similar in structure and function to the two-piece rotary knife blade 2300 and the foregoing discussion and description of the two-piece rotary knife blade 2300 is incorporated with respect to the description of each of the following two-piece rotary knife blades 3300, 4300, 5300.

The attachment structures 3370, 4370, 5370 of the respective two-piece rotary knife blades 3300, 4300, 5300 differ in structure from the attachment structure 2370 of the two-piece rotary knife blade 2300. Accordingly, the following discussion of the rotary knife blades 3300, 4300, 5300 will focus on the respective attachment structures 3370, 4370, 5370. Each of the rotary knife blades 3300, 4300, 5300 is configured to be used in a power operated rotary knife of the present disclosure, such as, for example, the power operated rotary knife 100, although it should be appreciated that structural changes to other, mating components of the power operated rotary knife 100 (e.g., the blade housing 400) will be required to accommodate the specific configuration, size and/or diameter of the two-piece knife blades 3300, 4300, 5300. In one exemplary embodiment of the rotary knife blades 3300, 4300, 5300, both the carrier portion and the blade portion are one-piece, continuous annular pieces. Each of the two-piece knife blades 3300, 4300, 5300 are schematically shown in FIGS. 74-99 as flat style rotary knife blades, but the concepts presented herein are equally applicable to hook and straight style rotary knife blades.

Two-Piece Rotary Knife Blade 3300

Turning to FIGS. 74-81, the two-piece rotary knife blade 3300 includes the carrier portion 3302 and the blade portion 3350. The rotary knife blade 3300 is schematically shown in assembled condition 3399 in FIGS. 74-76 and in unassembled condition 3398 in FIGS. 77 and 78. The rotary knife blade 3300, in assembled condition 3399, extends from an upper end 3300*a* to a lower end 3300*b* and rotates about an axis of rotation R", similar to the axis of rotation R' of the two-piece rotary knife blade 2300. The blade carrier portion 3302 includes an inner wall 3304 and an outer wall 3306, radially spaced apart by a central wall 3316. The carrier portion 3302 extends axially between a first end or top surface 3308, defining the upper end 3300*a* of the knife blade 3300, and a second end or bottom surface 3310. The carrier portion includes an upper region 3311, adjacent the top surface 3308 and a lower region 3312, adjacent the bottom surface 3310.

Figure 76:
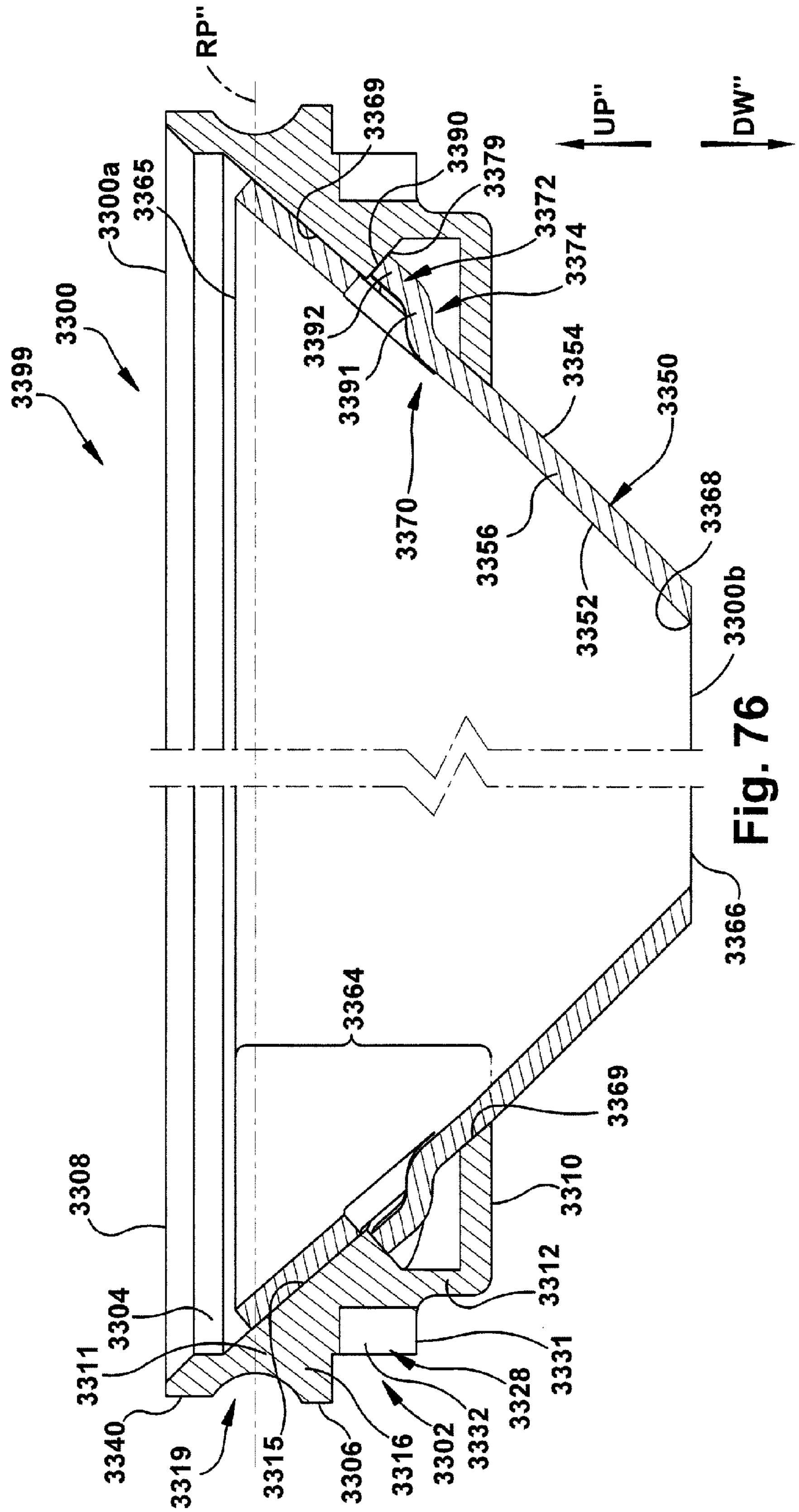
FIG. 76 is a schematic section view of the rotary knife blade of FIG. 74 showing a locking engagement of a projection of the blade portion and a socket of the carrier portion.
Figure 77:
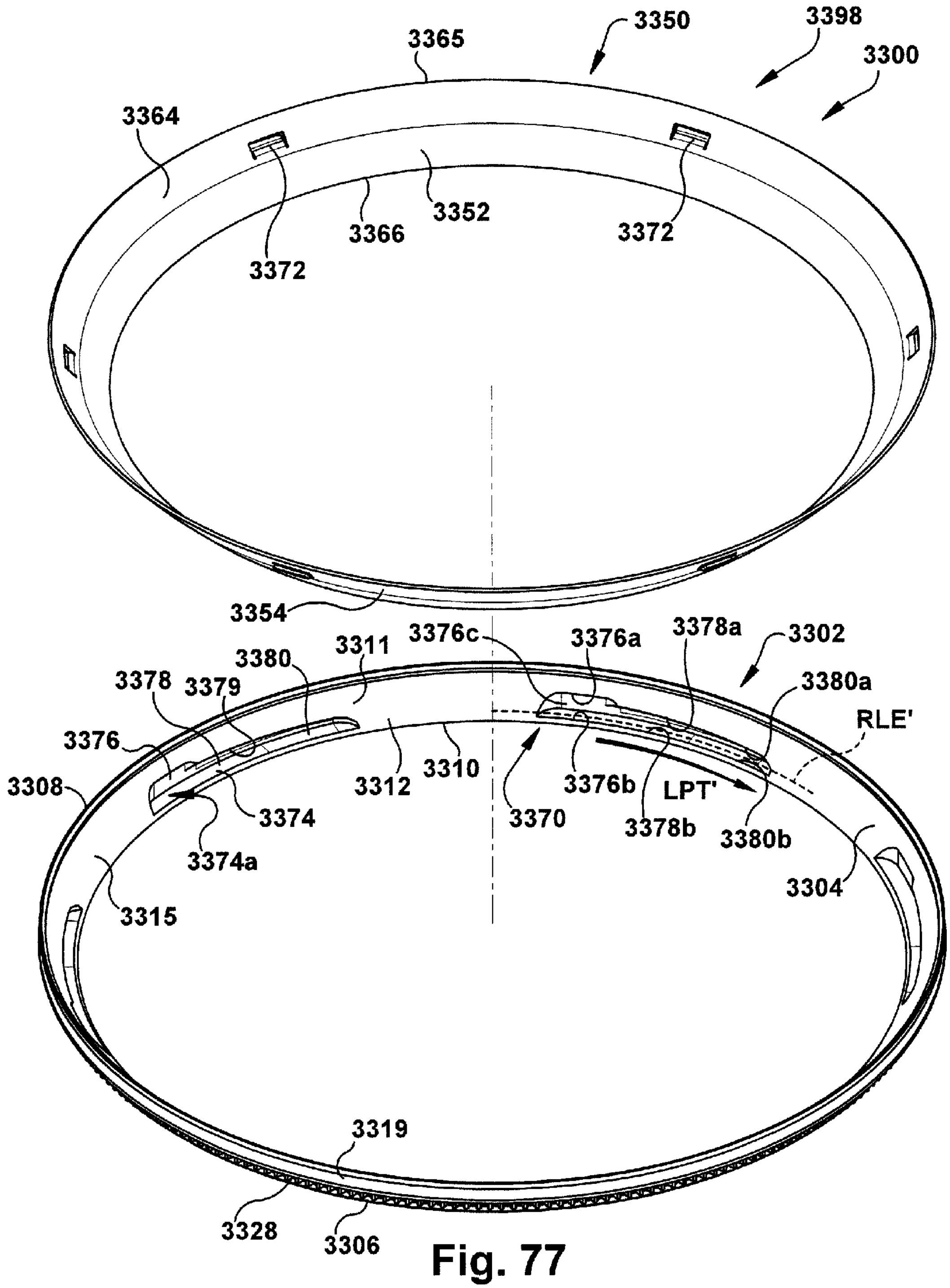
FIG. 77 is a schematic top perspective view of the rotary knife blade of FIG. 74 in an unassembled condition with the blade portion aligned above the carrier portion to schematically illustrate how the blade portion would be received into or would nest with respect to the carrier portion when assembled.
Figure 78:
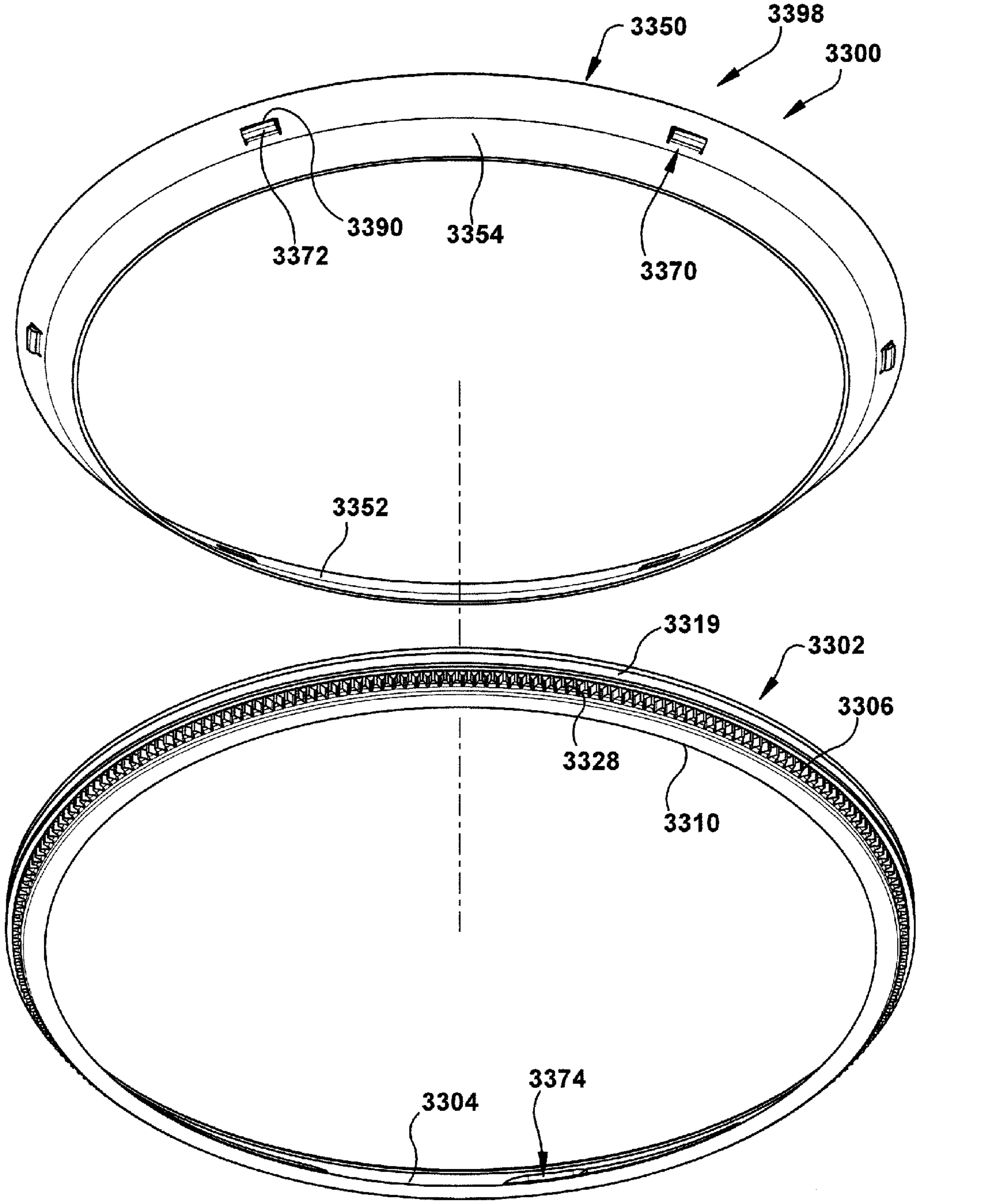
FIG. 78 is a schematic bottom perspective view of the rotary knife blade of FIG. 74 in an unassembled condition with the blade portion aligned above the carrier portion to schematically illustrate how the blade portion would be received into or would nest with respect to the carrier portion when assembled.

As can best be seen in FIG. 76, in the upper region 3311 of the carrier portion 3302, a generally cylindrical portion 3340 of the carrier portion outer wall 3306 includes a bearing surface 3319. The bearing surface 3319, similar to the bearing surface 2319 of the two-piece rotary knife blade 2300, functions as the bearing surface for the rotary knife blade 3300 and defines a rotational plane RP" of the blade 3300. In the lower region 3312 of the carrier portion, a stepped portion 3331 of the outer wall 3306 defines a driven gear 3328 including a plurality of gear teeth 3332, similar to the gear teeth 2332 of the two-piece rotary knife blade 2300. The inner wall 3304 of the carrier portion 3302 includes a frustoconical portion 3315 that serves as a nesting or support surface for an outer wall 3354 of the blade portion 3350.

The blade portion 3350 of the two-piece blade 3300 includes an inner wall 3352 and the outer wall 3354, the inner and outer walls 3352, 3354 radially spaced apart by a central wall 3356. The blade portion 3350 extends between a first end or upper wall 3365 and a second or lower end or wall 3366. The lower end 3366 of the blade portion 3350 defines a cutting edge 3368 of the blade 3300 and further defines the lower end 3300*b* of the knife blade 3300. The inner are outer walls 3352, 3354 of the blade portion 3350 are generally parallel and frustoconical, converging in a direction proceeding toward the lower end 3300*b* of the knife blade 3300 and generally centered about the blade axis of rotation R". As can best be seen in FIG. 76, when the rotary knife blade 3300 is in the assembled condition 3399, an upper region 3364 of the blade portion 3350 is received and supported in nested relationship in the carrier portion 3302. An area of contact 3369 between the outer wall 3354 of the blade portion 3350 and the inner wall 3304 of the carrier portion 3302 is generally frustoconical, extending both axially and radially and converging in a direction proceeding toward the lower end 3366 of the blade portion 3350.

The attachment structure 3370 of the two-piece rotary knife blade 3300 includes mating, releasable securement elements on both the blade portion 3350 and the carrier portion 3302. In one exemplary embodiment, the attachment structure 3370 includes a plurality of projections 3372 extending radially outwardly from an outer wall 3354 of the blade portion 3350 and a plurality of sockets 3274 formed in an inner wall 3304 of the carrier portion 3302. In one exemplary embodiment, the number of projections 3372 and sockets 3374 is six.

Figure 79:
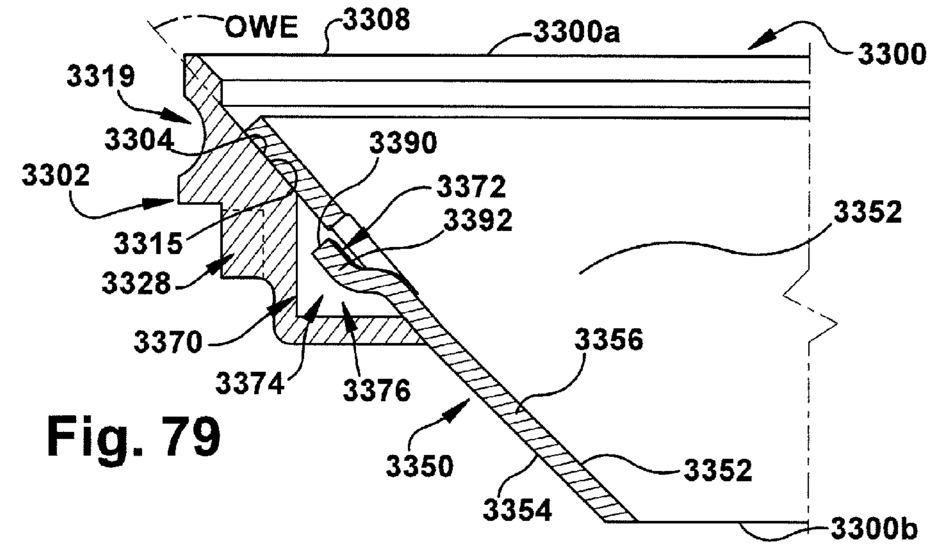
FIG. 79 is a schematic section view of the rotary knife blade of FIG. 74 in a region of the blade where there is engagement of a projection of the blade portion and into a first, wider opening region of a socket of the carrier portion, the blade portion projection and the carrier portion socket being part of an attachment structure of the knife blade for releasably securing blade portion to the carrier portion, the first, wider opening region defining a projection receiving opening to accept a projection of the blade portion.

As best seen in FIG. 79, each of the projections 3372 of the blade portion 3350 is cantilevered and generally S-shaped and includes: a) an arcuate base portion 3391 that extends radially away from a general extent OWE of the outer wall 3354 of the blade portion; b) an extending middle portion 3392 that extends generally parallel to the general extent OWE of the outer wall 3354; and c) a generally planar end wall 3390 that is generally orthogonal to the middle portion 3392 and the general extent OWE of the outer wall 3354.

Figure 74:
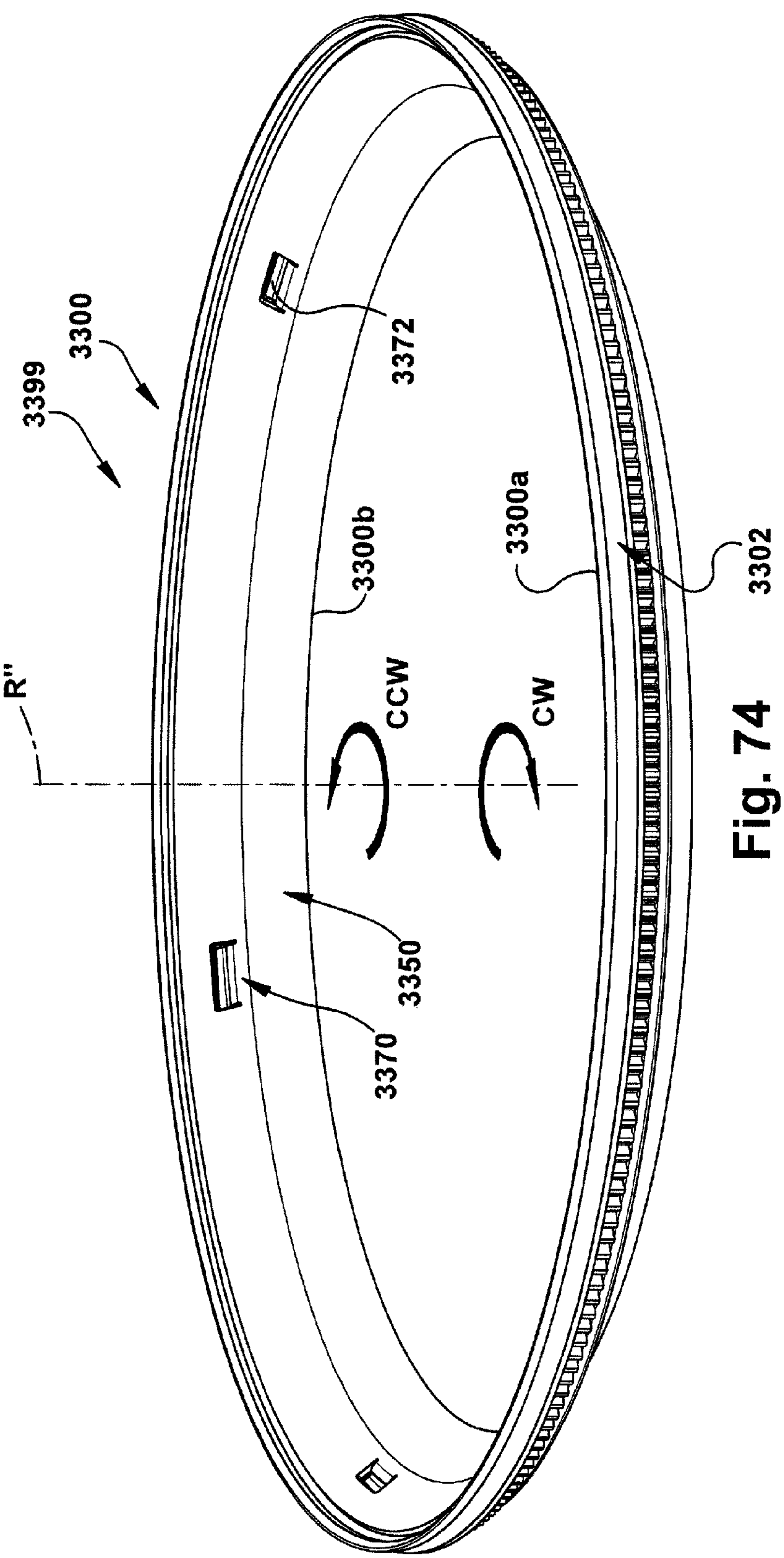
FIG. 74 is a schematic perspective view taken from above of a second alternate exemplary embodiment of a two-piece or two-part annular rotary knife blade of the present disclosure suitable for use in the power operated rotary knife of FIG. 1, the rotary knife blade including a carrier portion and a blade portion of the two-piece knife blade in a locked position or an assembled condition.
Figure 75:
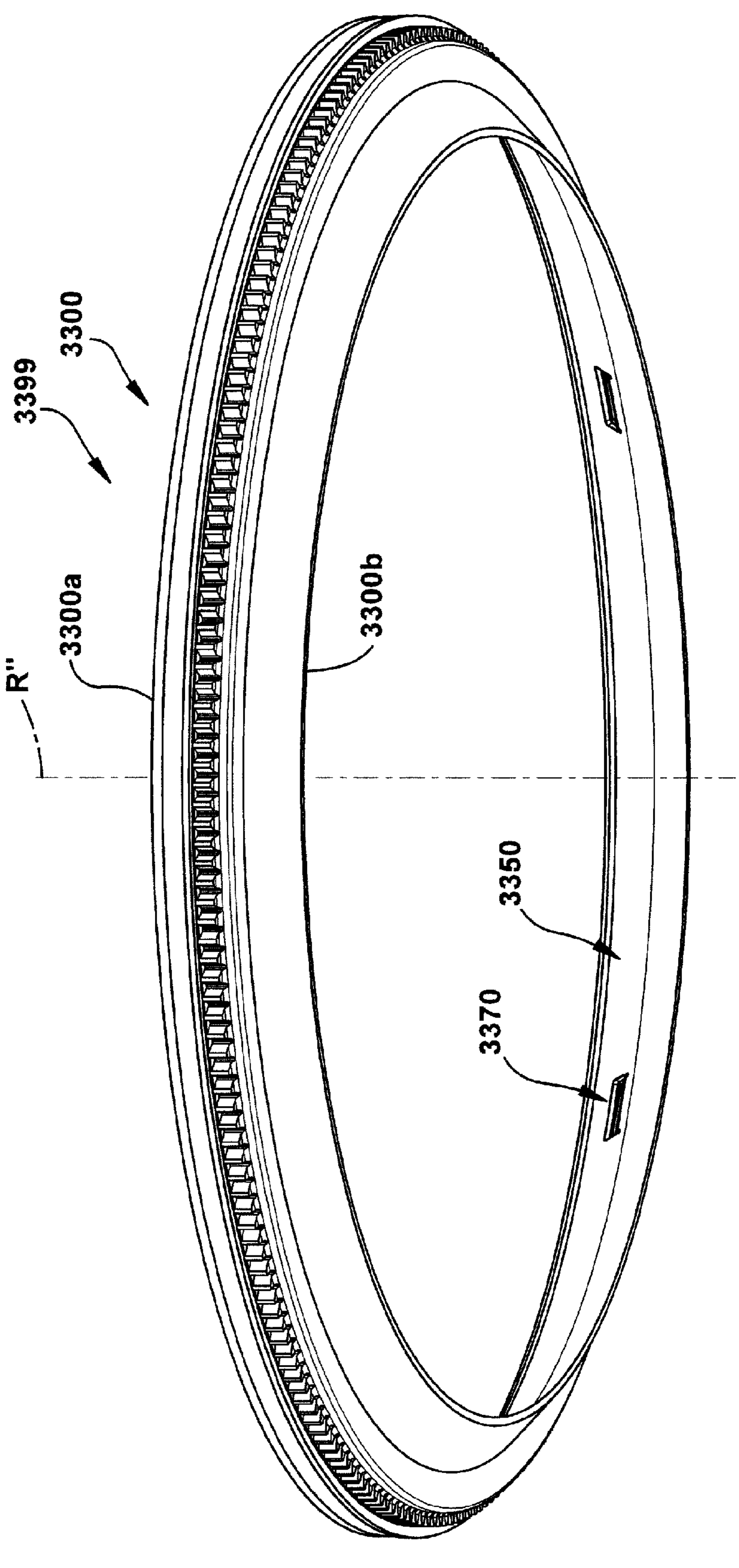
FIG. 75 is a schematic perspective view taken from below of the rotary knife blade of FIG. 74.

The configuration of the plurality of projections 3372 and, specifically, the configuration of the middle portion 3392 that extends generally parallel to the outer wall 3354 of the blade portion 3350 provides for increased strength and rigidity of the projections 3372 along a bearing line of action parallel to the general extent OWE of the outer wall 3354. That is, compared to, for example, the angled projection 2372 (FIG. 73) of the two-piece rotary knife blade 2300, the S-shaped configuration of the plurality of projections 3372 of the two-part rotary knife blade 3300 provides for greater strength and rigidity of the projections 3372 as the projections 3372 bear against and ride along a camming surface 3379 of the sockets 3374 when the blade portion 3350 is rotated in a clockwise direction CW with respect to the carrier portion 3302 to move the rotary knife blade 3300 from an unassembled condition 3398 (FIGS. 77 and 78) to an assembled condition 3399 (FIGS. 74-76).

The attachment structure 3370 of the two-piece rotary knife blade 3300 further includes the plurality sockets 3374 formed in the inner wall 3304 and extending into the central wall 3316 of the carrier portion 3302. Each socket 3374 is located in the lower region 3312 of the carrier portion 3302 and includes a first, wider opening region 3376, a second, tapering region 3378, and a third, locking region 3380. The first, wider opening region 3376 includes an upper surface 3376*a*, defining an opening region 3376*c* (FIG. 77) of the socket 3374, and a lower surface 3376*b* spaced from the upper surface along the inner wall 3304. The second, tapering region 3378 includes an upper surface 3378*a* and a lower surface 3378*b*. The third, locking region 3380 includes an upper surface 3380*a* and a lower surface 3380*b*. The upper surfaces 3378*a*, 3380*a* of the tapering and locking regions 3378, 3380 define the camming surface 3379. The camming surface 3379 proceeds generally toward or converges toward the lower surfaces 3378*b*, 3380*b* thereby reducing the spacing between the respective upper and lower surfaces, as measured along the inner wall 3304 of the carrier portion 3302, in moving from the first, opening region 3376 through the second, tapering region 3378 to the third, locking region 3380. Each of the sockets 3374 comprises a recess 3374*a* extending radially into the inner wall 3304 of the carrier portion 3302, the recess 3374*a* having a longitudinal extent RLE' (FIG. 77) that is substantially parallel to the first and second ends 3308, 3310 of the carrier portion 3302.

To secure the blade portion 3350 to the carrier portion 3302, the blade portion 3350 is positioned above the carrier portion 3302. The blade portion 3350 is moved in the downward direction DW" (FIG. 76) with respect to the carrier portion 3302. The blade portion 3350 is aligned and rotated with respect to the carrier portion 3302 such that each projection 3372 is received into a respective projection receiving opening 3376*c* defined by the upper surface 3376*b* of the first, wider opening region 3376 of its respective mating socket 3374. Next, after proper alignment, to secure the blade portion 3350 to the carrier portion 3302, the blade portion 3350 is rotated with respect to the carrier portion 3302 in a clockwise direction of rotation CW (when viewed from above) to the locked position wherein the knife blade 3300 is in the assembled condition 3399. As the blade portion 3350 is rotated with respect to the carrier portion 3302, each of the projections of the plurality of projections 3372 moves along the camming surface 3379 and along a locking path of travel LPT' (FIG. 77) within a respective socket of the plurality of sockets 3374.

Figure 80:
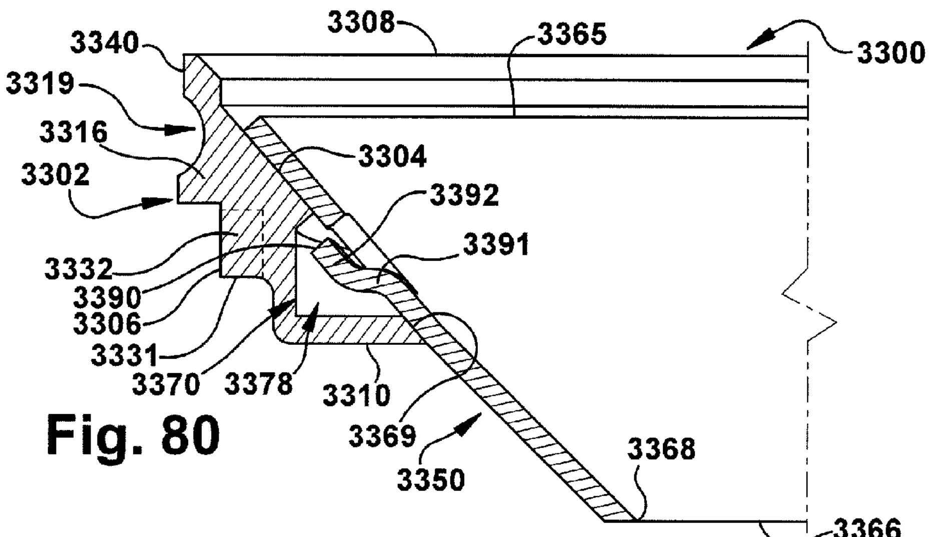
FIG. 80 is a schematic section view of the rotary knife blade of FIG. 74 wherein the projection of the blade portion into the socket of the carrier portion has moved from the first, wider opening region of the socket of the carrier portion (as shown in the sectional view of FIG. 79) to a second, transition or tapering region of the socket, the second, tapering region of the socket transitions between the first, wider opening region and a third, narrower locking region (shown in the section view of FIG. 81)
Figure 81:
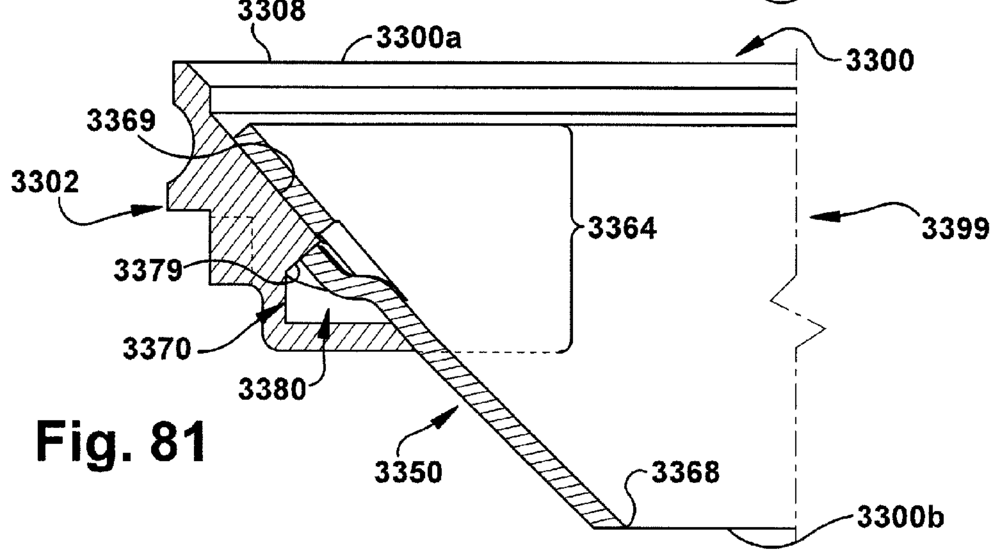
FIG. 81 is a schematic section view of the rotary knife blade of FIG. 74 wherein the projection of the blade portion into the socket of the carrier portion has moved from the second, tapering region of the socket of the carrier portion (as shown in the sectional view of FIG. 80) to a third, narrow locking region of the socket, the third, narrower locking region defining a locking region to lock a projection of the blade portion so that the blade portion and the carrier portion are in the assembled condition or locked position.
Figure 82:
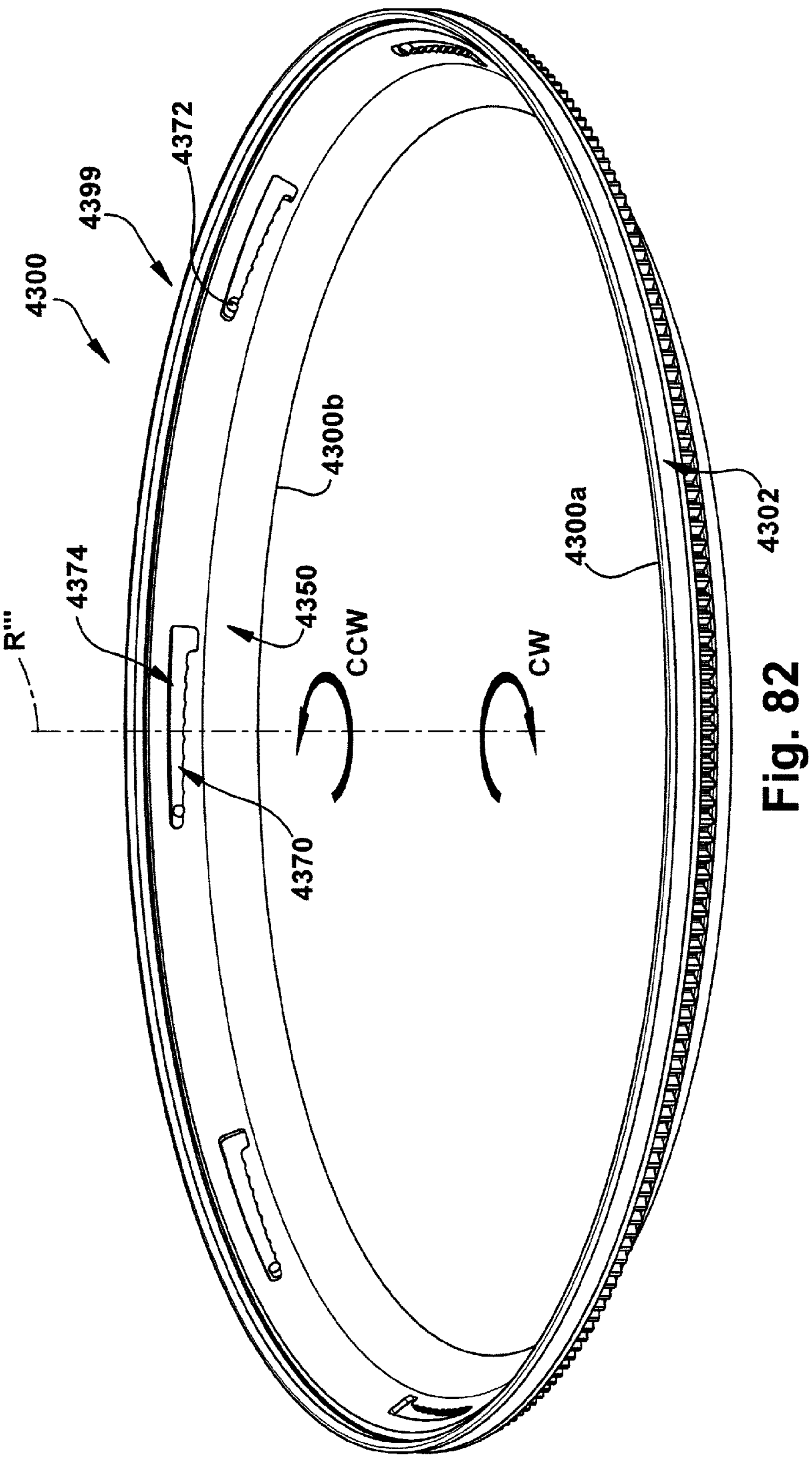
FIG. 82 is a schematic perspective view taken from above of a third alternate exemplary embodiment of a two-piece or two-part annular rotary knife blade of the present disclosure suitable for use in the power operated rotary knife of FIG. 1, the rotary knife blade including a carrier portion and a blade portion of the two-piece knife blade in a locked position or an assembled condition.
Figure 83:
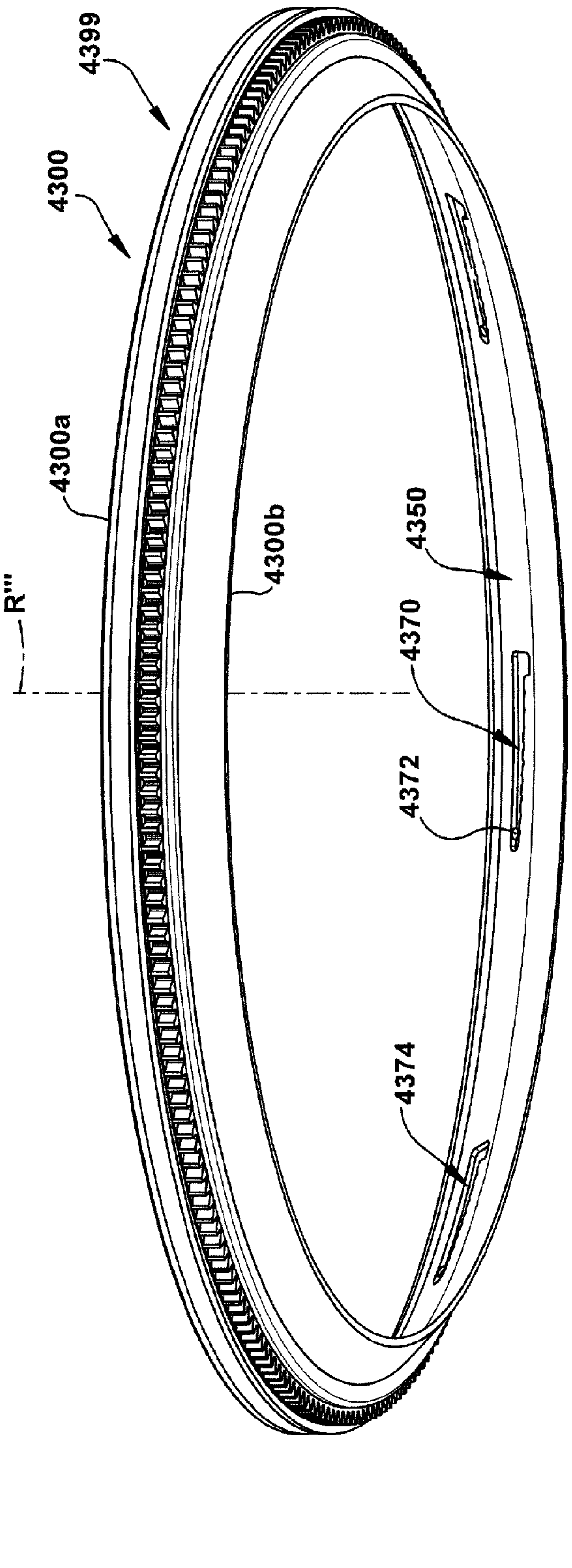
FIG. 83 is a schematic perspective view taken from below of the rotary knife blade of FIG. 82.

As a given projection 3372 moves along the locking path of travel LPT' in a socket 3374 from the first, wider opening region 3376 to the third, narrow locking region 3380, the projection 3372 is axially displaced by the camming surface 3379 (defined by the upper surfaces 3378*a*, 3380*a* of the tapering and locking regions 3378, 3380) such that the outer wall 3354 of the blade portion 3350 and the inner wall 3304 of the carrier portion 3302 are urged axially toward each other and the blade portion 3350 is secured to the carrier portion 3302. FIGS. 79-81 schematically illustrate, in section view, movement of a representative projection 3372 within a socket 3374 along the locking path of travel LPT' from the first, wider opening region 3376 (shown in FIG. 79—unlocked position), to the second, tapering region 3378 (shown in FIG. 80—partially locked position), to the third, locking region 3380 (shown in FIG. 81—locked position—assembled condition). As can be seen in the progression of FIGS. 79-81, as the twist and lock securement of the blade portion 3350 to the carrier portion 3302 occurs, the blade portion 3350 is urged axially to full engagement with the carrier portion 3302 in the nesting configuration depicted in FIG. 76.

As can best be seen in FIGS. 80 and 81, as the blade portion 3350 is twisted in the clockwise direction CW with respect to the carrier portion 3302, as viewed from above, the generally planar end wall 3390 of each of the plurality of projections 3372 bears against and rides along the camming surface 3379 in the second, tapering region 3378 and third, locking region 3380 of the respective sockets 3374. As the end wall 3390 of the projections 3372 ride along the camming surface 3379, the blade portion 3350 is urged in the downward axial direction DW" (FIG. 76) into a nested configuration with the carrier portion 3302, that is, the locked position or the assembled condition 3399.

Two-Piece Rotary Knife Blade 4300

Turning to FIGS. 82-90, the two-piece rotary knife blade 4300 includes the carrier portion 4302 and the blade portion 4350. The knife blade 4300 is schematically shown in assembled condition 4399 in FIGS. 82-85 and in unassembled condition 4398 in FIGS. 86 and 87. The knife blade 4300, in assembled condition 4399, extends from an upper end 4300*a* to a lower end 4300*b* and rotates about an axis of rotation R''', similar to the axis of rotation R' of the two-piece rotary knife blade 2300. The blade carrier portion 4302 includes an inner wall 4304 and an outer wall 4306, radially spaced apart by a central wall 4316. The carrier portion 4302 extends axially between a first end or top surface 4308, defining the upper end 4300*a* of the knife blade 4300, and a second end or bottom surface 4310. The carrier portion includes an upper region 4311, adjacent the top surface 4308 and a lower region 4312, adjacent the bottom surface 4310.

Figure 85:
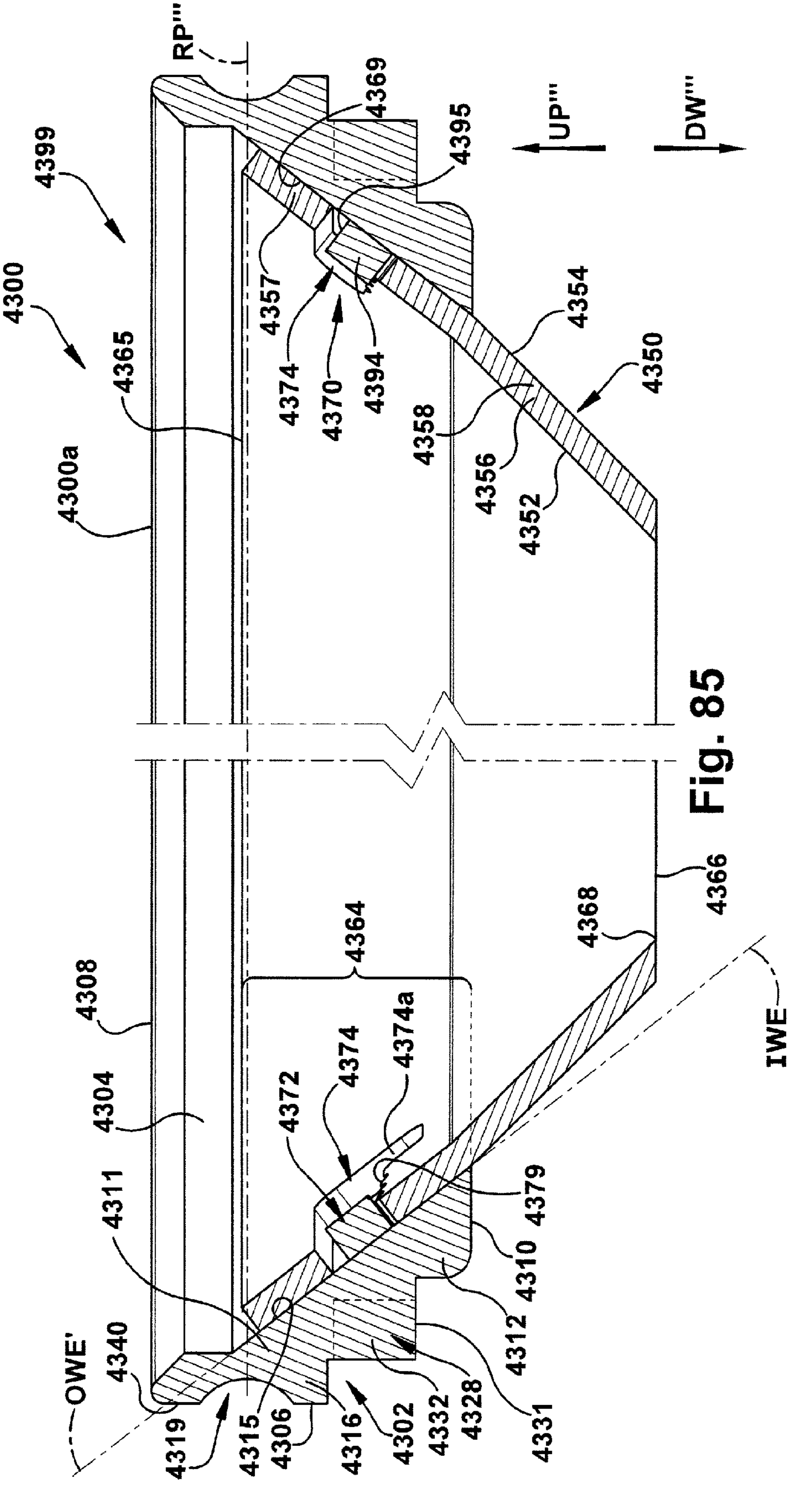
FIG. 85 is a schematic section view of the rotary knife blade of FIG. 82 showing a locking engagement of a projection of the carrier portion and a socket of the blade portion.
Figure 86:
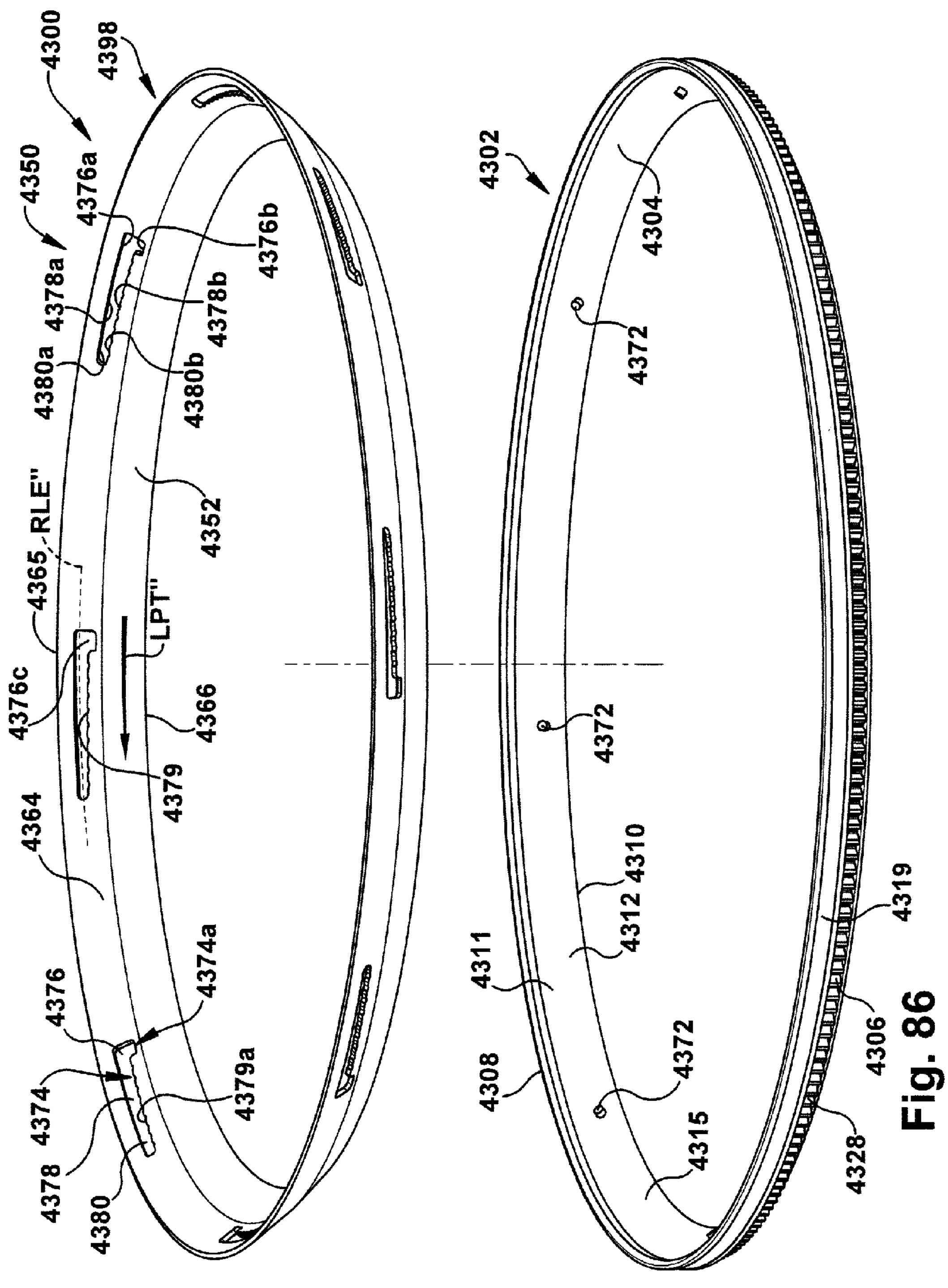
FIG. 86 is a schematic top perspective view of the rotary knife blade of FIG. 82 in an unassembled condition with the blade portion aligned above the carrier portion to schematically illustrate how the blade portion would be received into or would nest with respect to the carrier portion when assembled.
Figure 87:
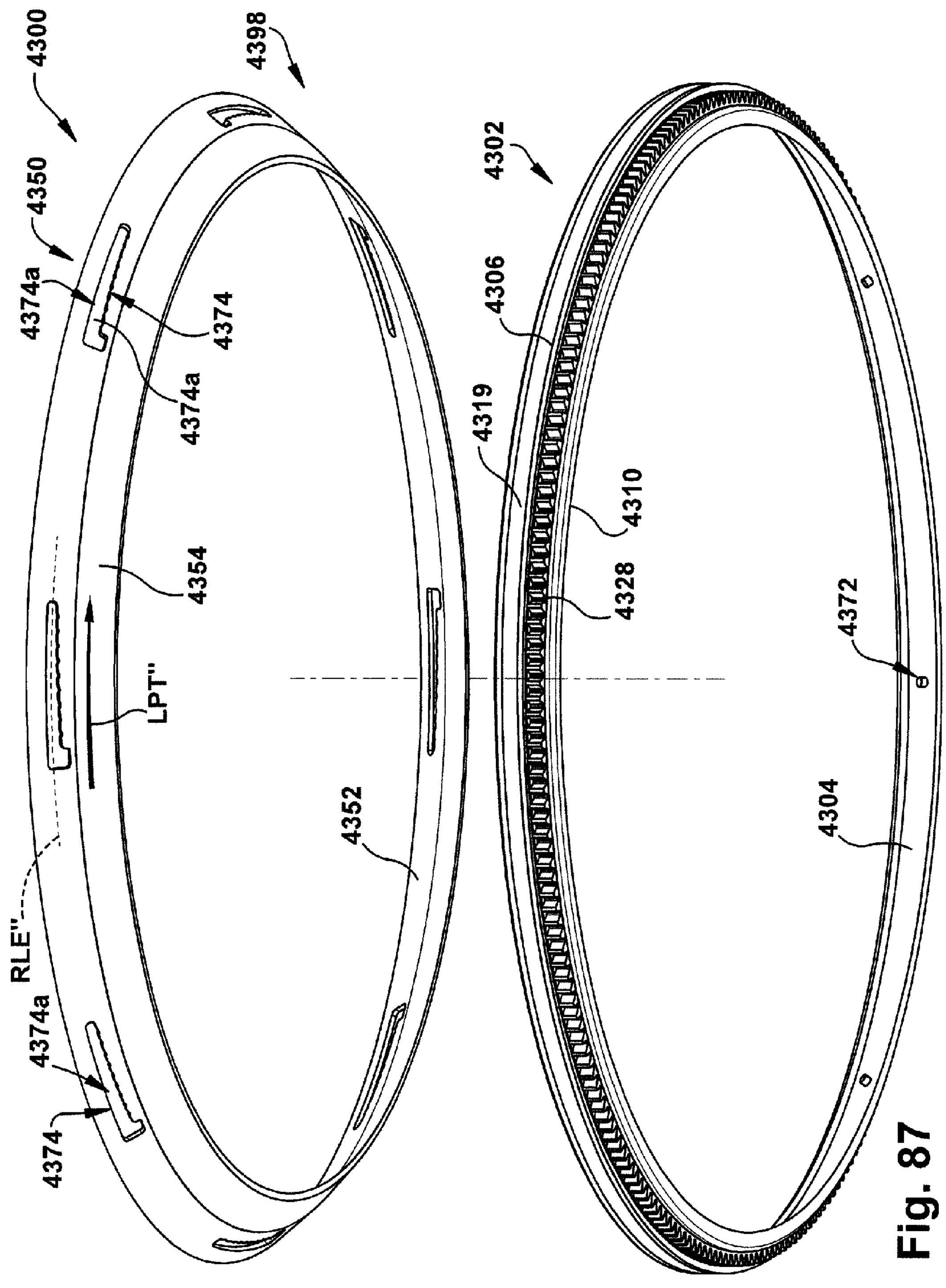
FIG. 87 is a schematic bottom perspective view of the rotary knife blade of FIG. 82 in an unassembled condition with the blade portion aligned above the carrier portion to schematically illustrate how the blade portion would be received into or would nest with respect to the carrier portion when assembled.

As can best be seen in FIG. 85, in the upper region 4311 of the carrier portion 4302, a generally cylindrical portion 4340 of the carrier portion outer wall 4306 includes a bearing surface 4319. The bearing surface 4319, similar to the bearing surface 2319 of the two-piece rotary knife blade 2300, functions as the bearing surface for the rotary knife blade 4300 and defines a rotational plane RP''' of the blade 4300. In the lower region 4312 of the carrier portion, a stepped portion 4331 of the outer wall 4306 defines a driven gear 4328 including a plurality of gear teeth 4332, similar to the gear teeth 2332 of the two-piece rotary knife blade 2300. The inner wall 4304 of the carrier portion 4302 includes a frustoconical portion 4315 which is adjacent and extending upwardly from the bottom surface 4310 of the carrier portion 4302. The frustoconical portion 4315 serves as a nesting or support surface for an outer wall 4354 of the blade portion 4350.

The blade portion 4350 of the two-piece blade 4300 includes an inner wall 4352 and the outer wall 4354, the inner and outer walls 4352, 4354 radially spaced apart by a central wall 4356. The blade portion 4350 extends between a first end or upper wall 4365 and a second or lower end or wall 4366. The lower end 4366 of the blade portion 4350 defines a cutting edge 4368 of the blade 4300 and further defines the lower end 4300*b* of the knife blade 4300. The blade portion includes an upper region 4357 and a lower region 4358, the upper and lower regions 4357, 4358 separated by a slight discontinuity or knee 4359 that extends orthogonally across the blade portion 4350, generally orthogonal to the axis of rotation R''' and generally parallel to the rotational plane RP''' of the rotary knife blade 4300. The inner are outer walls 4352, 4354 of the blade portion 4350 are generally parallel and frustoconical, converging in a direction proceeding toward the lower end 4300*b* of the knife blade 4300 and generally centered about the blade axis of rotation R'''. As can best be seen in FIG. 85, when the rotary knife blade 4300 is in the assembled condition 4399, an upper region 4364 of the blade portion 4350 is received and supported in nested relationship in the carrier portion 4302. An area of contact 4369 between the outer wall 4354 of the blade portion 4350 and the inner wall 4304 of the carrier portion 4302 is generally frustoconical, extending both axially and radially and converging in a direction proceeding toward the lower end 4366 of the blade portion 4350.

Figure 84:
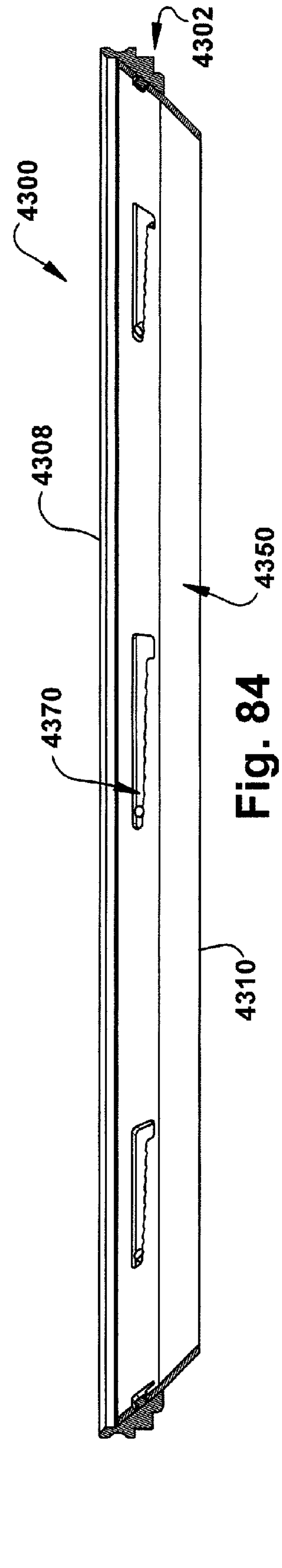
FIG. 84 is a schematic section view of the rotary knife blade of FIG. 82.

The attachment structure 4370 of the two-piece rotary knife blade 4300 includes mating, releasable securement elements on both the blade portion 4350 and the carrier portion 4302. In one exemplary embodiment, the attachment structure 4370 includes a plurality of projections 4372 extending radially inwardly from an inner wall 4304 of the carrier portion 4302 and a plurality of sockets 4374 formed in the central wall 4356 of the blade portion 4350. That is, as best seen in FIG. 84, each of the plurality of sockets 4374 pass completely through the blade portion 4350 passing from the inner wall 4352 through the outer wall 4354, defining an opening or a pass through the blade portion 4350. In one exemplary embodiment, the number of projections 4372 and sockets 4374 is six.

Figure 88:
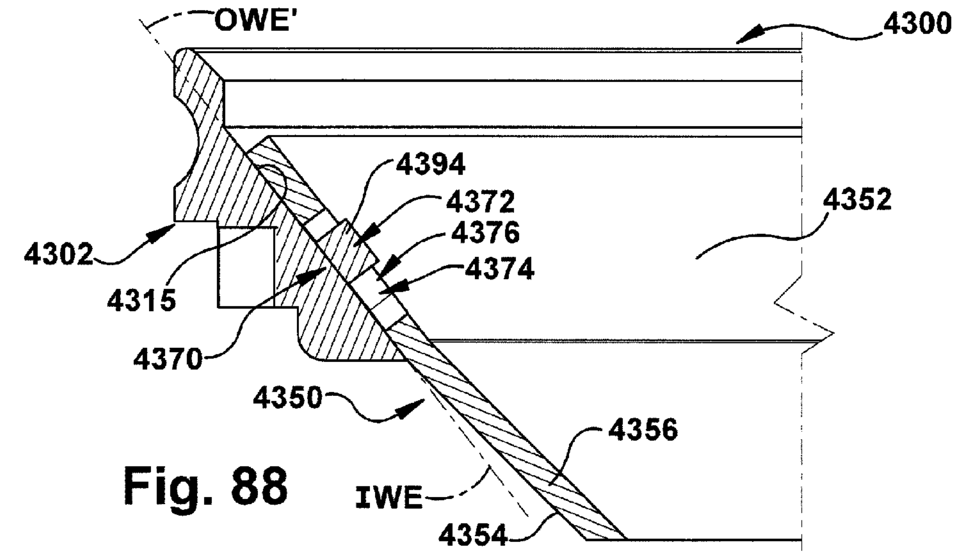
FIG. 88 is a schematic section view of the rotary knife blade of FIG. 82 in a region of the blade where there is engagement of a projection of the carrier portion and into a first, wider opening region of a socket of the blade portion, the socket of the blade portion extending through a central wall of the blade portion from an inner wall through an outer wall of the blade portion, the carrier portion projection and the blade portion socket being part of an attachment structure of the knife blade for releasably securing blade portion to the carrier portion, the first, wider opening region defining a projection receiving opening to accept a projection of the carrier portion.

As best seen in FIG. 88, each of the projections 4372 of the carrier portion 4302 is generally cylindrically shaped and includes: a) a cylinder 4394 extending radially and generally orthogonally away from a general extent IWE of the inner wall 4304 of a lower region 4312 of the carrier portion; and b) a cylindrical outer wall 4395 defined by the cylinder 4394. As can be seen in FIG. 88, when the two-piece rotary knife blade 4300 is in the assembled condition 4399, the cylinders 4394 of the projections 4372 also extend through the sockets 4372 and extend generally orthogonally to a general extent OWE' of the outer wall 4354 of the blade portion 4350. The plurality of projections 4372 may be, for example, spot welded to the inner wall 4304 of the carrier portion 4302.

The attachment structure 4370 of the two-piece rotary knife blade 4300 further includes the plurality sockets 4374 extending through the central wall 4356 of the blade portion 4350. Each socket 4374 is located in the upper region 4357 of the blade portion 4350 and includes a first, wider opening region 4376, a second, tapering region 4378, and a third, locking region 4380. The first, wider opening region 4376 includes an upper surface 4376*a* and a lower surface 4376*b* space from the upper surface along the inner and outer walls 4304, 4306. The lower surface 4376*b* defines an opening region 4376*c* of the socket 4372. The second, tapering region 4378 includes an upper surface 4378*a* and a lower surface 4378*b*. The third, locking region 4380 includes an upper surface 4380*a* and a lower surface 4380*b*. The lower surfaces 4378*b*, 4380*b* of the tapering and locking regions 4378, 4380 define a camming surface 4379. The cylindrical wall 4395 of the cylinders 4394 defining the projections 4372 of the carrier portion 4302 ride along and bear against the camming surface 4379 of the sockets 4374 when the blade portion 4350 is rotated in a clockwise direction CW with respect to the carrier portion 4302 to move the rotary knife blade 4300 from an unassembled condition 4398 (FIGS. 86 and 87) to an assembled condition 4399 (FIGS. 82-85).

The camming surface 4379 proceeds generally toward or converges toward the upper surfaces 4378*a*, 4380*a* thereby reducing the spacing between the respective upper and lower surfaces, as measured along the outer wall 4354 of the blade portion 4350, in moving from the first, opening region 4376 through the second, tapering region 4378 to the third, locking region 4380. Each of the sockets 4374 comprises an opening 4374*a* extending radially through the inner and outer walls 4352, 4354 of the blade portion 4350, the opening 4374*a* having a longitudinal extent RLE'' (FIG. 87) that is substantially parallel to the first and second ends 4365, 4366 of the blade portion 4350. In one exemplary embodiment, the camming surface 4379 is ratcheted 4379*a*, that is, includes a plurality of rounded, L-shaped projections (FIG. 84) for a locking effect. When the blade portion 4350 is rotated or twisted with respect to the carrier portion 4302 in the clockwise direction CW, to move the rotary knife blade 4300 to the assembled condition 4399, the ratcheting 4379*a* of the camming surface 4379 allows movement of the blade portion 4350 with respect to the carrier portion 4302. However, the ratcheting inhibits movement of the cylinder walls 4395 along the camming surface 4379 of the sockets 4374 in the counterclockwise direction CCW thereby mitigating any tendency of the blade portion 4350 to untwist or rotate in the counterclockwise direction CCW during assembly of the blade portion 4350 and the carrier portion 4302 or during operation of the rotary knife blade 4300 in a power operated rotary knife, such as the power operated rotary knife 100.

To secure the blade portion 4350 to the carrier portion 4302, the blade portion 4350 is positioned above the carrier portion 4302. The blade portion 4350 is moved in the downward direction DW''' (FIG. 85) with respect to the carrier portion 4302. The blade portion 4350 is aligned and rotated with respect to the carrier portion 4302 such that each projection 4372 is received into a respective projection receiving opening 4376*c* defined by the upper surface 4376*b* of the first, wider opening region 4376 of its respective mating socket 4374. A length of the cylinders 4394 defining the projections 4372 are configured such that the cylinders 4394*a* are sized to fit into the openings 4376*c* of the sockets 4374 and, as can best be seen in FIG. 88, are of sufficient length to extend completely though the central wall 4356 of the blade portion 4350 and just a bit beyond the inner wall 4352 of the blade portion 4350. Next, after proper alignment, to secure the blade portion 4350 to the carrier portion 4302, the blade portion 4350 is rotated with respect to the carrier portion 4302 in a clockwise direction of rotation CW (when viewed from above) to the locked position wherein the knife blade 4300 is in the assembled condition 4399. As the blade portion 4350 is rotated with respect to the carrier portion 4302, each of the projections of the plurality of projections 4372 moves along the camming surface 4379 and along a locking path of travel LPT'' (FIG. 86) within a respective socket of the plurality of sockets 4374.

Figure 89:
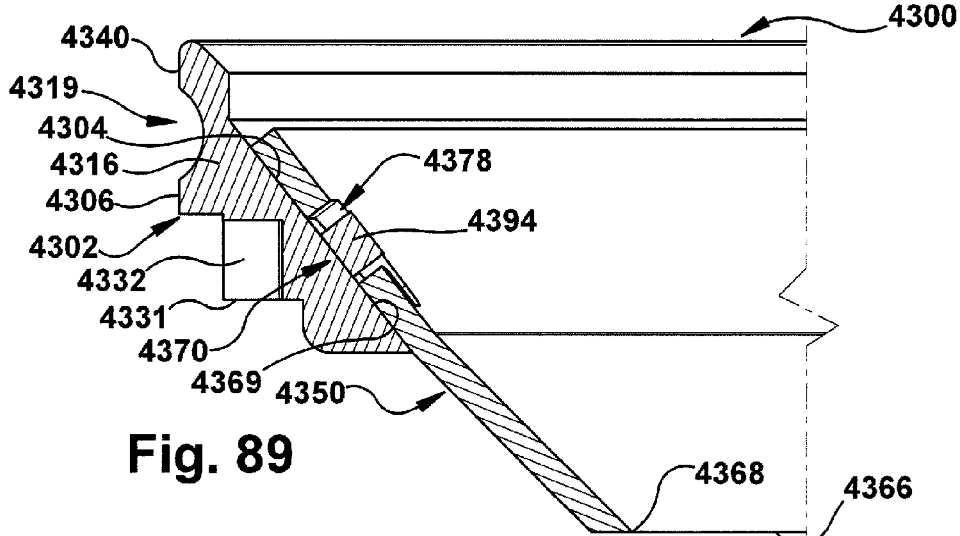
FIG. 89 is a schematic section view of the rotary knife blade of FIG. 82 wherein the projection of the carrier portion into the socket of the blade portion has moved from the first, wider opening region of the socket of the blade portion (as shown in the sectional view of FIG. 88) to a second, transition or tapering region of the socket, the second, tapering region of the socket transitions between the first, wider opening region and a third, narrower locking region (shown in the section view of FIG. 90)
Figure 90:
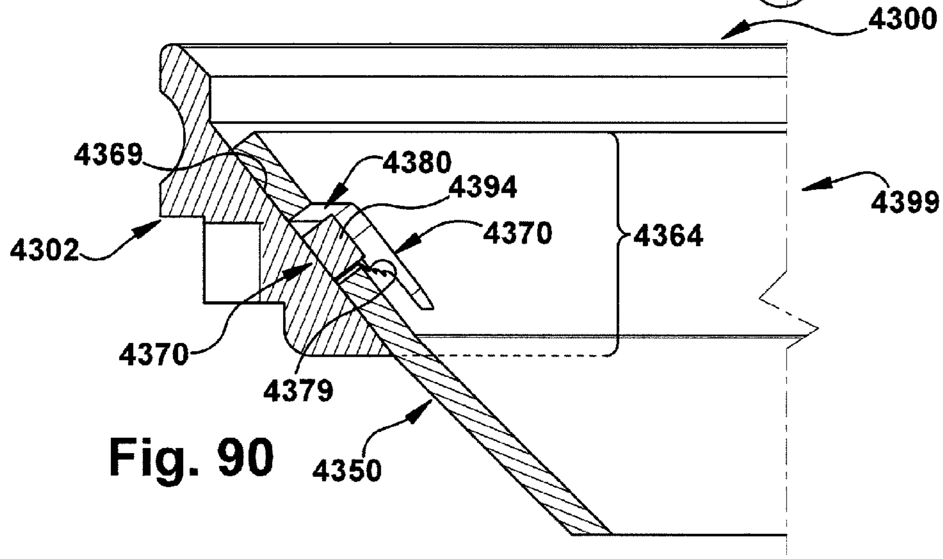
FIG. 90 is a schematic section view of the rotary knife blade of FIG. 82 wherein the projection of the carrier portion into the socket of the carrier portion has moved from the second, tapering region of the socket of the carrier portion (as shown in the sectional view of FIG. 89) to a third, narrow locking region of the socket, the third, narrower locking region defining a locking region to lock a projection of the blade portion so that the blade portion and the carrier portion are in the assembled condition or locked position.

As a given projection 4372 moves along the locking path of travel LPT'' in a socket 4374 from the first, wider opening region 4376 to the third, narrow locking region 4380, the projection 4372 is axially displaced by the camming surface 4379 (defined by the lower surfaces 4378*b*, 4380*b* of the tapering and locking regions 4378, 4380) such that the outer wall 4354 in the upper region 4357 of the blade portion 4350 and the inner wall 4304 of the carrier portion 4302 are urged axially toward each other and the blade portion 4350 is secured to the carrier portion 4302. FIGS. 88-90 schematically illustrate, in section view, movement of a representative cylindrical projection 4372 within a socket 4374 along the locking path of travel LPT'' from the first, wider opening region 4376 (shown in FIG. 88—unlocked position), to the second, tapering region 4378 (shown in FIG. 89—partially locked position), to the third, locking region 4380 (shown in FIG. 90—locked position—assembled condition). As can be seen in the progression of FIGS. 88-90, as the twist and lock securement of the blade portion 4350 to the carrier portion 4302 occurs, the blade portion 4350 is urged axially to full engagement with the carrier portion 4302 in the nesting configuration depicted in FIG. 85.

As can best be seen in FIGS. 89 and 90, as the blade portion 4350 is rotated or twisted in the clockwise direction CW with respect to the carrier portion 4302, the generally cylindrical wall 4395 of each of the plurality of projections 4372 bears against and rides along the camming surface 4379 in the second, tapering region 4378 and third, locking region 4380 of the respective sockets 4374. As the cylindrical wall 4395 of the projections 4374 ride along the camming surface 4379, the blade portion 4350 is urged in the downward axial direction DW''' (FIG. 85) into a nested configuration with the carrier portion 4302, that is, the locked position or the assembled condition 4399.

Two-Piece Rotary Knife Blade 5300

Turning to FIGS. 90-99, the two-piece rotary knife blade 5300 includes the carrier portion 5302 and the blade portion 5350. The rotary knife blade 5300 is schematically shown in assembled condition 5399 in FIGS. 91-93 and in unassembled condition 5398 in FIGS. 94 and 95. The blade 5300, in assembled condition 5399, extends from an upper end 5300*a* to a lower end 5300*b* and rotates about an axis of rotation R'''', similar to the axis of rotation R' of the two-piece rotary knife blade 2300. The blade carrier portion 5302 includes an inner wall 5304 and an outer wall 5306, radially spaced apart by a central wall 5316. The carrier portion 5302 extends axially between a first end or top surface 5308, defining the upper end 5300*a* of the knife blade 5300, and a second end or bottom surface 5310. The carrier portion includes an upper region 5311, adjacent the top surface 5308 and a lower region 5312, adjacent the bottom surface 5310.

Figure 93:
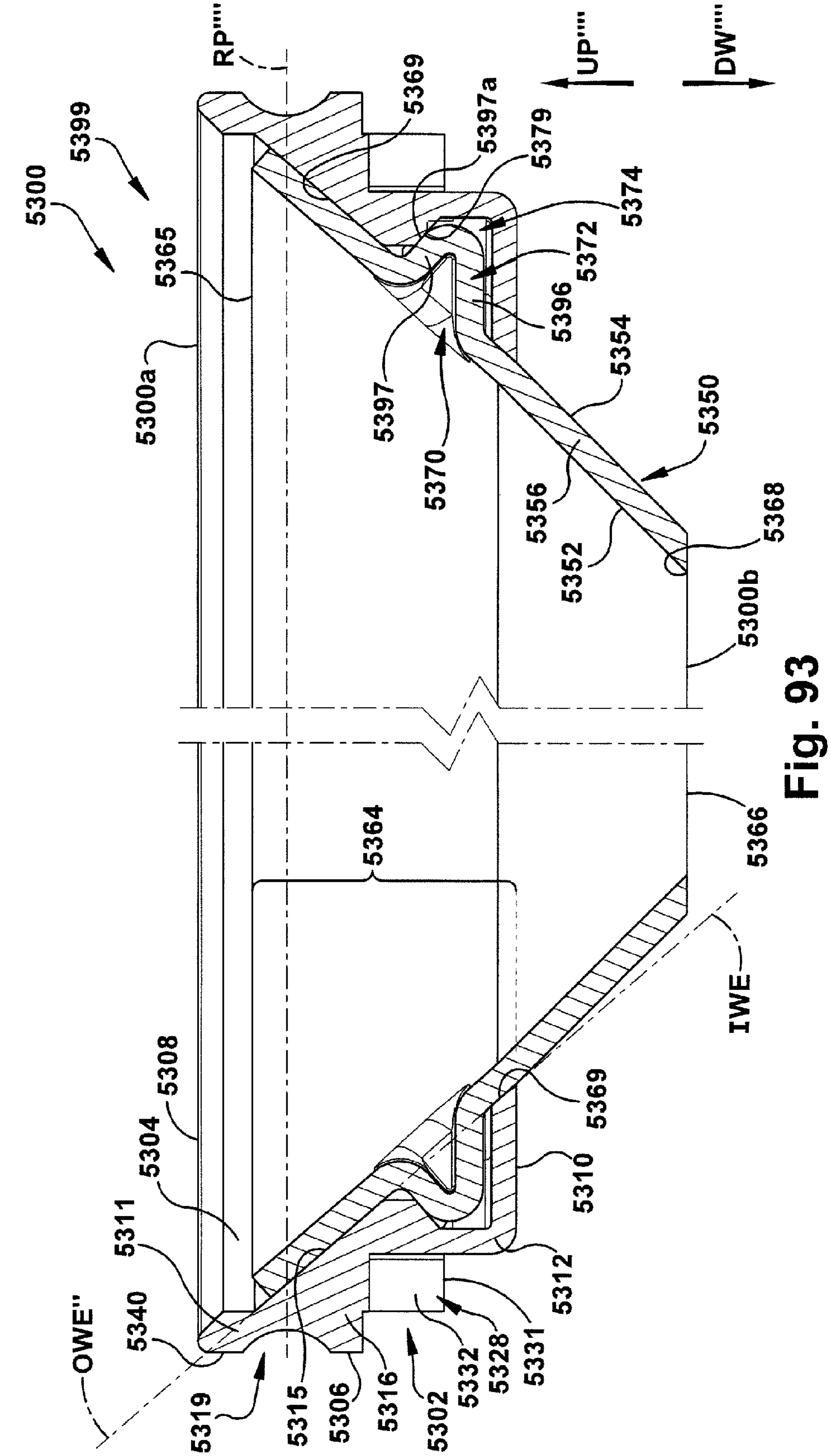
FIG. 93 is a schematic section view of the rotary knife blade of FIG. 91 showing a locking engagement of a projection of the blade portion and a socket of the carrier portion
Figure 94:
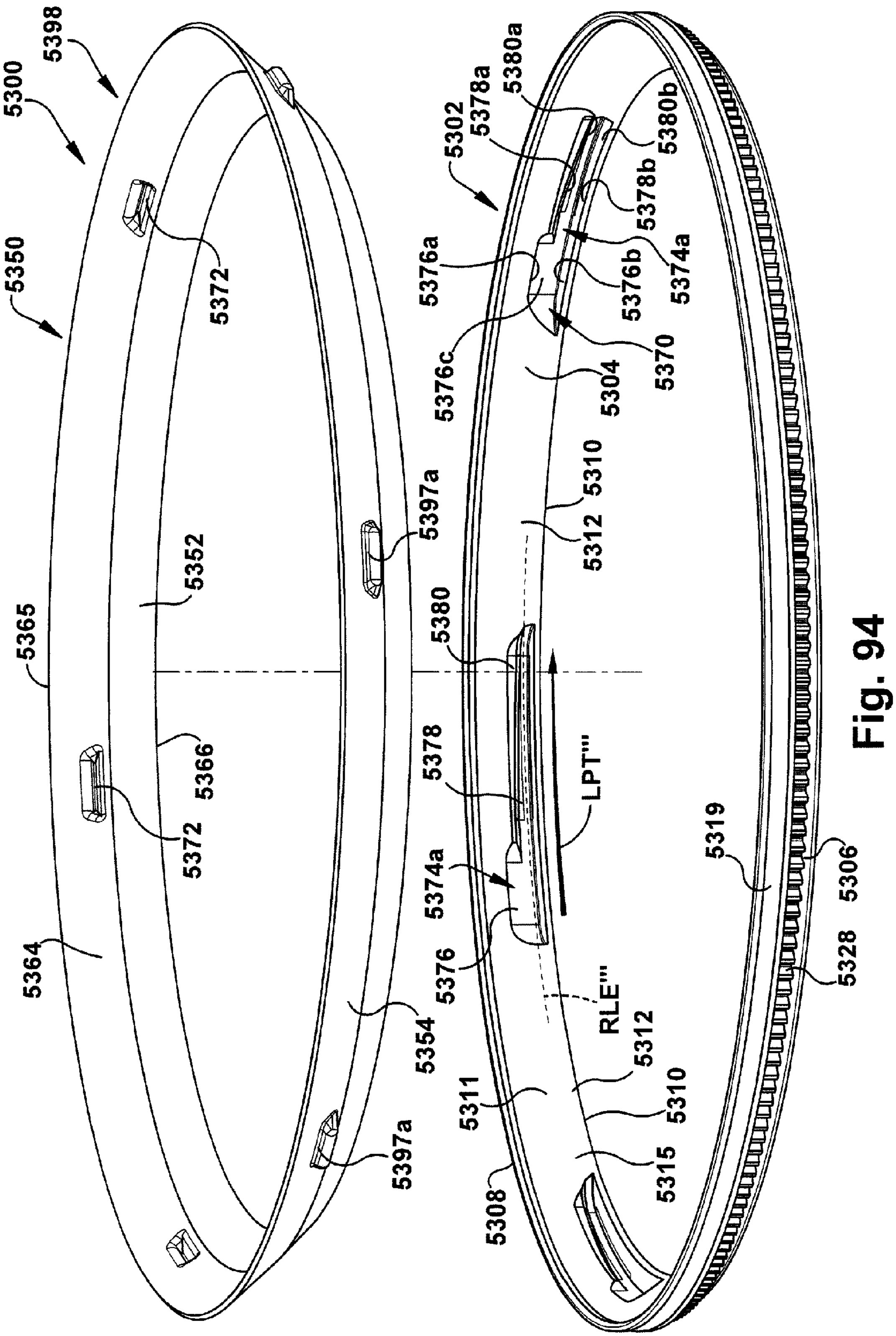
FIG. 94 is a schematic top perspective view of the rotary knife blade of FIG. 91 in an unassembled condition with the blade portion aligned above the carrier portion to schematically illustrate how the blade portion would be received into or would nest with respect to the carrier portion when assembled.
Figure 95:
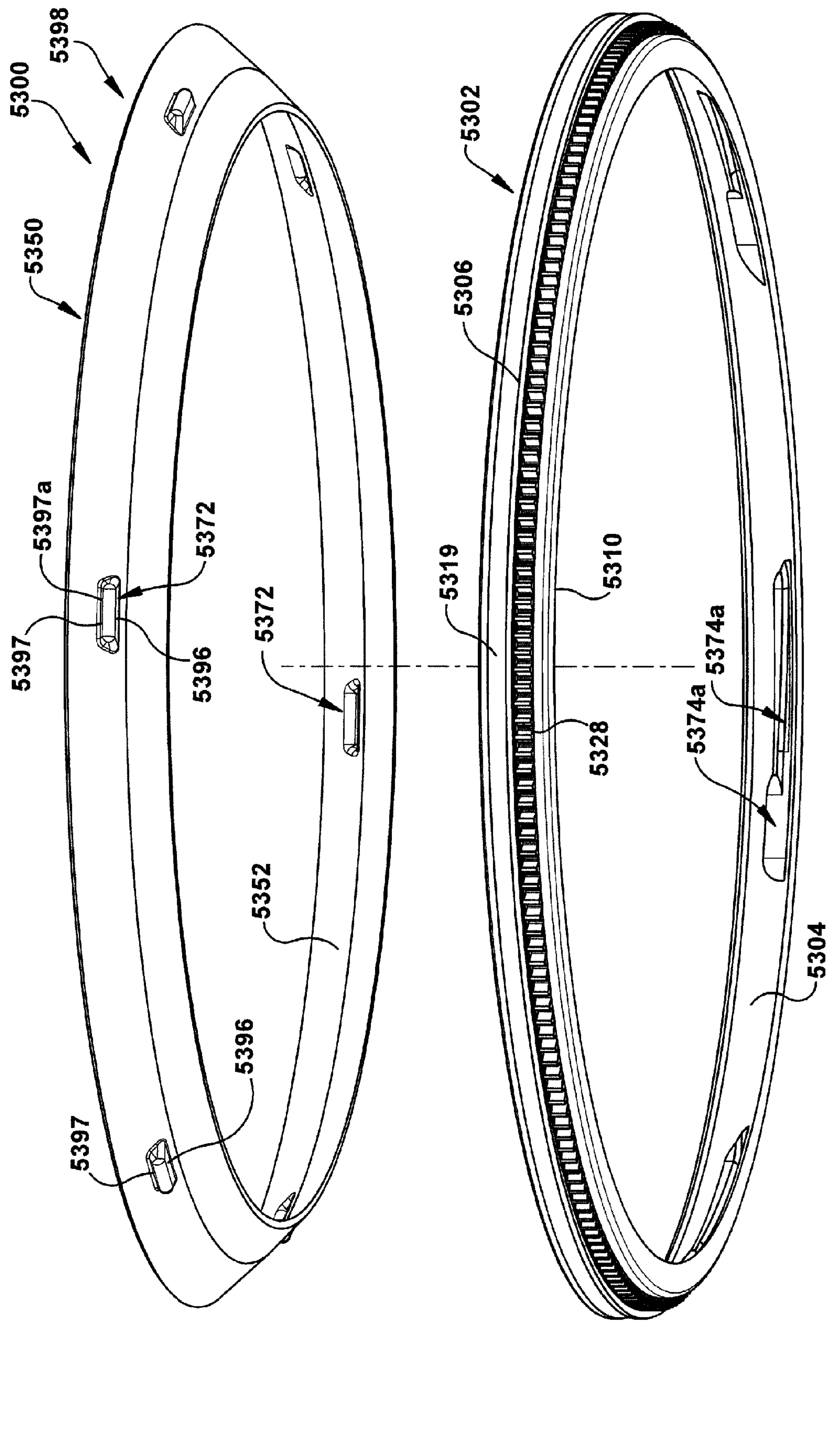
FIG. 95 is a schematic bottom perspective view of the rotary knife blade of FIG. 91 in an unassembled condition with the blade portion aligned above the carrier portion to schematically illustrate how the blade portion would be received into or would nest with respect to the carrier portion when assembled.

As can best be seen in FIG. 93, in the upper region 5311 of the carrier portion 5302, a generally cylindrical portion 5340 of the carrier portion outer wall 5306 includes a bearing surface 5319. The bearing surface 5319, similar to the bearing surface 2319 of the two-piece rotary knife blade 2300, functions as the bearing surface for the rotary knife blade 5300 and defines a rotational plane RP'''' of the blade 5300. In the lower region 5312 of the carrier portion, a stepped portion 5331 of the outer wall 5306 defines a driven gear 5328 including a plurality of gear teeth 5332, similar to the gear teeth 2332 of the two-piece rotary knife blade 2300. The inner wall 5304 of the carrier portion 5302 includes a frustoconical portion 5315 that serves as a nesting or support surface for an outer wall 5354 of the blade portion 5350.

The blade portion 5350 of the two-piece blade 5300 includes an inner wall 5352 and the outer wall 5354 radially spaced apart by a central wall 5356. The blade portion 5350 extends between a first end or upper wall 5365 and a second or lower end or wall 5366. The lower end 5366 of the blade portion 5350 defines a cutting edge of the rotary knife blade 5300 and also defines the lower end 5300*b* of the blade 5300. In one exemplary embodiment, the inner and outer walls 5352, 5354 are substantially parallel and frustoconical in configuration, converging in a direction proceeding toward the lower end 5300*b* of the knife blade 5300 and generally centered about the blade axis of rotation R''''. As can best be seen in FIG. 93, when the rotary knife blade 5300 is in the assembled condition 5399, an upper region 5364 of the blade portion 5350 is received and supported in nested relationship in the carrier portion 5302. An area of contact 5369 between the outer wall 5354 of the blade portion 5350 and the inner wall 5304 of the carrier portion 5302 is generally frustoconical, extending both axially and radially and converging in a direction proceeding toward the lower end 5366 of the blade portion 5350.

The attachment structure 5370 of the two-piece rotary knife blade 5300 includes mating, releasable securement elements on both the blade portion 5350 and the carrier portion 5302. In one exemplary embodiment, the attachment structure 5370 includes a plurality of projections 5372 extending radially outwardly from an outer wall 5354 of the blade portion 5350 and a plurality of sockets 5374 formed in the inner wall 5304 of the carrier portion 5302. In one exemplary embodiment, the number of projections 5372 and sockets 5374 is six.

Figure 97:
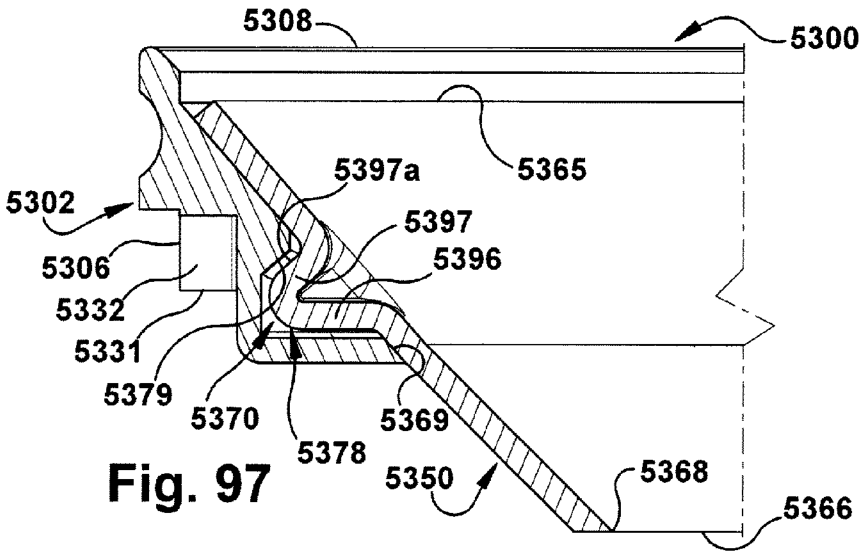
FIG. 97 is a schematic section view of the rotary knife blade of FIG. 91 wherein the projection of the blade portion into the socket of the carrier portion has moved from the first, wider opening region of the socket of the carrier portion (as shown in the sectional view of FIG. 96) to a second, transition or tapering region of the socket, the second, tapering region of the socket transitions between the first, wider opening region and a third, narrower locking region (shown in the section view of FIG. 98)

As best seen in FIG. 97, each of the projections 5372 of the blade portion 5350 is generally V-shaped and includes: a) an lower rib 5396 that extends radially outwardly in a direction generally parallel to the rotational plane RP'''' (FIGS. 93 and 99) of the blade 5300; and b) an upper rib 5397 that extends generally orthogonally away from a general extent OWE'' of the outer wall 5354 of the blade portion; and c) a generally planar upper or end wall 5397*a* defined by the upper rib 5397 that is also generally orthogonal to the general extent OWE' of the outer wall 5354. The V-shaped projections 5372 of the blade portion 5350 may be advantageously fabricated as extruded "bumps" formed in the steel stamping comprising the blade portion 5350.

Figure 91:
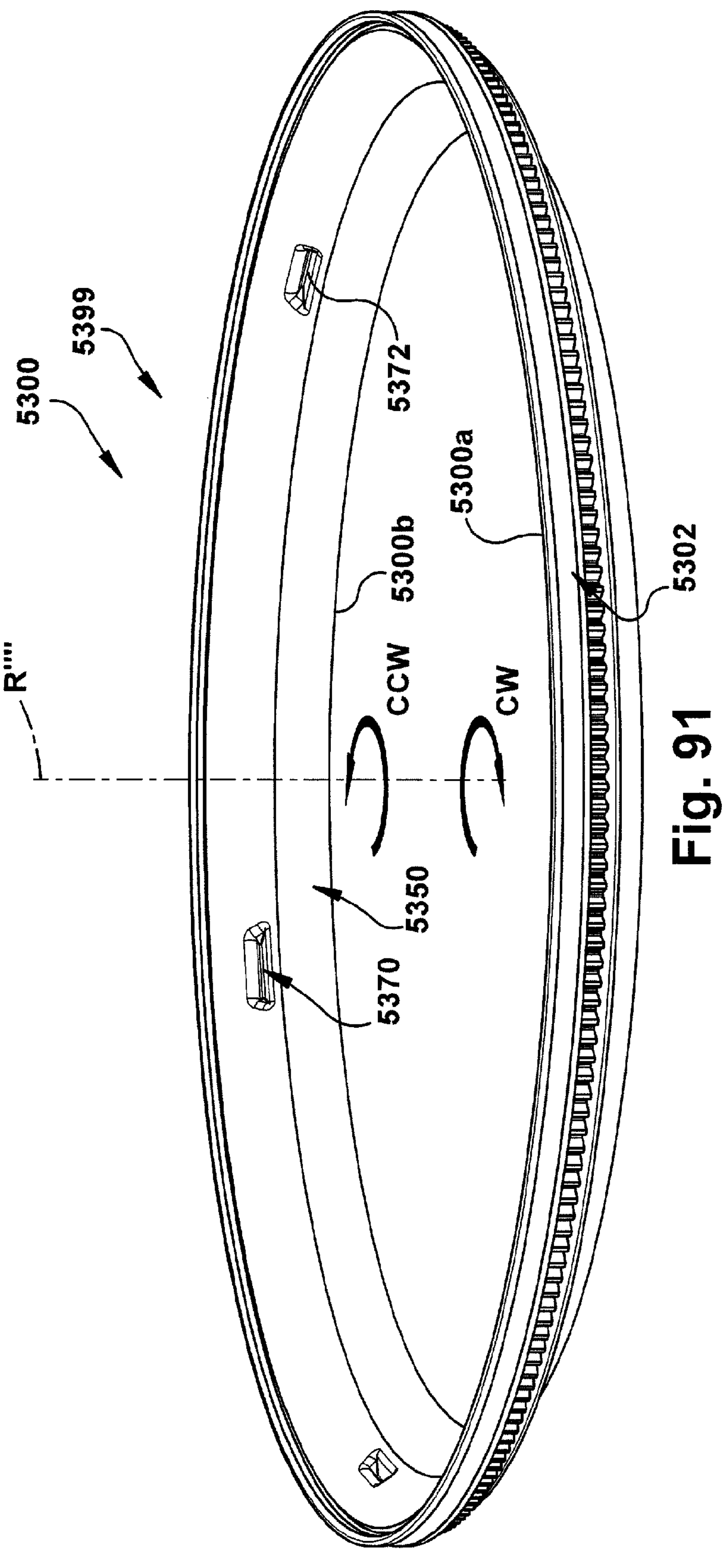
FIG. 91 is a schematic perspective view taken from above of a fourth alternate exemplary embodiment of a two-piece annular rotary knife blade of the present disclosure suitable for use in the power operated rotary knife of FIG. 1, the rotary knife blade including a carrier portion and a blade portion of the two-piece knife blade in a locked position or an assembled condition.
Figure 92:
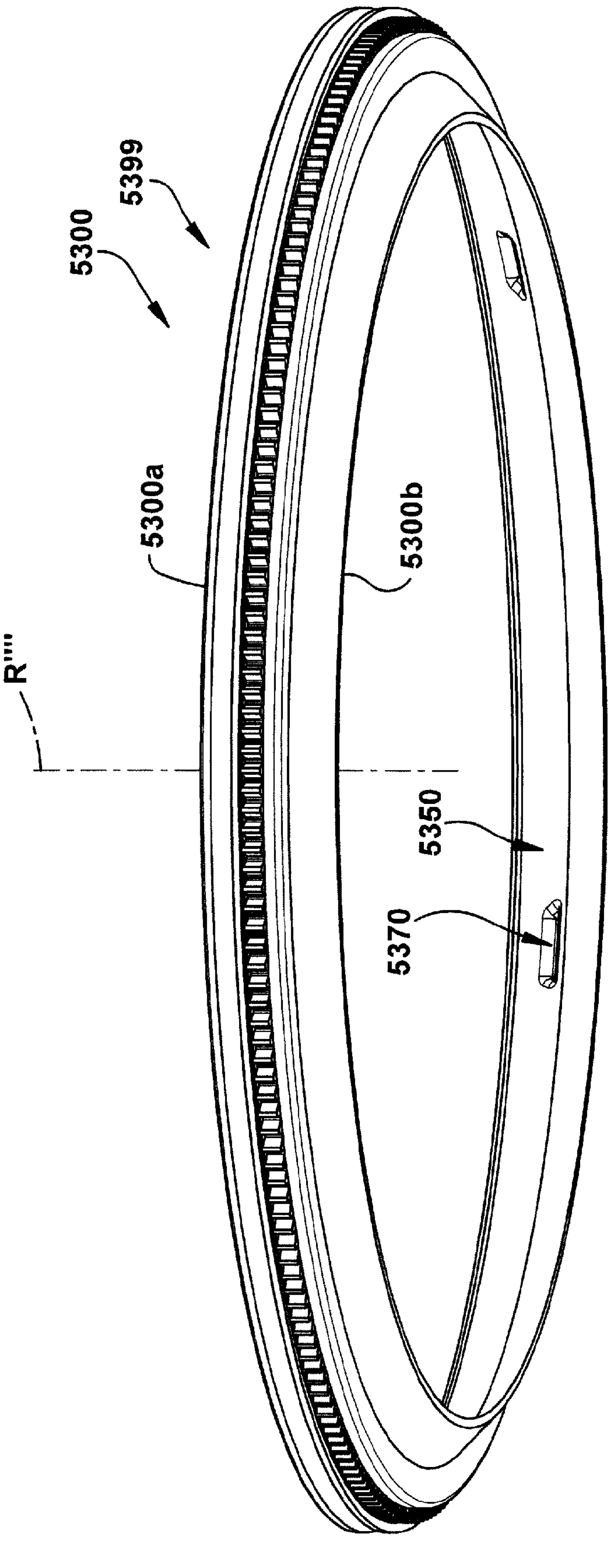
FIG. 92 is a schematic perspective view taken from below of the rotary knife blade of FIG. 91.

The configuration of the plurality of projections 5372 and, specifically, the configuration of the lower rib 5396 which supports and reinforces the upper rib 5397 provides for increased strength and rigidity of the projections 5372 along a bearing line of action parallel to the general extent OWE" of the outer wall 5354. That is, compared to, for example, the angled projections 2372 (FIG. 73) of the two-piece rotary knife blade 2300, the V-shaped configuration of the plurality of projections 5372 of the two-part rotary knife blade 5300 provides for greater strength and rigidity of the projections 5372 as the projections 5372 bear against and ride along a camming surface 5379 of the sockets 5374 when the blade portion 5350 is properly aligned and rotated in a clockwise direction CW with respect to the carrier portion 5302 to urge the rotary knife blade 5300 from an unassembled condition 5398 (FIGS. 94 and 95) to an assembled condition 5399 (FIGS. 91-93).

The attachment structure 5370 of the two-piece rotary knife blade 5300 further includes the plurality sockets 5374 formed in the inner wall 5304 and extending into the central wall 5316 of the carrier portion 5302. Each socket 5374 is located in the lower region 5312 of the carrier portion 5302 and includes a first, wider opening region 5376, a second, tapering region 5378, and a third, locking region 5380. The first, wider opening region 5376 includes an upper surface 5376*a*, defining an opening region 5376*c* of the socket 5374, and a lower surface 5376*b* spaced from the upper surface along the inner wall 5304. The second, tapering region 5378 includes an upper surface 5378*a* and a lower surface 5378*b*. The third, locking region 5380 includes an upper surface 5380*a* and a lower surface 5380*b*. The upper surfaces 5378*a*, 5380*a* of the tapering and locking regions 5378, 5380 define the camming surface 5379. The camming surface 5379 proceeds generally toward or converges toward the lower surfaces 5378*b*, 5380*b* thereby reducing the spacing between the respective upper and lower surfaces, as measured along the inner wall 5304 of the carrier portion 5302, in moving from the first, opening region 5376 through the second, tapering region 5378 to the third, locking region 5380. Each of the sockets 5374 comprises a recess 5374*a* extending radially into the inner wall 5304 of the carrier portion 5302, the recess 5374*a* having a longitudinal extent RLE''' (FIG. 94) that is substantially parallel to the first and second ends 5308, 5310 of the carrier portion 5302.

To secure the blade portion 5350 to the carrier portion 5302, the blade portion 5350 is positioned above the carrier portion 5302. The blade portion 5350 is moved in the downward direction DW'''' (FIG. 93) with respect to the carrier portion 5302. The blade portion 5350 is aligned and rotated with respect to the carrier portion 5302 such that each projection 5372 is received into a respective projection receiving opening 5376*c* defined by the upper surface 5376*b* of the first, wider opening region 5376 of its respective mating socket 5374. Next, after proper alignment, to secure the blade portion 5350 to the carrier portion 5302, the blade portion 5350 is rotated with respect to the carrier portion 5302 in a clockwise direction of rotation CW (when viewed from above) to the locked position wherein the knife blade 5300 is in the assembled condition 5399.

Figure 96:
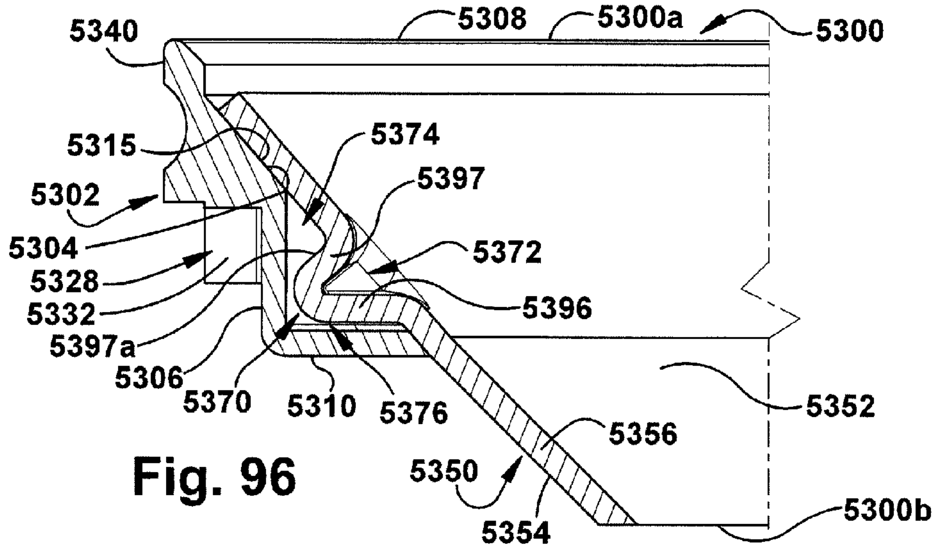
FIG. 96 is a schematic section view of the rotary knife blade of FIG. 91 in a region of the blade where there is engagement of a projection of the blade portion and into a first, wider opening region of a socket of the carrier portion, the blade portion projection and the carrier portion socket being part of an attachment structure of the knife blade for releasably securing blade portion to the carrier portion, the first, wider opening region defining a projection receiving opening to accept a projection of the blade portion.
Figure 98:
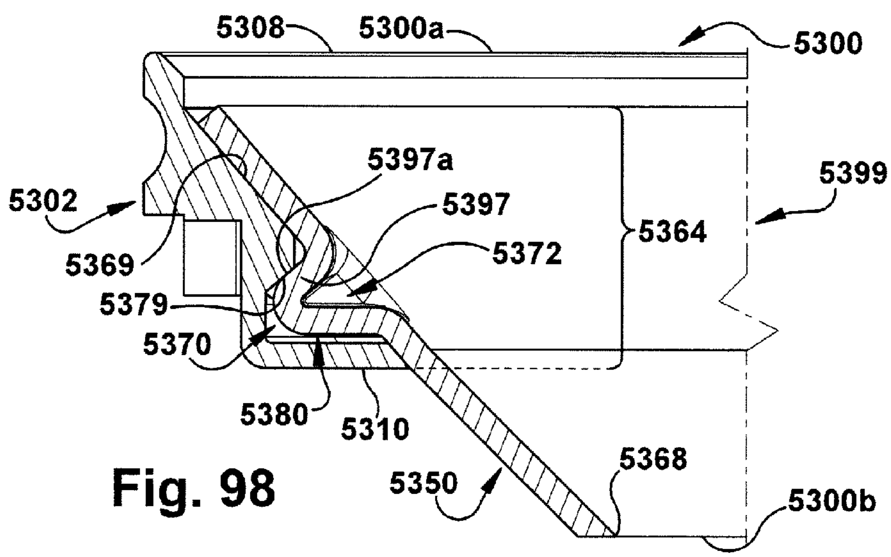
FIG. 98 is a schematic section view of the rotary knife blade of FIG. 91 wherein the projection of the blade portion into the socket of the carrier portion has moved from the second, tapering region of the socket of the carrier portion (as shown in the sectional view of FIG. 97) to a third, narrow locking region of the socket, the third, narrower locking region defining a locking region to lock a projection of the blade portion so that the blade portion and the carrier portion are in the assembled condition or locked position.

As the blade portion 5350 is rotated with respect to the carrier portion 5302, each of the projections of the plurality of projections 5372 moves along the camming surface 5379 and along a locking path of travel LPT''' (FIG. 94) within a respective socket of the plurality of sockets 5374. As a given projection 5372 moves along the locking path of travel LPT''' in a socket 5374 from the first, wider opening region 5376 to the third, narrow locking region 5380, the projection 5372 is axially displaced by the camming surface 5379 (defined by the upper surfaces 5378*a*, 5380*a* of the tapering and locking regions 5378, 5380) such that the outer wall 5354 of the blade portion 5350 and the inner wall 5304 of the carrier portion 5302 are urged axially toward each other and the blade portion 5350 is secured to the carrier portion 5302. FIGS. 96-98 schematically illustrate, in section view, movement of a representative projection 5372 within a socket 5374 along the locking path of travel LPT''' from the first, wider opening region 5376 (shown in FIG. 96—unlocked position), to the second, tapering region 5378 (shown in FIG. 97—partially locked position), to the third, locking region 5380 (shown in FIG. 98—locked position—assembled condition). As can be seen in the progression of FIGS. 96-98, as the twist and lock securement of the blade portion 5350 to the carrier portion 5302 occurs, the blade portion 5350 is urged axially to full engagement with the carrier portion 5302 in the nesting configuration depicted in FIG. 93.

Figure 99:
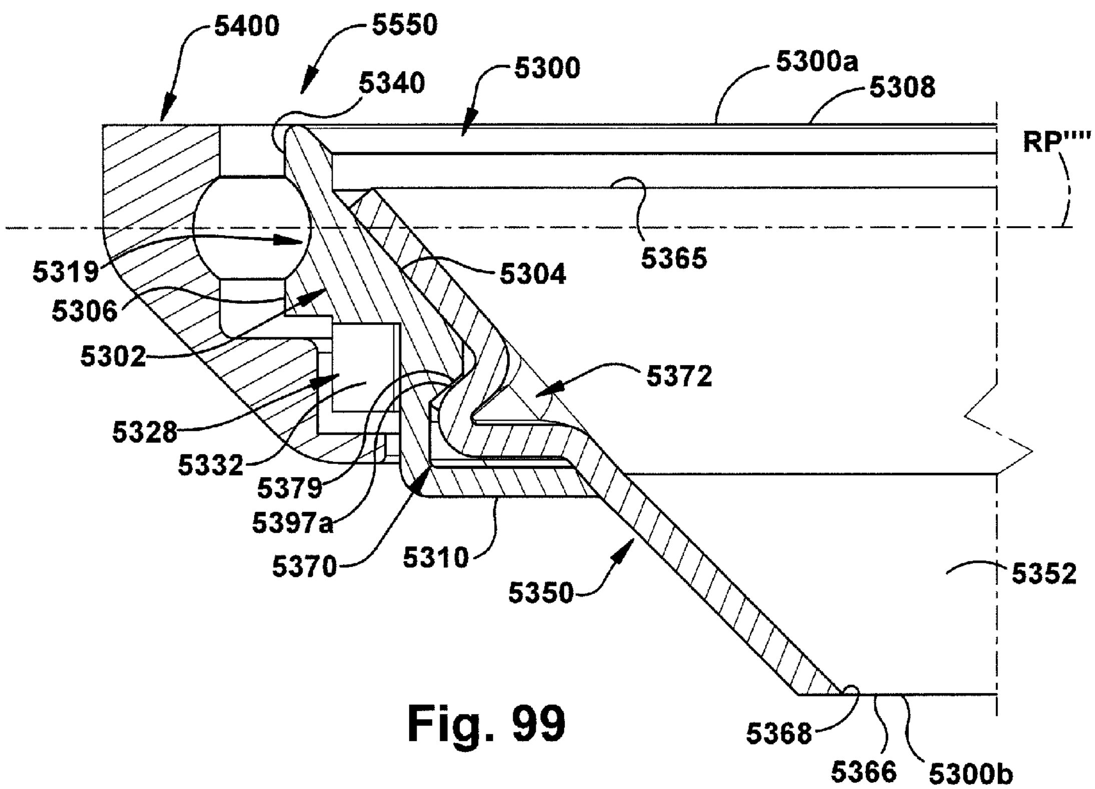
FIG. 99 is a schematic section view of the rotary knife blade of FIG. 91 in assembled condition as installed in a corresponding properly configured blade housing of a power operated rotary knife of the present disclosure.

As can best be seen in FIGS. 97 and 98, as the blade portion 5350 is rotated in the clockwise direction CW, as viewed from above, with respect to the carrier portion 5302, the generally planar upper wall 5397*a* of each of the plurality of projections 5372 bears against and rides along the camming surface 5379 in the second, tapering region 5378 and third, locking region 5380 of the respective sockets 5374. As the end or upper wall 5397*a* of the projections 5372 ride along the camming surface 5379, the blade portion 5350 is urged in the downward axial direction DW'''' (FIG. 93) into a nested configuration with the carrier portion 5302, that is, the locked position or the assembled condition 5399. In FIG. 99, the two-piece rotary knife blade 5300 is schematically shown in section view as mounted in an appropriately configured blade housing 5400 of a power operated rotary knife, such as the power operated rotary knife 100 of the present disclosure.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A power operated rotary knife comprising:

a two-part annular rotary knife blade rotating about an axis of rotation and defining a knife blade bearing surface, the knife blade including an annular carrier portion, an annular blade portion and an attachment structure;

a blade housing including an inner wall defining a blade housing bearing surface; and a blade-blade housing bearing structure disposed between the knife blade bearing surface and the blade housing bearing surface;

the knife blade carrier portion including a first end and an axially spaced apart second end, an outer wall and a radially inward spaced apart inner wall extending respectively between the first end and the second end, and a set of gear teeth;

the knife blade blade portion including a first end and an axially spaced apart second end, an outer wall and a radially inward spaced apart inner wall extending respectively between the first end and the second end, and a cutting edge at the blade portion second end, the blade portion configured to be received in a nested relationship by the carrier portion; and the knife blade attachment structure for releasably securing the blade portion to the carrier portion, the attachment structure including a plurality of projections extending from one of the outer wall of the blade portion and the inner wall of the carrier portion and a plurality of sockets disposed in the other of the outer wall of the blade portion and the inner wall of the carrier portion, each of the plurality of projections being received in a respective different one of the plurality of sockets to releasably secure the blade portion to the carrier portion.

2. The power operated rotary knife of claim 1 wherein the knife blade bearing surface comprises a bearing race extending radially into the outer wall of the carrier portion.

3. The power operated rotary knife of claim 2 wherein the bearing race is axially spaced from the first end of the carrier portion.

4. The power operated rotary knife of claim 1 wherein the set of gear teeth is formed in the outer wall of the carrier portion and is axially spaced from the first end of the carrier portion.

5. The power operated rotary knife of claim 2 where in the set of gear teeth is axially spaced from the bearing race.

6. The power operated rotary knife of claim 1 wherein each of the plurality of sockets includes a projection receiving opening and a camming surface extending from the projection receiving opening, the plurality of projections and the plurality of sockets configured and positioned relative to each other such that when the blade portion is received in nested relationship by the carrier portion and the blade and carrier portions are properly rotationally aligned, each of the plurality of projections is received into a respective projection receiving opening of the plurality of sockets and, upon rotating the blade portion with respect to the carrier portion in a direction of rotation to a locked position, each of the projections of the plurality of projections moves along a path of travel within a respective socket of the plurality of sockets and is axially displaced by the camming surface of the socket such that the outer wall of the blade portion and the inner wall of the carrier portion are urged toward each other and the blade portion is secured to the carrier portion.

7. The power operated rotary knife of claim 6 wherein the direction of rotation of the blade portion with respect to the carrier portion to move to the locked position is opposite in rotational direction to a direction of rotation of the blade in a rotary knife.

8. The power operated rotary knife of claim 6 wherein a direction of rotation of the blade in a rotary knife is counterclockwise when viewed from the blade central axis axially above the first end of the carrier portion and the direction of rotation of the blade portion with respect to the carrier portion is clockwise when viewed from the blade central axis axially above the first end of the blade carrier.

9. The power operated rotary knife of claim 1 wherein the inner and outer walls of the blade portion are substantially parallel.

10. The power operated rotary knife of claim 1 wherein the inner and outer walls of the blade portion include frustoconical portions.

11. The power operated rotary knife of claim 1 wherein the inner and outer walls of the blade portion are substantially frustoconical.

12. The power operated rotary knife of claim 1 wherein the plurality of projections extend from the outer wall of the blade portion and the plurality of sockets extend into the inner wall of the carrier portion.

13. The power operated rotary knife of claim 12 wherein the plurality of projections comprise radially outwardly extending projections.

14. The power operated rotary knife of claim 12 wherein the plurality of projections comprise projections that extend outwardly from a general extent of the outer wall of the blade portion.

15. The power operated rotary knife of claim 11 wherein each the plurality of sockets comprises a recess extending radially into the inner wall of the carrier portion.

16. The power operated rotary knife of claim 15 wherein the recess of each of the plurality of sockets has a longitudinal extent that is substantially parallel to the first end of the carrier portion.

17. The power operated rotary knife of claim 11 wherein each of the plurality of sockets comprises an opening extending through the inner and outer walls of the carrier portion.

18. The power operated rotary knife of claim 17 wherein the recess of each of the plurality of sockets has a longitudinal extent that is substantially parallel to the first end of the carrier portion.

19. The power operated rotary knife of claim 1 wherein the plurality of projections extend from the inner wall of the carrier portion and the plurality of sockets extend into the outer wall of the blade portion.

20. The power operated rotary knife of claim 19 wherein the plurality of sockets comprises an opening extending through the inner and outer walls of the carrier portion.

21. The power operated rotary knife of claim 20 wherein the recess of each of the plurality of sockets has a longitudinal extent that is substantially parallel to the first end of the blade portion.

22. The power operated rotary knife of claim 1 wherein each socket of the plurality of sockets includes a first surface and a spaced apart camming surface proceeding toward the first surface and further includes a first, opening region, a second, tapering region, and a third, locking region, the first, opening region defining a projection receiving opening.

23. The power operated rotary knife of claim 1 wherein the blade portion comprises a steel stamping.

24. The power operated rotary knife of claim 1 wherein the plurality of projections includes four projections and the plurality of sockets includes four sockets.

25. The power operated rotary knife of claim 1 wherein the plurality of projections includes six projections and the plurality of sockets includes six sockets.

26. An annular rotary knife blade for rotation about an axis of rotation in a power operated rotary knife, the rotary knife blade comprising:

an annular carrier portion including a first end and an axially spaced apart second end, an outer wall and a radially inward spaced apart inner wall extending respectively between the first end and the second end, the carrier portion including a set of gear teeth and a knife blade bearing surface;

an annular blade portion including a first end and an axially spaced apart second end, an outer wall and a radially inward spaced apart inner wall extending respectively between the first end and the second end, and a cutting edge at the blade portion second end, the blade portion configured to be received in a nested relationship by the carrier portion; and an attachment structure for releasably securing the blade portion to the carrier portion, the attachment structure including a plurality of projections extending from one of the outer wall of the blade portion and inner wall of the carrier portion and a plurality of sockets disposed in the other of the outer wall of the blade portion and the inner wall of the carrier portion, each of the plurality of projections being received in a respective different one of the plurality of sockets to releasably secure the blade portion to the carrier portion.

27. The annular rotary knife blade of claim 26 wherein the knife blade bearing surface comprises a bearing race extending radially into the outer wall of the carrier portion.

28. The annular rotary knife blade of claim 27 wherein the bearing race is axially spaced from the first end of the carrier portion.

29. The annular rotary knife blade of claim 26 wherein the set of gear teeth is formed in the outer wall of the carrier portion and is axially spaced from the first end of the carrier portion.

30. The annular rotary knife blade of claim 27 where in the set of gear teeth is axially spaced from the bearing race.

31. The annular rotary knife blade of claim 26 wherein the inner and outer walls of the blade portion are substantially parallel.

32. The annular rotary knife blade of claim 26 wherein the plurality of projections extend from the outer wall of the blade portion and the plurality of sockets extend into the inner wall of the carrier portion.

33. The annular rotary knife blade of claim 32 wherein the plurality of projections comprise radially outwardly extending projections.

34. The annular rotary knife blade of claim 32 wherein the plurality of projections comprise projections that extend outwardly from a general extent of the outer wall of the blade portion.

35. The annular rotary knife blade of claim 32 wherein each the plurality of sockets comprises a recess extending radially into the inner wall of the carrier portion.

36. The annular rotary knife blade of claim 35 wherein the recess of each of the plurality of sockets has a longitudinal extent that is substantially parallel to the first end of the carrier portion.

37. The annular rotary knife blade of claim 26 wherein each of the plurality of sockets comprises an opening extending through the inner and outer walls of the carrier portion.

38. The annular rotary knife blade of claim 37 wherein the recess of each of the plurality of sockets has a longitudinal extent that is substantially parallel to the first end of the carrier portion.

39. The annular rotary knife blade of claim 26 wherein the plurality of projections extend from the inner wall of the carrier portion and the plurality of sockets extend into the outer wall of the blade portion.

40. The annular rotary knife blade of claim 39 wherein the plurality of sockets comprises an opening extending through the inner and outer walls of the carrier portion.

41. The annular rotary knife blade of claim 40 wherein the recess of each of the plurality of sockets has a longitudinal extent that is substantially parallel to the first end of the blade portion.

42. The annular rotary knife blade of claim 26 wherein each of the plurality of sockets includes a projection receiving opening and a camming surface extending from the projection receiving opening, the plurality of projections and the plurality of sockets configured and positioned relative to each other such that when the blade portion is received in nested relationship by the carrier portion and the blade and carrier portions are properly rotationally aligned, each of the plurality of projections is received into a respective projection receiving opening of the plurality of sockets and, upon rotating the blade portion with respect to the carrier portion in a direction of rotation to a locked position, each of the projections of the plurality of projections moves along a path of travel within a respective socket of the plurality of sockets and is axially displaced by the camming surface of the socket such that the outer wall of the blade portion and the inner wall of the carrier portion are urged toward each other and the blade portion is secured to the carrier portion.

43. The annular rotary knife blade of claim 42 wherein the direction of rotation of the blade portion with respect to the carrier portion to move to the locked position is opposite in rotational direction to a direction of rotation of the blade in a rotary knife.

44. The annular rotary knife blade of claim 42 wherein a direction of rotation of the blade in a rotary knife is counterclockwise when viewed from the blade central axis axially above the first end of the blade carrier and a direction of rotation of the blade portion with respect to the carrier portion is clockwise when viewed from the blade central axis axially above the first end of the blade carrier.

45. The annular rotary knife blade of claim 26 wherein the inner and outer walls of the blade portion include substantially frustoconical portions.

46. The annular rotary knife blade of claim 26 wherein the inner and outer walls of the blade portion are substantially frustoconical.

47. The annular rotary knife blade of claim 26 wherein each socket of the plurality of sockets includes a first surface and a spaced apart camming surface proceeding toward the first surface and further includes a first, opening region, a second, tapering region, and a third, locking region, the first, opening region defining a projection receiving opening.

48. The annular rotary knife blade of claim 26 wherein the blade portion comprises a steel stamping.

49. The annular rotary knife blade of claim 26 wherein the plurality of projections includes four projections and the plurality of sockets includes four sockets.

50. The annular rotary knife blade of claim 26 wherein the plurality of projections includes six projections and the plurality of sockets includes six sockets.

* * * * *